US010557660B2

(12) United States Patent
Kakehashi et al.

(10) Patent No.: US 10,557,660 B2
(45) Date of Patent: Feb. 11, 2020

(54) HEAT EXCHANGER WITH A PLURALITY OF HEAT EXCHANGING PORTIONS

(71) Applicant: DENSO CORPORATION, Kariya, Aichi-pref. (JP)

(72) Inventors: Nobuharu Kakehashi, Toyoake (JP); Yoshiki Katoh, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 188 days.

(21) Appl. No.: 15/877,420

(22) Filed: Jan. 23, 2018

(65) Prior Publication Data

US 2018/0142936 A1 May 24, 2018

Related U.S. Application Data

(62) Division of application No. 14/376,277, filed as application No. PCT/JP2013/000521 on Jan. 31, 2013, now abandoned.

(30) Foreign Application Priority Data

| | | | |
|---|---|---|---|
| Feb. 2, 2012 | (JP) | ................................ | 2012-020905 |
| Apr. 3, 2012 | (JP) | ................................ | 2012-084444 |
| Jan. 15, 2013 | (JP) | ................................ | 2013-004966 |

(51) Int. Cl.
*F25D 17/02* (2006.01)
*H01M 10/625* (2014.01)
(Continued)

(52) U.S. Cl.
CPC ............ *F25D 17/02* (2013.01); *B60H 1/004* (2013.01); *B60H 1/143* (2013.01);
(Continued)

(58) Field of Classification Search
CPC .. F25D 17/02; F02M 26/28; F28F 9/02; F28F 9/0246; F28F 27/02; F28F 1/00;
(Continued)

(56) References Cited

U.S. PATENT DOCUMENTS 3,444,926 A 5/1969 Stalberg
3,881,323 A * 5/1975 Porter ..................... C09K 5/20 62/216

(Continued)

FOREIGN PATENT DOCUMENTS

JP H08138762 A 5/1996
JP 2001500822 A 1/2001

(Continued)

OTHER PUBLICATIONS

International Search Report and Written Opinion (in Japanese with English Translation) for PCT/JP2013/000521, dated Apr. 2, 2013; ISA/JP.

(Continued)

*Primary Examiner* — Emmanuel E Duke
(74) *Attorney, Agent, or Firm* — Harness, Dickey & Pierce, P.L.C.

(57) ABSTRACT

A heat exchanging portion and tank portions are formed by bonding plate members. The tank portion is provided with a refrigerant inlet allowing a refrigerant to flow into a refrigerant tank space, a refrigerant outlet allowing the refrigerant to flow from the refrigerant tank space, a heat medium inlet allowing a heat medium to flow into a heat medium tank space, and a heat medium outlet allowing the heat medium to flow from the heat medium tank space. At least one of the refrigerant inlet, the refrigerant outlet, the heat medium inlet, and the heat medium outlet is disposed between both ends of the tank portions in a tube stacking direction of refrigerant tubes and heat medium tubes.

13 Claims, 64 Drawing Sheets

(51) Int. Cl.

| | |
|---|---|
| ***H01M 10/6556*** | (2014.01) |
| ***H01M 10/613*** | (2014.01) |
| ***F28F 9/02*** | (2006.01) |
| ***F28F 27/02*** | (2006.01) |
| ***F28D 9/00*** | (2006.01) |
| ***B60H 1/00*** | (2006.01) |
| ***B60H 1/14*** | (2006.01) |
| ***F02M 26/28*** | (2016.01) |
| ***F28F 9/26*** | (2006.01) |
| ***F02B 29/04*** | (2006.01) |
| ***F28F 1/00*** | (2006.01) |
| *F28D 21/00* | (2006.01) |
| *B60K 1/00* | (2006.01) |

(52) U.S. Cl.

CPC ......... *F02B 29/0443* (2013.01); *F02M 26/28* (2016.02); *F28D 9/005* (2013.01); *F28D 9/0043* (2013.01); *F28D 9/0093* (2013.01); *F28F 1/00* (2013.01); *F28F 9/02* (2013.01); *F28F 9/0246* (2013.01); *F28F 9/26* (2013.01); *F28F 27/02* (2013.01); *H01M 10/613* (2015.04); *H01M 10/625* (2015.04); *H01M 10/6556* (2015.04); *B60K 2001/003* (2013.01); *B60L 2240/34* (2013.01); *B60L 2240/545* (2013.01); *F01P 2050/24* (2013.01); *F28D 2021/008* (2013.01); *F28D 2021/0031* (2013.01); *F28D 2021/0084* (2013.01); *F28D 2021/0094* (2013.01); *Y02T 10/146* (2013.01)

(58) Field of Classification Search

CPC .... F28F 9/26; H01M 10/625; H01M 10/6556; H01M 10/613; F02B 29/0443; F28D 2021/0084; F28D 2021/0031; F28D 2021/0094; F28D 2021/008; F28D 9/0043; F28D 9/005; F28D 9/0093; B60K 2001/003; Y02T 10/146; F01P 2050/24; B60L 2240/34; B60H 1/32281; B60H 1/004; B60H 1/143

See application file for complete search history.

(56) References Cited

U.S. PATENT DOCUMENTS

| | | | | |
|---|---|---|---|---|
| 5,755,280 | A | 5/1998 | da Costa et al. | |
| 5,834,132 | A | 11/1998 | Hasegawa et al. | |
| 5,974,817 | A * | 11/1999 | Prummer | B41F 7/24 101/487 |
| 6,092,383 | A * | 7/2000 | Mertens | B60H 1/00007 62/238.6 |
| 6,502,420 | B2 * | 1/2003 | Gupte | F28D 9/0093 165/140 |
| 6,616,059 | B2 | 9/2003 | Sabhapathy et al. | |
| 6,935,417 | B1 | 8/2005 | Inoue et al. | |
| 7,753,105 | B2 | 7/2010 | Acre | |
| 8,191,615 | B2 * | 6/2012 | So | F28D 1/0333 165/140 |
| 2002/0121554 | A1 | 9/2002 | Vaudry et al. | |
| 2005/0006076 | A1 | 1/2005 | Moeller et al. | |
| 2005/0066524 | A1 | 3/2005 | Moeller et al. | |
| 2006/0010885 | A1 * | 1/2006 | Van Berkel | F25D 17/02 62/64 |
| 2008/0251303 | A1 | 10/2008 | Rouaud et al. | |
| 2011/0197604 | A1 * | 8/2011 | Minor | B60H 1/00885 62/117 |
| 2012/0210746 | A1 * | 8/2012 | Kadle | F25B 1/00 62/498 |
| 2014/0374081 | A1 | 12/2014 | Kakehashi et al. | |

FOREIGN PATENT DOCUMENTS

| | | | |
|---|---|---|---|
| JP | 2002322911 | A | 11/2002 |
| JP | 3373770 | B2 | 2/2003 |
| JP | 3443296 | B2 | 9/2003 |
| JP | 2003262127 | A | 9/2003 |
| JP | 2004257728 | A | 9/2004 |
| JP | 2004257729 | A | 9/2004 |
| JP | 2006051852 | A | 2/2006 |
| JP | 4013832 | B2 | 11/2007 |
| JP | 2009507717 | A | 2/2009 |
| JP | 4657723 | B2 | 3/2011 |
| JP | 2011098628 | A | 5/2011 |
| JP | 2011121551 | A | 6/2011 |

OTHER PUBLICATIONS

Office Action dated Aug. 18, 2015 issued in the corresponding JP Application No. 2013-004966 with English Translation.

* cited by examiner

THIRD MODE

FIRST STATE

FIRST MODE

SECOND MODE

THIRD MODE

SECOND MODE

THIRD MODE

FIRST MODE

SECOND MODE

THIRD MODE

FOURTH MODE

HEAT EXCHANGER WITH A PLURALITY OF HEAT EXCHANGING PORTIONS

CROSS REFERENCE TO RELATED APPLICATION

This application is a divisional Application of U.S. patent application Ser. No. 14/376,277 filed on Aug. 1, 2014 which is a U.S. National Phase Application under 35 U.S.C. 371 of International Application No. PCT/JP2013/000521 filed on Jan. 31, 2013 and published in Japanese as WO 2013/114880 A1 on Aug. 8, 2013 which is based on Japanese Patent Applications No. 2012-020905 filed on Feb. 2, 2012, No. 2012-084444 filed on Apr. 3, 2012, and No. 2013-004966 filed on Jan. 15, 2013. The entire disclosures of all of the above applications are incorporated herein by reference.

FIELD OF THE INVENTION

The present disclosure relates to a heat exchanger for exchanging heat between a refrigerant and a heat medium.

BACKGROUND OF THE INVENTION

Conventionally, as disclosed in Patent Document 1, there is proposed a heat controller for cooling a motor generator, an inverter, a battery and a vehicle compartment of an electric vehicle.

The heat controller in the related art includes a cooling circuit for allowing a coolant for cooling the motor generator and the inverter to circulate therethrough, a first circulation circuit for allowing a coolant for cooling the battery and vehicle compartment to circulate therethrough, and a second circulation circuit for allowing a coolant passing through an outdoor heat exchanger and exchanging heat with outside air to circulate therethrough.

Further, the heat controller includes a first valve for connecting or disconnecting between the cooling circuit and the first circulation circuit, a second valve for connecting or disconnecting the cooling circuit to either the first circulation circuit or second circulation circuit, and a third valve for connecting or disconnecting between the cooling circuit and the second circulation circuit. The respective valves are controlled to switch the subject of connection of the cooling circuit between the first and second circulation circuits.

Heat can be transferred by a heat transfer device between the coolant circulating through the first circulation circuit and the coolant circulating through the second circulation circuit. The heat transfer device transfers the heat from the coolant at a low temperature to the coolant at a high temperature between the coolants in the first and second circulation circuits.

The heat of the coolant in the first circulation circuit is transferred to the coolant in the second circulation circuit by the heat transfer device, and the heat of the coolant in the second circulation circuit is dissipated into the outside by the outdoor heat exchanger, which can cool the battery and vehicle compartment.

The cooling circuit is connected to the first circulation circuit or second circulation circuit by use of the first to third valves, so that the heat of the coolant in the cooling circuit can be dissipated into the outside air by the outdoor heat exchanger in the second circulation circuit, thereby cooling the motor generator and inverter.

PRIOR ART DOCUMENT

Patent Document

PATENT DOCUMENT 1: JP 2011-121551A

SUMMARY OF INVENTION

The related art described above has an advantage that only one outdoor heat exchanger is required to cool a plurality of devices to be cooled, including the motor generator, the inverter, the battery, and the vehicle compartment in a cooling system. However, the entire circuit configuration might be complicated. In this case, as the number of devices to be cooled increases, the circuit configuration might become more complicated.

For example, the devices to be cooled, which require cooling, include an EGR cooler, an intake air cooler, and the like, in addition to the motor generator, the inverter, and the battery. Those devices to be cooled have different required cooling temperatures.

In order to appropriately cool the respective devices to be cooled, the coolant to circulate through the respective devices is proposed to be switchable among the devices, and thereby it leads to an increase in the number of the circulation circuits according to the number of devices to be cooled. Together with the increase, the number of valves for connecting/disconnecting between the cooling circuit and the respective circulation circuits is also increased, resulting in a very complicated structure of flow paths for connecting the respective circulation circuits and the cooling circuit.

For this reason, in order to simplify the system structure, a plurality of heat exchangers used for the cooling system is proposed to be combined (integrated) together. The combined (integrated) heat exchangers, however, have a plurality of inlets and outlets for fluids to be heat-exchanged, resulting in less flexibility in connection of pipes or arrangement of the heat exchangers.

The present disclosure has been made in view of the foregoing matters, and it is an object of the present disclosure to provide a heat exchanger having high flexibility in connection of pipes and arrangement of heat exchangers.

According to one aspect of the present disclosure, a heat exchanger includes: (i) a heat exchanging portion configured by stacking a plurality of refrigerant tubes through which a refrigerant in a vapor-compression refrigeration cycle flows, and a plurality of heat medium tubes through which a heat medium flows to exchange heat with the refrigerant; and (ii) a tank portion provided with at least one of a refrigerant tank space adapted to collect or distribute the refrigerant with respect to the refrigerant tubes, and a heat medium tank space adapted to collect or distribute the heat medium with respect to the heat medium tubes. In the heat exchanger, the heat exchanging portion and the tank portion are formed by bonding plate members. The heat exchanging portion includes a first heat exchanging portion in which heat is exchanged between the heat medium and the refrigerant on a high-pressure side of the vapor-compression refrigeration cycle, and a second heat exchanging portion in which heat is exchanged between the heat medium and the refrigerant on a low-pressure side of the vapor-compression refrigeration cycle. The tank portion is provided with a refrigerant inlet that allows the refrigerant to flow into the refrigerant tank space, a refrigerant outlet that allows the refrigerant to flow from the refrigerant tank space, a heat medium inlet that allows the heat medium to flow into the heat medium tank space, and a heat medium outlet that allows the heat medium to flow from the heat medium tank space. Furthermore, at least one of the refrigerant inlet, the refrigerant outlet, the heat medium inlet, and the heat medium outlet is disposed between both ends of the tank portion in a tube stacking direction of the refrigerant tubes and the heat medium tubes.

Thus, at least one of the refrigerant inlet, the refrigerant outlet, the heat medium inlet, and the heat medium outlet is disposed between both the ends of the tank portion in the tube stacking direction of the refrigerant tubes and the heat medium tubes, and thereby it is possible to increase the flexibility in connection of the pipes and arrangement of the heat exchangers as compared to the case where all the refrigerant inlet, refrigerant outlet, heat medium inlet, and heat medium outlet are disposed at both ends of the tank portion.

DETAILED DESCRIPTION OF THE PREFERRED EMBODIMENTS

Figure 1:
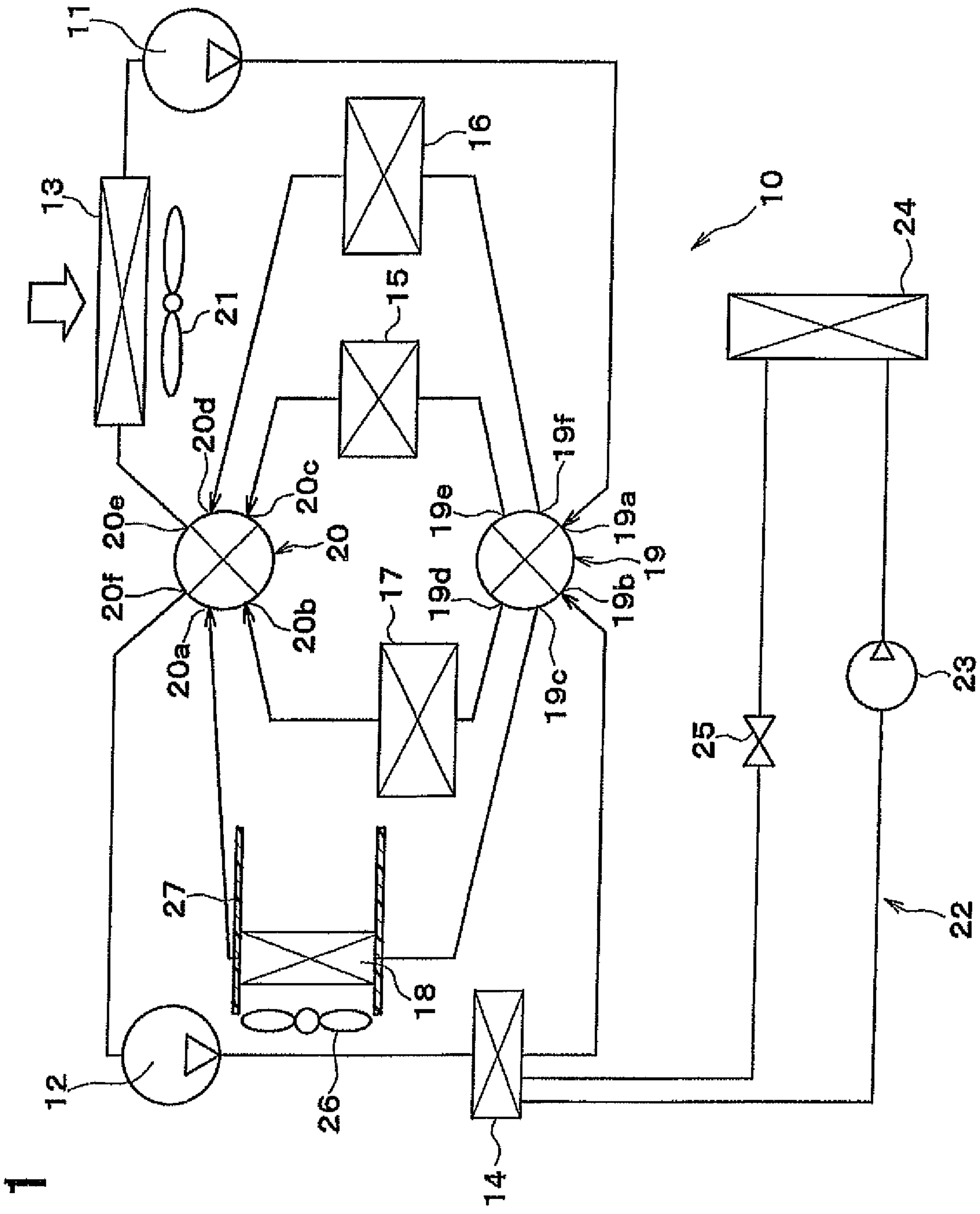
FIG. 1 is an entire configuration diagram of a vehicle cooling system in a first reference example.

In the following, preferred embodiments of the present invention and reference examples will be described with reference to the accompanying drawings. The same or equivalent parts in the respective embodiments and reference examples below are indicated by the same reference characters throughout the figures.

First Reference Example

A first reference example of the invention will be described below based on FIGS. 1 to 15. The first reference example is as a precondition for a first embodiment to be described later. A vehicle cooling system 10 (vehicle thermal management system) shown in FIG. 1 is used to cool various devices mounted on a vehicle (devices requiring cooling or heating) or an interior of the vehicle to an appropriate temperature.

In this reference example, the cooling system 10 is applied to a hybrid car that can obtain the driving force for traveling from both an internal combustion engine (engine) and an electric motor for traveling.

The hybrid car of this reference example is configured as a plug-in hybrid car that can charge a battery (vehicle-mounted battery) mounted on the vehicle with power supplied from an external power source (commercial power source) during stopping of the vehicle. For example, a lithium ion battery can be used as the battery.

A driving force output from an engine is used not only for traveling of the vehicle, but also for operating a generator. Power generated by the generator and power supplied from the external power source can be stored in the battery. The power stored in the battery can be supplied not only to the electric motor for traveling, but also to various vehicle-mounted devices, such as electric components included in the cooling system.

As shown in FIG. 1, the cooling system 10 includes a first pump 11, a second pump 12, a radiator 13, a coolant cooler 14, a battery cooler 15, an inverter cooler 16, an exhaust gas cooler 17, a cooler core 18, a first switching valve 19, and a second switching valve 20.

The first pump 11 and the second pump 12 are an electric pump for sucking and discharging the coolant (heat medium). The coolant is preferably liquid containing at least ethylene glycol or dimethylpolysiloxane.

The radiator 13 is a heat exchanger for heat dissipation (radiator) that dissipates heat of the coolant into the outside air by exchanging heat between the coolant and the outside air. The coolant outlet side of the radiator 13 is connected to the coolant suction side of the first pump 11. An outdoor blower 21 is an electric blower for blowing the outside air to the radiator 13. The radiator 13 and the outdoor blower 21 are disposed at the forefront of the vehicle. Thus, during traveling of the vehicle, the radiator 13 can face the traveling air.

The coolant cooler 14 is a cooling device for cooling the coolant by exchanging heat between the coolant and a low-pressure refrigerant of a refrigeration cycle 22. The coolant inlet side of the coolant cooler 14 is connected to the coolant discharge side of the second pump 12.

The coolant cooler 14 serves as an evaporator of the refrigeration cycle 22. The refrigeration cycle 22 is an evaporation compression refrigerator which includes a compressor 23, a condenser 24, an expansion valve 25, and the coolant cooler 14 as the evaporator. The refrigeration cycle 22 of this reference example employs a fluorocarbon refrigerant as the refrigerant, and forms a subcritical refrigeration cycle whose high-pressure side refrigerant pressure does not exceed the critical pressure of the refrigerant.

The compressor 23 is an electric compressor driven by power supplied from the battery. The compressor 23 sucks and compresses the refrigerant in the refrigeration cycle 22 to discharge the compressed refrigerant therefrom. The condenser 24 is a high-pressure side heat exchanger for condensing a high-pressure refrigerant by exchanging heat between the outside air and the high-pressure refrigerant discharged from the compressor 23.

The expansion valve 25 is a decompression device for decompressing and expanding a liquid-phase refrigerant condensed by the condenser 24. The coolant cooler 14 is a low-pressure side heat exchanger for evaporating a low-pressure refrigerant by exchanging heat between the coolant and the low-pressure refrigerant decompressed and expanded by the expansion valve 25. The gas-phase refrigerant evaporated at the coolant cooler 14 is sucked into and compressed by the compressor 23.

The radiator 13 serves to cool the coolant by the outside air, while the coolant cooler 14 serves to cool the coolant by the low-pressure refrigerant of the refrigeration cycle 22. Thus, the temperature of the coolant cooled by the coolant cooler 14 is lower than that of the coolant cooled by the radiator 13.

Specifically, the radiator 13 cannot cool the coolant to a temperature lower than that of the outside air, whereas the coolant cooler 14 can cool the coolant to a temperature lower than that of the outside air.

Hereinafter, the coolant cooled by the outside air in the radiator 13 is referred to as an "intermediate-temperature coolant", and the coolant cooled by the low-pressure refrigeration of the refrigerant cycle 22 in the coolant cooler 14 is referred to as a "low-temperature coolant".

Each of the coolant cooler 14, the battery cooler 15, the inverter cooler 16, the exhaust gas cooler 17, and the cooler core 18 is the device to be cooled (device for temperature adjustment), which is cooled (or whose temperature is adjusted) by either the intermediate-temperature coolant or the low-temperature coolant.

The battery cooler 15 has a flow passage for coolant, and cools the battery by dissipating the heat of the battery into the coolant. The battery preferably has its temperature maintained in a range of about 10 to 40° C. for the purpose of preventing the reduction in output, a decrease in charging efficiency, degradation, and the like.

The inverter cooler 16 has a flow passage for coolant, and cools the inverter by dissipating the heat of the inverter into the coolant. The inverter is a power converter that converts a direct-current (DC) power supplied from the battery to an alternating-current (AC) voltage to output the AC voltage to an electric motor for traveling. The inverter preferably has its temperature maintained at 65° C. or lower for the purpose of preventing the degradation thereof or the like.

The exhaust gas cooler 17 has a flow passage for coolant, and cools exhaust gas by dissipating the heat of the exhaust gas of the engine into the coolant. The exhaust gas cooled by the exhaust gas cooler 17 is returned to the intake side of the engine. The exhaust gas returned to the intake side of the engine preferably has its temperature maintained in a range of 40 to 100° C. for the purpose of reducing the engine loss, and preventing knocking and generation of NOX, and the like.

The cooler core 18 is a heat exchanger for cooling that cools blast air by exchanging heat between the coolant and the blast air. An indoor blower 26 is an electric blower for blowing the outside air to the cooler core 18. The cooler core 18 and the indoor blower 26 are disposed inside a casing 27 of the indoor air conditioning unit.

Each of the first and second switching valves 19 and 20 is a flow switching device that switches the flow of coolant. The first switching valve 19 and the second switching valve have the same basic structure. However, the first switching valve 19 differs from the second switching valve 20 in that an inlet and outlet for the coolant are reversed to each other.

The first switching valve 19 includes two inlets 19*a* and 19*b* as an inlet for the coolant, and four outlets 19*c*, 19*d*, 19*e*, and 19*f* as an outlet for the coolant.

The inlet 19*a* is connected to the coolant discharge side of the first pump 11. The inlet 19*b* is connected to the coolant outlet side of the coolant cooler 14.

The outlet 19*c* is connected to the coolant inlet side of the cooler core 18. The outlet 19*d* is connected to the coolant inlet side of the exhaust gas cooler 17. The outlet 19*e* is connected to the coolant inlet side of the battery cooler 15. The outlet 19*f* is connected to the coolant inlet side of the inverter cooler 16.

The second switching valve 20 includes inlets 20*a*, 20*b*, 20*c*, and 20*d* as an inlet for the coolant, and outlets 20*e*, and 20*f* as an outlet for the coolant.

The inlet 20*a* is connected to the coolant outlet side of the cooler core 18. The inlet 20*b* is connected to the coolant outlet side of the exhaust gas cooler 17. The inlet 20*c* is connected to the coolant outlet side of the battery cooler 15. The inlet 20*d* is connected to the coolant outlet side of the inverter cooler 16.

The outlet 20*e* is connected to the coolant inlet side of the radiator 13. The outlet 20*f* is connected to the coolant suction side of the second pump 12.

The first switching valve 19 is configured to be capable of switching among three types of communication states between the inlets 19*a* and 19*b*, and the outlets 19*c*, 19*d*, 19*e*, and 19*f*. The second switching valve 20 is also configured to be capable of switching among three types of communication states between the inlets 20*a*, 20*b*, 20*c*, and 20*d*, and the outlets 20*e* and 20*f*.

Figure 2:
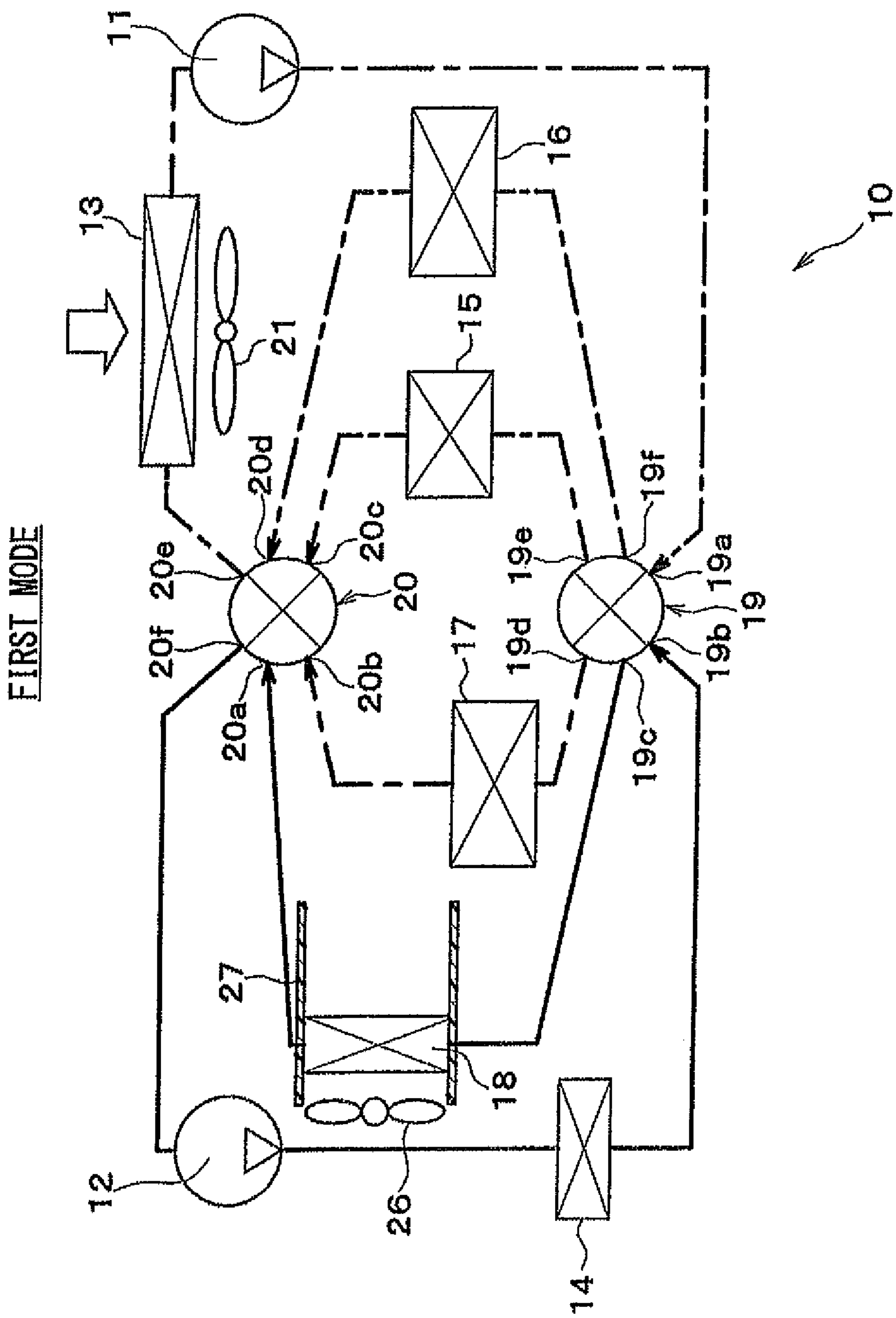
FIG. 2 is a diagram for explaining a first mode in the vehicle cooling system of FIG. 1.

FIG. 2 shows the operation (first mode) of the cooling system 10 when the first and second switching valves 19 and 20 are switched to a first state.

In the first state, the first switching valve 19 connects the inlet 19*a* with the outlets 19*d*, 19*e*, and 19*f*, and also connects the inlet 19*b* with the outlet 19*c*. Thus, the first switching valve 19 allows the coolant entering the inlet 19*a* to flow out of the outlets 19*d*, 19*e*, and 19*f* as indicated by alternate long and short dashed arrows in FIG. 2, and also allows the coolant entering the inlet 19*b* to flow out of the outlet 19*c* as indicated by a solid arrow in FIG. 2.

In the first state, the second switching valve 20 connects the inlets 20*b*, 20*c*, and 20*d* with the outlet 20*e*, and also connects the inlet 20*a* with the outlet 20*f*. Thus, the second switching valve 20 allows the coolant entering the inlets 20*b*, 20*c*, and 20*d* to flow out of the outlet 20*e* as indicated by alternate long and short dashed arrows in FIG. 2, and also allows the coolant entering the inlet 20*a* to flow out of the outlet 20*f* as a solid arrow in FIG. 2.

Figure 3:
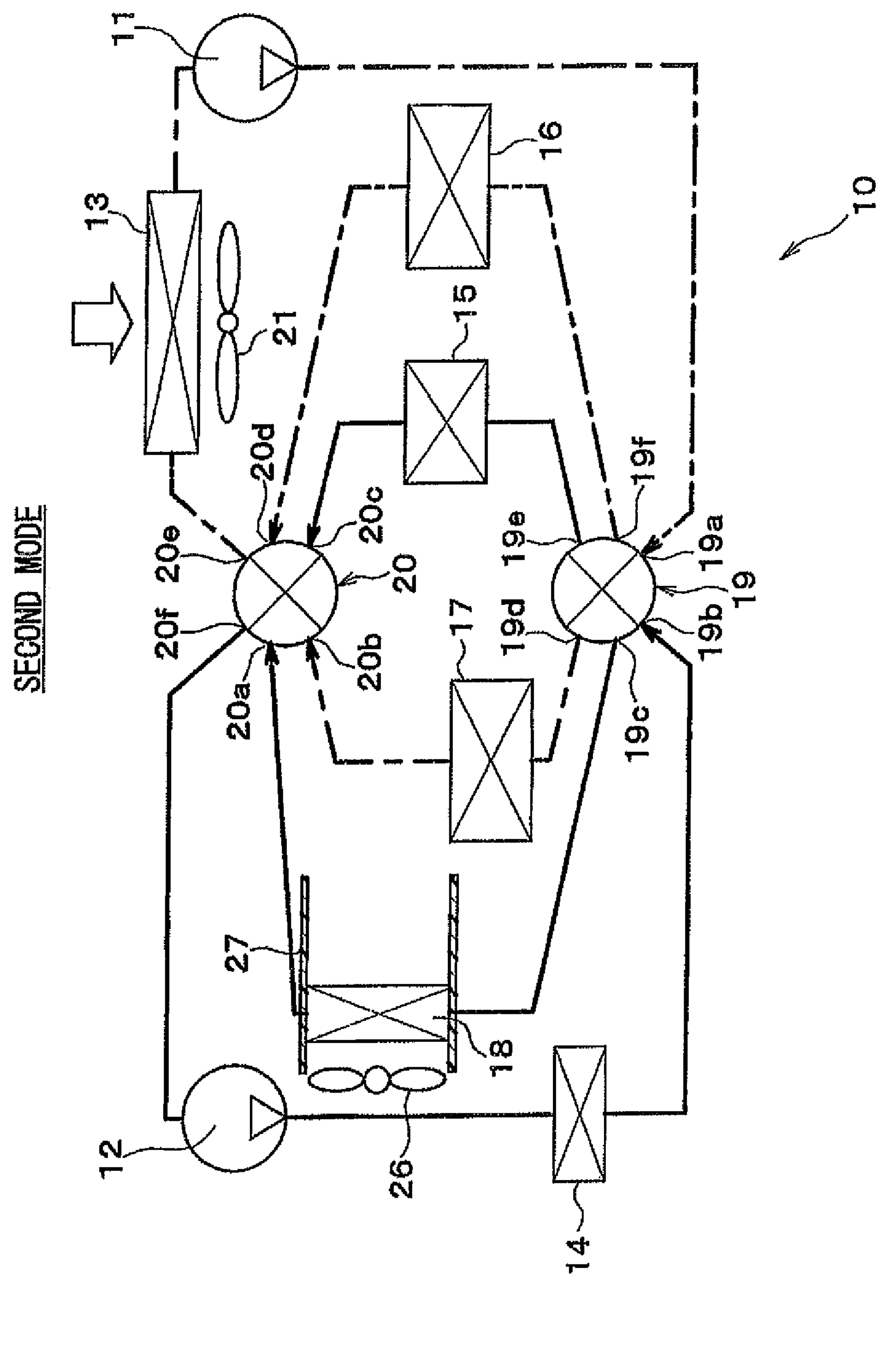
FIG. 3 is a diagram for explaining a second mode in the vehicle cooling system of FIG. 1.

FIG. 3 shows the operation (second mode) of the cooling system 10 when the first and second switching valves 19 and 20 are switched to a second state.

In the second state, the first switching valve 19 connects the inlet 19*a* with the outlets 19*d*, and 19*f*, and also connects the inlet 19*b* with the outlets 19*c* and 19*e*. Thus, the first switching valve 19 allows the coolant entering the inlet 19*a* to flow out of the outlets 19*d*, and 19*f* as indicated by alternate long and short dashed arrows in FIG. 3, and also allows the coolant entering the inlet 19*b* to flow out of the outlets 19*c* and 19*e* as solid arrows in FIG. 3.

In the second state, the second switching valve 20 connects the inlets 20*a* and 20*c* with the outlet 20*f*, and also connects the inlets 20*b* and 20*d* with the outlet 20*e*. Thus, the second switching valve 20 allows the coolant entering the inlets 20*b* and 20*d* to flow out of the outlet 20*e* as indicated by alternate long and short dashed arrows in FIG. 3, and also allows the coolant entering the inlets 20*a* and 20*c* to flow out of the outlet 20*f* as solid arrows in FIG. 3.

Figure 4:
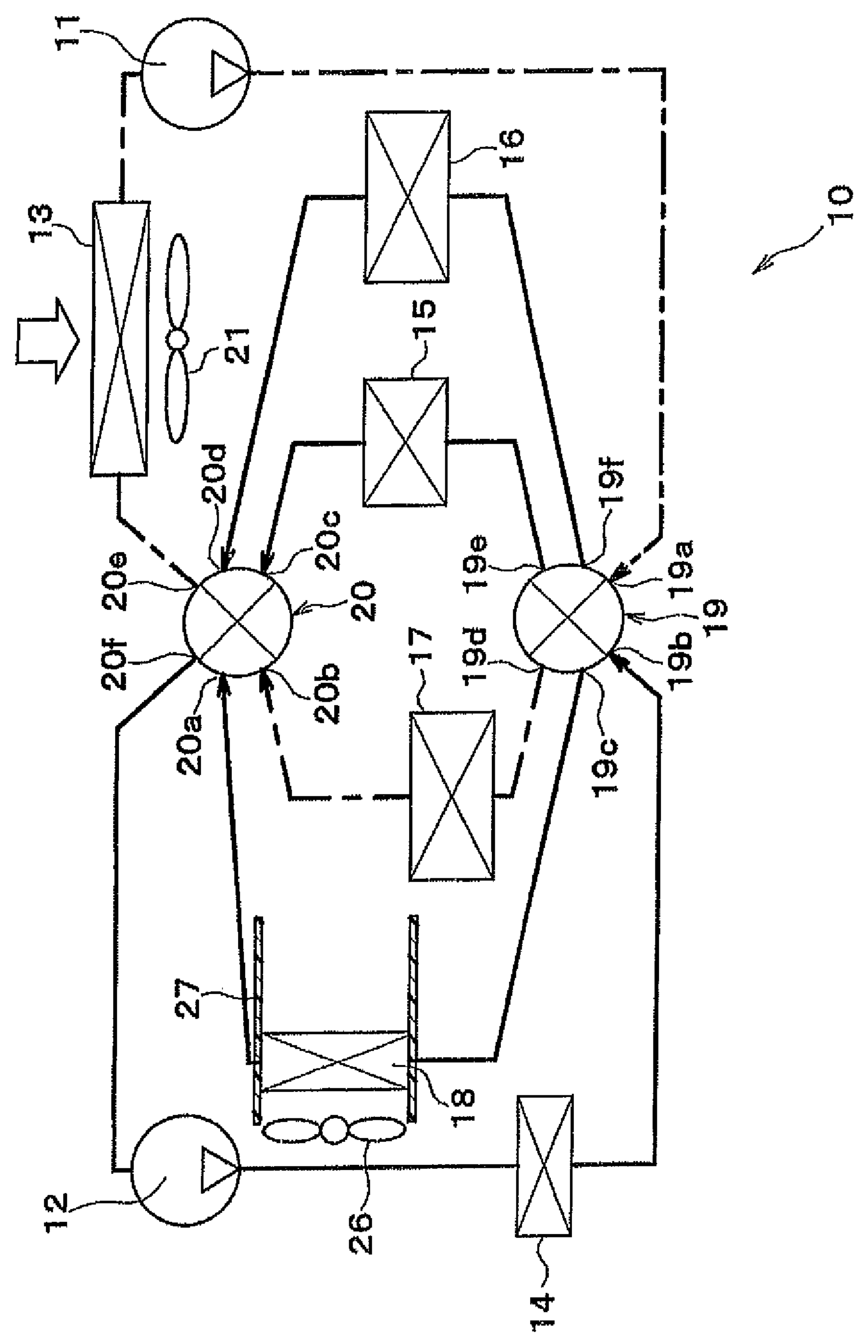
FIG. 4 is a diagram for explaining a third mode in the vehicle cooling system of FIG. 1.

FIG. 4 shows the operation (third mode) of the cooling system 10 when the first and second switching valves 19 and 20 are switched to a third state.

In the third state, the first switching valve 19 connects the inlet 19*a* with the outlet 19*d*, and also connects the inlet 19*b* with the outlets 19*c*, 19*e*, and 19*f*. Thus, the first switching valve 19 allows the coolant entering the inlet 19*a* to flow out of the outlet 19*d* as indicated by an alternate long and short dashed arrow in FIG. 4, and also allows the coolant entering the inlet 19*b* to flow out of the outlets 19*c*, 19*e*, and 19*f* as solid arrows in FIG. 4.

In the third state, the second switching valve 20 connects the inlet 20*b* with the outlet 20*e* and also connects the inlets 20*a*, 20*c*, and 20*d* with the outlet 20*f*. Thus, the second switching valve 20 allows the coolant entering the inlet 20*b* to flow out of the outlet 20*e* as indicated by an alternate long and short dashed arrow in FIG. 4, and also allows the coolant entering the inlets 20*a*, 20*c*, and 20*d* to flow out of the outlet 20*f* as indicated by a solid arrow in FIG. 3.

Figure 5:
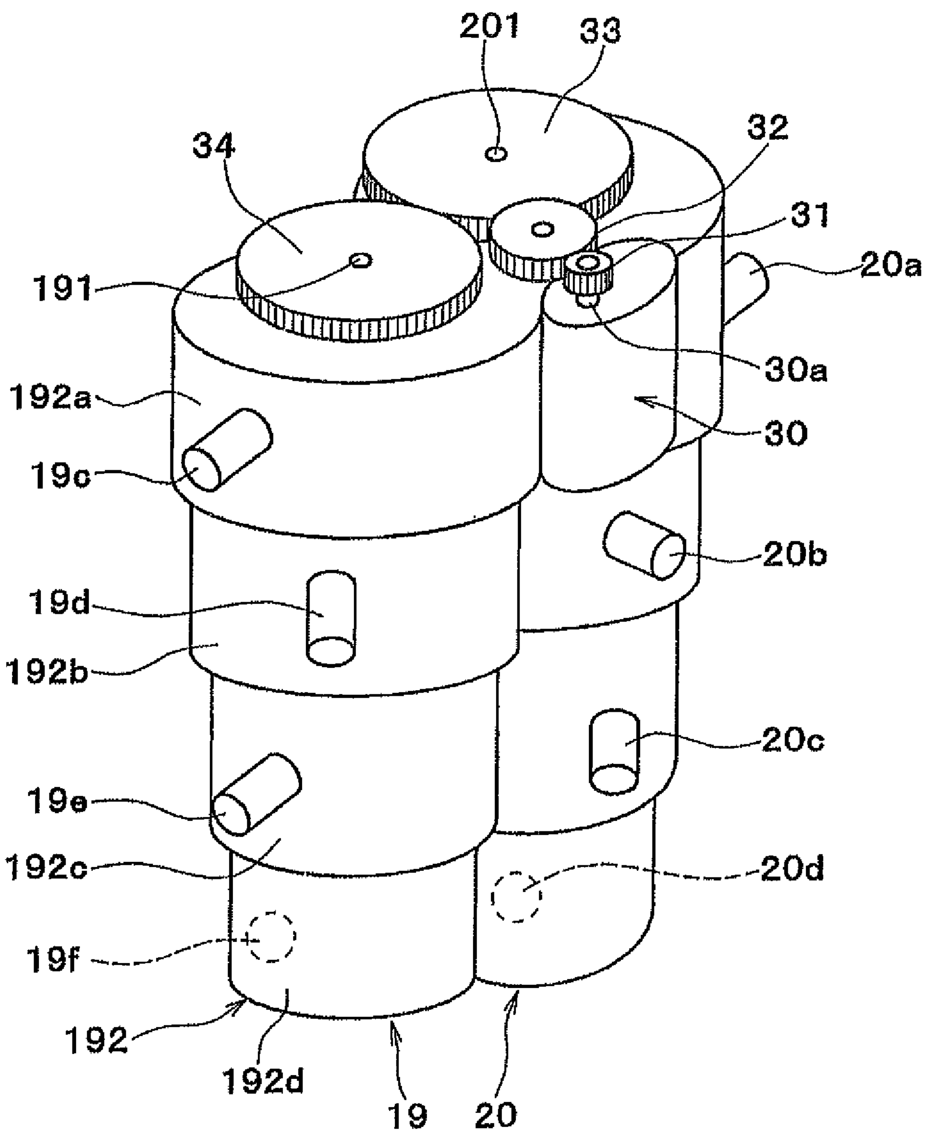
FIG. 5 is a perspective view showing a first switching valve and a second switching valve in the first reference example.

As shown in FIG. 5, the first switching valve 19 and the second switching valve 20 include rotary shafts 191 and 201 of valve elements, respectively. A rotation force of an output shaft 30*a* of an electric motor 30 for a switching valve is transferred to the rotary shafts 191 and 201 via gears 31, 32, 33, and 34. Thus, by the common electric motor 30 for a switching valve, the valve element of the first switching valve 19 and the valve element of the second switching valve 20 are driven to cooperatively rotate.

Alternatively, an electric motor for a switching valve may be individually provided in each of the first and the second switching valves 19 and 20. In such a case, the operations of the two electric motors for the switching valves may be cooperatively controlled, so that the valve elements of the first and second switching valves 19 and 20 can be driven to cooperatively rotate.

The first switching valve 19 and the second switching valve 20 have the same basic structure. In the following, the specific structure of the first switching valve 19 will be described, and thus the description of the specific structure of the second switching valve 20 will be omitted.

The first switching valve 19 includes a case 192 serving as an outer shell. The case 192 is formed in a substantially cylindrical shape extending in the longitudinal direction of the rotary shaft 191 of the valve element (in the vertical direction of FIG. 5). The rotary shaft 191 of the valve element penetrates one end surface (upper end surface shown in FIG. 5) of the case 192.

The cylindrical surface of the case 192 has outer and inner diameters thereof decreased in four stages from one end side (upper end side of FIG. 5) to the other end side (other end side of FIG. 5). Specifically, at the cylindrical surface of the case 192, a first cylindrical portion 192*a* with the largest outer and inner diameters, a second cylindrical portion 192*b* with the second largest outer and inner diameters, a third cylindrical portion 192*c* with the third largest outer and inner diameters, and a fourth cylindrical portion 192*d* with the smallest outer and inner diameters are formed in that order from the one end side to the other end side.

The first cylindrical portion 192*a* is provided with the outlet 19*c*. The second cylindrical portion 192*b* is provided with the outlet 19*d*. The third cylindrical portion 192*c* is provided with the outlet 19*e*. The fourth cylindrical portion 192*d* is provided with the outlet 19*f*.

Figure 6:
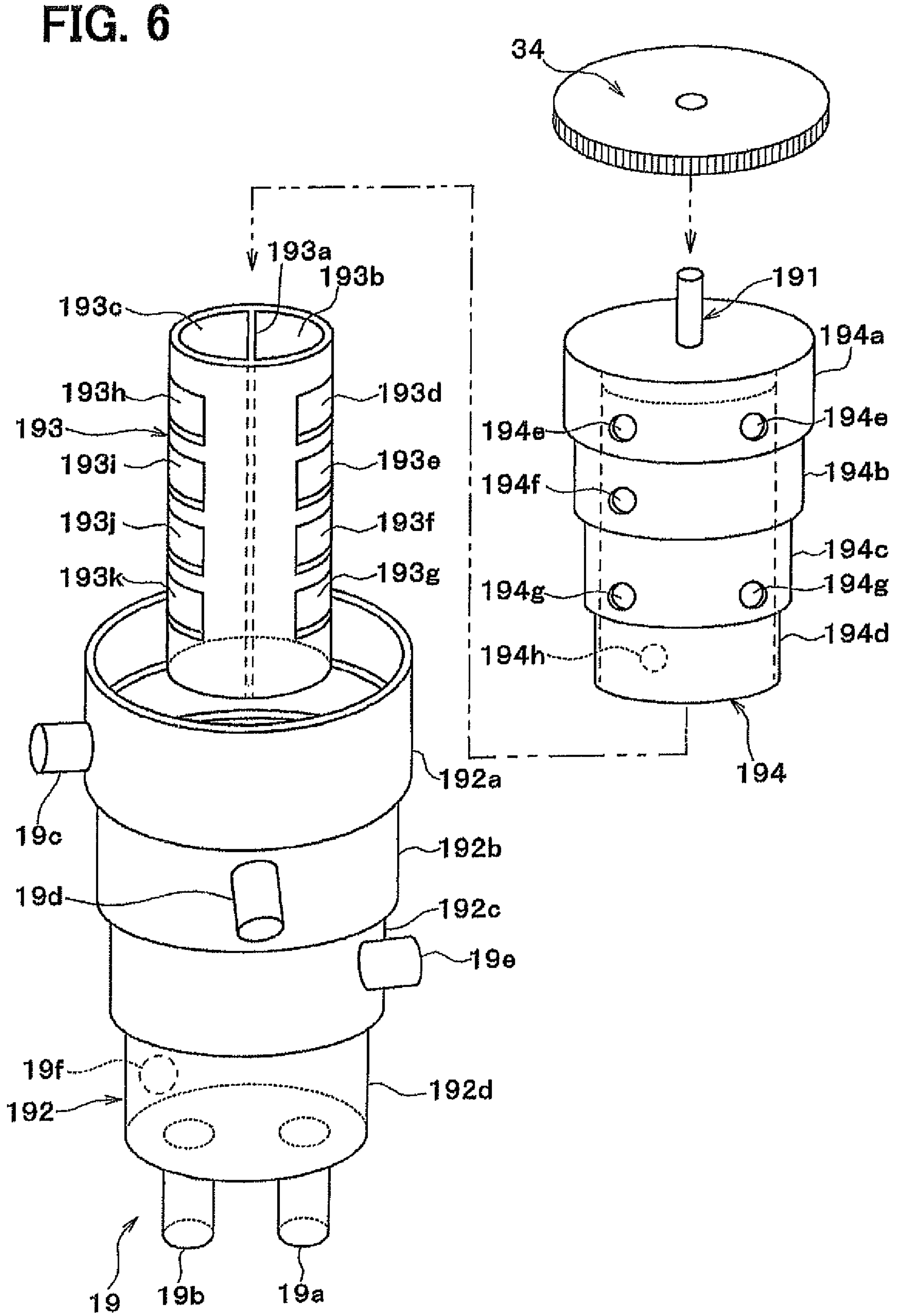
FIG. 6 is an exploded perspective view of the first switching valve of FIG. 5.

As shown in FIG. 6, at the other end surface of the case 192 (lower end surface shown in FIG. 6), the inlet 19*a* for coolant and the inlet 19*b* for coolant are formed.

An inner cylindrical member 193 is inserted into an internal space of the case 192. The inner cylindrical member 193 is formed in a cylindrical shape with constant inner and outer diameters, and positioned coaxially with respect to the case 192. One end of the inner cylindrical member 193 on the other end side of the case 192 (the lower end thereof shown in FIG. 6) is fixed in intimate contact with the other end surface of the case 192.

A partition plate 193*a* is provided within the inner cylindrical member 193. The partition plate 193*a* is formed across the entire area of the inner cylindrical member 193 in the axial direction thereof to partition the internal space of the inner cylindrical member 193 into two half-round spaces 193*b* and 193*c*.

The first space 193*b* of the two spaces 193*b* and 193*c* communicates with the inlet 19*a* of the case 192, and the second space 193*c* thereof communicates with the inlet 19*b* of the case 192.

The cylindrical surface of the inner member 193 is provided with four openings 193*d*, 193*e*, 193*f*, and 193*g* communicating with the first space 193*b*, and four openings 193*h*, 193*i*, 193*j*, and 193*k* communicating with the second space 193*c*.

With the inner cylindrical member 193 inserted into the case 192, the openings 193*d* and 193*h* of the inner cylindrical member 193 are opposed to the first cylindrical portion 192*a* of the cylindrical member 193, the openings 193*e* and 193*i* are opposed to the second cylindrical portion 192*b* of the inner cylindrical member 193, the openings 193*f* and 193*j* are opposed to the third cylindrical portion 192*c* of the inner cylindrical member 193, and the openings 193*g* and 193*k* are opposed to the fourth cylindrical portion 192*d* of the inner cylindrical member 193.

A valve element 194 for opening and closing eight openings 193*d* to 193*k* of the inner cylindrical member 193 is inserted into between the case 192 and the inner cylindrical member 193. The valve element 194 is formed in a substantially cylindrical shape, and positioned coaxially with respect to the case 192 and the inner cylindrical member 193.

A rotary shaft 191 is fixed to the center of one end surface (upper end surface of FIG. 6) of the valve element 194. The valve element 194 is rotatable with the rotary shaft 191 centered with respect to the case 192 and the inner cylindrical member 193.

The inner diameter of the valve element 194 is set constant, like the outer diameter of the inner cylindrical member 193. Like the inner diameter of the case 192, the outer diameter of the valve element 194 is decreased in four stages from one end side to the other end side thereof.

Specifically, at the outer peripheral surface of the valve element 194, a first cylindrical portion 194*a* with the largest outer diameter, a second cylindrical portion 194*b* with the second largest outer diameter, a third cylindrical portion 194*c* with the third largest outer diameter, and a fourth cylindrical portion 194*d* with the smallest outer diameter are formed in that order from the one end side to the other end side.

With the valve element 194 inserted into between the case 192 and the inner cylindrical member 193, the first cylindrical portion 194*a* of the valve element 194 is opposed to the first cylindrical portion 192*a* of the case 192, the second cylindrical portion 194*b* of the valve element 194 is opposed to the second cylindrical portion 192*b* of the case 192, the third cylindrical portion 194*c* of the valve element 194 is opposed to the third cylindrical portion 194*c* of the case 192, and the fourth cylindrical portion 194*d* of the valve element 194 is opposed to the fourth cylindrical portion 194*d* of the case 192.

A plurality of holes 194*e* is formed at the first cylindrical portion 194*a* of the valve element 194. A plurality of holes 194*f* is formed at the second cylindrical portion 194*b* of the valve element 194. A plurality of holes 194*g* is formed at the third cylindrical portion 194*c* of the valve element 194. A plurality of holes 194*h* is formed at the fourth cylindrical portion 194*d* of the valve element 194.

Figure 7:
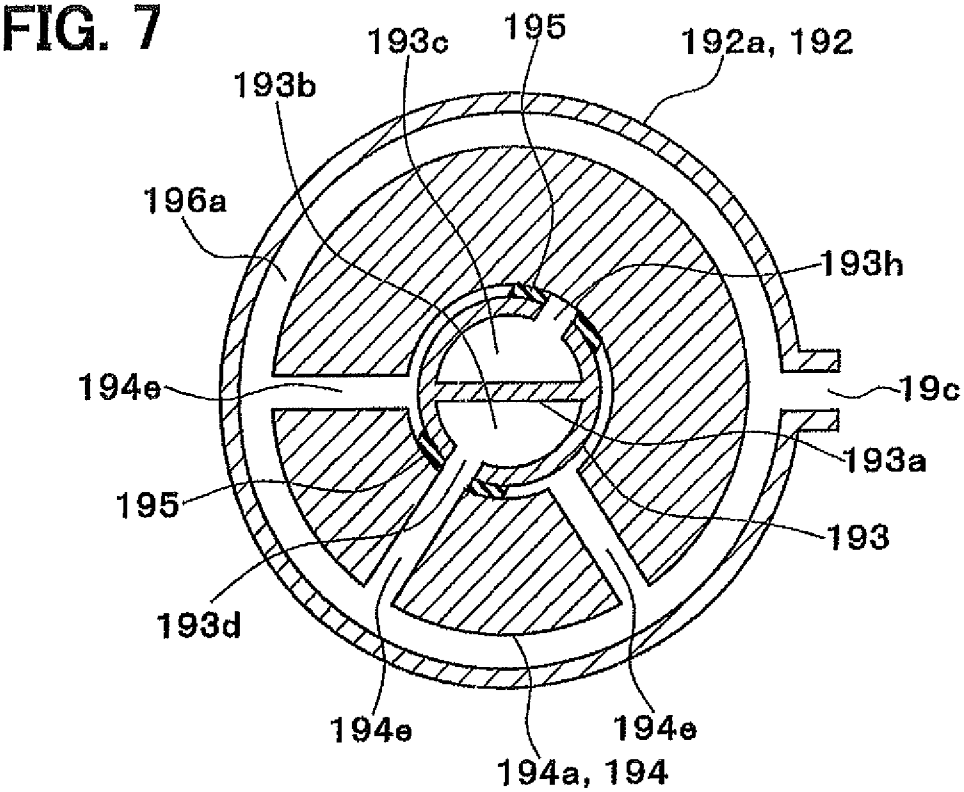
FIG. 7 is a cross-sectional view of the first switching valve of FIG. 5.

FIG. 7 is a cross-sectional view of the first switching valve 19 taken at a part of the first cylindrical portion 194*a* of the valve element 194 in the direction perpendicular to the axial direction thereof.

The three holes 194*e* of the first cylindrical portion 194*a* of the valve element 194 are formed in the circumferential direction of the first cylindrical portion 194*a*. When the valve element 194 is located in a predetermined rotating position, the holes 194*e* are superimposed over the openings 193*d* and 193*h* of the inner cylindrical member 193.

A packing 195 is fixed to the periphery of each of the openings 193*d* and 193*h* of the inner cylindrical member 193. The packing 195 is in intimate contact with the first cylindrical portion 194*a* of the valve element 194, and serves to seal a gap between the first cylindrical portion 194*a* and the openings 193*d* and 193*h* of the inner cylindrical member 193 in a liquid-tight manner.

A first ring-like space 196*a* is formed between the first cylindrical portion 194*a* of the valve element 194 and the first cylindrical portion 192*a* of the case 192. The first ring-like space 196*a* communicates with the outlet 19*c*.

Figure 8:
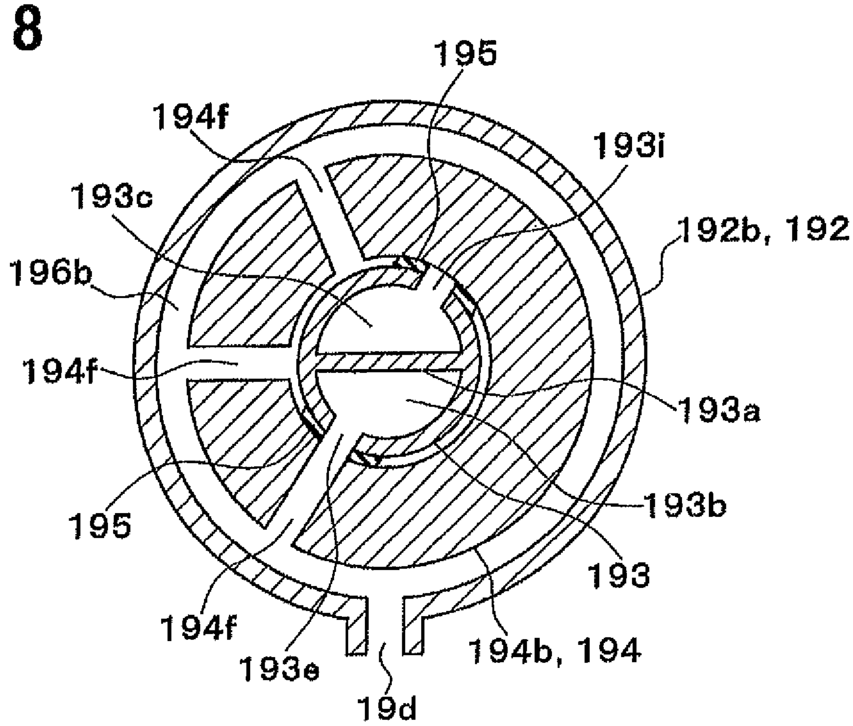
FIG. 8 is a cross-sectional view of the first switching valve of FIG. 5.

FIG. 8 is a cross-sectional view of the first switching valve 19 taken at a part of the second cylindrical portion 194*b* of the valve element 194 in the direction perpendicular to the axial direction thereof.

The three holes 194*f* of the second cylindrical portion 194*b* of the valve element 194 are formed in the circumferential direction of the second cylindrical portion 194*b*. When the valve element 194 is located in a predetermined rotating position, the holes 194*f* are superimposed over the openings 193*e* and 193*i* of the inner cylindrical member 193.

The packing 195 is fixed to the periphery of each of the openings 193*e* and 193*i* of the inner cylindrical member 193. The packing 195 is in intimate contact with the second cylindrical portion 194*b* of the valve element 194, and serves to seal a gap between the second cylindrical portion 194*b* and the openings 193*e* and 193*i* of the inner cylindrical member 193 in a liquid-tight manner.

A second ring-like space 196*b* is formed between the second cylindrical portion 194*b* of the valve element 194 and the second cylindrical portion 192*b* of the case 192. The second ring-like space 196*b* communicates with the outlet 19*d*.

Figure 9:
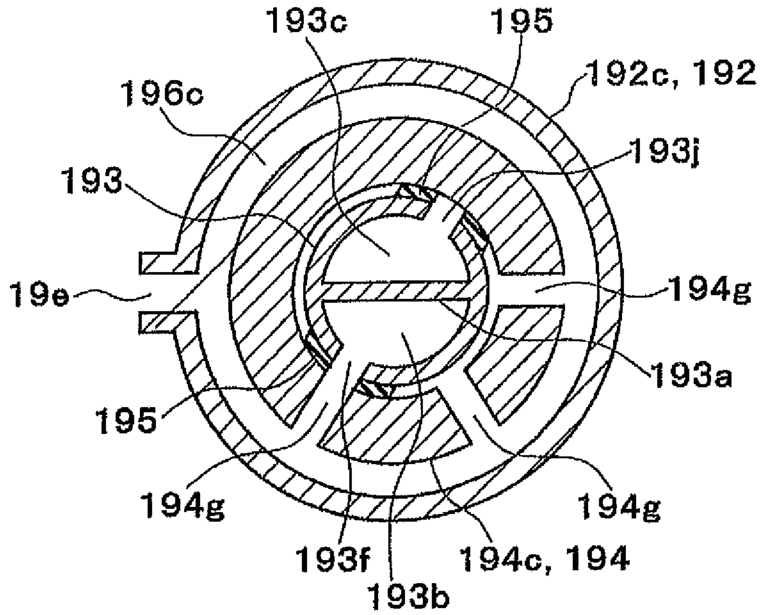
FIG. 9 is a cross-sectional view of the first switching valve of FIG. 5.

FIG. 9 is a cross-sectional view of the first switching valve 19 taken at a part of the third cylindrical portion 194*c* of the valve element 194 in the direction perpendicular to the axial direction thereof.

The three holes 194*g* of the third cylindrical portion 194*c* of the valve element 194 are formed in the circumferential direction of the third cylindrical portion 194*c*. When the valve element 194 is located in a predetermined rotating position, the holes 194*g* are superimposed over the openings 193*f* and 193*j* of the inner cylindrical member 193.

The packing 195 is fixed to the periphery of each of the openings 193*f* and 193*j* of the inner cylindrical member 193. The packing 195 is in intimate contact with the third cylindrical portion 194*c* of the valve element 194, and serves to seal a gap between the third cylindrical portion 194*c* and the openings 193*f* and 193*j* of the inner cylindrical member 193 in a liquid-tight manner.

A third ring-like space 196*c* is formed between the third cylindrical portion 194*c* of the valve element 194 and the third cylindrical portion 192*c* of the case 192. The third ring-like space 196*c* communicates with the outlet 19*e*.

Figure 10:
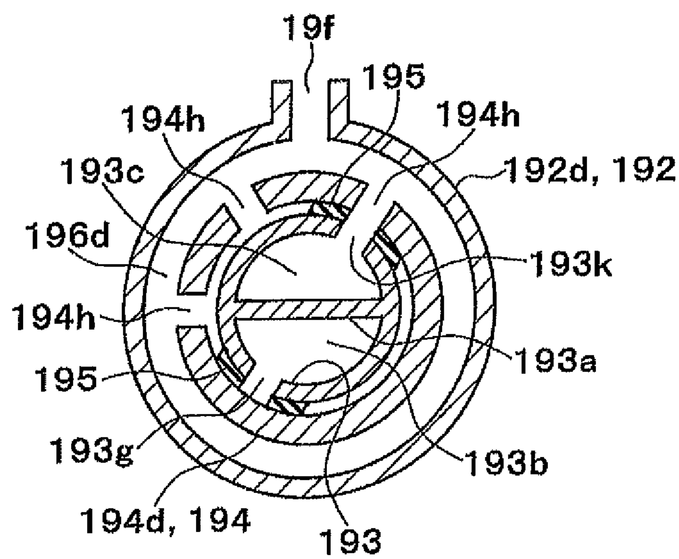
FIG. 10 is a cross-sectional view of the first switching valve of FIG. 5.

FIG. 10 is a cross-sectional view of the first switching valve 19 taken at a part of the fourth cylindrical portion 194*d* of the valve element 194 in the direction perpendicular to the axial direction thereof.

The three holes 194*h* of the fourth cylindrical portion 194*d* of the valve element 194 are formed in the circumferential direction of the third cylindrical portion 194*c*. When the valve element 194 is located in a predetermined rotating position, the holes 194*h* are superimposed over the openings 193*g* and 193*k* of the inner cylindrical member 193.

The packing 195 is fixed to the periphery of each of the openings 193*g* and 193*k* of the inner cylindrical member 193. The packing 195 is in intimate contact with the fourth cylindrical portion 194*d* of the valve element 194, and serves to seal a gap between the fourth cylindrical portion 194*d* and the openings 193*g* and 193*k* of the inner cylindrical member 193 in a liquid-tight manner.

A fourth ring-like space 196*d* is formed between the fourth cylindrical portion 194*d* of the valve element 194 and the fourth cylindrical portion 192*d* of the case 192. The fourth ring-like space 196*d* communicates with the outlet 19*f*.

Figure 11:
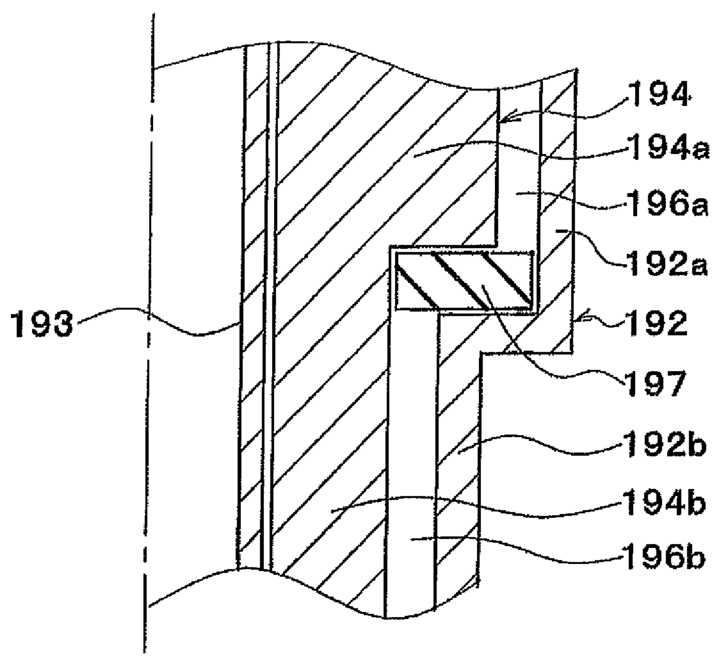
FIG. 11 is a cross-sectional view of the first switching valve of FIG. 5.

As shown in FIG. 11, a gap between the first ring-like space 196*a* and the second ring-like space 196*b* is sealed by a packing 197 in a liquid-tight manner. The packing 197 is formed in a ring-like shape so as to have its entire periphery sandwiched between a stepped surface of the valve element 194 and a stepped surface of the case 192.

Although not shown, a gap between the second and third ring-like spaces 196*b* and 196*c*, as well as a gap between the third and fourth ring-like spaces 196*c* and 196*d* are also sealed by the ring-like packing 197 in the liquid-tight manner.

Figure 12:
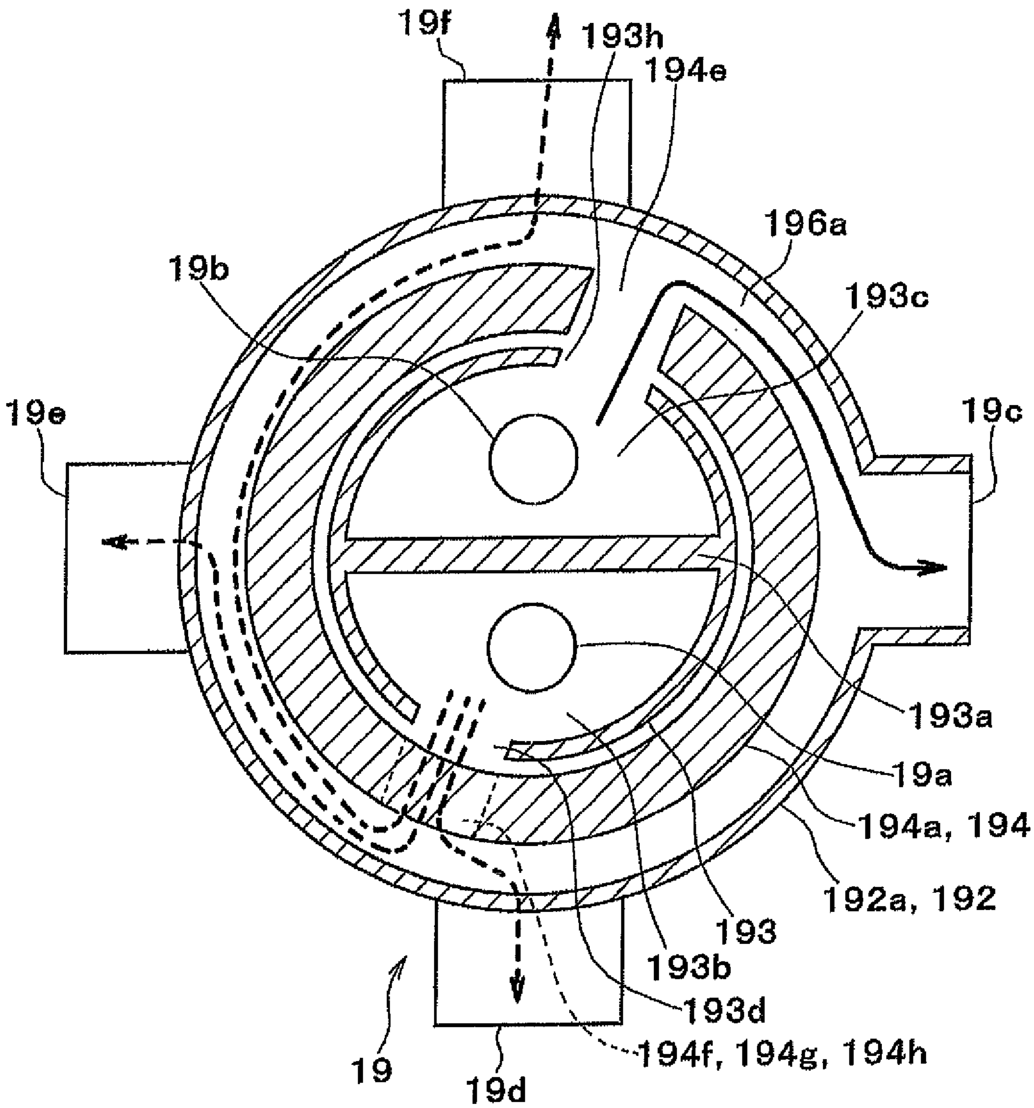
FIG. 12 is a cross-sectional view showing a first state of the first switching valve of FIG. 5.

The first state of the first switching valve 19 will be described below based on FIG. 12. FIG. 12 is a cross-sectional view of the first switching valve 19 taken at a part of the first cylindrical portion 194*a* of the valve element 194 in the direction perpendicular to the axial direction thereof. For better understanding of the description, FIG. 12 illustrates only one of three holes of each of the types 194*e*, 194*f*, 194*g*, and 194*h* while omitting the illustration of other remaining two holes 194*e*, 194*f*, 194*g*, and 194*h* of each type.

In the first state, the valve element 194 is rotated to the position shown in FIG. 12, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by the solid arrows in FIG. 12, the second space 193*c* of the inner cylindrical member 193 communicates with the outlet 19*c* via the opening 193*h* of the inner cylindrical member 193, the hole 194*e* of the valve element 194, and the first ring-like space 196*a*. On the other hand, the first space 193*b* of the inner cylindrical member 193 does not communicate with the outlet 19*c*.

Accordingly, in the first state, the outlet 19*c* communicates with the inlet 19*b*, and not with the inlet 19*a*.

Although not shown, in the first state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by a dashed arrow in FIG. 12, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the first state, the hole 194*g* of the third cylindrical portion 194*c* of the valve element 194 is superimposed over the opening 193*f* on the first space 193*b* side of the inner cylindrical member 193, thereby causing the third cylindrical portion 194*c* of the valve element 194 to close the opening 193*j* on the second space 193*c* side of the inner cylindrical member 193.

Thus, as indicated by a dashed arrow in FIG. 12, the first space 193*b* of the inner cylindrical member 193 communicates with the outlet 19*e*, and the second space 193*c* of the inner cylindrical member 193 does not communicate with the outlet 19*e*. Accordingly, the outlet 19*e* communicates with the inlet 19*a*, and not with the inlet 19*b*.

Although not shown, in the first state, the hole 194*h* of the fourth cylindrical portion 194*d* of the valve element 194 is superimposed over the opening 193*g* on the first space 193*b* side of the inner cylindrical member 193, thereby causing the fourth cylindrical portion 194*d* of the valve element 194 to close the opening 193*k* on the second space 193*c* side of the inner cylindrical member 193.

Thus, as indicated by the dashed arrow of FIG. 12, the first space 193*b* of the inner cylindrical member 193 communicates with the outlet 19*f*, and the second space 193*c* of the inner cylindrical member 193 does not communicate with the outlet 19*f*. Accordingly, the outlet 19*f* communicates with the inlet 19*a*, and not with the inlet 19*b*.

Figure 13:
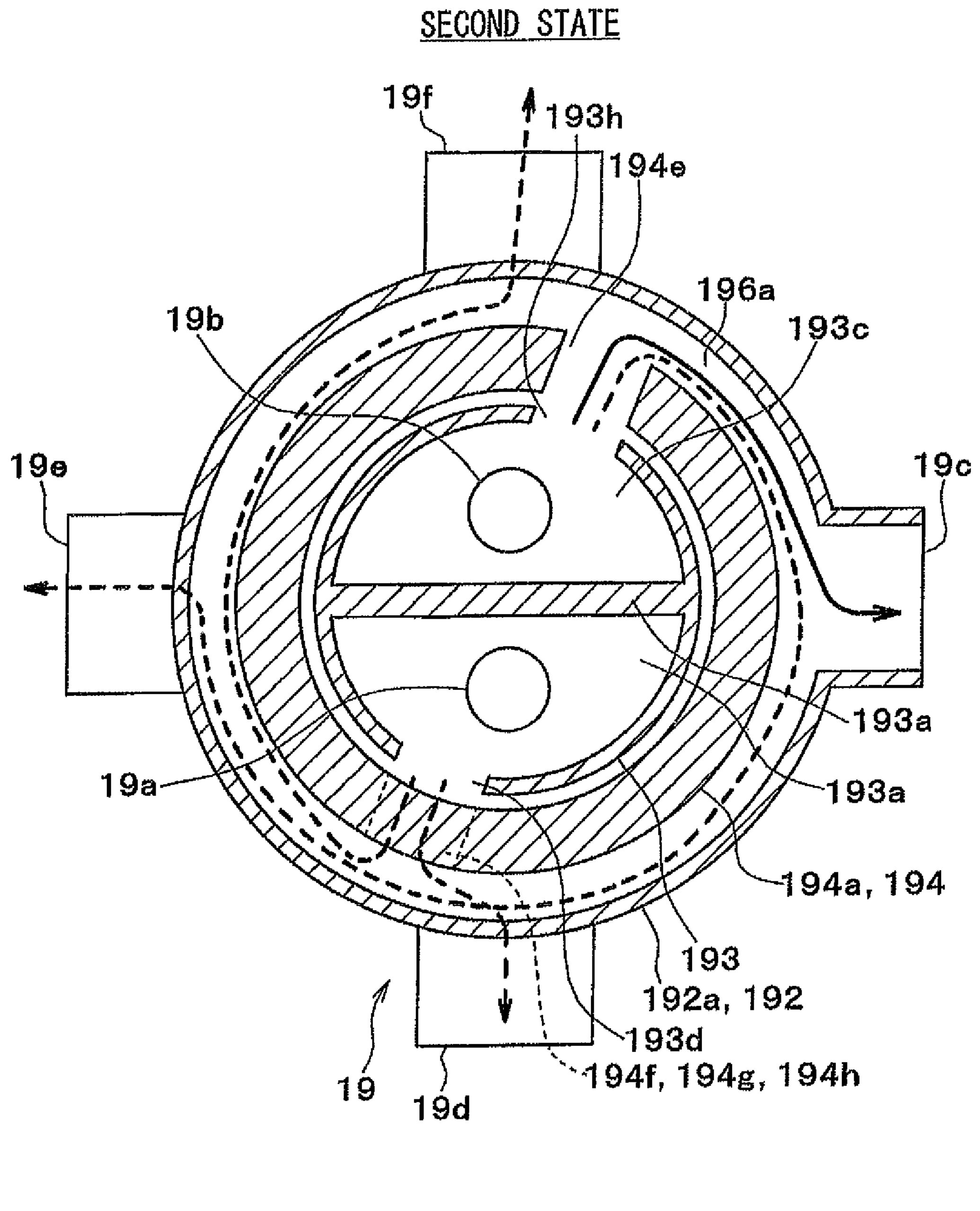
FIG. 13 is a cross-sectional view showing a second state of the first switching valve of FIG. 5.

The second state of the first switching valve 19 will be described below based on FIG. 13. FIG. 13 is a cross-sectional view of the first switching valve 19 taken at a part of the first cylindrical portion 194*a* of the valve element 194 in the direction perpendicular to the axial direction thereof. For better understanding of the description, FIG. 13 illustrates only one of three holes of each of the types 194*e*, 194*f*, 194*g*, and 194*h* while omitting the illustration of other remaining two holes 194*e*, 194*f*, 194*g*, and 194*h* of each type.

In the second state, the valve element 194 is rotated to the position shown in FIG. 13, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by a solid arrow in FIG. 13, the second space 193*c* of the inner cylindrical member 193 communicates with the outlet 19*c*, and the first space 193*b* of the inner cylindrical member 193 does not communicate with the outlet 19*c*. Accordingly, the outlet 19*c* communicates with the inlet 19*b*, and not with the inlet 19*a*.

Although not shown, in the second state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by a dashed arrow in FIG. 13, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the second state, the hole 194*g* of the third cylindrical portion 194*c* of the valve element 194 is superimposed over the opening 193*j* on the second space 193*c* side of the inner cylindrical member 193, thereby causing the third cylindrical portion 194*c* of the valve element 194 to close the opening 193*f* on the first space 193*b* side of the inner cylindrical member 193.

Thus, as indicated by a dashed arrow in FIG. 13, the second space 193*c* of the inner cylindrical member 193 communicates with the outlet 19*e*, and the first space 193*b* of the inner cylindrical member 193 does not communicate with the outlet 19*e*. Accordingly, the outlet 19*e* communicates with the inlet 19*b*, and not with the inlet 19*a*.

Although not shown, in the second state, the hole 194*h* of the fourth cylindrical portion 194*d* of the valve element 194 is superimposed over the opening 193*g* on the first space 193*b* side of the inner cylindrical member 193, thereby causing the fourth cylindrical portion 194*d* of the valve element 194 to close the opening 193*k* on the second space 193*c* side of the inner cylindrical member 193.

Thus, as indicated by the dashed arrow of FIG. 13, the first space 193*b* of the inner cylindrical member 193 communicates with the outlet 19*f*, and the second space 193*c* of the inner cylindrical member 193 does not communicate with the outlet 19*f*. Accordingly, the outlet 19*f* communicates with the inlet 19*a*, and not with the inlet 19*b*.

Figure 14:
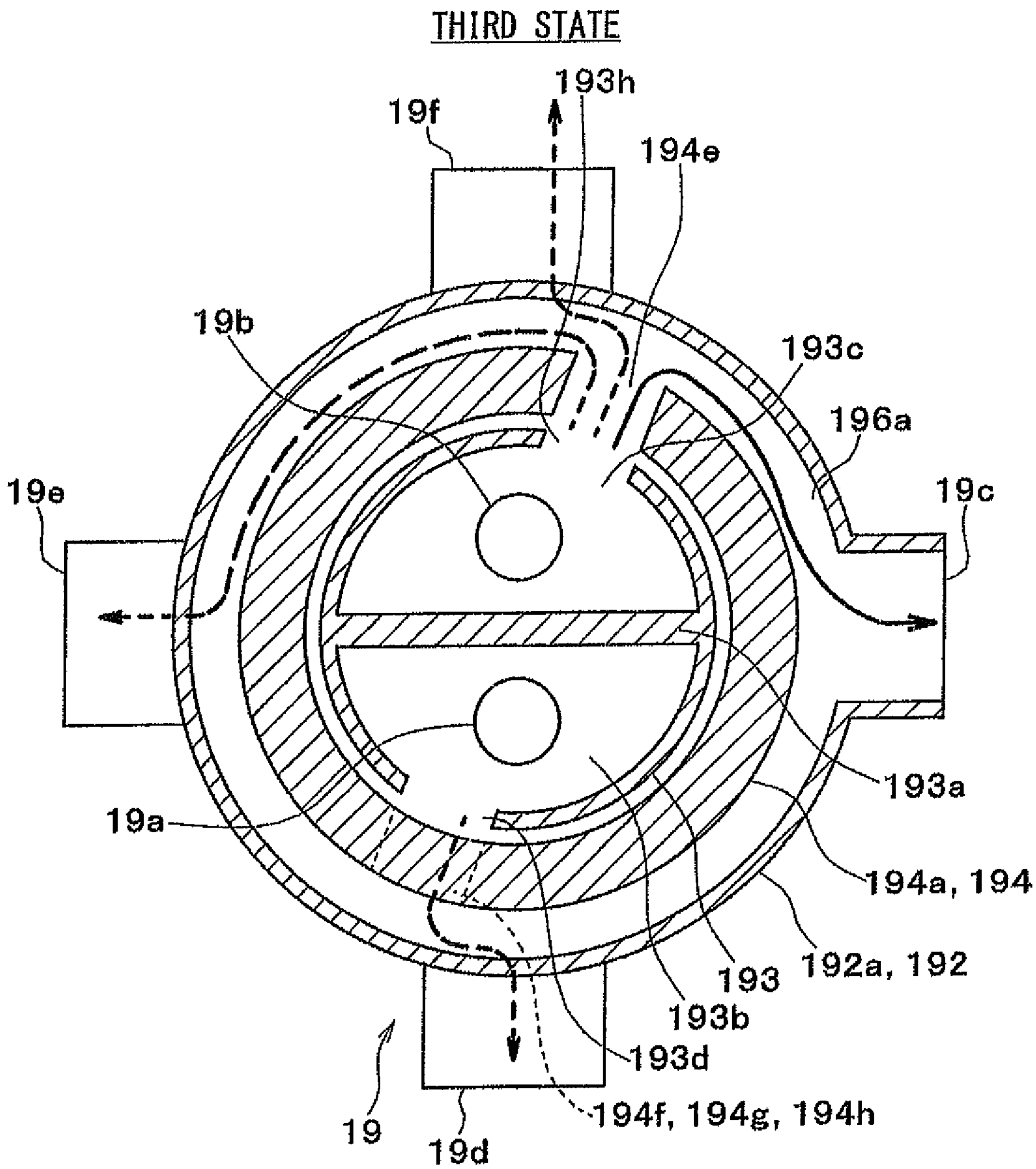
FIG. 14 is a cross-sectional view showing a third state of the first switching valve of FIG. 5.

The third state of the first switching valve 19 will be described below based on FIG. 14. FIG. 14 is a cross-sectional view of the first switching valve 19 taken at a part of the first cylindrical portion 194*a* of the valve element 194 in the direction perpendicular to the axial direction thereof. For better understanding of the description, FIG. 14 illustrates only one of three holes of each of the types 194*e*, 194*f*, 194*g*, and 194*h* while omitting the illustration of other remaining two holes 194*e*, 194*f*, 194*g*, and 194*h* of each type.

In the third state, the valve element 194 is rotated to the position shown in FIG. 14, so that the hole 194*e* of the first cylindrical portion 194*a* of the valve element 194 is superimposed over the opening 193*h* on the second space 193*c* side of the inner cylindrical member 193, thereby causing the first cylindrical portion 194*a* of the valve element 194 to close the opening 193*d* on the first space 193*b* side of the inner cylindrical member 193.

Thus, as indicated by a solid arrow in FIG. 14, the second space 193*c* of the inner cylindrical member 193 communicates with the outlet 19*c*, and the first space 193*b* of the inner cylindrical member 193 does not communicate with the outlet 19*c*. Accordingly, the outlet 19*c* communicates with the inlet 19*b*, and not with the inlet 19*a*.

Although not shown, in the third state, the hole 194*f* of the second cylindrical portion 194*b* of the valve element 194 is superimposed over the opening 193*e* on the first space 193*b* side of the inner cylindrical member 193, thereby causing the second cylindrical portion 194*b* of the valve element 194 to close the opening 193*i* on the second space 193*c* side of the inner cylindrical member 193.

Thus, as indicated by a dashed arrow in FIG. 14, the first space 193*b* of the inner cylindrical member 193 communicates with the outlet 19*d*, and the second space 193*c* of the inner cylindrical member 193 does not communicate with the outlet 19*d*. Accordingly, the outlet 19*d* communicates with the inlet 19*a*, and not with the inlet 19*b*.

Although not shown, in the third state, the hole 194*g* of the third cylindrical portion 194*c* of the valve element 194 is superimposed over the opening 193*j* on the second space 193*c* side of the inner cylindrical member 193, thereby causing the third cylindrical portion 194*c* of the valve element 194 to close the opening 193*f* on the first space 193*b* side of the inner cylindrical member 193.

Thus, as indicated by a dashed arrow in FIG. 14, the second space 193*c* of the inner cylindrical member 193 communicates with the outlet 19*e*, and the first space 193*b* of the inner cylindrical member 193 does not communicate with the outlet 19*e*. Accordingly, the outlet 19*e* communicates with the inlet 19*b*, and not with the inlet 19*a*.

Although not shown, in the third state, the hole 194*h* of the fourth cylindrical portion 194*d* of the valve element 194 is superimposed over the opening 193*k* on the second space 193*c* side of the inner cylindrical member 193, thereby causing the fourth cylindrical portion 194*d* of the valve element 194 to close the opening 193*g* on the first space 193*b* side of the inner cylindrical member 193.

Thus, as indicated by a dashed arrow in FIG. 14, the second space 193*c* of the inner cylindrical member 193 communicates with the outlet 19*f*, and the first space 193*b* of the inner cylindrical member 193 does not communicate with the outlet 19*f*. Accordingly, the outlet 19*f* communicates with the inlet 19*b*, and not with the inlet 19*a*.

Figure 15:
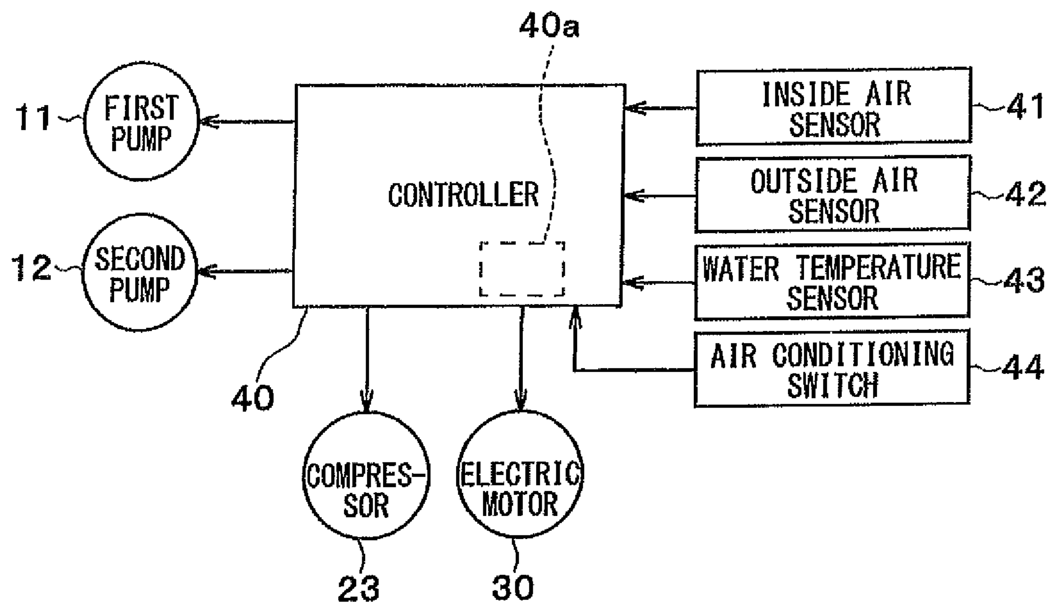
FIG. 15 is a block diagram showing an electric controller of the vehicle cooling system shown in FIG. 1.

Next, an electric controller of the cooling system 10 will be described with reference to FIG. 15. A controller 40 is comprised of a known microcomputer, including CPU, ROM, RAM, and the like, and a peripheral circuit thereof. The controller 40 is a control device for controlling the operations of the devices connected to the output side, including the first pump 11, the second pump 12, the compressor 23, the electric motor 30 for a switching valve, and the like by performing various kinds of computations and processing based on air conditioning control programs stored in the ROM.

The controller 40 is integrally structured with a control unit for controlling various devices for control connected to an output side of the controller. The control unit for controlling the operation of each of the devices for control includes a structure (hardware and software) that is adapted to control the operation of each of the devices for control.

In this reference example, particularly, the structure (hardware and software) that controls the operation of the electric motor 30 for a switching valve acts as a switching valve controller 40*a*. Obviously, the switching valve controller 40*a* may be independently provided from the controller 40.

Detection signals from a group of sensors, including an inside air sensor 41, an outside air sensor 42, a water temperature sensor 43, and the like are input to the input side of the controller 40.

The inside air sensor 41 is a detector (inside air temperature detector) for detecting the temperature of inside air (temperature of the vehicle interior). The outside air sensor 42 is a detector (outside air temperature detector) for detecting the temperature of outside air. The water temperature sensor 43 is a detector (heat medium temperature detector) for detecting the temperature of coolant flowing therethrough directly after passing through the radiator 13.

An operation signal is input from an air conditioning switch 44 to the input side of the controller 40. The air conditioning switch 44 is a switch for switching an air conditioner between ON and OFF (in short, ON and OFF of cooling), and disposed near a dash board in the vehicle compartment.

Now, the operation of the above-mentioned structure will be described. When an outside air temperature detected by the outside air sensor 42 is equal to or lower than 15° C., the controller 40 performs the first mode shown in FIG. 2. When an outside air temperature detected by the outside air sensor 42 ranges from more than 15° C. and to less than 40° C., the controller 40 performs the second mode shown in FIG. 3. When an outside air temperature detected by the outside air sensor 42 is equal to or higher than 40° C., the controller 40 performs the third mode shown in FIG. 4.

In the first mode, the controller 40 controls the electric motor 30 for a switching valve such that the first and second switching valves 19 and 20 are brought into the first state shown in FIG. 2 to thereby operate the first and second pumps 11 and 12 and the compressor 23.

Thus, the first switching valve 19 connects the inlet 19*a* with the outlets 19*d*, 19*e*, and 19*f*, and also connects the inlet 19*b* with the outlet 19*c*. The second switching valve 20 connects the inlets 20*b*, 20*c*, and 20*d* with the outlet 20*e*, and also connects the inlet 20*a* with the outlet 20*f*.

Accordingly, a first coolant circuit (intermediate-temperature coolant circuit) is formed of the first pump 11, the battery cooler 15, the inverter cooler 16, the exhaust gas cooler 17, and the radiator 13, whereas a second coolant circuit (low-temperature coolant circuit) is formed of the second pump 12, the coolant cooler 14, and the cooler core 18.

That is, as indicated by alternate long and short dashed arrows in FIG. 2, the coolant discharged from the first pump 11 is branched by the first switching valve 19 into the battery cooler 15, the inverter cooler 16, and the exhaust gas cooler 17. Then, the coolant flows in parallel through the battery cooler 15, the inverter cooler 16, and the exhaust gas cooler 17 are collected into the second switching valve 20 to flow through the radiator 13, thereby being sucked into the first pump 11.

On the other hand, as indicated by a solid arrow in FIG. 2, the coolant discharged from the second pump 12 flows through the coolant cooler 14 and then through the cooler core 18 via the first switching valve 19 into the second switching valve 20. The coolant flows through the second switching valve 20, thereby being sucked into the second pump 12.

In this way, in the first mode, the intermediate-temperature coolant cooled by the radiator 13 flows through the battery cooler 15, the inverter cooler 16, and the exhaust gas cooler 17, whereas the low-temperature coolant cooled by the coolant cooler 14 flows through the cooler core 18.

As a result, the battery, the inverter, and the exhaust gas are cooled by the intermediate-temperature coolant, and the blast air into the vehicle interior is cooled by the low-temperature coolant.

For example, when the outside air temperature is about 15° C., the intermediate coolant cooled by the outside air in the radiator 13 becomes at a temperature of about 25° C., so that the intermediate-temperature coolant can sufficiently cool the battery, inverter, and exhaust gas.

The low-temperature coolant cooled by the low-pressure refrigerant of the refrigeration cycle 22 in the coolant cooler 14 becomes at about 0° C., so that the low-temperature coolant can sufficiently cool the blast air into the vehicle interior.

In the first mode, the battery, inverter, and exhaust gas are cooled by the outside air, which can effectively achieve the energy saving as compared to the case in which the battery, inverter, and exhaust gas are cooled by the low-pressure refrigerant of the refrigeration cycle 22.

In the second mode, the controller 40 controls the electric motor 30 for a switching valve such that the first and second switching valves 19 and 20 are brought into the second state shown in FIG. 3 to thereby operate the first and second pumps 11 and 12 and the compressor 23.

Thus, the first switching valve 19 connects the inlet 19*a* with the outlets 19*d* and 19*f*, and also connects the inlet 19*b* with the outlets 19*c* and 19*e*. The second switching valve 20 connects the inlets 20*b* and 20*d* with the outlet 20*e*, and also connects the inlets 20*a* and 20*c* with the outlet 20*f*.

Accordingly, the first coolant circuit (intermediate-temperature coolant circuit) is formed of the first pump 11, the inverter cooler 16, the exhaust gas cooler 17, and the radiator 13, whereas the second coolant circuit (low-temperature coolant circuit) is formed of the second pump 12, the coolant cooler 14, the cooler core 18, and the battery cooler 15.

That is, as indicated by alternate long and short dashed arrows of FIG. 3, the coolant discharged from the first pump 11 is branched by the first switching valve 19 into the inverter cooler 16 and the exhaust gas cooler 17. Then, the coolants flowing in parallel through the inverter cooler 16 and the exhaust gas cooler 17 are collected into the second switching valve 20 to flow through the radiator 13, thereby being sucked into the first pump 11.

On the other hand, as indicated by solid arrows of FIG. 3, the coolant discharged from the second pump 12 flows through the coolant cooler 14, and is branched by the first switching valve 19 into the cooler core 18 and the battery cooler 15. Then, the coolants flowing in parallel through the cooler core 18 and the battery cooler 15 are collected into the second switching valve 20 to be sucked into the second pump 12.

That is, in the second mode, the intermediate-temperature coolant cooled by the radiator 13 flows through the inverter cooler 16 and the exhaust gas cooler 17, whereas the low-temperature coolant cooled by the coolant cooler 14 flows through the cooler core 18 and the battery cooler 15.

As a result, the inverter and the exhaust gas are cooled by the intermediate-temperature coolant, and the battery and the blast air into the vehicle interior are cooled by the low-temperature coolant.

For example, when the outside air temperature is about 25° C., the intermediate coolant cooled by the outside air in the radiator 13 becomes at a temperature of about 40° C., so that the intermediate-temperature coolant can sufficiently cool the inverter, and exhaust gas.

The low-temperature coolant cooled by the low-pressure refrigerant of the refrigeration cycle 22 in the coolant cooler 14 becomes at about 0° C., so that the battery and the blast air into the vehicle interior can be sufficiently cooled by the low-temperature coolant.

Since in the second mode the battery is cooled by the low-pressure refrigerant of the refrigeration cycle 22, the battery can be sufficiently cooled even when the outside air cannot cool the battery adequately because of the high temperature of the outside air.

In the third mode, the controller 40 controls the electric motor 30 for a switching valve such that the first and second switching valves 19 and 20 are brought into the third state shown in FIG. 4 to thereby operate the first and second pumps 11 and 12 and the compressor 23.

Thus, the first switching valve 19 connects the inlet 19*a* with the outlet 19*d* and also connects the inlet 19*b* with the outlets 19*c*, 19*e*, and 19*f*. The second switching valve 20 connects the inlet 20*b* with the outlet 20*e*, and also connects the inlets 20*a*, 20*c*, and 20*d* with the outlet 20*f*.

Accordingly, the first coolant circuit (intermediate-temperature coolant circuit) is formed of the first pump 11, the exhaust gas cooler 17, and the radiator 13, whereas the second coolant circuit (low-temperature coolant circuit) is formed of the second pump 12, the coolant cooler 14, the cooler core 18, the battery cooler 15, and the inverter cooler 16.

That is, as indicated by an alternate long and short dashed arrow in FIG. 4, the coolant discharged from the first pump 11 flows through the exhaust gas cooler 17 via the first switching valve 19, and then through the radiator 13 via the second switching valve 20, thereby being sucked into the first pump 11.

On the other hand, as indicated by solid arrows in FIG. 4, the coolant discharged from the second pump 12 flows through the coolant cooler 14, and is branched by the first switching valve 19 into the cooler core 18, the battery cooler 15, and the inverter cooler 16. Then, the coolants flowing in parallel through the cooler core 18, the battery cooler 15, and the inverter cooler 16 are collected into the second switching valve 20 to be sucked into the second pump 12.

Thus, in the third mode, the intermediate-temperature coolant cooled by the radiator 13 flows through the exhaust gas cooler 17, whereas the low-temperature coolant cooled by the coolant cooler 14 flows through the cooler core 18, the battery cooler 15, and the inverter cooler 16.

Thus, the exhaust gas is cooled by the coolant cooled by the radiator 13, and the blast air into the vehicle interior, the battery, and the inverter are cooled by the coolant cooled by the coolant cooler 14.

For example, when the outside air temperature is about 40° C., the intermediate-temperature coolant cooled by the outside air in the radiator 13 becomes at a temperature of about 50° C., so that the intermediate-temperature coolant can sufficiently cool the exhaust gas.

The low-temperature coolant cooled by the low-pressure refrigerant of the refrigeration cycle 22 in the coolant cooler 14 becomes at about 0° C., so that the blast air into the vehicle interior, the battery, and the inverter can be sufficiently cooled by the low-temperature coolant.

Since in the third mode the battery and the inverter are cooled by the low-pressure refrigerant of the refrigeration cycle 22, the battery and the inverter can be sufficiently cooled even when the outside air cannot cool the battery and the inverter adequately because of the very high temperature of the outside air.

This reference example employs the simple structure in which the devices 15, 16, 17, and 18 to be cooled are connected in parallel between the first and second switching valves 19 and 20 to thereby switch the coolants circulating through the respective devices 15, 16, 17, and 18 to be cooled among the devices.

Specifically, the outside air temperature is detected as a temperature associated with the temperature of the coolant obtained after the heat exchange by the radiator 13, and then based on the outside air temperature detected, the operations of the first switching valve 19 and the second switching valve 20 are controlled to thereby perform the first to third modes. Thus, the coolant circulating through each of the devices 15, 16, 17, and 18 to be cooled can be switched among the devices according to the temperature of the coolant obtained after the heat exchange by the radiator 13.

More specifically, when the outside air temperature is lower than a predetermined temperature (15° C. in this embodiment), the first mode is performed to allow the coolant to circulate between the first pump 11 and each of the devices 15, 16, 17, and 18 to be cooled. When the outside air temperature is higher than the predetermined temperature (15° C. in this embodiment), the operation is shifted from the second mode to the third mode as the outside air temperature becomes higher, which increases the number of devices to be cooled for allowing the coolant to circulate through the second pump 12.

Thus, the cooling load of the coolant cooler 14 (that is, cooling load of the refrigeration cycle 22) can be changed according to the temperature of the coolant obtained after the heat exchange by the radiator 13, which can achieve the energy saving.

More specifically, the devices 15, 16, 17, and 18 to be cooled have different required cooling temperatures. When the outside air temperature is higher than the predetermined temperature (15° C. in this embodiment), as the outside air temperature becomes higher, the operation is shifted from the second mode to the third mode, whereby the coolant circulates starting from the device requiring the lower cooling temperature through the other devices in the order of increasing the required cooling temperature with respect to the second pump 12.

In this way, this embodiment can shift the circulation through the respective devices to be cooled 15, 16, 17, and 18 between the low-temperature coolant and the high-temperature coolant in accordance with the required coolant temperature thereof, thereby appropriately cooling the devices 15, 16, 17, and 18 to be cooled, while achieving the energy saving.

First Embodiment

Figure 16:
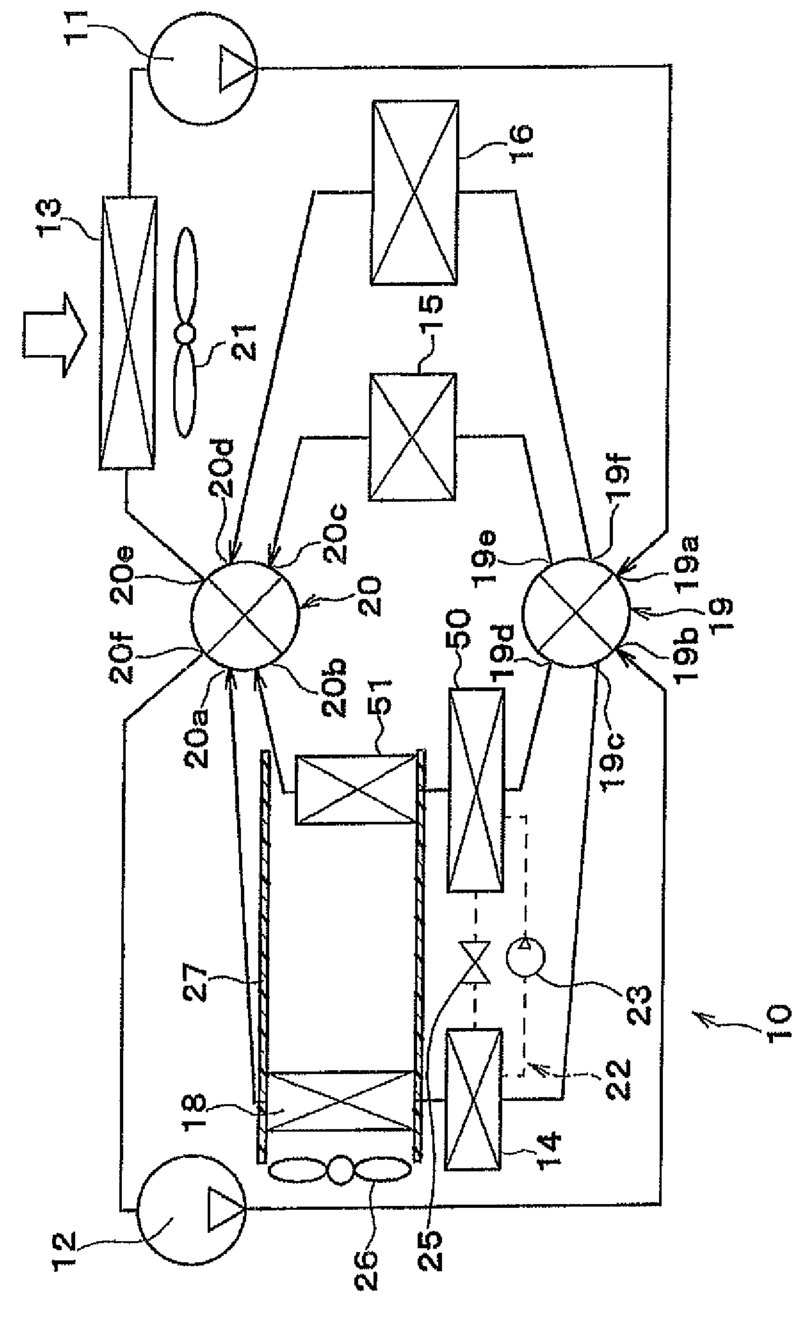
FIG. 16 is an entire configuration diagram of a vehicle cooling system according to a first embodiment of the invention.

Although in the first reference example, the exhaust gas cooler 17 is connected between the outlet 19*d* of the first switching valve 19 and the inlet 20*b* of the second switching valve 20, in a first embodiment, as shown in FIG. 16, a condenser 50 (device to be cooled) and a heater core 51 are connected between the outlet 19*d* of the first switching valve 19 and the inlet 20*b* of the second switching valve 20.

The condenser 50 is a high-pressure side heat exchanger for condensing a high-pressure refrigerant by exchanging heat between the coolant and the high-pressure refrigerant discharged from the compressor 23, thereby heating the coolant. The coolant inlet side of the condenser 50 is connected to the outlet 19*d* of the first switching valve 19.

The heater core 51 is a heat exchanger for heating that heats the blast air by exchanging heat between the coolant and the blast air having passed through the cooler core 18. The heater core 51 is disposed on the downstream side of the air flow of the cooler core 18 within the casing 27 of the indoor air conditioning unit.

The coolant inlet side of the heater core 51 is connected to the coolant outlet side of the condenser 50. The coolant outlet side of the heater core 51 is connected to the inlet 20*b* of the second switching valve 20.

Although in the first reference example, the coolant cooler 14 is connected between the discharge side of the first pump 11 and the inlet 19*b* of the first switching valve 19, in this embodiment, the coolant cooler 14 is connected between the first switching valve 19 and the cooler core 18. Specifically, the coolant inlet side of the coolant cooler 14 is connected to the outlet 19*c* of the first switching valve 19, and the coolant outlet side of the coolant cooler 14 is connected to the coolant inlet side of the cooler core 18.

The first switching valve 19 is configured to be capable of switching among the five types of communication states between the inlets 19*a* and 19*b* and the outlets 19*c*, 19*d*, 19*e*, and 19*f*. The second switching valve 20 is also configured to be capable of switching among five types of communication states between the inlets 20*a*, 20*c*, and 20*d* and the outlets 20*e*, and 20*f*.

Figure 17:
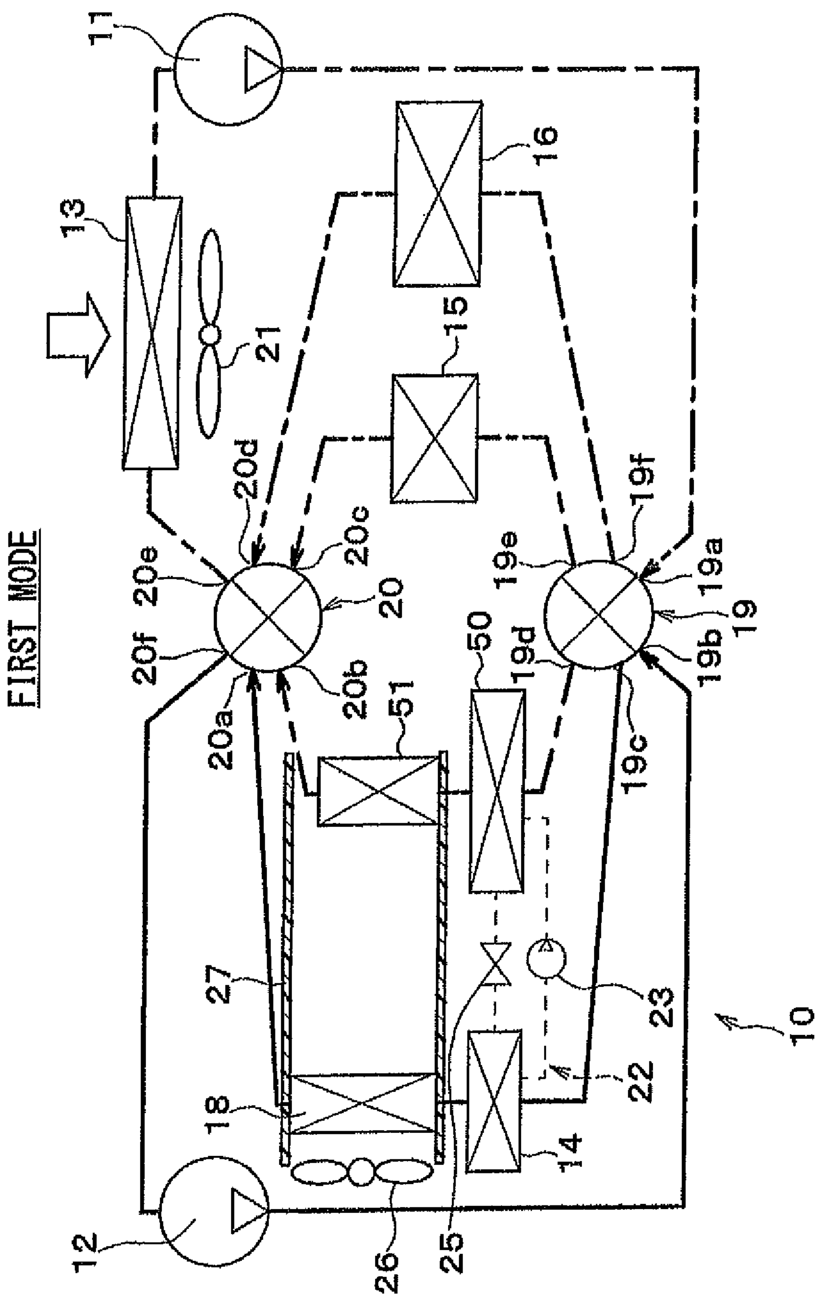
FIG. 17 is a diagram for explaining a first mode in the vehicle cooling system of FIG. 16.

FIG. 17 shows the operation (first mode) of the cooling system 10 when the first and second switching valves 19 and 20 are switched to a first state.

In the first state, the first switching valve 19 connects the inlet 19*a* with the outlets 19*d*, 19*e*, and 19*f*, and also connects the inlet 19*b* with the outlet 19*c*. Thus, the first switching valve 19 allows the coolant entering the inlet 19*a* to flow out of the outlets 19*d*, 19*e*, and 19*f* as indicated by alternate long and short dashed arrows in FIG. 17, and also allows the coolant entering the inlet 19*b* to flow out of the outlet 19*c* as indicated by a solid arrow in FIG. 17.

In the first state, the second switching valve 20 connects the inlets 20*b*, 20*c*, and 20*d* with the outlet 20*e*, and also connects the inlet 20*a* with the outlet 20*f*. Thus, the second switching valve 20 allows the coolant entering the inlets 20*b*, 20*c*, and 20*d* to flow out of the outlet 20*e* as indicated by alternate long and short dashed arrows in FIG. 17, and also allows the coolant entering the inlet 20*a* to flow out of the outlet 20*f* as a solid arrow in FIG. 17.

Figure 18:
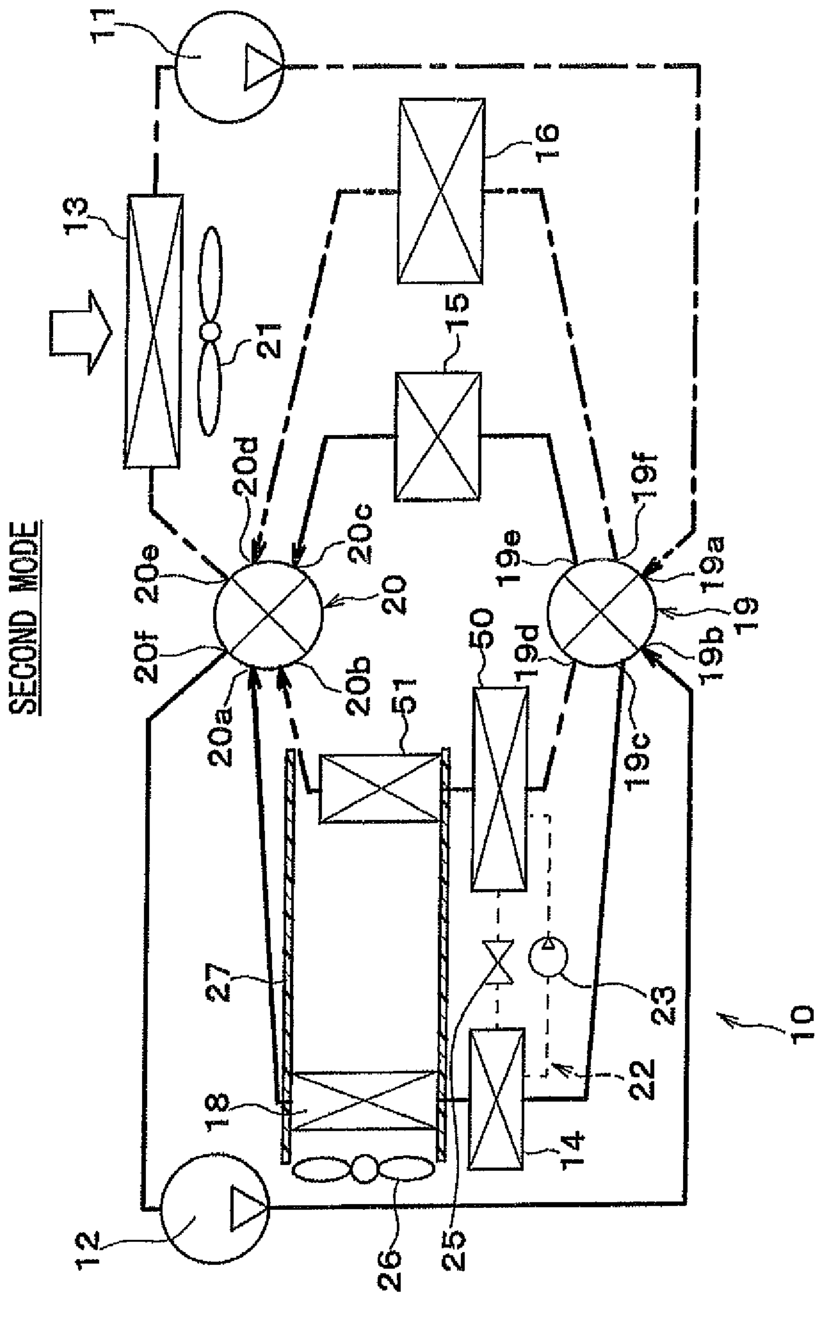
FIG. 18 is a diagram for explaining a second mode in the vehicle cooling system of FIG. 16.

FIG. 18 shows the operation (second mode) of the cooling system 10 when the first and second switching valves 19 and 20 are switched to a second state.

In the second state, the first switching valve 19 connects the inlet 19*a* with the outlets 19*d*, and 19*f*, and also connects the inlet 19*b* with the outlets 19*c* and 19*e*. Thus, the first switching valve 19 allows the coolant flowing into the inlet 19*a* to flow from the outlets 19*d*, and 19*f* as indicated by alternate long and short dashed arrows in FIG. 18, and the coolant flowing into the inlet 19*b* to flow from the outlets 19*c* and 19*e* as solid arrows in FIG. 18.

In the second state, the second switching valve 20 connects the inlets 20*b* and 20*d* with the outlet 20*e* and also connects the inlets 20*a*, and 20*c* with the outlet 20*f*. Thus, the second switching valve 20 allows the coolant entering the inlets 20*b*, and 20*d* to flow out of the outlet 20*e* as indicated by alternate long and short dashed arrows in FIG. 18, and the coolant entering the inlets 20*a* and 20*c* to flow out of the outlet 20*f* as solid arrows in FIG. 18.

Figure 19:
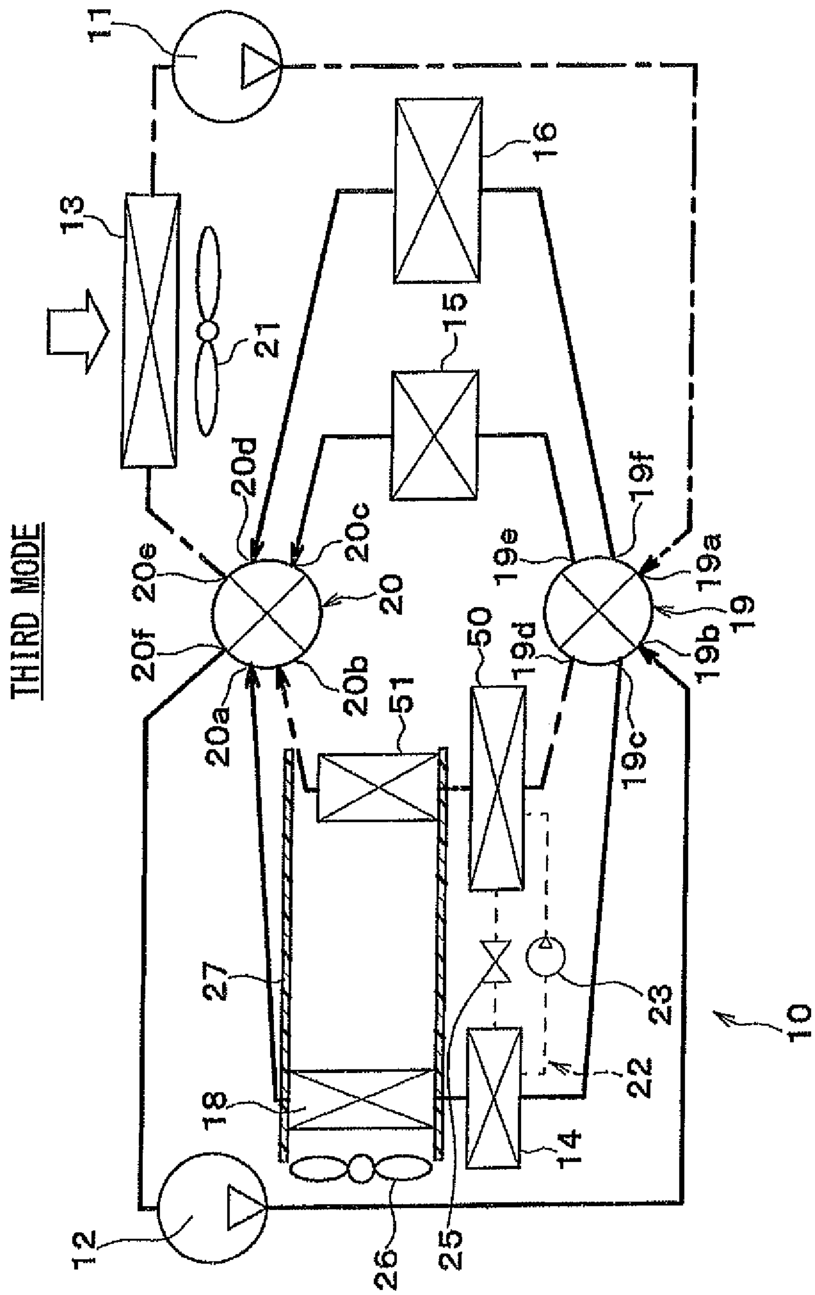
FIG. 19 is a diagram for explaining a third mode in the vehicle cooling system of FIG. 16.

FIG. 19 shows the operation (third mode) of the cooling system 10 when the first and second switching valves 19 and 20 are switched to a third state.

In the third state, the first switching valve 19 connects the inlet 19*a* with the outlet 19*d*, and also connects the inlet 19*b* with the outlets 19*c*, 19*e*, and 19*f*. Thus, the first switching valve 19 allows the coolant entering the inlet 19*a* to flow out of the outlet 19*d* as indicated by an alternate long and short dashed arrow in FIG. 19, and also allows the coolant entering the inlet 19*b* to flow out of the outlets 19*c*, 19*e*, and 19*f* as solid arrows in FIG. 19.

In the third state, the second switching valve 20 connects the inlet 20*b* with the outlet 20*e* and also connects the inlets 20*a*, 20*c*, and 20*d* with the outlet 20*f*. Thus, the second switching valve 20 allows the coolant entering the inlet 20*b* to flow out of the outlet 20*e* as indicated by an alternate long and short dashed arrow in FIG. 19, and also allows the coolant entering the inlets 20*a*, 20*c*, and 20*d* to flow out of the outlet 20*f* as indicated by a solid arrow in FIG. 19.

Figure 20:
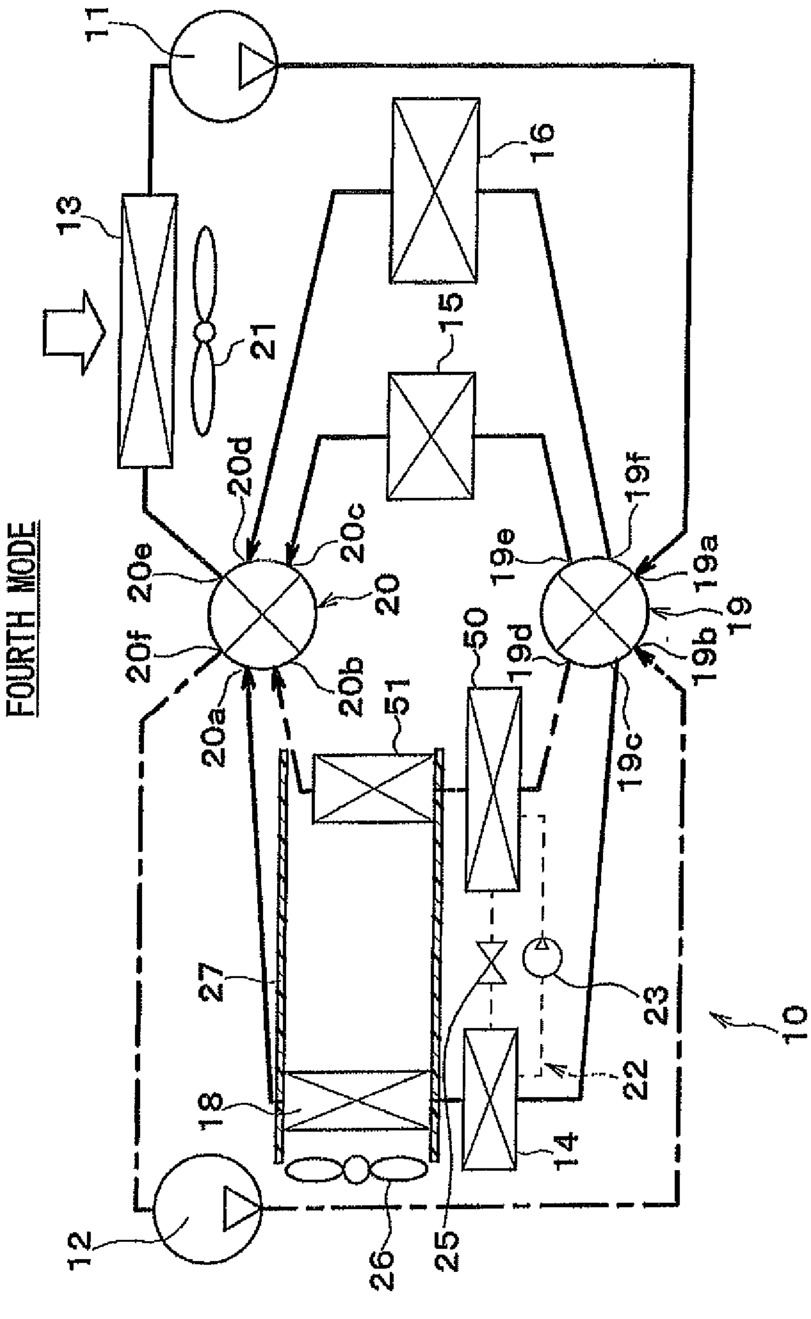
FIG. 20 is a diagram for explaining a fourth mode in the vehicle cooling system of FIG. 16.

FIG. 20 shows the operation (fourth mode) of the cooling system 10 when the first and second switching valves 19 and 20 are switched to a fourth state.

In the fourth state, the first switching valve 19 allows the inlet 19*a* to communicate with the outlets 19*c*, 19*e*, and 19*f*, and also allows the inlet 19*b* to communicate with the outlet 19*d*. Thus, the first switching valve 19 allows the coolant flowing into the inlet 19*a* to flow from the outlets 19*c*, 19*e*, and 19*f* as indicated by solid arrows in FIG. 20, and the coolant flowing into the inlet 19*b* to flow from the outlet 19*d* as indicated by an alternate long and short dashed arrow in FIG. 20.

In the fourth state, the second switching valve 20 connects the inlet 20*b* with the outlet 20*f* and also connects the inlets 20*a*, 20*c*, and 20*d* with the outlet 20*e*. Thus, the second switching valve 20 allows the coolant entering the inlets 20*a*, 20*c*, and 20*d* to flow out of the outlet 20*e* as indicated by solid arrows in FIG. 20, and the coolant entering the inlet 20*b* to flow out of the outlet 20*f* as an alternate long and short dashed arrow in FIG. 20.

Figure 21:
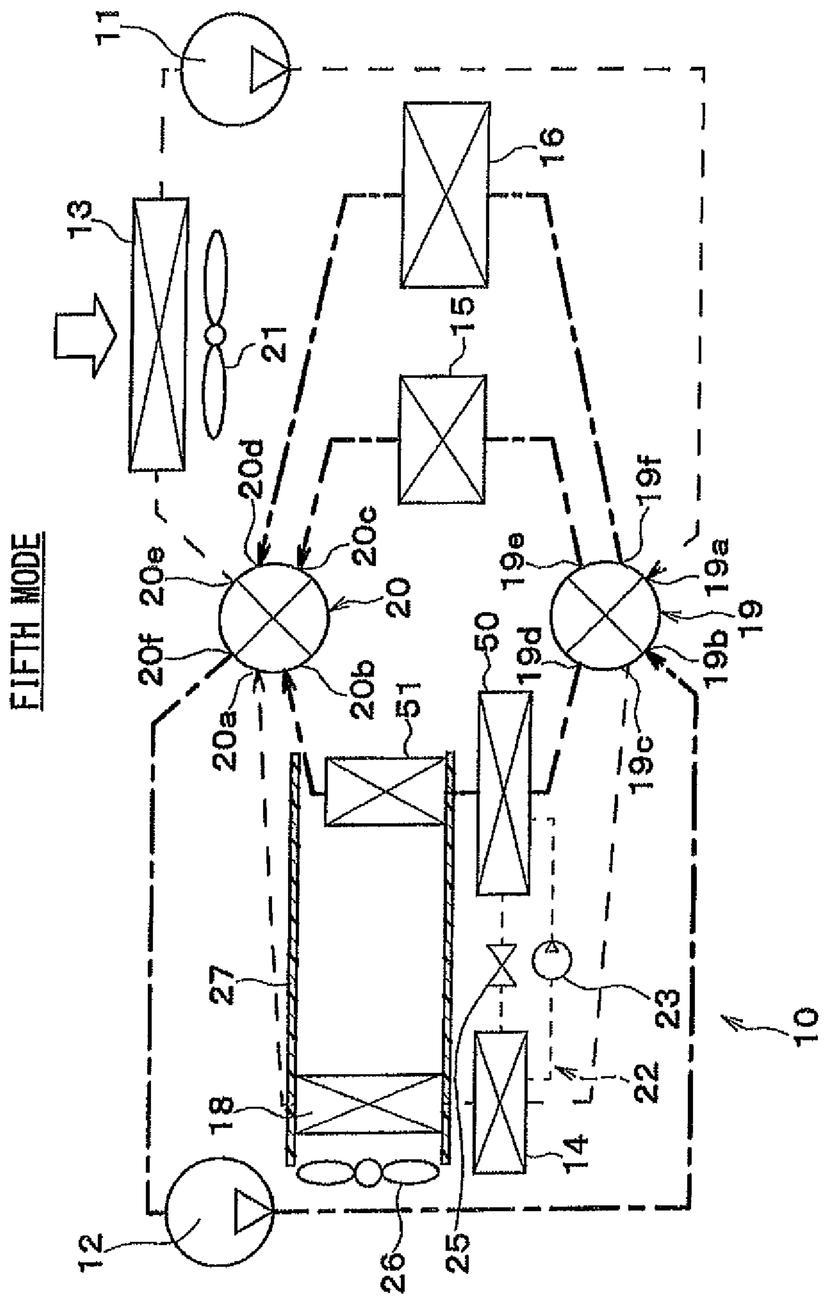
FIG. 21 is a diagram for explaining a fifth mode in the vehicle cooling system of FIG. 16.

FIG. 21 shows the operation (fifth mode) of the cooling system 10 when the first and second switching valves 19 and 20 are switched to a fifth state.

In the fifth state, the first switching valve 19 connects the inlet 19*a* with the outlet 19*c*, and also connects the inlet 19*b* with the outlets 19*d*, 19*e*, and 19*f*. Thus, the first switching valve 19 allows the coolant flowing into the inlet 19*a* to flow from the outlet 19*c* as indicated by a dashed arrow in FIG. 21, and the coolant flowing into the inlet 19*b* to flow from the outlets 19*d*, 19*e*, and 19*f* as indicated by an alternate long and short dashed arrow in FIG. 21.

In the fifth state, the second switching valve 20 connects the inlet 20*a* with the outlet 20*e* and also connects the inlets 20*b*, 20*c*, and 20*d* with the outlet 20*f*. Thus, the second switching valve 20 allows the coolant entering the inlet 20*a* to flow out of the outlet 20*e* as indicated by a dashed arrow in FIG. 21, and also allows the coolant entering the inlets 20*b*, 20*c*, and 20*d* to flow out of the outlet 20*f* as indicated by alternate long and short dashed arrows in FIG. 21.

The specific structures of the coolant cooler 14 and the condenser 50 in this embodiment will be described below with reference to FIG. 22. The coolant cooler 14 and condenser 50 are included in one heat exchanger 52 of the tank-and-tube type. One half of the heat exchanger 52 constitutes the coolant cooler 14, while the other half of the heat exchanger 52 constitutes the condenser 50.

The heat exchanger 52 includes a heat exchanger core (heat exchanging portion) 52*a*, tank portions 52*b* and 52*c*, and a partition portion 52*d*. The heat exchanger core 52*a* includes a plurality of tubes through which the coolant and the refrigerant independently flow. The tubes are stacked on each other in parallel.

The tank portions 52*b* and 52*c* are disposed on both sides of the tubes to distribute and collect the coolant and refrigerant with respect to the tubes. The internal spaces of the tank portions 52*b* and 52*c* are partitioned into a space for allowing the coolant to flow therethrough, and another space for allowing the refrigerant to flow therethrough by a partition member (not shown).

Figure 22:
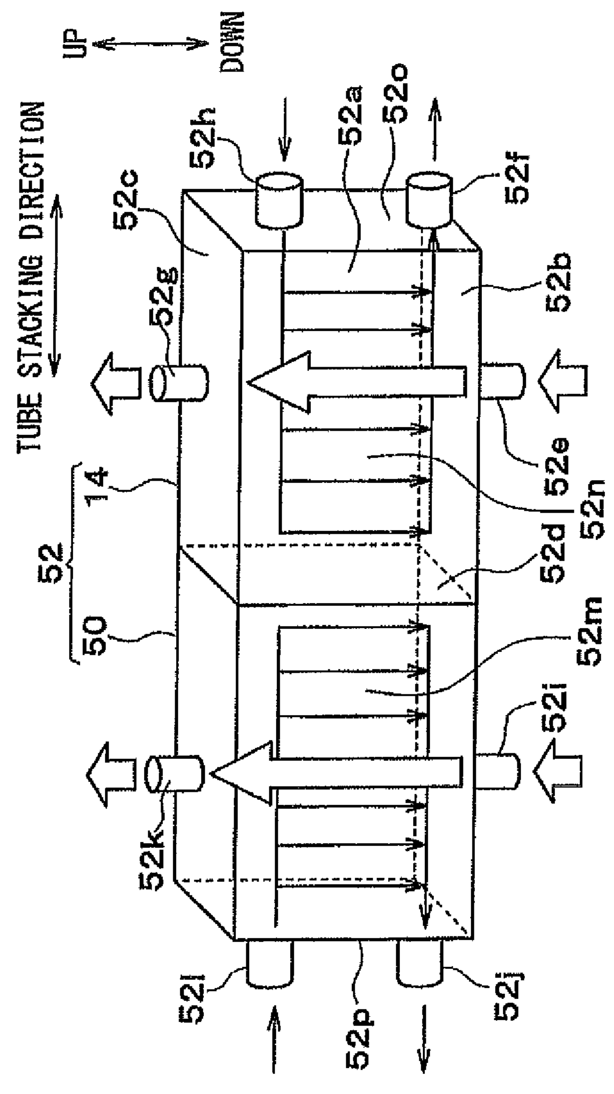
FIG. 22 is a perspective view showing a coolant cooler and a condenser in the first embodiment.

The partition portion 52*d* partitions the insides of the tank portions 52*b* and 52*c* into two spaces in the tube stacking direction (in the left-right direction of FIG. 22). One side of the heat exchanger 51 (on the right side of FIG. 22) in the tube stacking direction with respect to the partition portion 52*d* constitutes the coolant cooler 14, whereas the other side of the heat exchanger 52 (on the left side of FIG. 22) in the tube stacking direction with respect to the partition portion 52*d* constitutes the condenser 50. Thus, the partition portion 52*d* forms a boundary between the coolant cooler 14 and the condenser 50.

One side of the heat exchanger core 52*a* (on the right side of FIG. 22) in the tube stacking direction with respect to the partition portion 52*d* constitutes a heat exchanging portion 52*m* (second heat exchanging portion) of the coolant cooler 14. The other side of the heat exchanger core 52*a* (on the left side of FIG. 22) in the tube stacking direction with respect to the partition portion 52*d* constitutes a heat exchanging portion 52*n* (first heat exchanging portion) of the condenser 50.

Members constituting the heat exchanger core 52*a*, the tank portions 52*b* and 52*c*, and the partition portion 52*d* are formed of metal (for example, an aluminum alloy), and bonded together by brazing.

A part of one tank portion 52*b* serving as the coolant cooler 14 is provided with an inlet (heat medium inlet) 52*e* for the coolant and an outlet (refrigerant outlet) 52*f* for the refrigerant.

Further, a part of the other tank portion 52*c* serving as the coolant cooler 14 is provided with an outlet (heat medium outlet) 52*g* for the coolant and an inlet (refrigerant inlet) 52*h* for the refrigerant.

Thus, in the coolant cooler 14, the coolant flows from the inlet 52*e* into the tank portion 52*b*, and is then distributed to the tubes for the coolant (tubes for the heat medium) by the tank portion 52*b*. The coolants after having passed through the tubes for the coolant are collected into the tank portion 52*c* to flow out of the outlet 52*g*.

In the coolant cooler 14, the coolant flows from the inlet 52*h* into the tank portion 52*c*, and is then distributed to the tubes for the coolant by the tank portion 52*c*. The coolants after having passed through the tubes for the coolant are collected into the tank portion 52*b* to flow from the outlet 52*f*.

The inlet 52*e* and outlet 52*g* for the coolant of the coolant cooler 14 are disposed between both ends 52*o* and 52*p* of the tank portions 52*b* and 52*c* in the tube stacking direction (both ends in the left-right direction of FIG. 22). In the example shown in FIG. 22, the inlet 52*e* and outlet 52*g* are disposed between the partition portion 52*d* and the end 52*o* of the tank portions 52*b* and 52*c* in the tube stacking direction. Thus, the coolant cooler 14 does not allow the flow of coolant to make a U-turn.

The inlet 52*e* and outlet 52*g* are opened while being oriented in the direction perpendicular to the tube stacking direction. In the example shown in FIG. 22, the inlet 52*e* and outlet 52*g* are oriented in the direction parallel to the tubes for the refrigerant and for the coolant.

A part of one tank portion 52*b* serving as the condenser 50 is provided with an inlet (heat medium inlet) 52*i* for the coolant and an outlet (refrigerant outlet) 52*j* for the refrigerant. Further, a part of the other tank portion 52*c* serving as the condenser 50 is provided with an outlet (heat medium outlet) 52*k* for the coolant and an inlet (refrigerant inlet) 52*l* for the refrigerant.

Thus, in the condenser 50, the coolant flows from the inlet 52*i* into the tank portion 52*b*, and is then distributed to the tubes for the coolant by the tank portion 52*b*. The coolants after having passed through the tubes for the coolant are collected into the tank portion 52*c* to flow from the outlet 52*k*.

In the condenser 50, the refrigerant flows from the inlet 52*l* into the tank portion 52*c*, and is then distributed to the tubes for the refrigerant by the tank portion 52*c*. The coolants after having passed through the tubes for the refrigerant are collected into the tank portion 52*b* to flow from the outlet 52*j*.

The inlet 52*i* and outlet 52*k* for the coolant of the condenser 50 are disposed between both the ends 52*o* and 52*p* of the tank portions 52*b* and 52*c* in the tube stacking direction (both ends in the left-right direction of FIG. 22). In the example shown in FIG. 22, the inlet 52*i* and outlet 52*k* are disposed between the partition portion 52*d* and the other end 52*p* of the tank portions 52*b* and 52*c* in the tube stacking direction. Thus, the condenser 50 does not allow the flow of coolant to make a U-turn.

The inlet 52*i* and outlet 52*k* are oriented in the direction perpendicular to the tube stacking direction. In the example shown in FIG. 22, the inlet 52*e* and outlet 52*g* are oriented in the direction parallel to the tubes for the refrigerant and for the coolant.

The heat exchanger 52 is not limited to the tank-and-tube type heat exchanger, and can be applied to other types of heat exchangers. For example, a laminate-type heat exchanger including a lamination of a number of plate members may be adopted.

Figure 23:
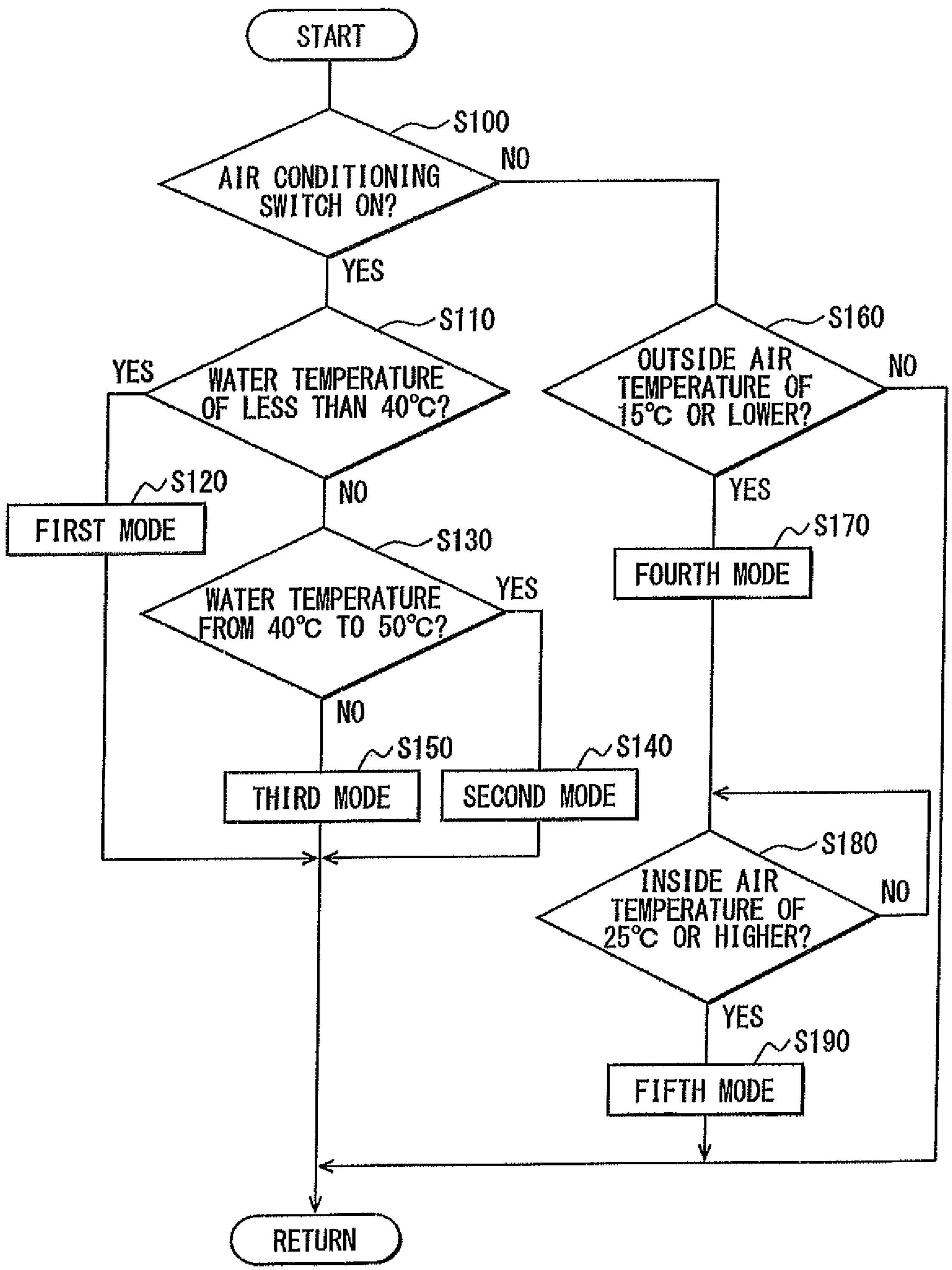
FIG. 23 is a flowchart showing the flow of a control process performed by a controller of the first embodiment.

A control process executed by the controller 40 of this embodiment will be described with reference to FIG. 23. The controller 40 executes a computer program according to a flowchart of FIG. 23.

First, in step S100, it is determined whether the air conditioning switch 44 is turned on or not. When the air conditioner 44 is determined to be turned on, the cooling is considered to be necessary, and then the operation proceeds to step S110. In step S110, it is determined whether the temperature of coolant detected by the water temperature sensor 43 is lower than 40 degrees or not.

When the temperature of coolant detected by the water temperature sensor 43 is determined to be lower than 40 degrees, the temperature of the coolant (intermediate-temperature coolant) cooled by the outside air in the radiator 13 is considered to be low, and then the operation proceeds to step S120. In step S120, the first mode shown in FIG. 17 is performed.

In the first mode, the controller 40 controls the electric motor 30 for a switching valve such that the first and second switching valves 19 and 20 are brought into the first state shown in FIG. 17 to thereby operate the first and second pumps 11 and 12 and the compressor 23.

Thus, the first switching valve 19 connects the inlet 19*a* with the outlets 19*d*, 19*e*, and 19*f*, and also connects the inlet 19*b* with the outlet 19*c*. The second switching valve 20 connects the inlets 20*b*, 20*c*, and 20*d* with the outlet 20*e*, and also connects the inlet 20*a* with the outlet 20*f*.

Accordingly, the first coolant circuit (intermediate-temperature coolant circuit) is formed of the first pump 11, the battery cooler 15, the inverter cooler 16, the condenser 50, the heater core 51, and the radiator 13, whereas the second coolant circuit (low-temperature coolant circuit) is formed of the second pump 12, the coolant cooler 14, and the cooler core 18.

That is, as indicated by alternate long and short dashed arrows in FIG. 17, the coolant discharged from the first pump 11 is branched by the first switching valve 19 into the battery cooler 15, the inverter 16, and the condenser 50 to flow in parallel through the battery cooler 15, the inverter cooler 16, and the condenser 50. The coolant flowing through the condenser 50 flows in series through the heater core 51. The coolants flowing through the heater core 51, through the battery cooler 15, and through the inverter cooler 16 are collected by the second switching valve 20 to flow through the radiator 13, thereby being sucked into the first pump 11.

On the other hand, as indicated by a solid arrow in FIG. 17, the coolant discharged from the second pump 12 flows through the coolant cooler 14 and the cooler core 18 in series via the first switching valve 19, and is then sucked into the second pump 12 via the second switching valve 20.

In this way, in the first mode, the intermediate-temperature coolant cooled by the radiator 13 flows through the battery cooler 15, the inverter cooler 16, the condenser 50, and the heater core 51, whereas the low-temperature coolant cooled by the coolant cooler 14 flows through the cooler core 18.

Thus, in the battery cooler 15 and the inverter cooler 16, the battery and inverter are cooled by the intermediate-temperature coolant. In the condenser 50, the intermediate-temperature coolant is heated by exchanging heat with the high-pressure refrigerant of the refrigeration cycle 22. In the cooler core 18, the blast air into the vehicle interior is cooled by exchanging heat between the low-temperature coolant and the blast air into vehicle interior.

The intermediate-temperature coolant heated by the condenser 50 exchanges heat with the blast air having passed through the cooler core 18 when flowing through the heater core 51. Thus, the heater core 51 heats the blast air having passed through the cooler core 18. That is, the blast air cooled and dehumidified by the cooler core 18 can be heated by the heater core 51 to form a conditioned air at a desired temperature.

For example, when the outside air temperature is about 15° C., the intermediate coolant cooled by the outside air in the radiator 13 becomes at about 25° C., so that the intermediate-temperature coolant can sufficiently cool the battery and the inverter.

The low-temperature coolant cooled by the low-pressure refrigerant of the refrigeration cycle 22 in the coolant cooler 14 becomes at about 0° C., so that the low-temperature coolant can sufficiently cool the blast air into the vehicle interior.

In the first mode, the battery and the inverter are cooled by the outside air, which can effectively achieve the energy saving as compared to the case in which the battery and the inverter are cooled by the low-pressure refrigerant of the refrigeration cycle 22.

In contrast, in step S110, when the temperature of the coolant detected by the water temperature sensor 43 is determined not to be lower than 40 degrees, the temperature of the intermediate-temperature coolant is considered to be higher, and then the operation proceeds to step S130. In step S130, it is determined whether or not the temperature of the coolant detected by the water temperature sensor 43 is 40 degrees or more to less than 50 degrees.

When the temperature of the coolant detected by the water temperature sensor 43 is determined to be 40 degrees or more, and less than 50 degrees, the operation proceeds to step S140, in which the second mode is performed as shown in FIG. 18.

In the second mode, the controller 40 controls the electric motor 30 for a switching valve such that the first and second switching valves 19 and 20 are brought into the second state shown in FIG. 18 to thereby operate the first and second pumps 11 and 12 and the compressor 23.

Thus, the first switching valve 19 connects the inlet 19*a* with the outlets 19*d* and 19*f*, and also connects the inlet 19*b* with the outlets 19*c* and 19*e*. The second switching valve 20 connects the inlets 20*b* and 20*d* with the outlet 20*e*, and also connects the inlets 20*a* and 20*c* with the outlet 20*f*.

Accordingly, the first coolant circuit (intermediate-temperature coolant circuit) is formed of the first pump 11, the inverter cooler 16, the condenser 50, the heater core 51, and the radiator 13, whereas the second coolant circuit (low-temperature coolant circuit) is formed of the second pump 12, the coolant cooler 14, the cooler core 18, and the battery cooler 15.

That is, as indicated by alternate long and short dashed arrows in FIG. 18, the coolant discharged from the first pump 11 is branched into the inverter cooler 16 and the condenser 50 by the first switching valve 19 to flow in parallel through the inverter cooler 16 and the condenser 50. The coolant flowing through the condenser 50 flows in series through the heater core 51. The coolants flowing through the heater core 51 and through the inverter cooler 16 are collected by the second switching valve 20 to flow through the radiator 13, thereby being sucked into the first pump 11.

On the other hand, as indicated by solid arrows in FIG. 18, the coolant discharged from the second pump 12 is branched into the coolant cooler 14 and the battery cooler 15 by the first switching valve 19 to flow in parallel through the coolant cooler 14 and the battery cooler 15. The coolant flowing through the coolant cooler 14 flows in series through the cooler core 18. The coolants flowing through the cooler core 18 and through the battery cooler 15 are collected by the second switching valve 20 to be sucked into the second pump 12.

Thus, in the second mode, the intermediate-temperature coolant cooled by the radiator 13 flows through the inverter cooler 16, the condenser 50, and the heater core 51, whereas the low-temperature coolant cooled by the coolant cooler 14 flows through the cooler core 18 and the battery cooler 15.

Thus, the inverter can be cooled by the intermediate-temperature coolant, and the battery can be cooled by the low-temperature coolant. Additionally, like the first mode, the blast air cooled and dehumidified by the cooler core 18 is heated by the heater core 51, which can make the conditioned air at the desired temperature.

For example, when the outside air temperature is about 30° C., the intermediate-temperature coolant cooled by the outside air in the radiator 13 becomes at a temperature of about 40° C., so that the intermediate-temperature coolant can sufficiently cool the inverter.

The low-temperature coolant cooled by the low-pressure refrigerant of the refrigeration cycle 22 in the coolant cooler 14 becomes at about 0° C., so that the battery and the blast air into the vehicle interior can be sufficiently cooled by the low-temperature coolant.

Since in the second mode the battery is cooled by the low-pressure refrigerant of the refrigeration cycle 22, the battery can be sufficiently cooled even when the outside air cannot cool the battery adequately because of the high temperature of the outside air.

In step S130, when the temperature of coolant detected by the water temperature sensor 43 is determined to be 40 degrees or more to less than 50 degrees, the temperature of the intermediate-temperature coolant is considered to be very high, and then the operation proceeds to step S150. In step S150, the third mode shown in FIG. 19 is performed.

In the third mode, the controller 40 controls the electric motor 30 for a switching valve such that the first and second switching valves 19 and 20 are brought into the third state shown in FIG. 19 to thereby operate the first and second pumps 11 and 12 and the compressor 23.

Thus, the first switching valve 19 connects the inlet 19*a* with the outlet 19*d* and also connects the inlet 19*b* with the outlets 19*c*, 19*e*, and 19*f*. The second switching valve 20 connects the inlet 20*b* with the outlet 20*e*, and also connects the inlets 20*a*, 20*c*, and 20*d* with the outlet 20*f*.

Accordingly, the first coolant circuit (intermediate-temperature coolant circuit) is formed of the first pump 11, the condenser 50, the heater core 51, and the radiator 13, whereas the second coolant circuit (low-temperature coolant circuit) is formed of the second pump 12, the coolant cooler 14, the cooler core 18, the battery cooler 15, and the inverter cooler 16.

That is, as indicated by an alternate long and short dashed arrow in FIG. 19, the coolant discharged from the first pump 11 flows through the condenser 50 and heater core 51 in series via the first switching valve 19, and then through the radiator 13 via the second switching valve 20, thereby being sucked into the first pump 11.

On the other hand, as indicated by solid arrows in FIG. 19, the coolant discharged from the second pump 12 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to be sucked into the second pump 12.

In this way, in the third mode, the intermediate-temperature coolant cooled by the radiator 13 flows through the condenser 50 and the heater core 51, whereas the low-temperature coolant cooled by the coolant cooler 14 flows through the cooler core 18, the battery cooler 15, and the inverter cooler 16.

Thus, the battery and the inverter can be cooled by the low-temperature coolant, and like the first and second modes, the blast air cooled and dehumidified by the cooler core 18 is heated by the heater core 51, which can make the conditioned air at the desired temperature.

For example, when the outside air temperature is about 40° C., the intermediate-temperature coolant cooled by the outside air in the radiator 13 becomes at about 50° C. The low-temperature coolant cooled by the low-pressure refrigerant of the refrigeration cycle 22 in the coolant cooler 14 becomes at about 0° C., so that the blast air into the vehicle interior, the battery, and the inverter can be sufficiently cooled by the low-temperature coolant.

Since in the third mode the battery and the inverter are cooled by the low-pressure refrigerant of the refrigeration cycle 22, the battery and the inverter can be sufficiently cooled even when the outside air cannot cool the battery and the inverter adequately because of the very high temperature of the outside air.

When the air conditioning switch 44 is determined not to be turned on in step S100, the cooling is considered not to be necessary, and then the operation proceeds to step S160. In step S160, it is determined whether the outside air temperature detected by the outside air sensor 42 is lower than 15 degrees or not.

When the outside air temperature detected by the outside air sensor 42 is determined to be 15 degrees or less, the high heating capacity is considered to be necessary, and then the operation proceeds to step S170, in which a fourth mode is performed as shown in FIG. 20.

In the fourth mode, the controller 40 controls the electric motor 30 for a switching valve such that the first and second switching valves 19 and 20 are brought into the fourth state shown in FIG. 20 to thereby operate the first and second pumps 11 and 12 and the compressor 23.

Thus, the first switching valve 19 connects the inlet 19*a* with the outlets 19*c*, 19*e*, and 19*f*, and also connects the inlet 19*b* with the outlet 19*d*. The second switching valve 20 connects the inlets 20*a*, 20*c*, and 20*d* with the outlet 20*e*, and also connects the inlet 20*b* with the outlet 20*f*.

Accordingly, a first coolant circuit (low-temperature coolant circuit) is formed of the first pump 11, the coolant cooler 14, the cooler core 18, the battery cooler 15, the inverter cooler 16, and the radiator 13, whereas a second coolant circuit (intermediate-temperature coolant circuit) is formed of the second pump 12, the condenser 50, and the heater core 51.

That is, as indicated by solid arrows in FIG. 20, the coolant discharged from the first pump 11 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to flow through the radiator 13, thereby being sucked into the first pump 11.

On the other hand, as indicated by an alternate long and short dashed arrow in FIG. 20, the coolant discharged from the second pump 12 flows through the condenser 50 and the heater core 51 in series via the first switching valve 19, and is then sucked into the second pump 12 via the second switching valve 20.

Thus, in the fourth mode, the low-temperature coolant cooled by the coolant cooler 14 flows through the cooler core 18, the battery cooler 15, and the inverter cooler 16, which can cool the blast air into the vehicle interior, the battery, and the inverter by the low-temperature coolant.

In the fourth mode, the low-temperature coolant cooled by the coolant cooler 14 flows through the radiator 13, allowing the coolant to absorb heat from the outside air in the radiator 13. Then, the coolant that has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the cooler core 18 in flowing through the heater core 51, thereby dissipating heat therefrom. Thus, the heater core 51 heats the blast air having passed through the cooler core 18. Accordingly, the fourth mode can achieve heat pump heating that heats the vehicle interior by absorbing heat from the outside air.

For example, when the outside air temperature is 10° C., the intermediate-temperature coolant heated by the condenser 50 becomes at about 50° C., so that the blast air having passed through the cooler core 18 can be sufficiently heated by the intermediate-temperature coolant.

The low-temperature coolant cooled by the low-pressure refrigerant of the refrigeration cycle 22 in the coolant cooler 14 is at about 0° C., so that the battery and the inverter can be sufficiently cooled by the low-temperature coolant.

Note that the fourth mode can achieve the dehumidification heating which involves allowing the heater core 51 to heat the blast air cooled and dehumidified by the cooler core 18.

In the following step S180, it is determined whether or not the inside air temperature detected by the inside air sensor 41 is 25 degrees or higher. When the inside air temperature detected by the inside air sensor 41 is determined not to be 25 degrees or more, the high heating capacity is considered to be necessary, and then the operation returns to step S180. Thus, until the inside air temperature is increased to 25 degrees or more, the fourth mode is performed.

When the inside air temperature detected by the inside air sensor 41 is determined to be 25 degrees or more, the high heating capacity is considered not to be necessary, and then the operation proceeds to step S190, in which a fifth mode is performed as shown in FIG. 21.

In the fifth mode, the controller 40 controls the electric motor 30 for a switching valve such that the first and second switching valves 19 and 20 becomes the fifth state shown in FIG. 21.

Thus, the first switching valve 19 connects the inlet 19*a* with the outlet 19*c* and also connects the inlet 19*b* with the outlets 19*d*, 19*e*, and 19*f*. The second switching valve 20 connects the inlet 20*a* with the outlet 20*e*, and also connects the inlets 20*b*, 20*c*, and 20*d* with the outlet 20*f*.

Accordingly, a first coolant circuit (low-temperature coolant circuit) is formed of the first pump 11, the coolant cooler 14, the cooler core 18, and the radiator 13, whereas a second coolant circuit (intermediate-temperature coolant circuit) is formed of the second pump 12, the battery cooler 15, the inverter cooler 16, the condenser 50, and the heater core 51.

At this time, the second pump 12 is operated to thereby stop the first pump 11 and compressor 23. Thus, in the first coolant circuit indicated by dashed arrows in FIG. 21, the coolant does not circulate therethrough.

On the other hand, as indicated by alternate long and short dashed arrows in FIG. 21, in the second coolant circuit, the coolant discharged from the second pump 12 is branched into the battery cooler 15, the inverter cooler 16, and the condenser 50 by the first switching valve 19. The coolant flowing through the condenser 50 flows in series through the heater core 51. The coolants flowing through the heater core 51, through the battery cooler 15, and through the inverter cooler 16 are collected by the second switching valve 20 to be sucked into the second pump 12.

Thus, in the fifth mode, the coolant which has absorbed heat from the battery in the battery cooler 15 and the coolant which has absorbed heat from the inverter in the inverter cooler 16 flow through the heater core 51, so that the blast air into the vehicle interior can be heated by exhaust heat from the battery and inverter.

For example, when the outside air temperature is 10° C., the coolant heated by the battery cooler 15 and the inverter cooler 16 becomes at about 30°, whereby the blast air into the vehicle interior can be heated to 25 degrees or more with the inside air temperature maintained at 25 degrees or more.

In this embodiment, when the outside air temperature is lower than a predetermined temperature (15° C. in this embodiment), the forth mode or the fifth mode can be carried out to perform heating.

In the fourth mode, the coolant circulates between the coolant cooler 14 and the first pump 11, whereas the coolant heat medium circulates between the condenser 50 and the second pump 12.

Thus, the coolant cooled by the coolant cooler 14 flows through the radiator 13, so that the refrigerant of the refrigeration cycle 22 in the coolant cooler 14 can absorb heat from the outside air via the coolant flowing through the radiator 13. Thus, the heat of the outside air can be pumped up from the coolant cooler 14 (low-pressure side heat exchanger) of the refrigeration cycle 22 to the condenser 50 (high-pressure side heat exchanger).

The heat of the outside air pumped up by the refrigeration cycle 22 can heat the blast air into the vehicle interior by use of the heater core 51, which can achieve the heat pump heating which involves heating the vehicle interior by absorption of the heat from the outside air.

In the fifth mode, the coolant circulates between each of the battery coolant 15 and the heater core 51, and the second pump 12, whereby the operation of the first pump 11 is stopped. Thus, the coolant absorbs heat from the battery in the battery cooler 15, and the coolant which has absorbed the heat from the battery heats the blast air into the vehicle interior by the heater core 51, so that the exhaust heat from the battery can be used to heat the vehicle interior.

In this embodiment, the coolant cooler 14 and the condenser 50 are integrated into one heat exchanger 52, which can significantly improve the productivity as compared to the case where the coolant cooler 14 and the condenser 50 are formed of different heat exchangers.

Further, in this embodiment, the inlet 52*e* and outlet 52*g* for the coolant of the coolant cooler 14 are disposed between both the ends 52*o* and 52*p* of the tank portions 52*b* and 52*c* in the tube stacking direction, which can increase the flexibility in connection of the pipes and arrangement of the heat exchangers as compared to the case where the inlet 52*e* and outlet 52*g* for the coolant are disposed at both the ends 52*o* and 52*p* of the tank portions 52*b* and 52*c* in the tube stacking direction. The coolant cooler 14 does not allow the flow of coolant to make a U-turn, and thus can reduce the loss of pressure of the coolant in the coolant cooler 14.

Likewise, the inlet 52*i* and outlet 52*k* for the coolant of the condenser 50 are disposed between both the ends 52*o* and 52*p* of the tank portions 52*b* and 52*c* in the tube stacking direction, which can increase the flexibility in connection of the pipes and arrangement of the heat exchangers as compared to the case where the inlet 52*i* and outlet 52*k* for the coolant are disposed at both the ends 52*o* and 52*p* of the tank portions 52*b* and 52*c* in the tube stacking direction. The condenser 50 does not allow the flow of coolant to make a U-turn, and thus can reduce the loss of pressure of the coolant in the condenser 50.

That is, at least one of the refrigerant inlets 52*h* and 52*l*, refrigerant outlets 52*f* and 52*j*, coolant inlets 52*e* and 52*i*, and coolant outlets 52*g* and 52*k* is disposed between both the ends 52*o* and 52*p* of the tank portions 52*b* and 52*c* in the tube stacking direction. Such a system can increase the flexibility of connection of the pipes and arrangement of the heat exchangers as compared to the system in which all the refrigerant inlets 52*h* and 52*l*, refrigerant outlets 52*f* and 52*j*, coolant inlets 52*e* and 52*i*, and coolant outlets 52*g* and 52*k* are disposed at both the ends 52*o* and 52*p* of the tank portions 52*b* and 52*c*.

Second Embodiment

Figure 24:
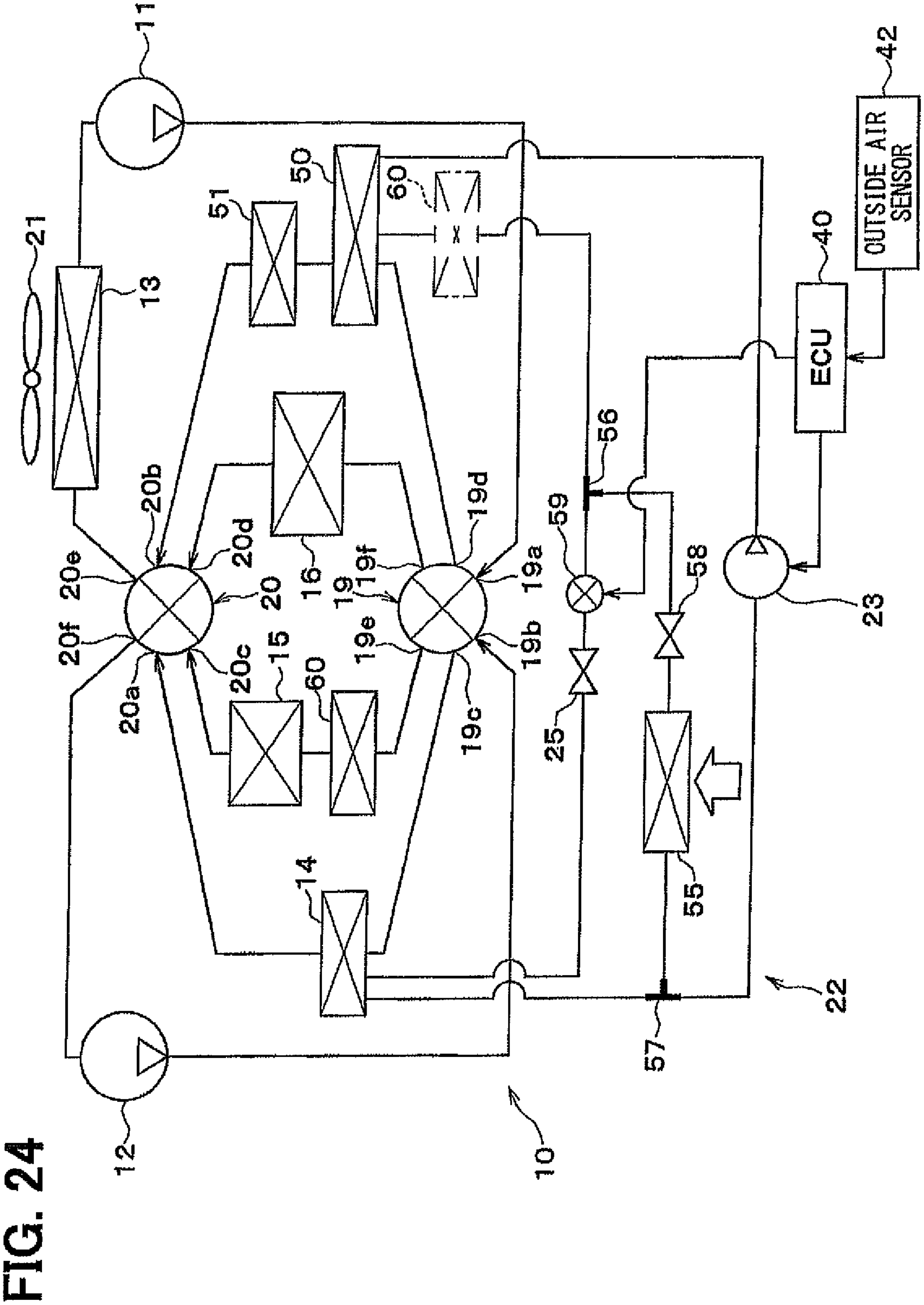
FIG. 24 is an entire configuration diagram of a vehicle cooling system according to a second embodiment of the invention.

Although in the first embodiment, the low-pressure refrigerant of the refrigeration cycle 22 is evaporated by the coolant cooler 14 to thereby cool the blast air into the vehicle interior by the cooler core 18, in a second embodiment, as shown in FIG. 24, the low-pressure refrigerant of the refrigeration cycle 22 is evaporated in the coolant cooler 14 and an evaporator 55, thereby cooling the blast air into the vehicle interior by the evaporator 55 of the refrigeration cycle 22.

The evaporator 55 allows the refrigerant to flow in parallel to the coolant cooler 14. Specifically, the refrigerant cycle 22 has a branch portion 56 for refrigerant flow that is located between the refrigerant discharge side of the compressor 23 and the refrigerant inlet side of the expansion valve 25, and a collection portion 57 for refrigerant flow that is located between the refrigerant outlet side of the coolant cooler 14 and the refrigerant suction side of the compressor 23. An expansion valve 58 and the evaporator 55 are connected between the branch portion 56 and the collection portion 57.

The expansion valve 58 is a decompression device for decompressing and expanding a liquid-phase refrigerant branched by the branch portion 56. The evaporator 55 is adapted to evaporate a low-pressure refrigerant so as to cool the blast air by exchanging heat between the blast air into the vehicle interior and the low-pressure refrigerant decompressed and expanded by the expansion valve 25.

An electromagnetic valve 59 (opening and closing valve) is connected between the branch portion 56 and the expansion valve 25. When the electromagnetic valve 59 is opened, the refrigerant discharged from the compressor 23 flows through the expansion valve 25 and the coolant cooler 14. When the electromagnetic valve 59 is closed, the flow of refrigerant toward the expansion valve 25 and the coolant cooler 14 is interrupted. The operation of the electromagnetic valve 59 is controlled by the controller 40.

The refrigeration cycle 22 includes a supercooler 60. The supercooler 60 is a heat exchanger (auxiliary heat exchanger) for further cooling the liquid-phase refrigerant to increase a supercooling degree of the refrigerant by exchanging heat between the coolant and the liquid-phase refrigerant condensed by the condenser 50.

The coolant inlet side of the supercooler 60 is connected to the outlet 19*e* of the first switching valve 19. The coolant outlet side of the supercooler 60 is connected to the coolant inlet side of the battery cooler 15.

In this embodiment, the battery cooler 15 and the battery are accommodated in an insulating container formed of thermal insulating material. Thus, cold energy stored in the battery can be prevented from escaping outward, thereby keeping the battery cold.

The first switching valve 19 is configured to be capable of switching between two types of communication states between the inlets 19*a* and 19*b* and the outlets 19*c*, 19*d*, 19*e*, and 19*f*. The second switching valve 20 is also configured to be capable of switching between two types of communication states between the inlets 20*a*, 20*b*, 20*c*, and 20*d* and the outlets 20*e*, and 20*f*.

Figure 25:
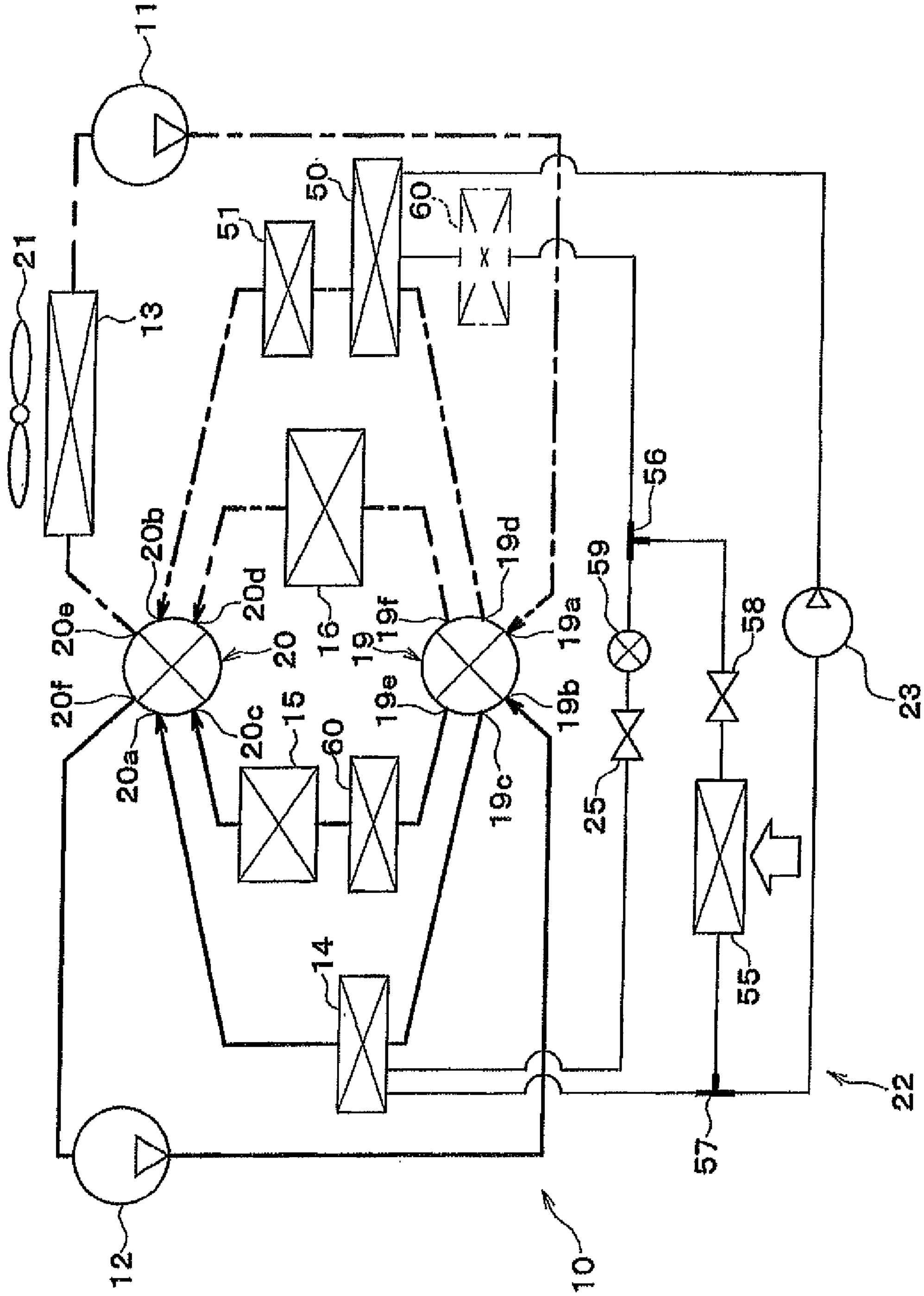
FIG. 25 is a diagram for explaining a first mode in the vehicle cooling system of FIG. 24.
Figure 26:
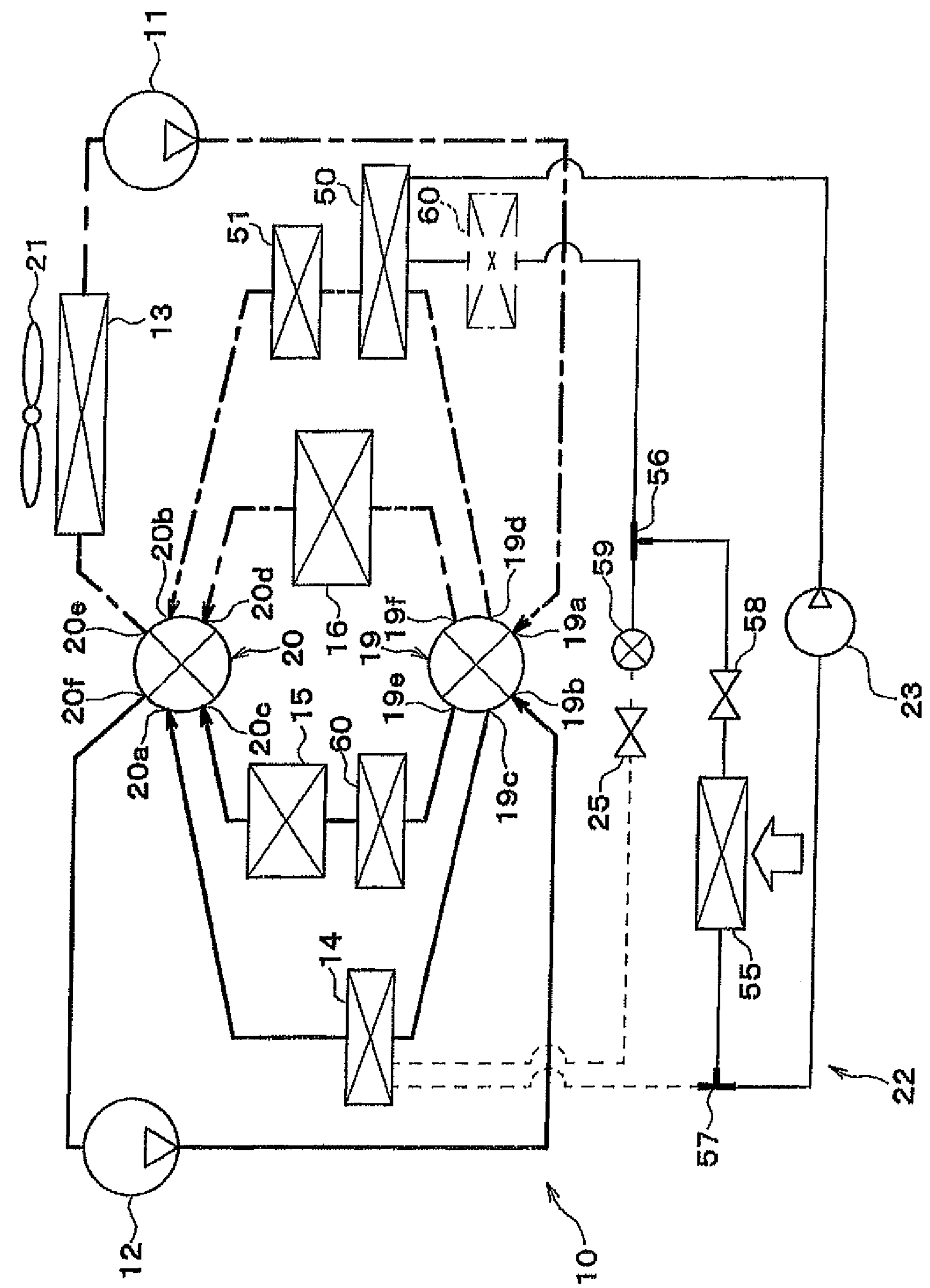
FIG. 26 is a diagram for explaining a second mode in the vehicle cooling system of FIG. 24.

FIG. 25 shows the operation (first mode) of the cooling system 10 when the first and second switching valves 19 and 20 are switched to a first state, and the electromagnetic valve 59 is switched to an opened state. FIG. 26 shows the operation (second mode) of the cooling system 10 when the first and second switching valves 19 and 20 are switched to the first state, and the electromagnetic valve 59 is switched to a closed state.

In the first and second states, the first switching valve 19 connects the inlet 19*a* with the outlets 19*d*, and 19*f*, and also connects the inlet 19*b* with the outlets 19*c* and 19*e*. Thus, the first switching valve 19 allows the coolant entering the inlet 19*a* to flow out of the outlets 19*d*, and 19*f* as indicated by alternate long and short dashed arrows in FIGS. 25 and 26, and also allows the coolant entering the inlet 19*b* to flow out of the outlets 19*c* and 19*e* as solid arrows in FIGS. 25 and 26.

In the first and second states, the second switching valve 20 connects the inlets 20*b* and 20*d* with the outlet 20*e* and also connects the inlets 20*a*, and 20*c* with the outlet 20*f*. Thus, the second switching valve 20 allows the coolant entering the inlets 20*b*, and 20*d* to flow out of the outlet 20*e* as indicated by alternate long and short dashed arrows in FIGS. 25 and 26, and also allows the coolant entering the inlets 20*a* and 20*c* to flow out of the outlet 20*f* as indicated by solid arrows in FIGS. 25 and 26.

Figure 27:
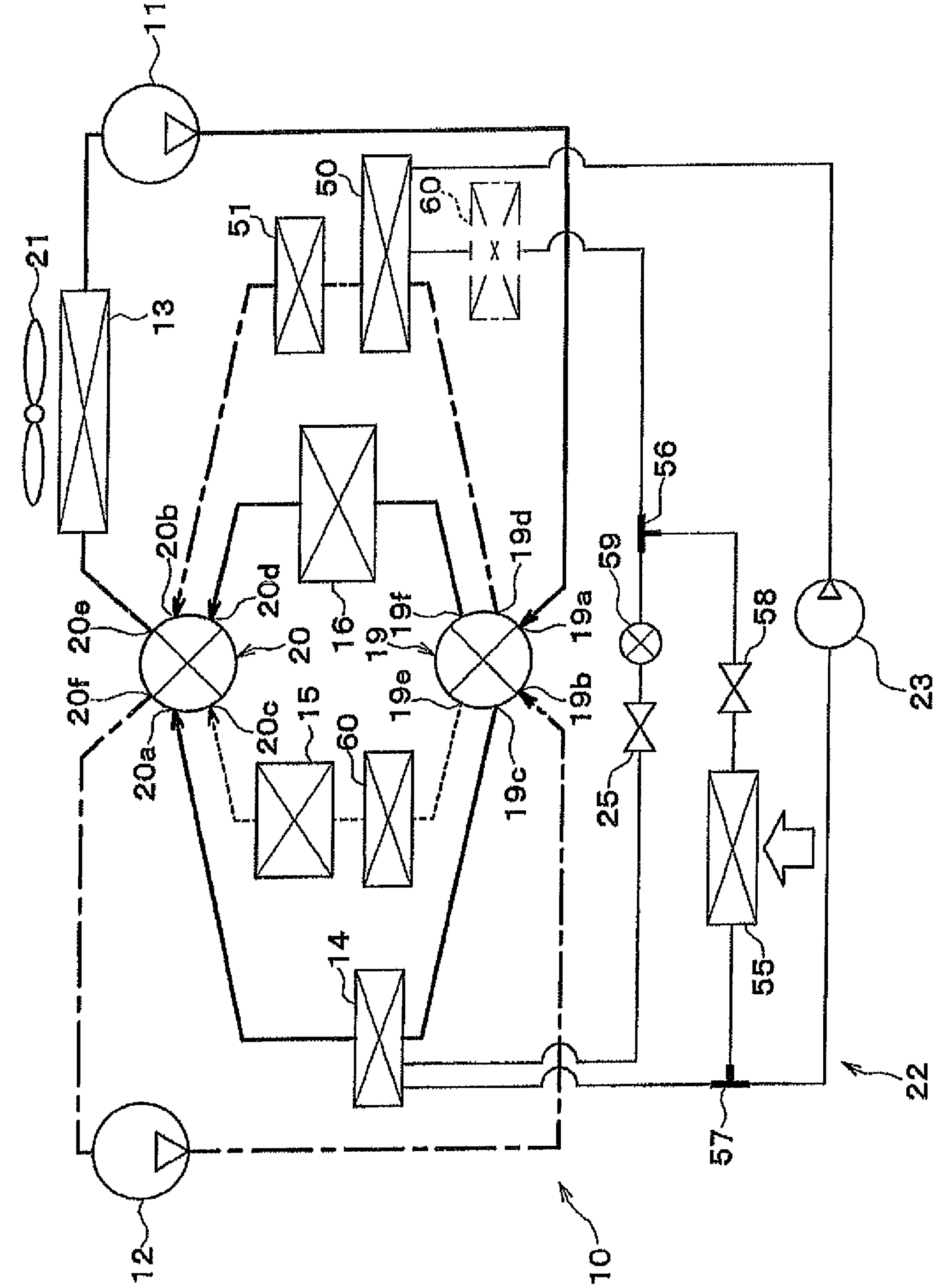
FIG. 27 is a diagram for explaining a third mode in the vehicle cooling system of FIG. 24.

FIG. 27 shows the operation (third mode) of the cooling system 10 when the first and second switching valves 19 and 20 are switched to the second state.

In the third state, the first switching valve 19 allows the inlet 19*a* to communicate with the outlets 19*c*, and 19*f*, and also allows the inlet 19*b* to communicate with the outlet 19*d*, thereby closing the outlet 19*e*. Thus, the first switching valve 19 allows the coolant flowing into the inlet 19*a* to flow from the outlets 19*c* and 19*f* as indicated by solid arrows in FIG. 27, and the coolant flowing into the inlet 19*b* to flow from the outlet 19*d* as indicated by an alternate long and short dashed arrow in FIG. 27, thereby preventing the coolant from flowing out of the outlet 19*e*.

In the third state, the second switching valve 20 connects the inlets 20*a* and 20*d* with the outlet 20*e* and also connects the inlet 20*b* with the outlet 20*f*, thereby closing the inlet 20*c*. Thus, the second switching valve 20 allows the coolant entering the inlets 20*a* and 20*d* to flow out of the outlet 20*e* as indicated by solid arrows in FIG. 27, and also allows the coolant entering the inlet 20*b* to flow out of the outlet 20*f* as indicated by an alternate long and short dashed arrow in FIG. 27, thereby preventing the coolant from flowing out of the inlet 20*c*.

The specific structures of the coolant cooler 14, the condenser 50, and the supercooler 60 in this embodiment will be described below with reference to FIG. 28.

The coolant cooler 14, the condenser 50, and the supercooler 60 are included in one heat exchanger 61 of the tank-and-tube type. Specifically, the supercooler (auxiliary heat exchanger) 60 is disposed between the coolant cooler 14 and the condenser 50.

The heat exchanger 61 includes a heat exchanger core (heat exchanging portion) 61*a*, tank portions 61*b* and 61*c*, and two partition portions 61*d* and 61*d*. The heat exchanger core 61*a* includes a plurality of tubes through which the coolant and the refrigerant independently flow. The tubes are stacked on each other in parallel.

The tank portions 61*b* and 61*c* are disposed on both sides of the tubes to distribute and collect the coolant and refrigerant with respect to the tubes. The internal spaces of the tank portions 61*b* and 61*c* are partitioned into a space for allowing the coolant to flow therethrough, and another space for allowing the refrigerant to flow therethrough by a partition member (not shown).

Figure 28:
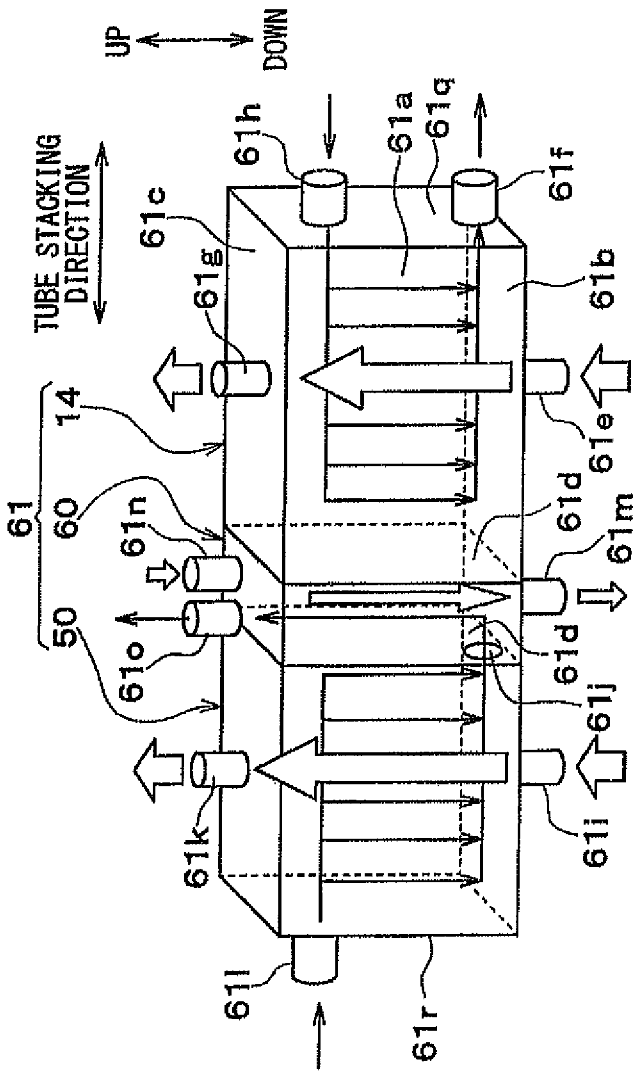
FIG. 28 is a perspective view showing a coolant cooler, a condenser, and a supercooler in a second embodiment.

The two partition portions 61*d* and 61*d* partition the insides of the tank portions 61*b* and 61*c* into three spaces in the tube stacking direction (in the left-right direction of FIG. 28). One side of the heat exchanger 61 (on the right side of FIG. 28) in the tube stacking direction with respect to the partition portion 61*d* constitutes the coolant cooler 14, whereas the other side of the heat exchanger 52 (on the left side of FIG. 28) in the tube stacking direction with respect to the partition portion 61*d* constitutes the condenser 50, whereby a gap between the partitions 61*d* and 61*d* serves as the supercooler 60.

Thus, one partition portion 61*d* forms a boundary (first boundary) between the coolant cooler 14 and the supercooler 60, and the other partition portion 61*d* forms another boundary (second boundary) between the supercooler 60 and the condenser 50.

A part of the heat exchanger core 61*a* of the heat exchanger 61 on one side in the tube stacking direction (on the right side of FIG. 28) with respect to the partition portion 61*d* constitutes a heat exchanging portion (second heat exchanging portion) of the coolant cooler 14. A part of the heat exchanger 61 on the other side in the tube stacking direction (on the left side of FIG. 28) with respect to the partition portion 61*d* constitutes a heat exchanging portion (first heat exchanging portion) of the condenser 50. A part of the heat exchanger between the partition portions 61*d* and 61*d* constitutes a further heat exchanging portion (auxiliary heat exchanging portion) of the supercooler 60.

Members constituting the heat exchanger core 61*a*, the tank portions 61*b* and 61*c*, and the partition portion 61*d* are formed of metal (for example, an aluminum alloy), and bonded together by brazing.

A part of one tank portion 61*b* serving as the coolant cooler 14 is provided with an inlet 61*e* for the coolant and an outlet 61*f* for the refrigerant. A part of the other tank portion 61*c* serving as the coolant cooler 14 is provided with an outlet 61*g* for the coolant and an inlet 61*h* for the refrigerant.

Thus, in the coolant cooler 14, the coolant flows from an inlet 61*e* into the tank portion 61*b*, and is then distributed to the tubes for the coolant by the tank portion 61*b*. The coolants after having passed through the tubes for the coolant are collected into the tank portion 61*c* to flow from the outlet 61*g*.

In the coolant cooler 14, the refrigerant flows from the inlet 61*h* into the tank portion 61*c*, and is then distributed to the tubes for the refrigerant by the tank portion 61*c*. The refrigerants after having passed through the tubes for the refrigerant are collected into the tank portion 61*b* to flow from the outlet 61*f*.

The inlet 61*e* for the coolant of the coolant cooler 14 is disposed between both ends 61*q* and 61*r* of the tank portion 61*b* in the tube stacking direction (both ends in the left-right direction of FIG. 28). The outlet 61*g* for the coolant of the coolant cooler 14 is disposed inside both ends of the tank portion 61*c* in the tube stacking direction (both ends in the left-right direction of FIG. 28). In the example shown in FIG. 28, the inlet 61*e* and outlet 61*g* for the coolant are disposed between one end 61*q* and the partition portion 61*d* (specifically, the partition portion 61*d* forming the boundary between the coolant cooler 14 and the supercooler 60) of the tank portions 61*b* and 61*c* in the tube stacking direction. Thus, the coolant cooler 14 does not allow the flow of coolant to make a U-turn.

The inlet 61*e* and outlet 61*g* are oriented in the direction perpendicular to the tube stacking direction. In the example shown in FIG. 28, the inlet 61*e* and outlet 61*g* are oriented in the direction parallel to the tubes for the refrigerant and for the coolant.

A part of one tank portion 61*b* serving as the condenser 50 is provided with an inlet 61*i* for the coolant. A hole 61*j* for allowing the refrigerant to flow therethrough is formed in a part of the partition portion 61*d* for partitioning the inner space of the tank portion 61*b* into a tank space for the condenser 50 and another tank space for the supercooler 60. A part of the other tank portion 61*c* serving as the condenser 50 is provided with an outlet 61*k* for the coolant and an inlet 611 for the refrigerant.

Thus, in the condenser 50, the coolant flows from the inlet 61*i* into the tank portion 61*b*, and is then distributed to the tubes for the coolant by the tank portion 61*b*. The coolants after having passed through the tubes for the coolant are collected into the tank portion 61*c* to flow from the outlet 61*k*.

In the condenser 50, the refrigerant flows from the inlet 611 into the tank portion 61*c*, and is then distributed to the tubes for the refrigerant by the tank portion 61*c*. The refrigerants after having passed through the tubes for the refrigerant are collected into the tank portion 61*b* to flow from the supercooler 60 via the hole 61*j* of the partition portion 61*d*.

The inlet 61*i* for the coolant of the condenser 50 is disposed between both the ends 61*q* and 61*r* of the tank portion 61*b* in the tube stacking direction (both ends in the left-right direction of FIG. 28). The outlet 61*k* for the coolant of the condenser 50 is disposed inside both the ends 61*q* and 61*r* of the tank portion 61*c* in the tube stacking direction. In the example shown in FIG. 28, the inlet 61*i* and outlet 61*k* for the coolant is disposed between the other end 61*r* and the partition portion 61*d* (partition portion 61*d* forming a boundary between the supercooler 60 and the condenser 50) of the tank portions 61*b* and 61*c* in the tube stacking direction. Thus, the condenser 50 does not allow the flow of coolant to make a U-turn.

The inlet 61*i* and outlet 61*k* are oriented in the direction perpendicular to the tube stacking direction. In the example shown in FIG. 28, the inlet 61*i* and outlet 61*k* are oriented in the direction parallel to the tubes for the refrigerant and for the coolant.

A part of one tank portion 61*b* serving as the supercooler 60 is provided with an outlet 61*m* for the coolant. A part of the other tank portion 61*c* serving as the supercooler 60 is provided with an inlet 61*n* for the coolant and an outlet 61*o* for the refrigerant.

Thus, in the condenser 60, the coolant flows from the inlet 61*n* into the tank portion 61*c*, and is then distributed to the tubes for the coolant by the tank portion 61*c*. The coolants after having passed through the tubes for the coolant are collected into the tank portion 61*b* to flow from the outlet 61*m*.

In the supercooler 60, the refrigerant flows into the tank portion 61*b* through the hole 61*j* of the partition portion 61*d*, and is then distributed to the tubes for the refrigerant by the tank portion 61*b*. The refrigerants after having passed through the tubes for the refrigerant are collected into the tank portion 61*c* to flow from the outlet 61*o*.

The inlet 61*n* and outlet 61*o* for the coolant of the supercooler 60 are disposed between both the ends 61*q* and 61*r* of the tank portion 61*b* in the tube stacking direction. The outlet 61*m* for the coolant of the supercooler 60 is disposed between both the ends 61*q* and 61*r* of the tank portion 61*c* in the tube stacking direction. In the example shown in FIG. 28, the inlet 61*n* and outlet 61*m* for the coolant and the outlet 61*o* for the refrigerant are disposed between two partition portions 61*d*. Thus, the coolant cooler 60 does not allow the flow of coolant to make a U-turn.

The inlet 61*n* and outlet 61*m* for the coolant are oriented in the direction perpendicular to the tube stacking direction. The inlet 61*n* and outlet 61*o* for the coolant are oriented in the direction parallel to the tubes for the refrigerant and for the coolant. The outlet 61*o* for the refrigerant is oriented in the direction perpendicular to the tube stacking direction. The outlet 61*o* for the refrigerant is oriented in the direction parallel to the tubes for the refrigerant and for the coolant.

Now, the operation of the above-mentioned structure will be described. When the battery is charged with an external power source, the controller 40 performs the first mode shown in FIG. 25.

In the first mode, the controller 40 controls the electric motor 30 for a switching valve such that the first and second switching valves 19 and 20 are brought into the first state shown in FIG. 25 to operate the first and second pumps 11 and 12 and the compressor 23, thereby switching the electromagnetic valve 59 to the opened state.

Thus, the first switching valve 19 connects the inlet 19*a* with the outlets 19*d* and 19*f*, and also connects the inlet 19*b* with the outlets 19*c* and 19*e*. The second switching valve 20 connects the inlets 20*b* and 20*d* with the outlet 20*e*, and also connects the inlets 20*a* and 20*c* with the outlet 20*f*.

Accordingly, the first coolant circuit (intermediate-temperature coolant circuit) is formed of the first pump 11, the inverter cooler 16, the condenser 50, the heater core 51, and the radiator 13, whereas the second coolant circuit (low-temperature coolant circuit) is formed of the second pump 12, the coolant cooler 14, the supercooler 60, and the battery cooler 15.

That is, as indicated by alternate long and short dashed arrows in FIG. 25, the coolant discharged from the first pump 11 is branched into the inverter cooler 16 and the condenser 50 by the first switching valve 19 to flow in parallel through the inverter cooler 16 and the condenser 50. The coolant flowing through the condenser 50 flows in series through the heater core 51. The coolants flowing through the heater core 51 and through the inverter cooler 16 are collected by the second switching valve 20 to flow through the radiator 13, thereby being sucked into the first pump 11.

On the other hand, as indicated by solid arrows in FIG. 25, the coolant discharged from the second pump 12 is branched into the coolant cooler 14 and the supercooler 60 by the first switching valve 19 to flow in parallel through the coolant cooler 14 and the supercooler 60. The coolant flowing through the supercooler 60 flows in series through the battery cooler 15. The coolants flowing through the battery cooler 15 and through the coolant 14 are collected by the second switching valve 20 to be sucked into the second pump 12.

In this way, in the first mode, the intermediate-temperature coolant cooled by the radiator 13 flows through the inverter cooler 16, the condenser 50, and the heater core 51, whereas the low-temperature coolant cooled by the coolant cooler 14 flows through the supercooler 60 and the battery cooler 15.

As a result, the inverter and the high-pressure refrigerant of the condenser 50 are cooled by the intermediate-temperature coolant, and the battery and the liquid-phase refrigerant of the supercooler 60 are cooled by the low-temperature coolant.

When the battery is charged with the external power source, the compressor 23 of the refrigeration cycle 22 is driven by power supplied from the external power source. Thus, in the first mode, the cold energy is stored in the battery using the power supplied from the external power source.

In the first mode, the evaporator 55 exchanges heat between the blast air into the vehicle interior and the low-pressure refrigerant of the refrigeration cycle 22 to thereby cool the blast air into the vehicle interior. In the first mode, the condenser 50 exchanges heat between the intermediate-temperature coolant and the high-pressure refrigerant of the refrigeration cycle 22 to thereby heat the intermediate-temperature coolant, whereas the heater core 51 exchanges heat between the blast air into the vehicle interior and the intermediate-temperature coolant to thereby heat the blast air into the vehicle interior.

Thus, the conditioned air at the desired temperature can be made to adjust the temperature of air in the vehicle interior. For example, when the battery is charged before a passenger rides on a vehicle, pre-air conditioning can be carried out to perform air conditioning of the vehicle interior before the passenger rides on.

When the battery is not charged with the external power source and the interior of the vehicle needs cooling, the controller 40 performs the second mode shown in FIG. 26.

In the second mode, the controller 40 controls the electric motor 30 for a switching valve such that the first and second switching valves 19 and 20 are brought into the first state shown in FIG. 26 to operate the first and second pumps 11 and 12 and the compressor 23, thereby switching the electromagnetic valve 59 to the closed state. That is, the second mode has the same states of the first and second switching valves 19 and 20 as those in the first mode, but differs from the first mode in that the electromagnetic valve 59 is closed.

Thus, the low-pressure refrigerant of the refrigeration cycle 22 does not flow through the coolant cooler 14, and as a result the coolant is not cooled by the coolant cooler 14. However, the coolant is cooled by the cold energy stored at the battery in the battery cooler 15 in the first mode.

Since the low-temperature coolant cooled by the battery cooler 15 flows through the supercooler 60, the liquid-phase refrigerant (high-pressure refrigerant) is cooled by the low-temperature coolant.

Thus, in the second mode, the cold energy stored in the battery can be used to supercool the high-pressure refrigerant of the refrigeration cycle 22, which can improve the efficiency of the refrigeration cycle 22, thereby achieving the energy saving.

Note that in the second mode, the low-temperature coolant may be cooled by the coolant cooler 14 with the electromagnetic valve 59 opened.

When the battery is at a predetermined temperature (for example, 40° C.) or less, and thus does not need cooling, and when the vehicle interior does not need to be heated, the controller 40 performs the third mode shown in FIG. 27.

In the third mode, the controller 40 controls the electric motor 30 for a switching valve such that the first and second switching valves 19 and 20 are brought into the second state shown in FIG. 27 to thereby operate the first and second pumps 11 and 12 and the compressor 23, thereby switching the electromagnetic valve 59 to the opened state.

Thus, the first switching valve 19 connects the inlet 19*a* with the outlets 19*c*, and 19*f*, and also connects the inlet 19*b* with the outlet 19*d*, thereby closing the outlet 19*e*. The second switching valve 20 connects the inlets 20*a* and 20*d* with the outlet 20*e*, and also connects the inlet 20*b* with the outlet 20*f*, thereby closing the inlet 20*c*.

Accordingly, a first coolant circuit (low-temperature coolant circuit) is formed of the first pump 11, the coolant cooler 14, the inverter cooler 16, and the radiator 13, whereas a second coolant circuit (intermediate-temperature coolant circuit) is formed of the second pump 12, the condenser 50, and the heater core 51.

That is, as indicated by solid arrows in FIG. 27, the coolant discharged from the first pump 11 is branched into the coolant cooler 14, and the inverter cooler 16 by the first switching valve 19 to flowing through the coolant cooler 14 and the inverter cooler 16 in parallel. The coolants flowing through the coolant cooler 14, and through the inverter cooler 16 are collected by the second switching valve 20 to flow through the radiator 13, thereby being sucked into the first pump 11.

On the other hand, as indicated by an alternate long and short dashed arrow in FIG. 27, the coolant discharged from the second pump 12 flows through the condenser 50 and the heater core 51 in series via the first switching valve 19, and is then sucked into the second pump 12 via the second switching valve 20.

Thus, in the third mode, the low-temperature coolant cooled by the coolant cooler 14 flows through the inverter cooler 16, which can cool the inverter by the low-temperature coolant.

In this case, the battery is at a predetermined temperature (for example, 40° C.) or less, and thus does not need to be cooled, so that the circulation of the coolant to the battery cooler 15 is stopped.

In the third mode, the low-temperature coolant cooled by the coolant cooler 14 flows through the radiator 13, allowing the coolant to absorb heat from the outside air in the radiator 13. Then, the coolant that has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the evaporator 55 in flowing through the heater core 51, thereby dissipating heat therefrom. Thus, the heater core 51 heats the blast air after having passed through the evaporator 55. Accordingly, the fourth mode can achieve heat pump heating that heats the vehicle interior by absorbing heat from the outside air.

The blast air heated by the heater core 51 is a dried cool air cooled and dehumidified by the low-pressure refrigerant of the refrigeration cycle 22 in the evaporator 55. Thus, in the third mode, the dehumidification heating can be performed.

Alternatively, when the temperature of the battery increases in the third mode, the intermediate-temperature coolant or low-temperature coolant may circulate into the battery cooler 15, thereby cooling the battery.

In this embodiment, when the battery is charged with the electric power supplied from the external power source, the electromagnetic valve 59 is opened to allow the low-pressure refrigerant of the refrigeration cycle to flow into the coolant cooler 14, so that the coolant cooled by the coolant cooler 14 flows through the battery cooler 15 to thereby cool the battery. Thus, the cold energy made by the refrigeration cycle 22 can be stored in the battery.

After the battery is charged with the electric power supplied from the external power source, the coolant flowing through the battery cooler 15 flows through the supercooler 60, so that the refrigerant flowing through the supercooler 60 can be cooled by the cold energy stored in the battery, further improving the efficiency of the refrigeration cycle 22. At this time, the electromagnetic valve 59 is closed to prevent the low-pressure refrigerant of the refrigeration cycle from flowing into the coolant cooler 14, thereby decreasing a cooling load on the refrigeration cycle 22.

Thus, for example, when the external power source cannot be used during traveling of the vehicle, the cold energy stored in the battery can be used for cooling the devices to be cooled, thereby decreasing the power consumption.

In this embodiment, the supercooler 60 and the battery cooler 15 are connected together in series, which can effectively cool the coolant heated through the supercooler 60 with the cold energy stored in the battery cooler 15 as compared to the case in which the supercooler 60 and the battery cooler 15 are connected together in parallel.

In this embodiment, the coolant cooler 14, the condenser 50, and the supercooler 60 are integrated into one heat exchanger 52, which can significantly improve the productivity as compared to the case where the coolant cooler 14, the condenser 50, and the supercooler 60 are formed of different heat exchangers.

Further, in this embodiment, the inlet 61*e* and outlet 61*g* for the coolant of the coolant cooler 14 are disposed inside both the ends 61*q* and 61*r* of the tank portions 61*b* and 61*c* in the tube stacking direction, which can increase the flexibility in connection of the pipes and arrangement of the heat exchangers as compared to the case where the inlet 61*e* and outlet 61*g* for the coolant are disposed at both ends 61*q* and 61*r* of the tank portions 61*b* and 61*c* in the tube stacking direction. The coolant cooler 14 does not allow the flow of coolant to make a U-turn, and thus can reduce the loss of pressure of the coolant in the coolant cooler 14.

Likewise, the inlet 61*i* and outlet 61*k* for the coolant of the condenser 50 are disposed inside both the ends 61*q* and 61*r* of the tank portions 61*b* and 61*c* in the tube stacking direction, which can increase the flexibility in connection of the pipes and arrangement of the heat exchangers as compared to the case where the inlet 61*i* and outlet 61*k* for the coolant are disposed at both the ends 61*q* and 61*r* of the tank portions 61*b* and 61*c* in the tube stacking direction. The condenser 50 does not allow the flow of coolant to make a U-turn, and thus can reduce the loss of pressure of the coolant in the condenser 50.

Likewise, the inlet 61*n* and outlet 61*m* for the coolant and the outlet 61*o* for the refrigerant of the supercooler 60 are disposed inside both the ends 61*q* and 61*r* of the tank portions 61*b* and 61*c* in the tube stacking direction, which can increase the flexibility in connection of the pipes and arrangement of the heat exchangers as compared to the case where the inlet 61*i* and outlet 61*k* for the coolant and the outlet 61*o* for the refrigerant are disposed at both the ends 61*q* and 61*r* of the tank portions 61*b* and 61*c* in the tube stacking direction. The condenser 50 does not allow the flow of coolant and the flow of refrigerant to make the U-turn, and thus can reduce the loss of pressure of the coolant in the condenser 50.

Third Embodiment

Figure 29:
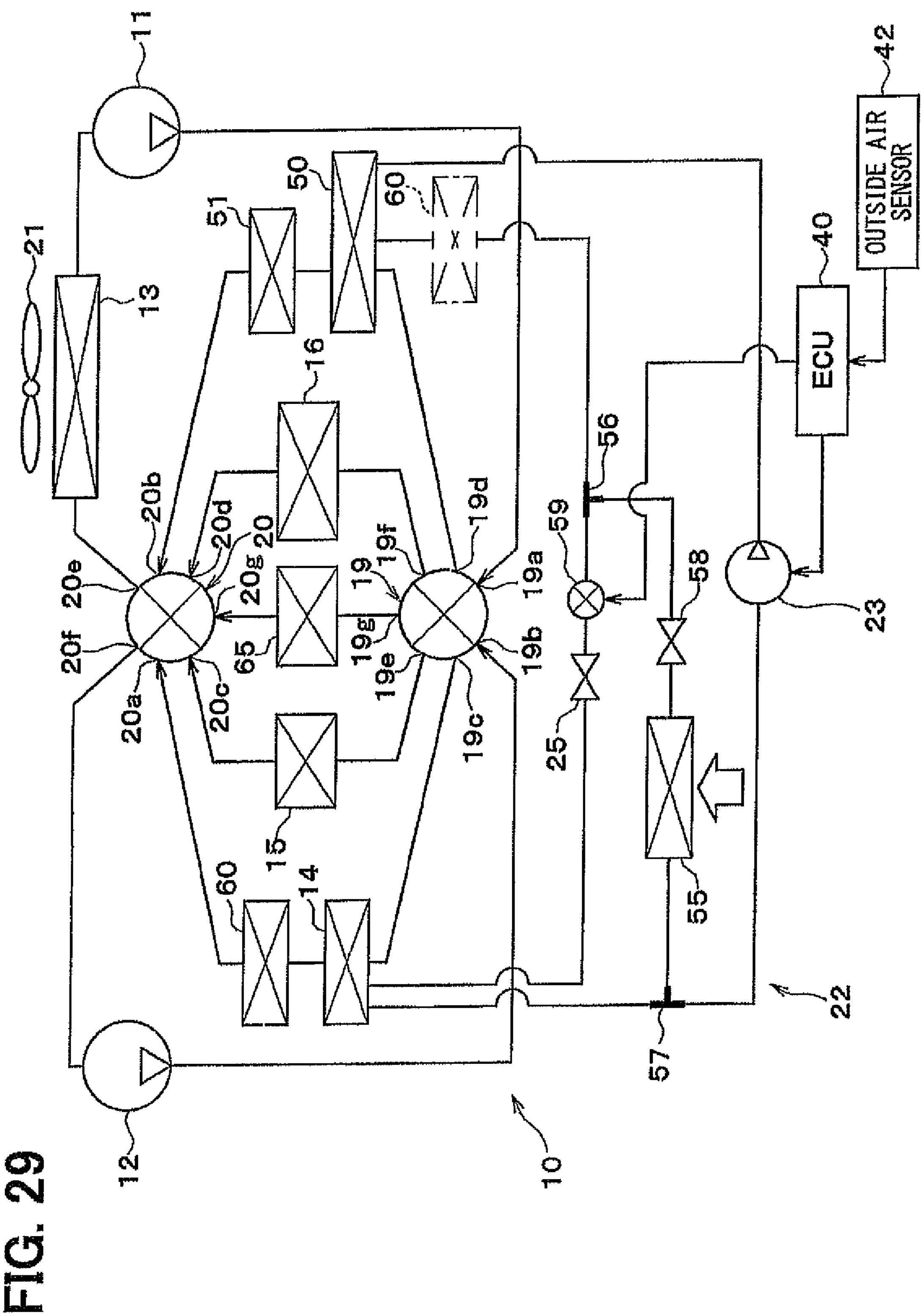
FIG. 29 is an entire configuration diagram of a vehicle cooling system according to a third embodiment of the invention.

In a third embodiment of the invention, as shown in FIG. 29, an intake air cooler 65 (device to be cooled) is added to the structure of the above second embodiment. The intake air cooler 65 is a heat exchanger that cools intake air by exchanging heat between the coolant and the intake air at a high temperature compressed by a supercharger for an engine. The intake air is preferably cooled down to about 30° C.

The coolant inlet side of the intake air cooler 65 is connected to the outlet 19*g* of the first switching valve 19. The coolant outlet side of the intake air cooler 65 is connected to the inlet 20*g* of the second switching valve 20.

In this embodiment, the supercooler 60 is connected to between the coolant outlet side of the coolant cooler 14 and the inlet 20*a* of the second switching valve 20.

The first switching valve 19 is configured to be capable of switching among three types of communication states between the inlets 19*a* and 19*b* and the outlets 19*c*, 19*d*, 19*e*, 19*f*, and 19*g*. The second switching valve 20 is also configured to be capable of switching among three types of communication states between the inlets 20*a*, 20*b*, 20*c*, 20*d*, and 20*g* and the outlets 20*e*, and 20*f*.

Figure 30:
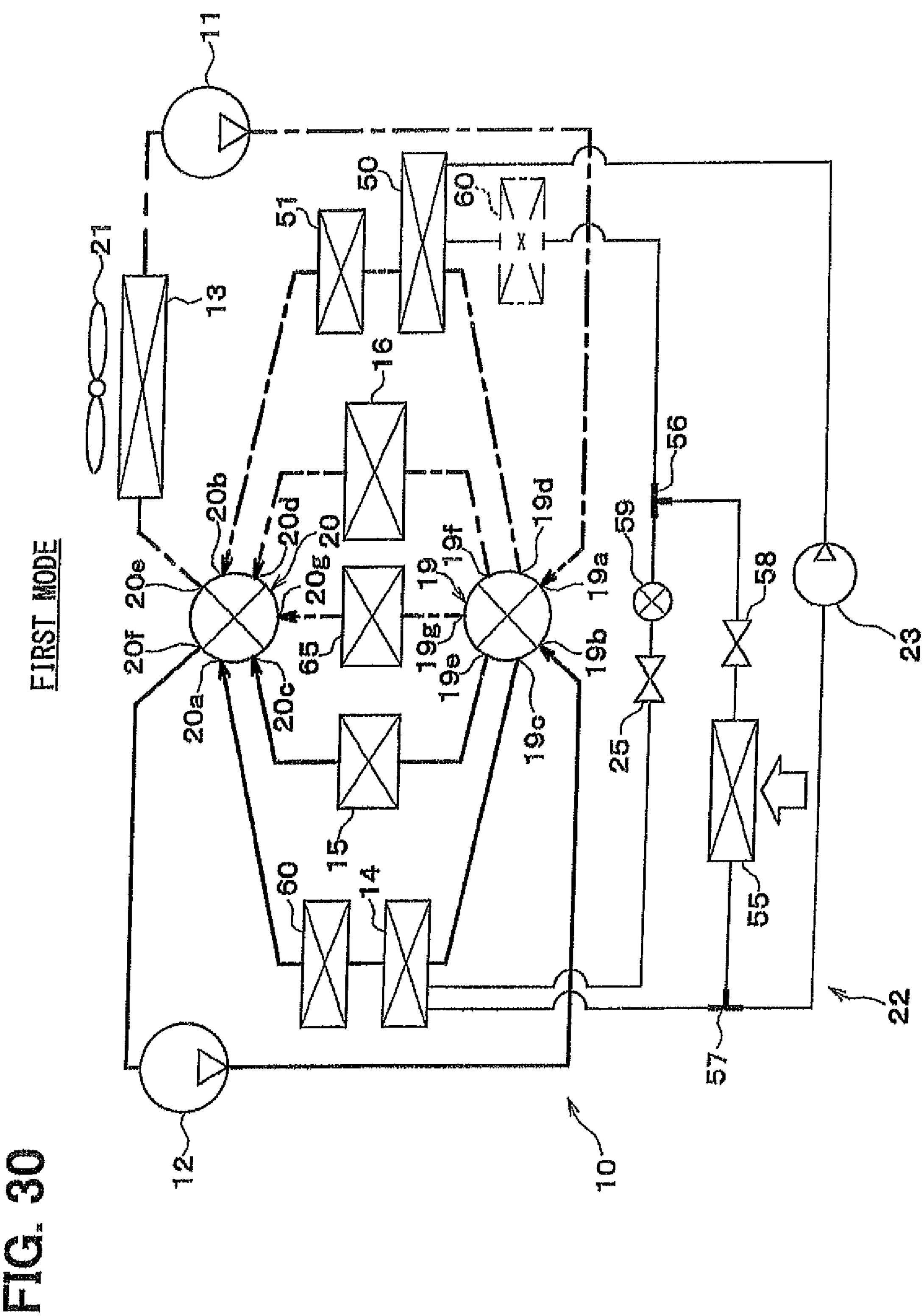
FIG. 30 is a diagram for explaining a first mode in the vehicle cooling system of FIG. 29.

FIG. 30 shows the operation (first mode) of the cooling system 10 when the first and second switching valves 19 and 20 are switched to a first state.

In the first state, the first switching valve 19 connects the inlet 19*a* with the outlets 19*d*, 19*f*, and 19*g*, and also connects the inlet 19*b* with the outlets 19*c* and 19*e*. Thus, the first switching valve 19 allows the coolant entering the inlet 19*a* to flow out of the outlets 19*d*, 19*f*, and 19*g* as indicated by alternate long and short dashed arrows in FIG. 30, and also allows the coolant entering the inlet 19*b* to flow out of the outlets 19*c* and 19*e* as solid arrows in FIG. 30.

In the first state, the second switching valve 20 connects the inlets 20*b*, 20*d*, and 20*g* with the outlet 20*e*, and also connects the inlets 20*a*, and 20*c* with the outlet 20*f*. Thus, the second switching valve 20 allows the coolant entering the inlets 20*b*, 20*d*, and 20*g* to flow out of the outlet 20*e* as indicated by alternate long and short dashed arrows in FIG. 30, and also allows the coolant entering the inlets 20*a* and 20*c* to flow out of the outlet 20*f* as solid arrow in FIG. 30.

Figure 31:
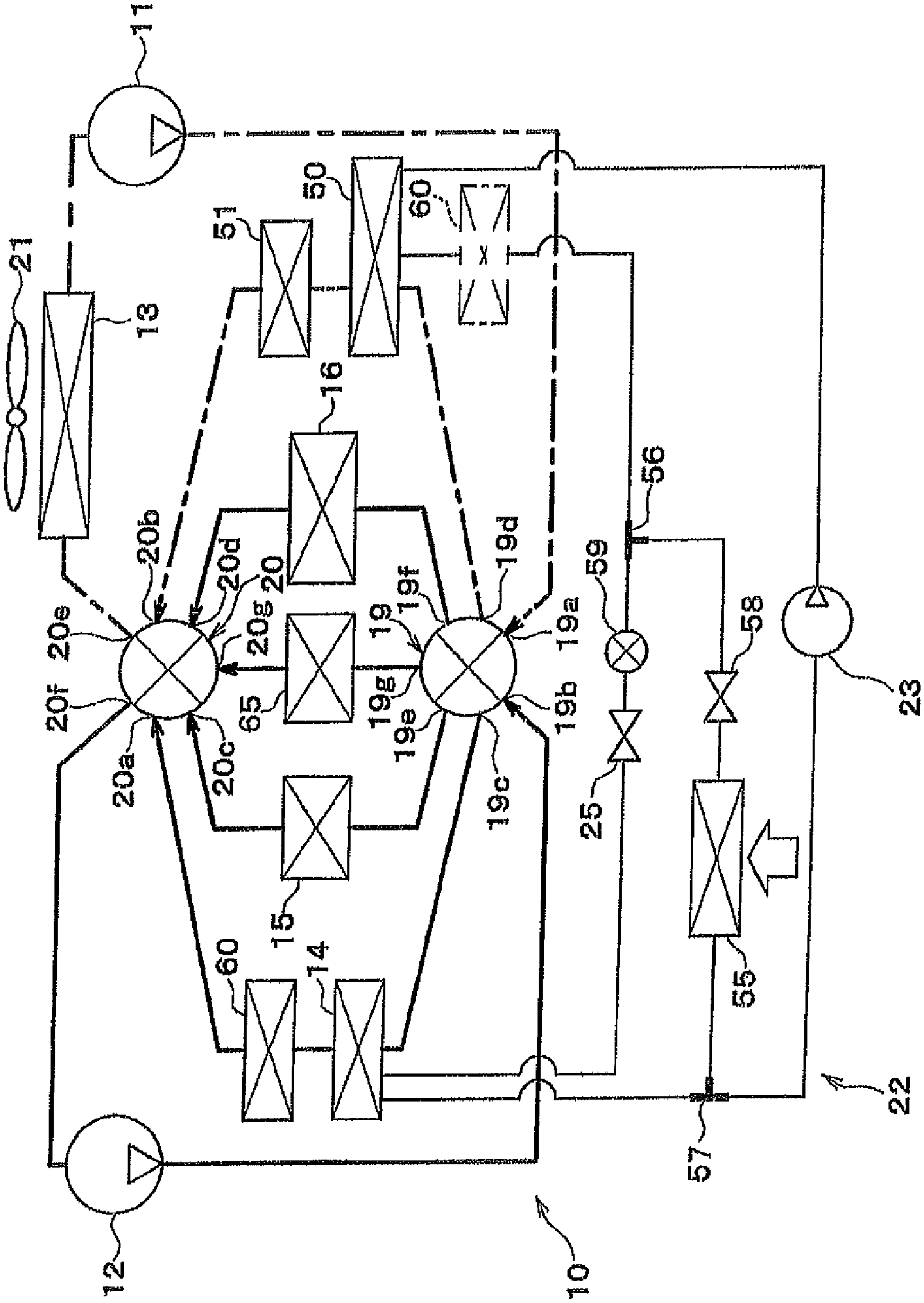
FIG. 31 is a diagram for explaining a second mode in the vehicle cooling system of FIG. 29.

FIG. 31 shows the operation (second mode) of the cooling system 10 when the first and second switching valves 19 and 20 are switched to a second state.

In the second state, the first switching valve 19 connects the inlet 19*a* with the outlet 19*d*, and also connects the inlet 19*b* with the outlets 19*c*, 19*e*, 19*f*, and 19*g*. Thus, the first switching valve 19 allows the coolant entering the inlet 19*a* to flow out of the outlet 19*d* as indicated by an alternate long and short dashed arrow in FIG. 31, and also allows the coolant entering the inlet 19*b* to flow out of the outlets 19*c*, 19*e*, 19*f*, and 19*g* as solid arrows in FIG. 31.

In the second state, the second switching valve 20 connects the inlet 20*b* with the outlet 20*e* and also connects the inlets 20*a*, 20*c*, 20*d*, and 20*g* with the outlet 20*f*. Thus, the second switching valve 20 allows the coolant entering the inlet 20*b* to flow out of the outlet 20*e* as indicated by an alternate long and short dashed arrow in FIG. 31, and the coolant entering the inlets 20*a*, 20*c*, 20*d*, and 20*g* to flow out of the outlet 20*f* as a solid arrow in FIG. 31.

Figure 32:
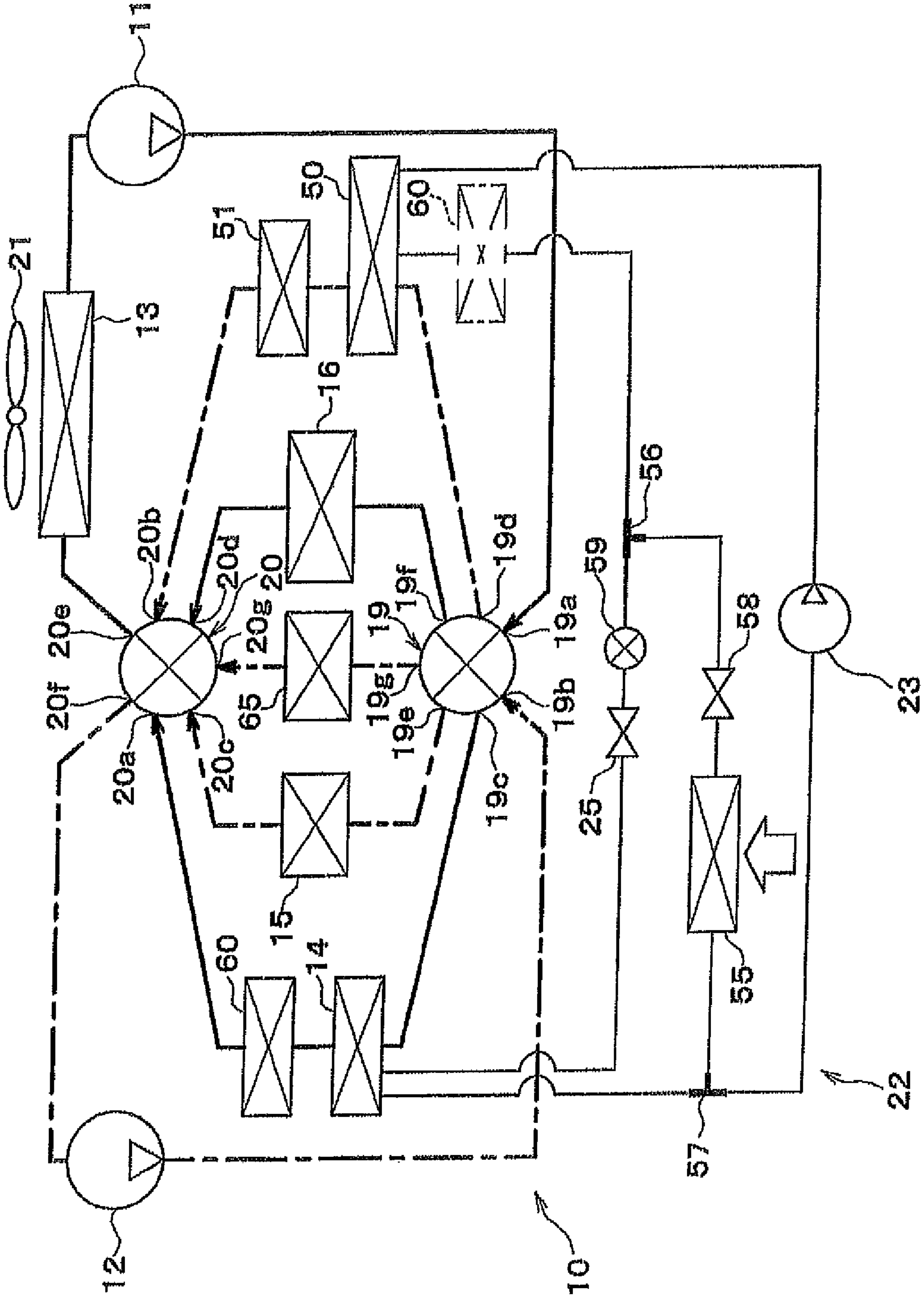
FIG. 32 is a diagram for explaining a third mode in the vehicle cooling system of FIG. 29.

FIG. 32 shows the operation (third mode) of the cooling system 10 when the first and second switching valves 19 and 20 are switched to a third state.

In the third state, the first switching valve 19 connects the inlet 19*a* with the outlets 19*c* and 19*f*, and also connects the inlet 19*b* with the outlets 19*d*, 19*e*, and 19*g*. Thus, the first switching valve 19 allows the coolant entering the inlet 19*a* to flow out of the outlets 19*c*, and 19*f* as indicated by solid arrows in FIG. 32, and also allows the coolant entering the inlet 19*b* to flow out of the outlets 19*d*, 19*e*, and 19*g* as indicated by alternate long and short dashed arrows in FIG. 32.

In the third state, the second switching valve 20 connects the inlets 20*a*, and 20*d* with the outlet 20*e*, and also connects the inlets 20*b*, 20*c*, and 20*g* with the outlet 20*f*. Thus, the second switching valve 20 allows the coolant entering the inlets 20*a* and 20*d* to flow out of the outlet 20*e* as indicated by solid arrows in FIG. 32, and also allows the coolant entering the inlets 20*b*, 20*c*, and 20*g* to flow out of the outlet 20*f* as the alternate long and short dashed arrow in FIG. 32.

Now, the operation of the above-mentioned structure will be described. When the outside air temperature detected by the outside air sensor 42 is more than 15° C. and less than 40° C., the controller 40 performs the first mode shown in FIG. 30.

In the first mode, the controller 40 controls the electric motor 30 for a switching valve such that the first and second switching valves 19 and 20 are brought into the first state shown in FIG. 30 to thereby operate the first and second pumps 11 and 12 and the compressor 23, thereby switching the electromagnetic valve 59 to the opened state.

Thus, the first switching valve 19 connects the inlet 19*a* with the outlets 19*d*, 19*f*, and 19*g*, and also connects the inlet 19*b* with the outlets 19*c* and 19*e*. The second switching valve 20 connects the inlets 20*b*, 20*d*, and 20*g* with the outlet 20*e*, and also connects the inlets 20*a* and 20*c* with the outlet 20*f*.

Accordingly, the first coolant circuit (intermediate-temperature coolant circuit) is formed of the first pump 11, the inverter cooler 16, the condenser 50, the heater core 51, the intake air cooler 65, and the radiator 13, whereas the second coolant circuit (low-temperature coolant circuit) is formed of the second pump 12, the coolant cooler 14, the supercooler 60, and the battery cooler 15.

That is, as indicated by alternate long and short dashed arrows in FIG. 30, the coolant discharged from the first pump 11 is branched into the inverter cooler 16, the condenser 50, and the intake air cooler 65 by the first switching valve 19 to flow in parallel through the inverter cooler 16, the condenser 50, and the intake air cooler 65. The coolant flowing through the condenser 50 flows in series through the heater core 51. The coolants flowing through the heater core 51, through the inverter cooler 16, and through the intake air cooler 65 are collected by the second switching valve 20 to flow through the radiator 13, thereby being sucked into the first pump 11.

On the other hand, as indicated by solid arrows of FIG. 30, the coolant discharged from the second pump 12 is branched into the coolant cooler 14 and the battery cooler 15 by the first switching valve 19 to flow in parallel through the coolant cooler 14 and the battery cooler 15. The coolant flowing through the coolant cooler 14 flows in series through the supercooler 60. The coolants flowing through the supercooler 60 and through the battery cooler 15 are collected by the second switching valve 20 to be sucked into the second pump 12.

In this way, in the first mode, the intermediate-temperature coolant cooled by the radiator 13 flows through the inverter cooler 16, the condenser 50, the heater core 51, and the intake air cooler 65, whereas the low-temperature coolant cooled by the coolant cooler 14 flows through the supercooler 60 and the battery cooler 15.

As a result, the inverter, the intake air, and the high-pressure refrigerant of the condenser 50 are cooled by the intermediate-temperature coolant, and the liquid-phase refrigerant of the supercooler 60 and the battery are cooled by the low-temperature coolant.

In the first mode, the evaporator 55 exchanges heat between the blast air into the vehicle interior and the low-pressure refrigerant of the refrigeration cycle 22 to thereby cool the blast air into the vehicle interior. In the first mode, the condenser 50 exchanges heat between the intermediate-temperature coolant and the high-pressure refrigerant of the refrigeration cycle 22 to thereby heat the intermediate-temperature coolant, whereas the heater core 51 exchanges heat between the blast air into the vehicle interior and the intermediate-temperature coolant to thereby heat the blast air into the vehicle interior. Thus, the conditioned air at the desired temperature can be made to adjust the temperature of air in the vehicle interior.

When the outside air temperature detected by the outside air sensor 42 is 40° C. or higher, the controller 40 performs the second mode shown in FIG. 31.

In the second mode, the controller 40 controls the electric motor 30 for a switching valve such that the first and second switching valves 19 and 20 are brought into the second state shown in FIG. 31 to thereby operate the first and second pumps 11 and 12 and the compressor 23, thereby switching the electromagnetic valve 59 to the opened state.

Thus, the first switching valve 19 connects the inlet 19*a* with the outlet 19*d* and also connects the inlet 19*b* with the outlets 19*c*, 19*e*, 19*f*, and 19*g*. The second switching valve 20 connects the inlet 20*b* with the outlet 20*e*, and also connects the inlets 20*a*, 20*c*, 20*d*, and 20*g* with the outlet 20*f*.

Accordingly, the first coolant circuit (intermediate-temperature coolant circuit) is formed of the first pump 11, the condenser 50, the heater core 51, and the radiator 13, whereas the second coolant circuit (low-temperature coolant circuit) is formed of the second pump 12, the coolant cooler 14, the supercooler 60, the battery cooler 15, and the inverter cooler 16.

That is, as indicated by an alternate long and short dashed arrow of FIG. 31, the coolant discharged from the first pump 11 flows through the condenser 50 and the heater core 51 in series via the first switching valve 19, and is then sucked into the first pump 11 via the second switching valve 20.

On the other hand, as indicated by solid arrows in FIG. 31, the coolant discharged from the second pump 12 is branched into the coolant cooler 14, the battery cooler 15, the inverter cooler 16, and the intake air cooler 65 by the first switching valve 19. The coolant flowing through the coolant cooler 14 flows in series through the supercooler 60. The coolants flowing through the cooler core 60, through the battery cooler 15, through the inverter cooler 16, and through the intake air cooler 65 are collected by the second switching valve 20 to be sucked into the second pump 12.

In this way, in the second mode, the intermediate-temperature coolant cooled by the radiator 13 flows through the condenser 50, and the heater core 51, whereas the low-temperature coolant cooled by the coolant cooler 14 flows through the supercooler 60, the battery cooler 15, the inverter cooler 16, and the intake air cooler 65.

As a result, the high-pressure refrigerant of the condenser 50 is cooled by the intermediate-temperature coolant, and the liquid-phase refrigerant of the supercooler 60, the battery, the inverter, and the intake air are cooled by the low-temperature coolant.

In the second mode, the evaporator 55 exchanges heat between the blast air into the vehicle interior and the low-pressure refrigerant of the refrigeration cycle 22 to thereby cool the blast air into the vehicle interior. In the second mode, the condenser 50 exchanges heat between the high-pressure refrigerant of the refrigeration cycle 22 and the intermediate-temperature coolant to thereby heat the intermediate-temperature coolant, whereas the heater core 51 exchanges heat between the intermediate-temperature coolant and the blast air into the vehicle interior to thereby heat the blast air into the vehicle interior. Thus, the conditioned air at the desired temperature can be made to adjust the temperature of air in the vehicle interior.

Even in performing the first mode, under sudden acceleration, such as upon startup, the low-temperature coolant is allowed to flow through the intake air cooler 65, thereby cooling the intake air with the low-temperature coolant in the same way as the second mode. Thus, even though the intake air temperature is increased due to an increase in supercharging pressure at the time of sudden acceleration, the intake air can be sufficiently cooled to improve the fuel efficiency.

When the outside air temperature detected by the outside air sensor 42 is 0° C. or lower, the controller 40 performs the third mode shown in FIG. 32.

In the third mode, the controller 40 controls the electric motor 30 for a switching valve such that the first and second switching valves 19 and 20 are brought into the third state shown in FIG. 32 to thereby operate the first and second pumps 11 and 12 and the compressor 23, thereby switching the electromagnetic valve 59 to the opened state.

Thus, the first switching valve 19 connects the inlet 19*a* with the outlets 19*c* and 19*f* and also connects the inlet 19*b* with the outlets 19*d*, 19*e*, and 19*g*. The second switching valve 20 connects the inlets 20*a* and 20*d* with the outlet 20*e*, and also connects the inlets 20*b*, 20*c*, and 20*g* with the outlet 20*f*.

Accordingly, the first coolant circuit (low-temperature coolant circuit) is formed of the first pump 11, the coolant cooler 14, the supercooler 60, the inverter cooler 16, and the radiator 13, whereas the second coolant circuit (intermediate-temperature coolant circuit) is formed of the second pump 12, the battery cooler 15, the condenser 50, the heater core 51, and the intake cooler 65.

That is, as indicated by solid arrows of FIG. 32, the coolant discharged from the first pump 11 is branched into the coolant cooler 14, and the inverter cooler 16 by the first switching valve 19. The coolant flowing through the coolant cooler 14 flows in series through the supercooler 60. The coolants flowing through the supercooler 60 and through the inverter cooler 16 are collected by the second switching valve 20 to thereby be sucked into the first pump 11.

On the other hand, as indicated by alternate long and short dashed arrows of FIG. 32, the coolant discharged from the second pump 12 is branched into the battery cooler 15, the condenser 50, and the intake air cooler 65 by the first switching valve 19. The coolant flowing through the condenser 50 flows in series through the heater core 51. The coolants flowing through the cooler core 51, through the battery cooler 15, and through the intake air cooler 65 are collected by the second switching valve 20 to be sucked into the second pump 12.

In the third mode, the low-temperature coolant cooled by the coolant cooler 14 flows through the inverter cooler 16, which can cool the inverter by the low-temperature coolant.

In the third mode, the low-temperature coolant cooled by the coolant cooler 14 flows through the radiator 13, allowing the coolant to absorb heat from the outside air in the radiator 13. Then, the coolant that has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the evaporator 55 in flowing through the heater core 51, thereby dissipating heat therefrom. Thus, the heater core 51 heats the blast air after having passed through the evaporator 55. Accordingly, the fourth mode can achieve heat pump heating that heats the vehicle interior by absorbing heat from the outside air.

The blast air heated by the heater core 51 is a dried cool air cooled and dehumidified by the evaporator 55. Thus, in the third mode, the dehumidification heating can be performed.

In the third mode, the intermediate-temperature coolant heated by the condenser 50 flows through the battery cooler 15 and the intake air cooler 65. Thus, the third mode can improve the output of the battery by heating the battery, and promoting the atomization of the fuel by heating the intake air, further improving the fuel efficiency. In particular, at the cold start when fuel is difficult to atomize due to the cold engine, the promotion of the atomization of the fuel can improve the combustion efficiency.

Fourth Embodiment

Figure 33:
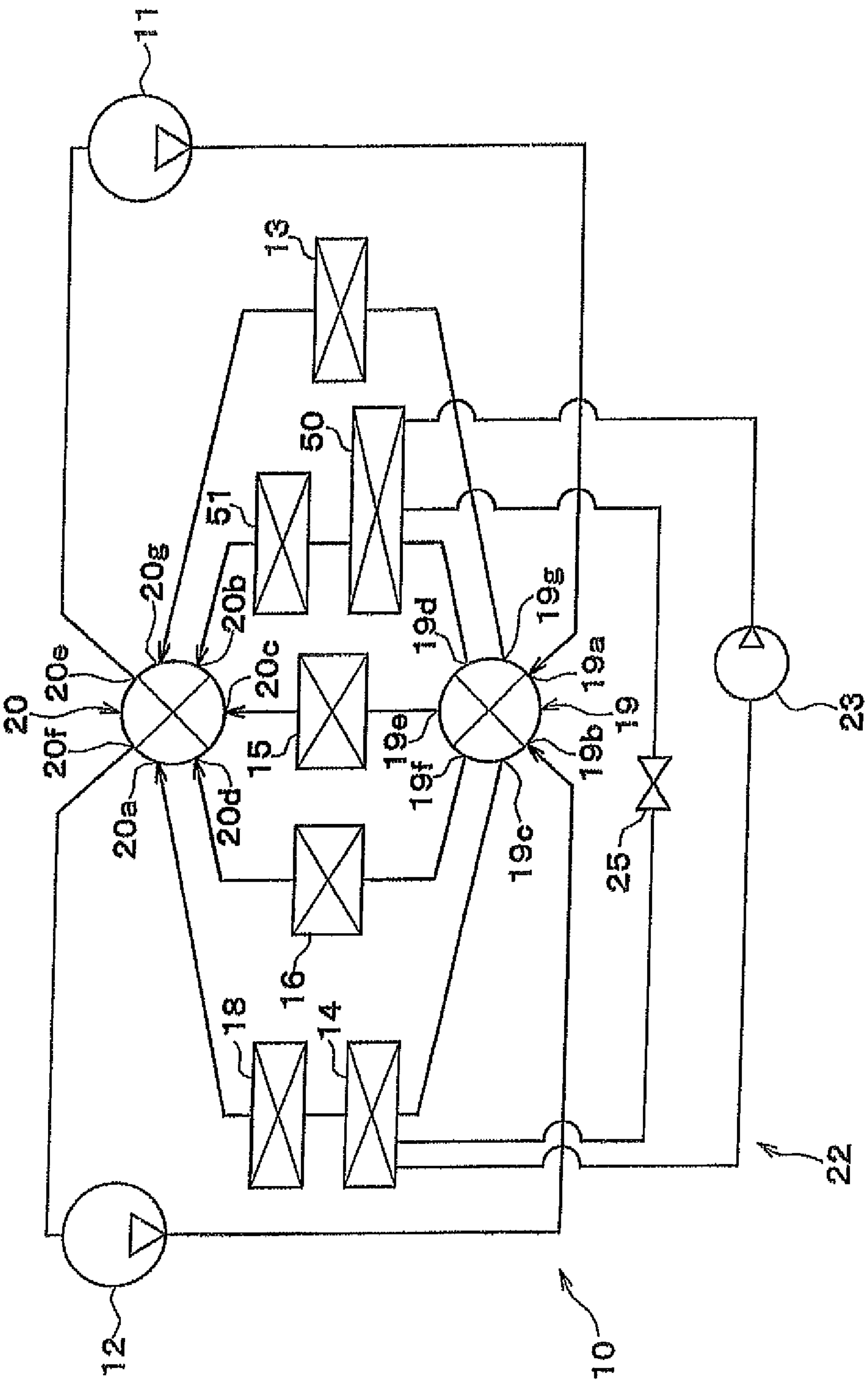
FIG. 33 is an entire configuration diagram of a vehicle cooling system according to a fourth embodiment of the invention.

Although in the first embodiment, the radiator 13 is connected between the outlet 20*e* of the second switching valve 20 and the suction side of the first pump 11, in a fourth embodiment, as shown in FIG. 33, the radiator 13 is connected between the outlet 19*g* of the first switching valve 19 and the inlet 20*g* of the second switching valve 20.

The coolant inlet side of the radiator 13 is connected to the outlet 19*g* of the first switching valve 19. The coolant outlet side of the radiator 13 is connected to the inlet 20*g* of the second switching valve 20.

The first switching valve 19 is configured to be capable of switching among two types of communication states between the inlets 19*a* and 19*b* and the outlets 19*c*, 19*d*, 19*e*, 19*f*, and 19*g*. The second switching valve 20 is also configured to be capable of switching among two types of communication states between the inlets 20*a*, 20*b*, 20*c*, 20*d*, and 20*g* and the outlets 20*e*, and 20*f*.

Figure 34:
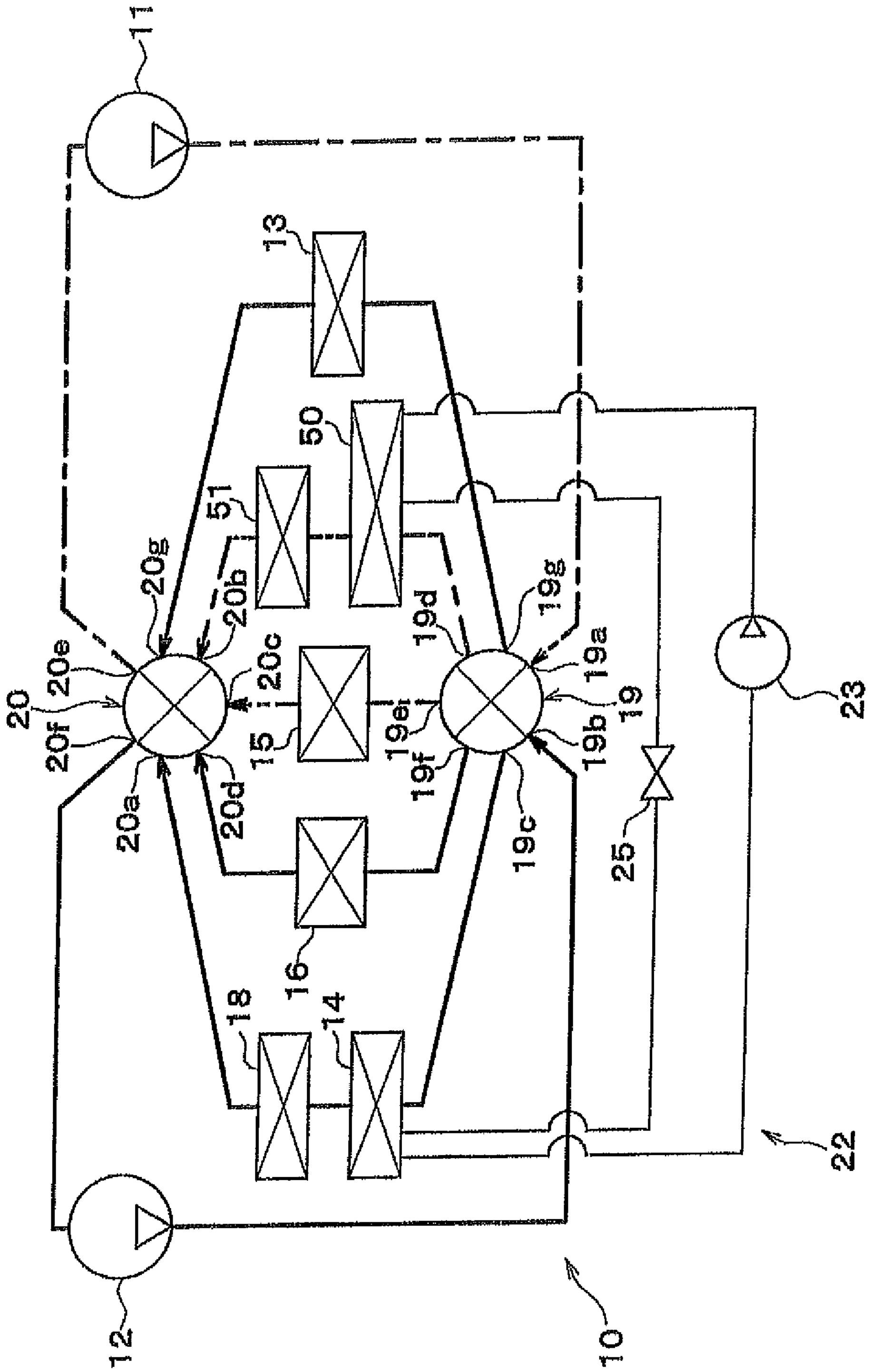
FIG. 34 is a diagram for explaining a first mode in the vehicle cooling system of FIG. 33.

FIG. 34 shows the operation (first mode) of the cooling system 10 when the first and second switching valves 19 and 20 are switched to a first state.

In the first state, the first switching valve 19 connects the inlet 19*a* with the outlets 19*d* and 19*e*, and also connects the inlet 19*b* with the outlets 19*c*, 19*f*, and 19*g*. Thus, the first switching valve 19 allows the coolant entering the inlet 19*a* to flow out of the outlets 19*d* and 19*e* as indicated by an alternate long and short dashed arrow in FIG. 34, and also allows the coolant entering the inlet 19*b* to flow out of the outlets 19*c*, 19*f*, and 19*g* as solid arrows in FIG. 34.

In the first state, the second switching valve 20 connects the inlets 20*b*, and 20*c* with the outlet 20*e* and also connects the inlets 20*a*, 20*d*, and 20*g* with the outlet 20*f*. Thus, the second switching valve 20 allows the coolant entering the inlets 20*b* and 20*c* to flow out of the outlet 20*e* as indicated by alternate long and short dashed arrows in FIG. 34, and also allows the coolant entering the inlets 20*a*, 20*d*, and 20*g* to flow out of the outlet 20*f* as solid arrows in FIG. 30.

Figure 35:
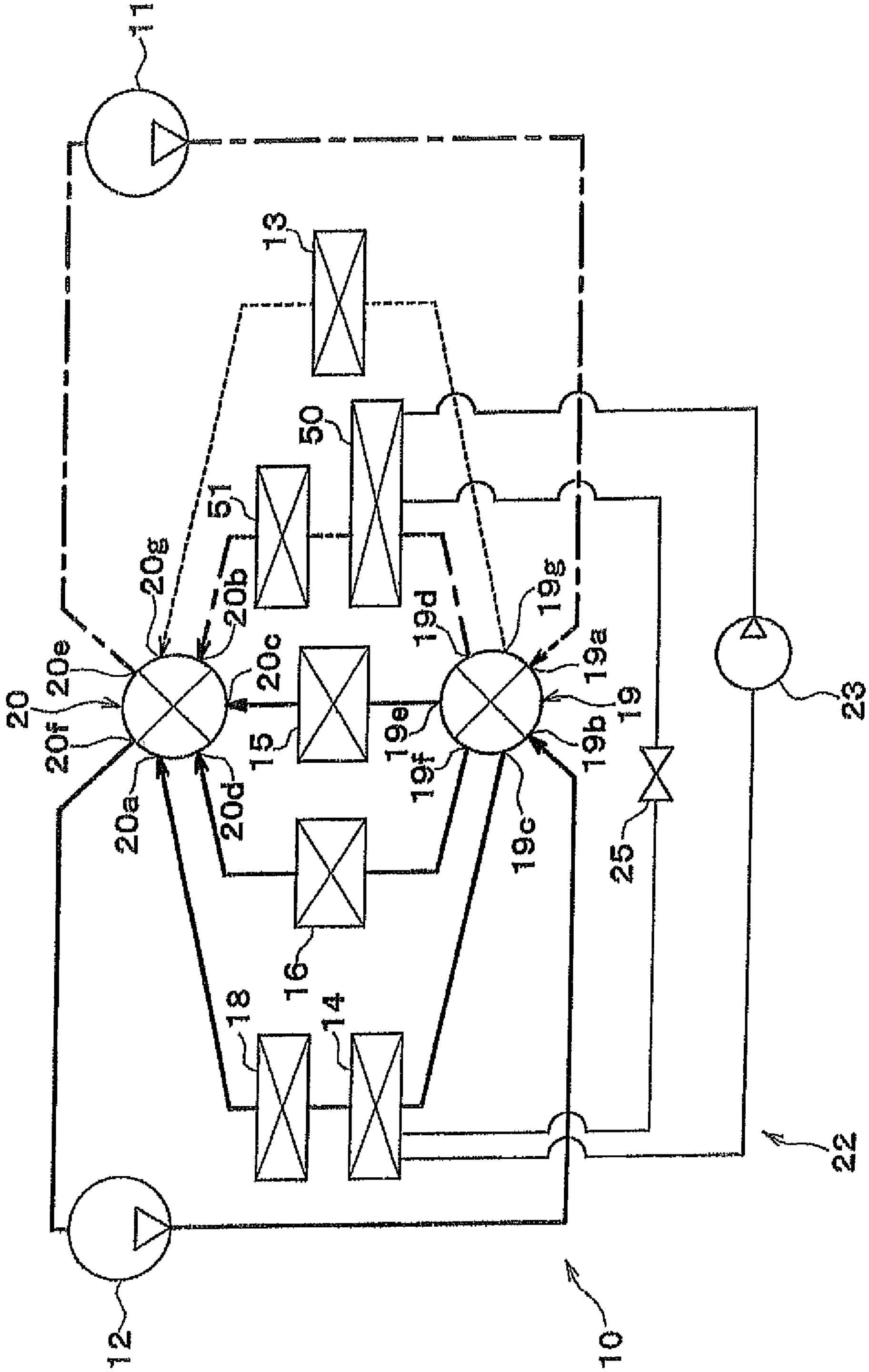
FIG. 35 is a diagram for explaining a second mode in the vehicle cooling system of FIG. 34.

FIG. 35 shows the operation (second mode) of the cooling system 10 when the first and second switching valves 19 and 20 are switched to a second state.

In the second state, the first switching valve 19 connects the inlet 19*a* with the outlet 19*d*, and also connects the inlet 19*b* with the outlets 19*c*, 19*e*, and 19*f*, thereby closing the outlet 19*g*. Thus, the first switching valve 19 allows the coolant entering the inlet 19*a* to flow out of the outlet 19*d* as indicated by an alternate long and short dashed arrow in FIG. 35, and also allows the coolant entering the inlet 19*b* to flow out of the outlets 19*c*, 19*e*, and 19*f* as indicated by solid arrows in FIG. 35, thereby preventing the coolant from flowing out of the outlet 19*g*.

In the second state, the second switching valve 20 connects the inlet 20*b* with the outlet 20*e* and also connects the inlets 20*a*, 20*c*, and 20*d* with the outlet 20*f*, thereby closing the inlet 20*g*. Thus, the second switching valve 20 allows the coolant entering the inlets 20*b* to flow out of the outlet 20*e* as indicated by an alternate long and short dashed arrow in FIG. 35, and also allows the coolant entering the inlets 20*a*, 20*c*, and 20*d* to flow out of the outlet 20*f* as indicated by solid arrows in FIG. 35, thereby preventing the coolant from flowing out of the inlet 20*g*.

When the battery is charged with the power supplied from the external power supply at a very low temperature of the outside air (for example, at 0° C.) in winter, the controller 40 performs the first mode shown in FIG. 34.

In the first mode, the controller 40 controls the electric motor 30 for a switching valve such that the first and second switching valves 19 and 20 are brought into the first state shown in FIG. 34 to thereby operate the first and second pumps 11 and 12 and the compressor 23.

Thus, the first switching valve 19 connects the inlet 19*a* with the outlets 19*d* and 19*e* and also connects the inlet 19*b* with the outlets 19*c*, 19*f*, and 19*g*. The second switching valve 20 connects the inlets 20*b* and 20*c* with the outlet 20*e*, and also connects the inlets 20*a*, 20*d*, and 20*g* with the outlet 20*f*.

Accordingly, a first coolant circuit (intermediate-temperature coolant circuit) is formed of the first pump 11, the battery cooler 15, the condenser 50, and the heater core 51, whereas a second coolant circuit (low-temperature coolant circuit) is formed of the second pump 12, the coolant cooler 14, the cooler core 18 the inverter cooler 16, and the heater core 13.

That is, as indicated by alternate long and short dashed arrows in FIG. 34, the coolant discharged from the first pump 11 is branched into the inverter cooler 15 and the condenser 50 by the first switching valve 19 to flow in parallel through the inverter cooler 15 and the condenser 50. The coolant flowing through the condenser 50 flows in series through the heater core 51. The coolants flowing through the heater core 51 and through the inverter cooler 15 are collected by the second switching valve 20 to be sucked into the first pump 11.

On the other hand, as indicated by solid arrows in FIG. 34, the coolant discharged from the second pump 12 is branched into the coolant cooler 14, the inverter cooler 16, and the radiator 13 by the first switching valve 19. The coolant flowing through the coolant cooler 14 flows in series through the cooler core 18. The coolants flowing through the cooler core 18, through the inverter cooler 16, and through the radiator 13 are collected by the second switching valve 20 to be sucked into the second pump 12.

In the first mode, the low-temperature coolant cooled by the coolant cooler 14 flows through the inverter cooler 16 and the cooler core 18, which can cool the inverter and the blast air into the vehicle interior by the low-temperature coolant.

In the first mode, the low-temperature coolant cooled by the coolant cooler 14 flows through the radiator 13, allowing the coolant to absorb heat from the outside air in the radiator 13. Then, the coolant that has absorbed heat from the outside air in the radiator 13 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the outside air via the coolant.

The refrigerant which has absorbed heat from the outside air in the coolant cooler 14 exchanges heat with the coolant of the intermediate-temperature coolant circuit in the condenser 50, whereby the coolant of the intermediate-temperature coolant circuit is heated. The coolant of the intermediate-temperature circuit heated by the condenser 50 exchanges heat with the blast air having passed through the cooler core 18 in flowing through the heater core 51, thereby dissipating heat therefrom. Thus, the heater core 51 heats the blast air having passed through the cooler core 18. Accordingly, the fourth mode can achieve heat pump heating that heats the vehicle interior by absorbing heat from the outside air.

The blast air heated by the heater core 51 is a dried cool air which is cooled and dehumidified by the cooler core 18. Thus, in the first mode, the dehumidification heating can be performed.

For example, when the battery is charged before a passenger rides on a vehicle, pre-air conditioning can be carried out to perform air conditioning of the vehicle interior before the passenger rides on.

Further, in the first mode, the intermediate-temperature coolant heated by the condenser 50 flows through the battery cooler 15, so that the warm energy can be stored in the battery by heating the battery. In this embodiment, in the first mode, the battery is heated up to about 40° C.

When the charging of the battery with the power from the external power source is completed and the vehicle starts traveling, the controller 40 performs the second mode shown in FIG. 35.

In the second mode, the controller 40 controls the electric motor 30 for a switching valve such that the first and second switching valves 19 and 20 are brought into the second state shown in FIG. 35 to thereby operate the first and second pumps 11 and 12 and the compressor 23.

Thus, the first switching valve 19 connects the inlet 19*a* with the outlet 19*d*, and also connects the inlet 19*b* with the outlets 19*c*, 19*e*, and 19*f*, thereby closing the outlet 19*g*. The second switching valve 20 connects the inlet 20*b* with the outlet 20*e*, and also connects the inlets 20*a*, 20*c*, and 20*d* with the outlet 20*f*, thereby closing the inlet 20*g*.

Accordingly, the first coolant circuit (intermediate-temperature coolant circuit) is formed of the first pump 11, the condenser 50, and the heater core 51, whereas the second coolant circuit (low-temperature coolant circuit) is formed of the second pump 12, the coolant cooler 14, the cooler core 18, the battery cooler 15, and the inverter cooler 16, thus stopping of circulation of the coolant toward the radiator 13.

That is, as indicated by an alternate long and short dashed arrow of FIG. 35, the coolant discharged from the first pump 11 flows through the condenser 50 and the heater core 51 in series via the first switching valve 19, and is then sucked into the first pump 11 via the second switching valve 20.

On the other hand, as indicated by solid arrows in FIG. 35, the coolant discharged from the second pump 12 is branched into the coolant cooler 14, the battery cooler 15, and the inverter cooler 16 by the first switching valve 19. The coolant flowing through the coolant cooler 14 flows in series through the cooler core 18. The coolants flowing through the cooler core 18, through the battery cooler 15, and through the inverter cooler 16 are collected by the second switching valve 20 to be sucked into the second pump 12.

In the second mode, the low-temperature coolant cooled by the coolant cooler 14 flows through the battery cooler 15, allowing the low-temperature coolant to absorb heat from the battery in the radiator 15. Then, the coolant which has absorbed heat from the battery in the battery cooler 15 exchanges heat with the refrigerant of the refrigeration cycle 22 in the coolant cooler 14 to dissipate heat therefrom. Thus, in the coolant cooler 14, the refrigerant of the refrigeration cycle 22 absorbs heat from the battery via the coolant.

The refrigerant which has absorbed heat from the battery in the coolant cooler 14 exchanges heat with the coolant of the intermediate-temperature coolant circuit in the condenser 50, thereby heating the coolant of the intermediate-temperature coolant circuit. The coolant of the intermediate-temperature circuit heated by the condenser 50 exchanges heat with the blast air having passed through the cooler core 18 in flowing through the heater core 51, thereby dissipating heat therefrom. Thus, the heater core 51 heats the blast air having passed through the cooler core 18. Accordingly, the second mode can achieve heat pump heating that heats the vehicle interior by absorbing heat from the battery.

The blast air heated by the heater core 51 is a dried cool air which is cooled and dehumidified by the cooler core 18. Thus, in the second mode, the dehumidification heating can be performed.

In this example, in the first mode, the battery is heated up to about 40° C., and hence in the second mode, the heat pump can be achieved by drawing heat from the battery at the 40° C. Thus, this example can operate the thermal management system at a higher temperature than the case where the low-pressure refrigerant of the refrigeration cycle 22 absorbs heat from the outside air (for example, 0° C.), thereby improving the operating efficiency of the heat pump.

In the second mode, the coolant does not circulate through the radiator 13, and the radiator 13 does not absorb heat from outside air, which can prevent the frost formation of the radiator 13.

Fifth Embodiment

Figure 36:
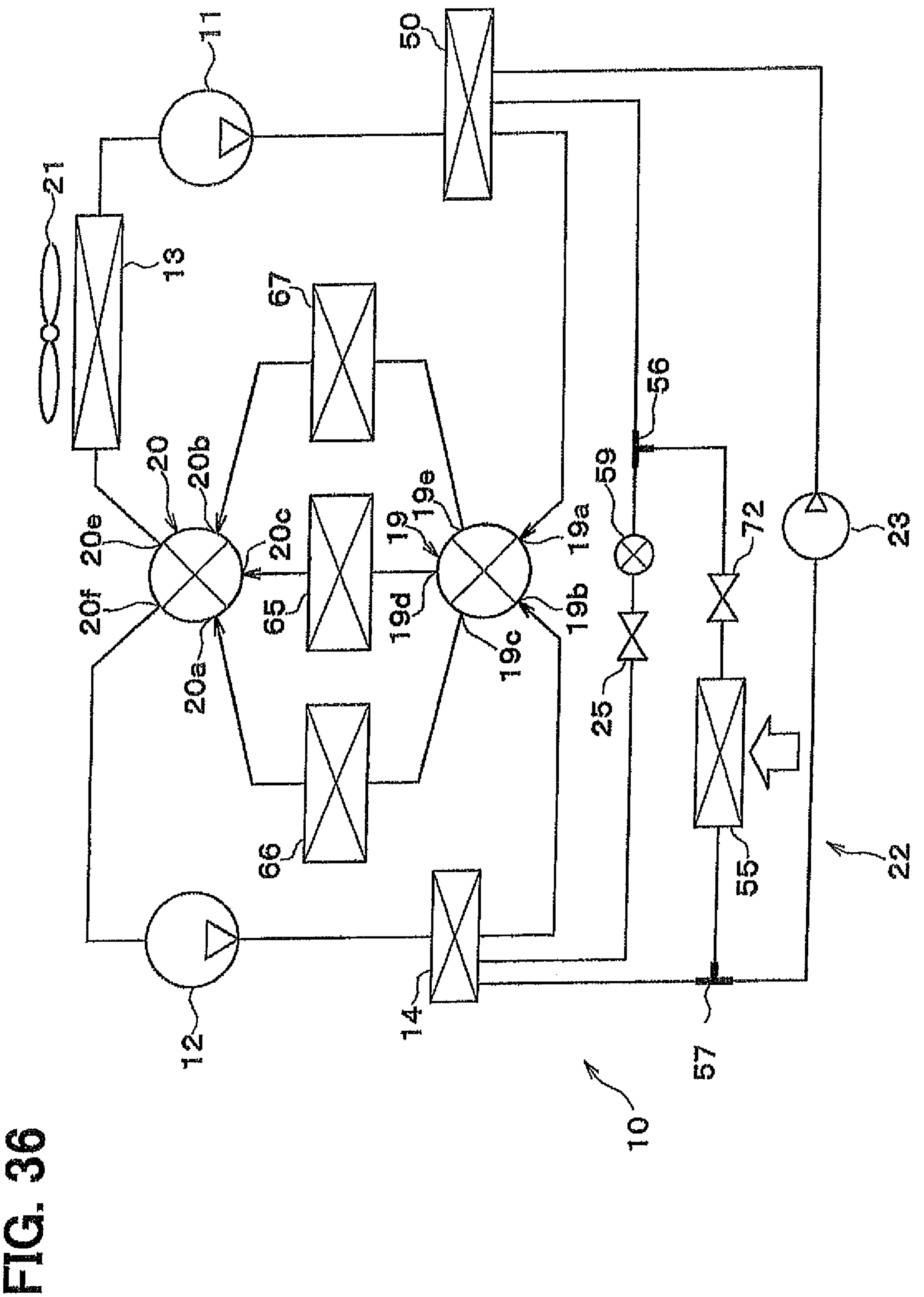
FIG. 36 is an entire configuration diagram of a vehicle cooling system according to a fifth embodiment of the invention.

Although in the above respective embodiments, the devices to be cooled include the coolant cooler 14, the battery cooler 15, the inverter cooler 16, the exhaust gas cooler 17, the cooler core 18, the condenser 50, and the intake air cooler 65 by way of example, in a fifth embodiment, as shown in FIG. 36, the devices to be cooled include the intake air cooler 65, a fuel cooler 66, and a vehicle-mounted electronic device cooler 67.

The fuel cooler 66 is a heat exchanger for cooling fuel by exchanging heat between the fuel supplied to the engine and the coolant. The vehicle-mounted electronic device cooler 67 is a heat exchanger for cooling a vehicle-mounted electronic device by exchanging heat between the vehicle-mounted electronic device and the coolant. In this way, various devices can be used as the devices to be cooled.

Like this embodiment, the condenser 50 may be connected to between the discharge side of the first pump 11 and the inlet 19*a* of the first switching valve 19.

Sixth Embodiment

Figure 37:
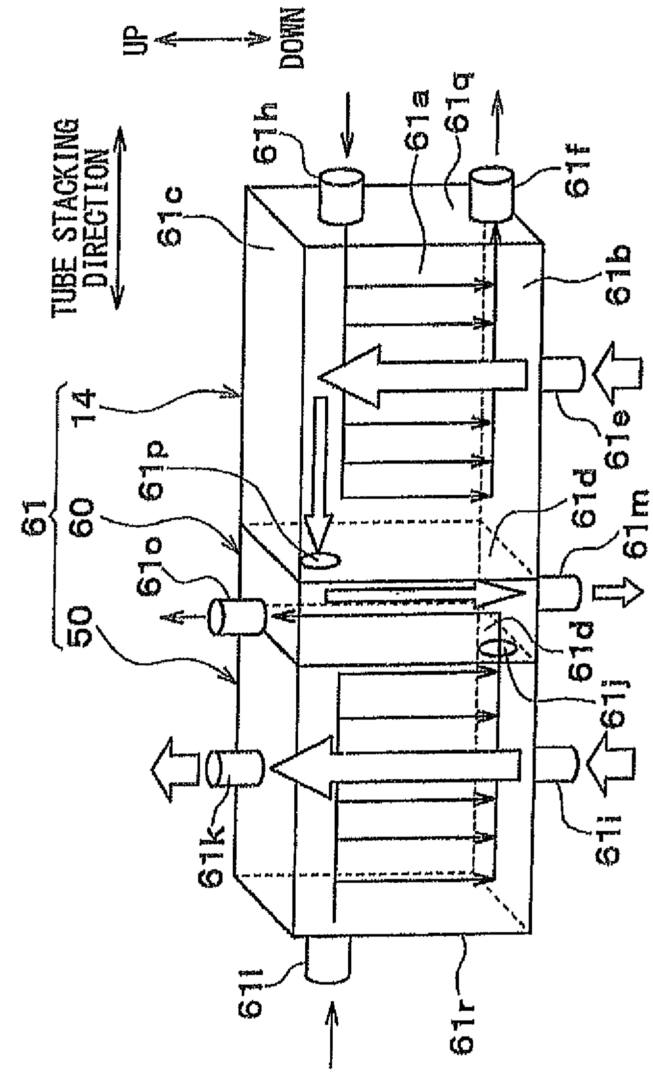
FIG. 37 is a perspective view showing a coolant cooler, a condenser, and a supercooler in a sixth embodiment.

Although in the above second embodiment, the outlet 61*g* and inlet 61*n* for the coolant are formed in parts constituting the coolant cooler 14 and the supercooler 60 of the tank portion 61*c* of the heat exchanger 61, in a sixth embodiment, as shown in FIG. 37, the outlet 61*g* and inlet 61*n* for the coolant are removed, and a hole 61*p* for allowing the refrigerant to flow therethrough is formed in a part of the partition portion 61*d* that partitions the internal space of the tank portion 61*c* into a tank space for the coolant cooler 14, and another tank space for the supercooler 60.

Thus, in the coolant cooler 14, the coolant flows from the inlet 61*e* into the tank portion 61*b*, and is then distributed to the tubes for the coolant by the tank portion 61*b*. The coolants after having passed through the tubes for the coolant are collected into the tank portion 61*c* to flow from the hole 61*p* of the partition portion 61*d* into the supercooler 60.

In the supercooler 60, the coolant flows into the tank portion 61*c* through the hole 61*p* of the partition portion 61*d*, and is then distributed to the tubes for the coolant by the tank portion 61*c*. The coolants after having passed through the tubes for the coolant are collected into the tank portion 61*b* to flow from the outlet 61*m*.

This embodiment can remove the outlet 61*g* and inlet 61*n* for the coolant with respect to the heat exchanger 61 of the second embodiment, and thus can simplify the connection structure of the coolant pipes.

Seventh Embodiment

Figure 38:
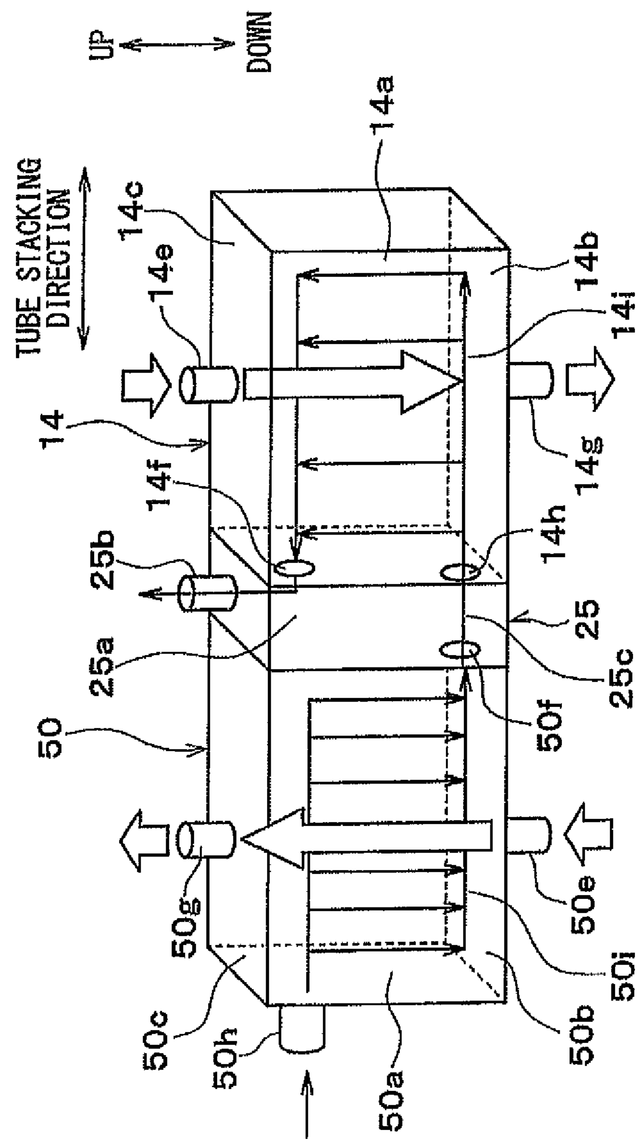
FIG. 38 is a perspective view showing a coolant cooler, a condenser, and an expansion valve in a seventh embodiment.

Although in the sixth embodiment, the coolant cooler 14, the condenser 50, and the supercooler 60 are included in one heat exchanger 61, in a seventh embodiment, as shown in FIG. 38, the coolant cooler 14, the condenser 50, and the expansion valve 25 are integrated together.

The coolant cooler 14 is composed of the tank-and-tube type heat exchanger, and includes a heat exchanger core (second heat exchanging portion) 14*a*, and tank portions 14*b* and 14*c*. The heat exchanger core 14*a* includes a plurality of tubes through which the coolant and the refrigerant flow independently. The tubes are stacked on each other in parallel. The tank portions 14*b* and 14*c* are disposed on both ends of the tubes to distribute and collect the coolant and refrigerant for the tubes.

Respective members constituting the heat exchanger core 14*a*, and the tank portions 14*b* and 14*c* are formed of metal (for example, an aluminum alloy), and bonded together by brazing.

The condenser 50 is composed of the tank-and-tube type heat exchanger, and includes a heat exchanger core (first heat exchanging portion) 50*a*, and tank portions 50*b* and 50*c*. The heat exchanger core 50*a* includes a plurality of tubes through which the coolant and the refrigerant flow independently. The tubes are stacked on each other in parallel. The tank portions 50*b* and 50*c* are disposed on both ends of the tubes to distribute and collect the coolant and refrigerant for the tubes.

Respective members constituting the heat exchanger core 50*a*, and the tank portions 50*b* and 50*c* are formed of metal (for example, an aluminum alloy), and bonded together by brazing.

The coolant cooler 14 and the condenser 24 are disposed in parallel in the stacking direction of tubes (in the left-right direction of FIG. 38). Specifically, the expansion valve 25 is fixed while being sandwiched between the coolant cooler 14 and the condenser 24.

The expansion valve 25 is a thermal expansion valve whose valve opening degree is adjusted by a mechanical system such that a degree of superheat of the refrigerant flowing from the coolant cooler 14 is in a predetermined range. The expansion valve 25 has a temperature sensing portion 25*a* for sensing the superheat degree of the refrigerant on the outlet side of the coolant cooler 14.

One tank portion 14*c* of the coolant cooler 14 is provided with an inlet 14*e* for the coolant and an outlet 14*f* for the refrigerant. The outlet 14*f* for the refrigerant is superimposed over the refrigerant inlet of the temperature sensing portion 25*a* of the expansion valve 25.

The other tank portion 14*b* of the coolant cooler 14 is provided with an outlet 14*g* for the coolant and an inlet 14*h* for the refrigerant. The inlet 14*h* for the refrigerant is superimposed over the refrigerant outlet of the expansion valve 25.

Thus, in the coolant cooler 14, the coolant flows from the inlet 14*e* into the tank portion 14*c*, and is then distributed to the tubes for the coolant by the tank portion 14*c*. The coolants after having passed through the tubes for the coolant are collected into the tank portion 14$b$ to flow from the outlet 14$g$.

In the coolant cooler 14, the refrigerant decompressed by the expansion valve 25 flows from the inlet 14$h$ into the tank portion 14$b$, and is then distributed to the tubes for the refrigerant in the tank portion 14$b$. The refrigerants having passed through the tubes for the refrigerant are collected into the tank portion 14$c$ to flow from the outlet 14$f$ into the temperature sensing portion 25$a$ of the expansion valve 25. The temperature sensing portion 25$a$ of the expansion valve 25 is provided with an outlet 25$b$ for the refrigerant.

The inlet 14$e$ and outlet 14$g$ for the coolant of the coolant cooler 14 are disposed between both ends of each of tank portions 14$b$ and 14$c$ in the tube stacking direction (both ends in the left-right direction of FIG. 38). Thus, the coolant cooler 14 does not allow the flow of coolant to make a U-turn.

The inlet 14$e$ and outlet 14$g$ are oriented in the direction perpendicular to the tube stacking direction. In an example shown in FIG. 38, the inlet 14$e$ and outlet 14$g$ are oriented in the direction parallel to the tubes for the refrigerant and for the coolant.

One tank portion 50$b$ of the condenser 50 is provided with an inlet 50$e$ for the coolant and an outlet 50$f$ for the refrigerant. The outlet 50$b$ for the refrigerant is superimposed over the refrigerant inlet of the expansion valve 25. One other tank portion 50$c$ of the condenser 50 is provided with an outlet 50$g$ for the coolant and an inlet 50$h$ for the refrigerant.

Thus, in the condenser 50, the coolant flows from the inlet 50$e$ into the tank portion 50$b$, and is then distributed to the tubes for the coolant by the tank portion 50$b$. The coolants after having passed through the tubes for the coolant are collected into the tank portion 50$c$ to flow from the outlet 50$g$.

In the condenser 50, the refrigerant flows from the inlet 50$h$ into the tank portion 50$c$, and is then distributed to the tubes for the refrigerant by the tank portion 50$c$. The coolants after having passed through the tubes for the refrigerant are collected into the tank portion 50$b$ to flow from the outlet 50$f$ into the expansion valve 25. The refrigerant flowing from the outlet 50$f$ into the expansion valve 25 is decompressed by the expansion valve 25 to flow into the coolant cooler 14.

The inlet 50$e$ and outlet 50$g$ for the coolant of the condenser 50 are disposed between both ends of tank portions 50$b$ and 50$c$ in the tube stacking direction (both ends in the left-right direction of FIG. 38). Thus, the condenser 50 does not allow the flow of coolant to make a U-turn.

The inlet 50$e$ and outlet 50$g$ are oriented in the direction perpendicular to the tube stacking direction. In the example shown in FIG. 38, the inlet 50$e$ and outlet 50$g$ are oriented in the direction parallel to the tubes for the refrigerant and for the coolant.

Further, in this embodiment, the inlet 14$e$ and outlet 14$g$ for the coolant of the coolant cooler 14 are disposed between both ends (both ends in the left-right direction of FIG. 38) of each of the tank portions 14$b$ and 14$c$ in the tube stacking direction, which can increase the flexibility in connection of the pipes and arrangement of the heat exchangers as compared to the case where the inlet 14$e$ and outlet 14$g$ for the coolant are disposed at both ends of each of the tank portions 14$b$ and 14$c$ in the tube stacking direction. The coolant cooler 14 does not allow the flow of coolant to make a U-turn, and thus can reduce the loss of pressure of the coolant in the coolant cooler 14.

Likewise, the inlet 50$e$ and outlet 50$g$ for the coolant of the condenser 50 are disposed between both ends (both ends in the left-right direction of FIG. 38) of each of the tank portions 50$b$ and 50$c$ in the tube stacking direction, which can increase the flexibility in connection of the pipes and arrangement of the heat exchangers as compared to the case where the inlet 50$e$ and outlet 50$g$ for the coolant are disposed at both ends of each of the tank portions 50$b$ and 50$c$ in the tube stacking direction. The condenser 50 does not allow the flow of coolant to make a U-turn, and thus can reduce the loss of pressure of the coolant in the condenser 50.

This embodiment does not need any refrigerant pipe between the coolant cooler 14 and the expansion valve 25, and between the condenser 50 and the expansion valve 25, and thus can simplify the connection structure between the refrigerant pipes.

A first tank space 50$i$ for the refrigerant in the internal space of the tank portion 50$b$ of the condenser 50 that causes the refrigerant to flow into the expansion valve 25 is superimposed over a second tank space 14$i$ for the refrigerant in the tank portion 14$b$ of the coolant cooler 14 that causes the refrigerant flowing out of the expansion valve 25 to flow thereinto as viewed from the tube stacking direction. Thus, a common part or component can be shared between the condenser 50 and the coolant cooler 14.

The first tank space 50$i$ for the refrigerant, a decompression flow path 25$c$ of the expansion valve 25, and the second tank space 14$i$ for the refrigerant are linearly disposed side by side in the tube stacking direction. Thus, the structure of the coolant cooler 14, condenser 50, and expansion valve 25 can be simplified. The decompression flow path 25$c$ of the expansion valve 25 is a flow path through which the refrigerant flowing from the condenser 50 is decompressed to flow into the coolant cooler 14.

Second Reference Example

Although in the first reference example, the operating mode is switched according to the outside air temperature detected by the outside air sensor 42, in a second reference embodiment, the operating mode is switched according to the temperature of the inverter and the temperature of the battery.

The first switching valve 19 is configured to be capable of switching among four types of communication states between the inlets 19$a$ and 19$b$ and the outlets 19$c$, 19$d$, 19$e$, and 19$f$. The second switching valve 20 is also configured to be capable of switching among four types of communication states between the inlets 20$a$, 20$b$, 20$c$, and 20$d$ and the outlets 20$e$, and 20$f$.

Figure 39:
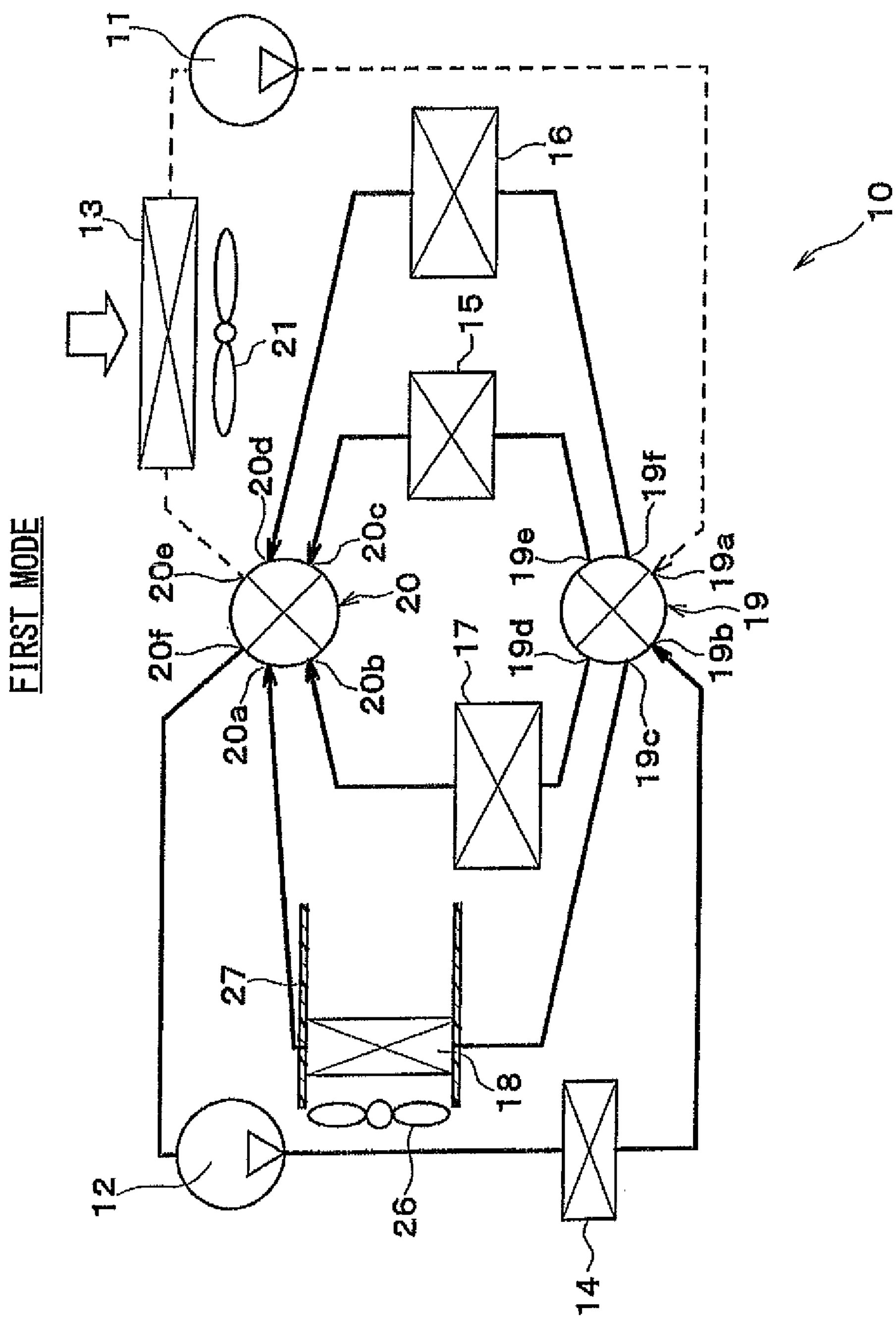
FIG. 39 is a diagram for explaining a first mode in a vehicle cooling system in a second reference example.

FIG. 39 shows the operation (first mode) of the cooling system 10 when the first and second switching valves 19 and 20 are switched to a first state.

In the first state, the first switching valve 19 closes the inlet 19$a$, and connects the inlet 19$b$ with the outlet 19$c$, 19$d$, 19$e$, and 19$f$. Thus, the first switching valve 19 does not allow the coolant to flow into the inlet 19$a$, but allows the coolant entering the inlet 19$b$ to flow out of the outlets 19$c$, 19$d$, 19$e$, and 19$f$ as indicated by solid arrows in FIG. 39.

In the first state, the second switching valve 20 closes the outlet 20$e$, and connects the inlets 20$a$, 20$b$, 20$c$, and 20$d$ with the outlet 20$f$. Thus, the second switching valve 20 does not allow the coolant to flow from the outlet 20$e$, but allows the coolant entering the inlets 20*a*, 20*b*, 20*c*, and 20*d* to flow out of the outlet 20*f* as indicated by solid arrows of FIG. 39.

Figure 40:
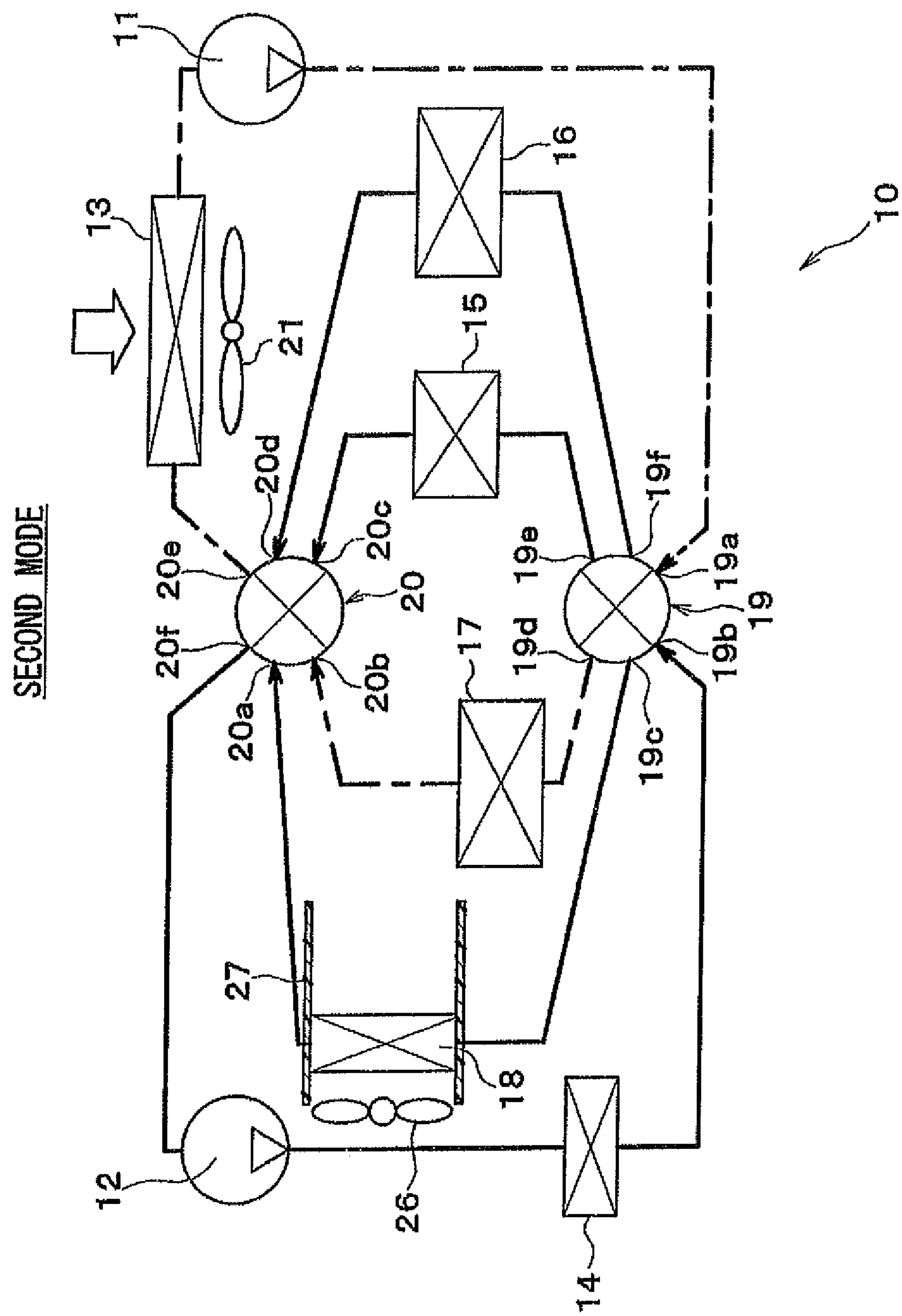
FIG. 40 is a diagram for explaining a second mode in a vehicle cooling system in the second reference example.

FIG. 40 shows the operation (second mode) of the cooling system 10 when the first and second switching valves 19 and 20 are switched to a second state.

In the second state, the first switching valve 19 connects the inlet 19*a* with the outlet 19*d*, and also connects the inlet 19*b* with the outlets 19*c*, 19*e*, and 19*f*. Thus, the first switching valve 19 allows the coolant entering the inlet 19*a* to flow out of the outlet 19*d* as indicated by an alternate long and short dashed arrow in FIG. 40, and also allows the coolant entering the inlet 19*b* to flow out of the outlets 19*c*, 19*e*, and 19*f* as solid arrows in FIG. 40.

In the second state, the second switching valve 20 connects the inlets 20*a*, 20*c*, and 20*d* with the outlet 20*f*, and also connects the inlet 20*b* with the outlet 20*e*. Thus, the second switching valve 20 allows the coolant entering the inlet 20*b* to flow out of the outlet 20*e* as indicated by an alternate long and short dashed arrow in FIG. 40, and also allows the coolant entering the inlets 20*a*, 20*c*, and 20*d* to flow out of the outlet 20*f* as indicated by a solid arrow in FIG. 40.

Figure 41:
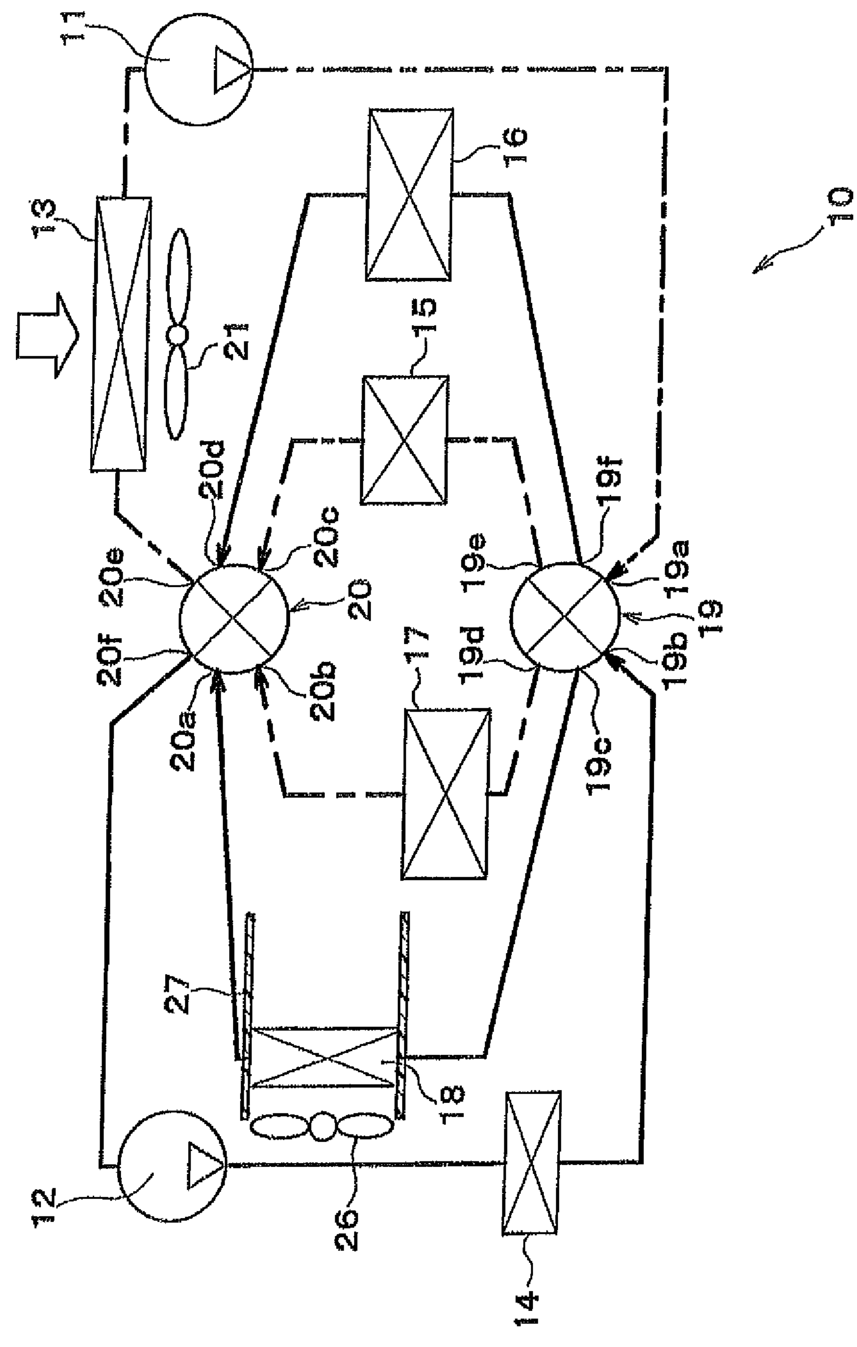
FIG. 41 is a diagram for explaining a third mode in a vehicle cooling system in the second reference example.

FIG. 41 shows the operation (third mode) of the cooling system 10 when the first and second switching valves 19 and 20 are switched to a third state.

In the third state, the first switching valve 19 connects the inlet 19*a* with the outlets 19*d* and 19*e*, and also connects the inlet 19*b* with the outlets 19*c*, and 19*f*. Thus, the first switching valve 19 allows the coolant entering the inlet 19*a* to flow out of the outlets 19*d* and 19*e* as indicated by alternate long and short dashed arrows in FIG. 41, and also allows the coolant entering the inlet 19*b* to flow from the outlets 19*c* and 19*f* as indicated by solid arrows in FIG. 41.

In the third state, the second switching valve 20 connects the inlets 20*a*, and 20*d* with the outlet 20*f*, and also connects the inlets 20*b* and 20*c* with the outlet 20*e*. Thus, the second switching valve 20 allows the coolant entering the inlets 20*b* and 20*c* to flow out of the outlet 20*e* as indicated by alternate long and short dashed arrows in FIG. 41, and also allows coolant entering the inlets 20*a* and 20*d* to flow out of the outlet 20*f* as a solid arrow in FIG. 41.

Figure 42:
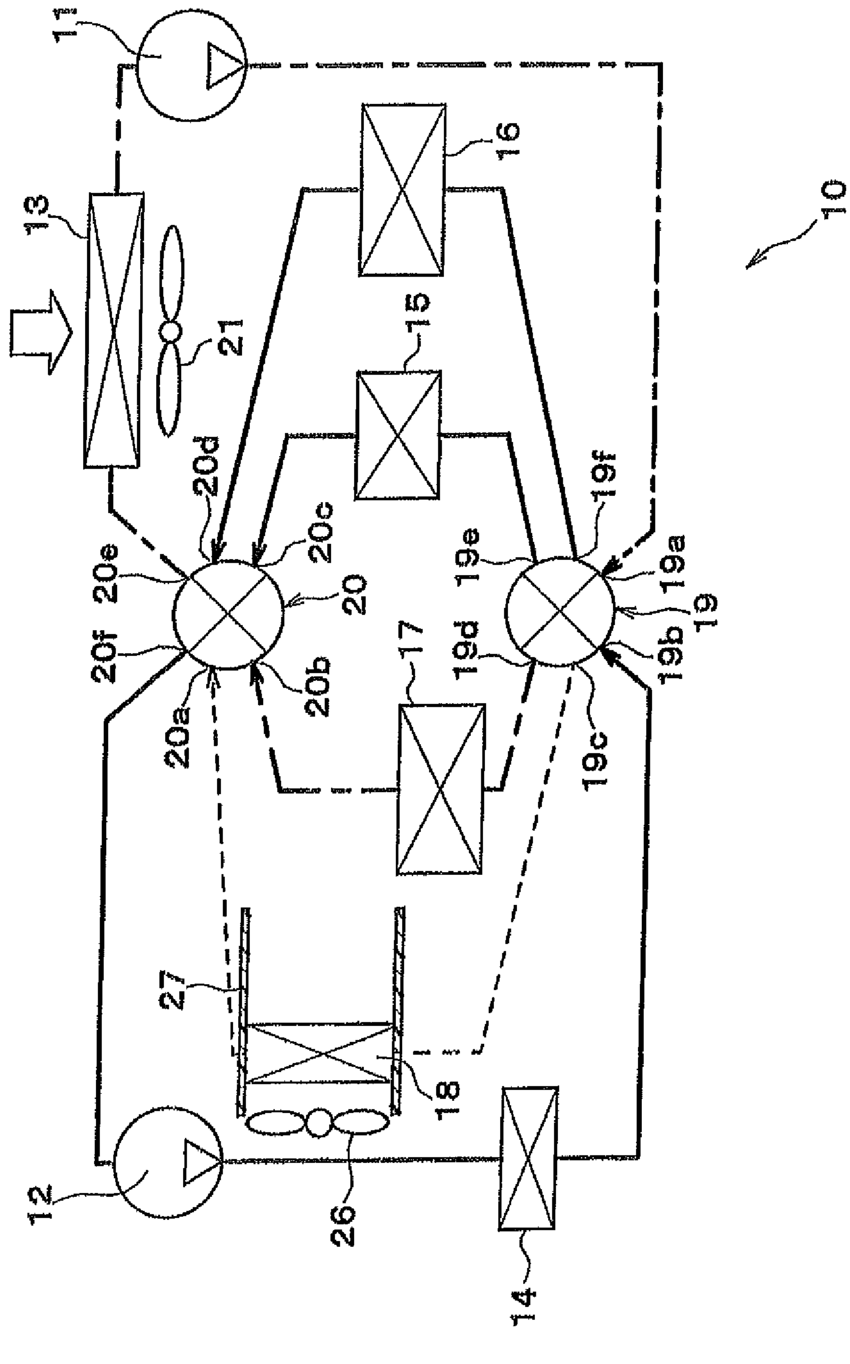
FIG. 42 is a diagram for explaining a fourth mode in a vehicle cooling system in the second reference example.

FIG. 42 shows the operation (fourth mode) of the cooling system 10 when the first and second switching valves 19 and 20 are switched to a fourth state.

In the fourth state, the first switching valve 19 connects the inlet 19*a* with the outlet 19*d*, and also connects the inlet 19*b* with the outlets 19*e* and 19*f*, thereby closing the outlet 19*c*. Thus, the first switching valve 19 allows the coolant entering the inlet 19*a* to flow out of the outlet 19*d* as indicated by an alternate long and short dashed arrow of FIG. 42, and also allows the coolant entering the inlet 19*b* to flow out of the outlets 19*e* and 19*f* as indicated by solid arrows of FIG. 42, thereby preventing the coolant from flowing out of the outlet 19*c*.

In the fourth state, the second switching valve 20 connects the inlets 20*c* and 20*d* with the outlet 20*f* and also connects the inlet 20*b* with the outlet 20*e*, thereby closing the inlet 20*a*. Thus, the second switching valve 20 allows the coolant entering the inlets 20*b* to flow out of the outlet 20*e* as indicated by an alternate long and short dashed arrow of FIG. 42, and also allows the coolant entering the inlets 20*c*, and 20*d* to flow out of the outlet 20*f* as indicated by solid arrows of FIG. 42, thereby preventing the coolant from entering the inlet 20*a*.

Figure 43:
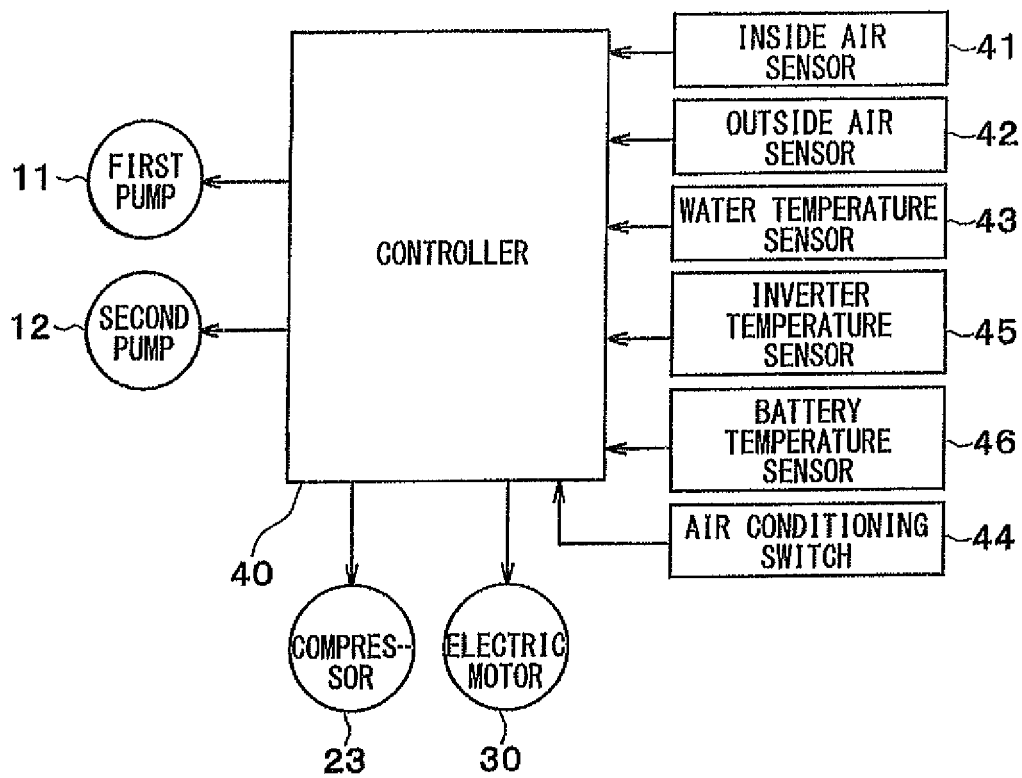
FIG. 43 is a block diagram showing an electric controller of the vehicle cooling system shown in the second reference example.

Next, an electric controller of the cooling system 10 will be described with reference to FIG. 43. The electric controller of the cooling system 10 has the structure, in addition to the above-mentioned structure of the first reference example, in which detection signals from an inverter temperature sensor 45 and a battery temperature sensor 46 are input to the input side of the controller 40.

The inverter temperature sensor 45 is an inverter temperature detector for detecting the temperature of the inverter. For example, the inverter temperature sensor 45 may detect the temperature of coolant flowing from the inverter cooler 16. The battery temperature sensor 46 is a battery temperature detector for detecting the temperature of the battery. For example, the battery temperature sensor 46 may detect the temperature of coolant flowing from the battery cooler 15.

Figure 44:
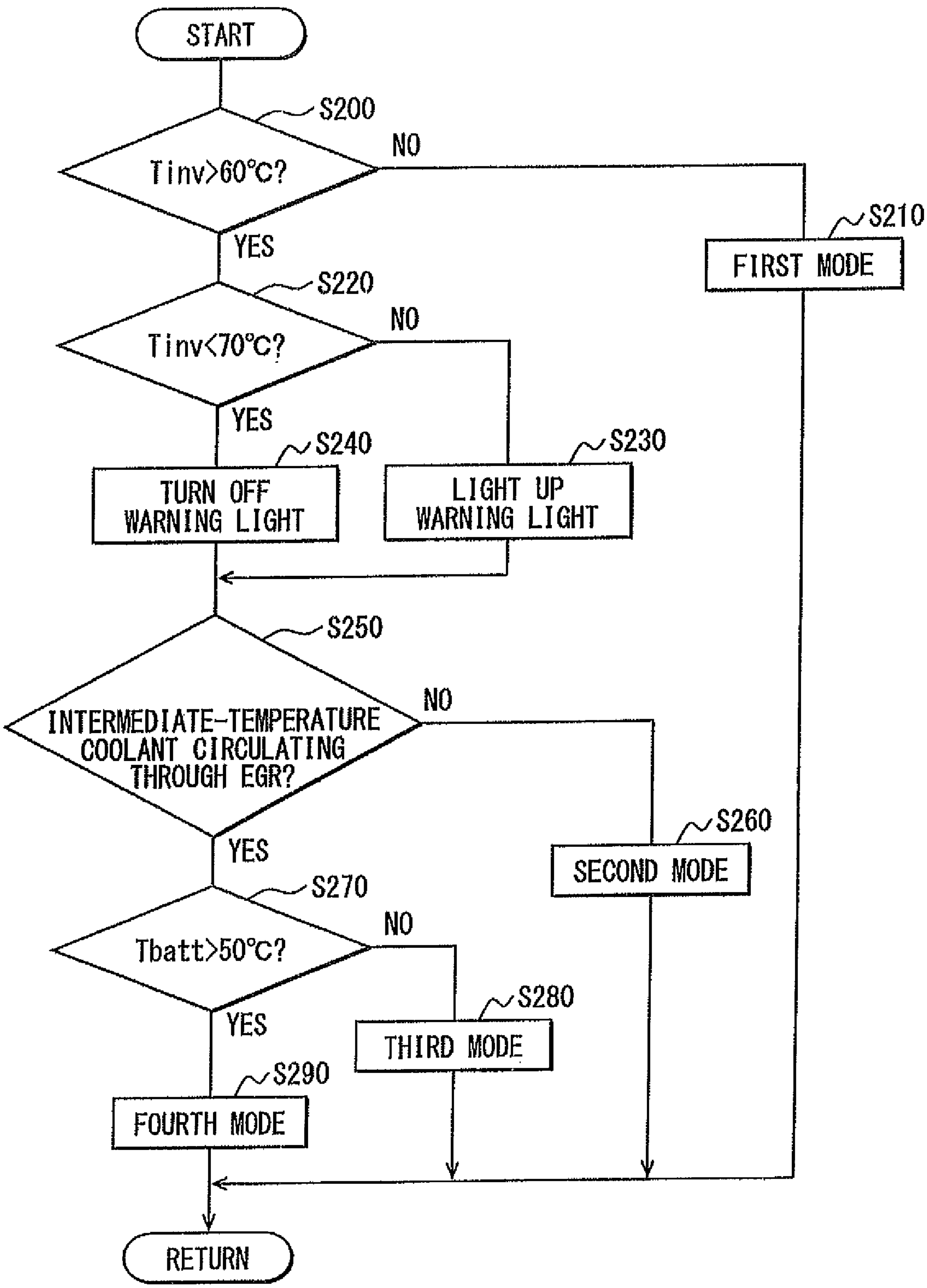
FIG. 44 is a flowchart showing the flow of a control process performed by a controller of the second reference example.

A control process executed by the controller 40 of this embodiment will be described with reference to FIG. 44. The controller 40 executes a computer program according to a flowchart of FIG. 44.

First, in step S200, it is determined whether an inverter temperature Tinv detected by the inverter temperature sensor 45 exceeds 60° C.

When the inverter temperature Tinv is determined not to exceed 60° C., the priority of cooling of the inverter is determined not to be high, and the operation proceeds to step S210, in which the first mode shown in FIG. 39 is performed.

In the first mode, the controller 40 controls the electric motor 30 for a switching valve such that the first and second switching valves 19 and 20 are brought into the first state shown in FIG. 39, thereby operating the second pump 12 and the compressor 23, and stopping the first pump 11.

Thus, the first switching valve 19 closes the inlet 19*a*, and connects the inlet 19*b* with the outlets 19*c*, 19*d*, 19*e*, and 19*f*. The second switching valve 20 connects the inlets 20*a*, 20*b*, 20*c*, and 20*d* with the outlet 20*f*, and closes the outlet 20*e*.

Thus, the low-temperature coolant circuit is formed of the second pump 12, the coolant cooler 14, the battery cooler 15, the inverter cooler 16, the exhaust gas cooler 17, and the cooler core 18, and the intermediate-temperature coolant circuit is not formed.

That is, as indicated by solid arrows of FIG. 39, the coolant discharged from the second pump 12 flows through the coolant cooler 14, and is branched by the first switching valve 19 into the battery cooler 15, the inverter cooler 16, the exhaust gas cooler 17, and the cooler core 18. Then, the coolants flowing in parallel through the battery cooler 15, the inverter cooler 16, the exhaust gas cooler 17, and the cooler core 18 are collected into the second switching valve 20 to be sucked into the second pump 12.

In contrast, as indicated by a dashed arrow of FIG. 39, the coolant is not discharged from the first pump 11, and does not flow through the radiator 13.

In this way, in the first mode, the low-temperature coolant cooled by the coolant cooler 14 flows through the battery cooler 15, the inverter cooler 16, the exhaust gas cooler 17, and the cooler core 18. As a result, the battery, the inverter, the exhaust gas, and the blast air into the vehicle interior are cooled by the low-temperature coolant.

When the inverter temperature Tinv is determined to exceed 60° C. in step S200, the priority of cooling of the inverter is determined to be high, and then the operation proceeds to step S220. In step S220, it is determined whether the inverter temperature Tinv is less than 70° C. or not.

When the inverter temperature Tinv is determined to be 70° C. or more, the inverter is considered to be at an abnormal high temperature, and the operation proceeds to step S230, in which a warning light is lit up. Thus, a passenger can be informed that the inverter is at the abnormal high temperature.

When the inverter temperature Tinv is determined to be less than 70° C., the inverter is considered not to be at an abnormal high temperature, and the operation proceeds to step S240, in which the warning light is turned off. Thus, a passenger can be informed that the inverter is not at the abnormal high temperature.

In step S250 following steps S230 and S240, it is determined whether or not the coolant of the intermediate-temperature coolant circuit (intermediate-temperature coolant) circulates through the exhaust gas cooler 17. Specifically, whether or not the coolant of the intermediate-temperature coolant circuit (intermediate-temperature coolant) circulates through the exhaust gas cooler 17 is determined based on the operating states of the first and second switching valves 19 and 20.

When the intermediate-temperature coolant is determined not to circulate through the exhaust gas cooler 17, the operation proceeds to step S260 so as to reduce the cooling capacity of the exhaust gas, in which the second mode shown in FIG. 40 is performed.

In the second mode, the controller 40 controls the electric motor 30 for a switching valve such that the first and second switching valves 19 and 20 are brought into the second state shown in FIG. 40 to thereby operate the first and second pumps 11 and 12 and the compressor 23.

Thus, the first switching valve 19 connects the inlet 19*a* with the outlet 19*d* and also connects the inlet 19*b* with the outlets 19*c*, 19*e*, and 19*f*. The second switching valve 20 connects the inlets 20*a*, 20*c*, and 20*d* with the outlet 20*f*, and also connects the inlet 20*b* with the outlet 20*e*.

Accordingly, an intermediate-temperature coolant circuit is formed of the first pump 11, the exhaust gas cooler 17, and the radiator 13, whereas a low-temperature coolant circuit is formed of the second pump 12, the coolant cooler 14, the battery cooler 15, the inverter cooler 16, and the cooler core 18.

That is, as indicated by an alternate long and short dashed arrow of FIG. 40, the coolant discharged from the first pump 11 flows through the exhaust gas cooler 17 via the first switching valve 19, and then through the radiator 13 via the second switching valve 20, thereby being sucked into the first pump 11.

On the other hand, as indicated by solid arrows in FIG. 40, the coolant discharged from the second pump 12 flows through the coolant cooler 14 to be branched into the battery cooler 15, the inverter cooler 16, and the cooler core 18 by the first switching valve 19. The coolants flowing in parallel through the battery cooler 15, the inverter cooler 16, and the cooler core 18 are collected into the second switching valve 20 to be sucked into the second pump 12.

In this way, in the second mode, the intermediate-temperature coolant cooled by the radiator 13 flows through the exhaust gas cooler 17, whereas the low-temperature coolant cooled by the coolant cooler 14 flows through the battery cooler 15, the inverter cooler 16, and the cooler core 18. As a result, the exhaust gas is cooled by the intermediate-temperature coolant, and the battery, the inverter, and the blast air into the vehicle interior are cooled by the low-temperature coolant.

Thus, the cooling capacity of the inverter can be improved as compared to that in the first mode in which the exhaust gas can also be cooled by the low-temperature coolant.

When the intermediate-temperature coolant is determined to circulate through the exhaust gas cooler 17 in step S250, the operation proceeds to step S270. In step S270, it is determined whether a battery temperature Tbatt detected by the battery temperature sensor 46 exceeds 50° C. or not.

When the battery temperature Tbatt is determined not to exceed 50° C., the priority of cooling of the battery is determined not to be high, and the operation proceeds to step S280, in which the third mode shown in FIG. 41 is performed.

In the third mode, the controller 40 controls the electric motor 30 for a switching valve such that the first and second switching valves 19 and 20 are brought into the third state shown in FIG. 41 to thereby operate the first and second pumps 11 and 12 and the compressor 23.

Thus, the first switching valve 19 connects the inlet 19*a* with the outlets 19*d*, and 19*e*, and also connects the inlet 19*b* with the outlets 19*c* and 19*f*. The second switching valve 20 connects the inlets 20*a* and 20*d* with the outlet 20*f*, and also connects the inlets 20*b* and 20*c* with the outlet 20*e*.

Accordingly, an intermediate-temperature coolant circuit is formed of the first pump 11, the battery cooler 15, the exhaust gas cooler 17, and the radiator 13, whereas a low-temperature coolant circuit is formed of the second pump 12, the coolant cooler 14, the inverter cooler 16, and the cooler core 18.

That is, as indicated by alternate long and short dashed arrows in FIG. 41, the coolant discharged from the first pump 11 is branched by the first switching valve 19 into the battery cooler 15 and the exhaust gas cooler 17. Then, the coolants flowing in parallel through the battery cooler 15 and the exhaust gas cooler 17 are collected into the second switching valve 20 to flow through the radiator 13, thereby being sucked into the first pump 11.

On the other hand, as shown in solid arrows in FIG. 41, the coolant discharged from the second pump 12 flows through the coolant cooler 14 to be branched into the inverter cooler 16 and the cooler core 18 by the first switching valve 19. The coolants flowing in parallel through the inverter cooler 16 and the cooler core 18 are collected into the second switching valve 20 to be sucked into the second pump 12.

In this way, in the second mode, the intermediate-temperature coolant cooled by the radiator 13 flows through the exhaust gas cooler 17 and the battery cooler 15, whereas the low-temperature coolant cooled by the coolant cooler 14 flows through the inverter cooler 16 and the cooler core 18. As a result, the battery and the exhaust gas are cooled by the intermediate-temperature coolant, while the inverter and the blast air into the vehicle interior are cooled by the low-temperature coolant.

Thus, the cooling capacity of the inverter can be improved as compared to that in the second mode in which the battery can also be cooled by the low-temperature coolant.

When the battery temperature Tbatt is determined to exceed 50° C. in step S270, the priority of cooling of the battery is determined to be high, and the operation proceeds to step S290, in which a fourth mode shown in FIG. 42 is performed.

In the fourth mode, the controller 40 controls the electric motor 30 for a switching valve such that the first and second switching valves 19 and 20 are brought into the fourth state shown in FIG. 42 to thereby operate the first and second pumps 11 and 12 and the compressor 23.

Thus, the first switching valve 19 connects the inlet 19*a* with the outlet 19*d*, and also connects the inlet 19*b* with the outlets 19*e* and 19*f*, thereby closing the outlet 19*c*. The second switching valve 20 closes the inlet 20*a* and connects the inlet 20*b* with the outlet 20*e*, and also connects the inlets 20*c* and 20*d* with the outlet 20*f*.

Accordingly, an intermediate-temperature coolant circuit is formed of the first pump 11, the exhaust gas cooler 17, and the radiator 13, whereas a low-temperature coolant circuit is formed of the second pump 12, the coolant cooler 14, the battery cooler 15, and the inverter cooler 16.

That is, as indicated by an alternate long and short dashed arrow of FIG. 42, the coolant discharged from the first pump 11 flows through the exhaust gas cooler 17 via the first switching valve 19, and then through the radiator 13 via the second switching valve 20, thereby being sucked into the first pump 11.

On the other hand, as indicated by solid arrows in FIG. 41, the coolant discharged from the second pump 12 flows through the coolant cooler 14, and is branched by the first switching valve 19 into the battery cooler 15 and the inverter cooler 16. Then, the coolants flowing in parallel through the battery cooler 15, and the inverter cooler 16 are collected into the second switching valve 20 to be sucked into the second pump 12. In contrast, as indicated by a dashed arrow in FIG. 41, the coolant does not circulate through the cooler core 18.

In this way, in the second mode, the intermediate-temperature coolant cooled by the radiator 13 flows through the exhaust gas cooler 17, whereas the low-temperature coolant cooled by the coolant cooler 14 flows through the battery cooler 15 and the inverter cooler 16, stopping the circulation of the coolant toward the cooler core 18. As a result, the battery and the exhaust gas are cooled by the intermediate-temperature coolant, and the inverter is cooled by the low-temperature coolant, thereby stopping the cooling (that is, air conditioning) of the blast air into the vehicle interior.

Thus, the cooling capabilities of the battery and the inverter can be improved as compared to those in the second mode in which the blast air into the vehicle interior can also be cooled by the low-temperature coolant.

In this embodiment, when the inverter temperature Tinv is higher than the predetermined temperature (60° C. in this example), the third mode is performed to allow the coolant to circulate between the inverter cooler 16 and the second pump 12, and also to circulate between the battery cooler 15 and the first pump 11. Thus, when the inverter temperature is high, the inverter with a smaller heat capacity can be preferentially cooled as compared to the battery with a larger heat capacity. As a result, the inverter can be effectively cooled while suppressing the increase in temperature of the battery.

Third Reference Example

Figure 45:
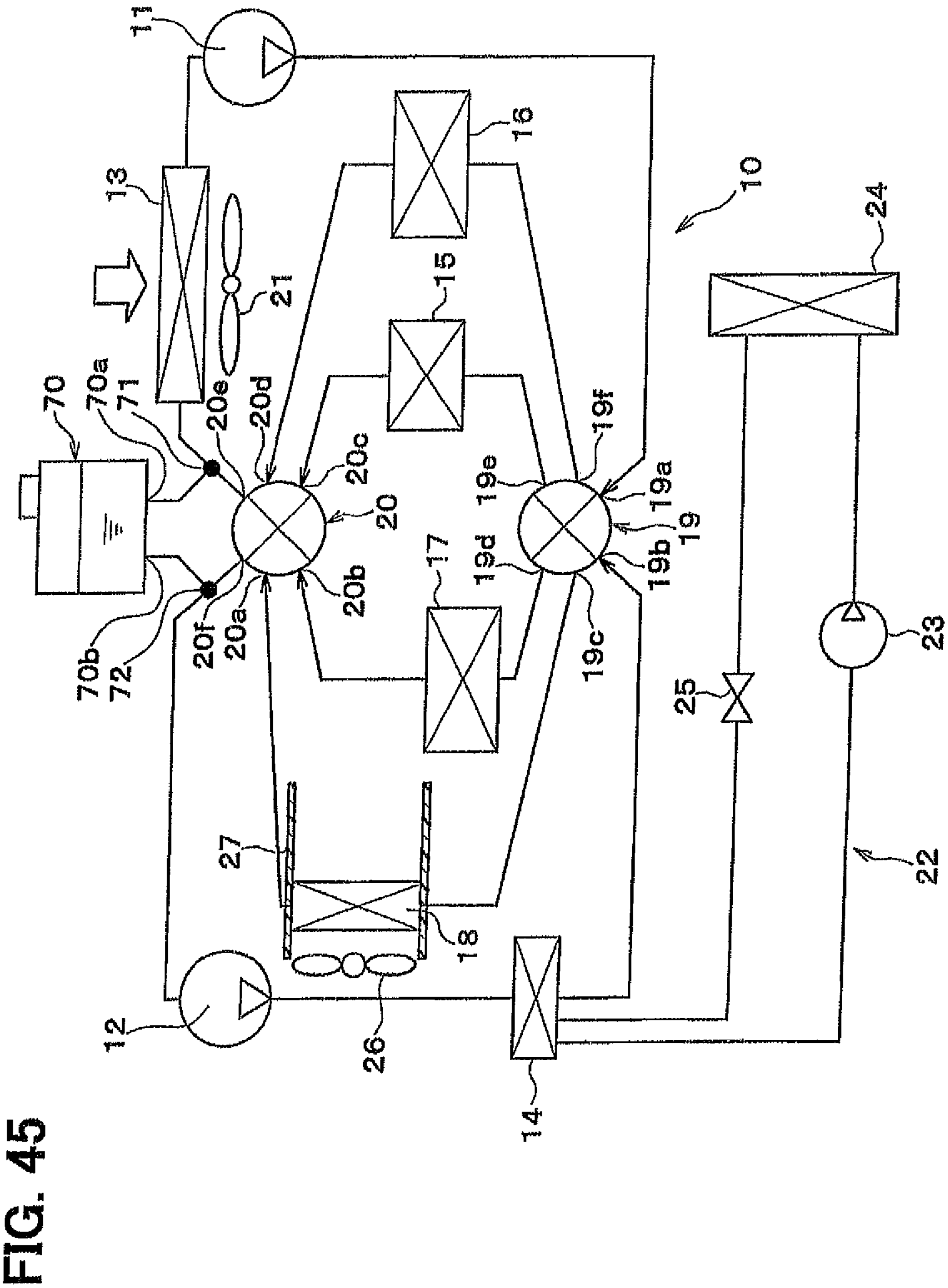
FIG. 45 is an entire configuration diagram of a vehicle cooling system according to a third reference example.

As shown in FIG. 45, a third reference example of the invention includes a coolant tank 70 for storing the coolant therein, in addition to the structure of the first reference example.

The coolant tank 70 is provided with a first coolant outlet/inlet 70*a* and a second coolant outlet/inlet 70*b*. The first coolant outlet/inlet 70*a* is connected to a first branch portion 71 provided between the outlet 20*e* of the second switching valve 20 and a coolant inlet side of the radiator 13. The second coolant outlet/inlet 70*b* is connected to a second branch portion 72 provided between an outlet 20*f* of the second switching valve 20 and a suction side of the second pump 12.

Thus, a coolant flow path of the first coolant circuit (coolant circuit on the first pump 11 side) on the suction side of the first pump 11 communicates with a coolant flow path of the second coolant circuit (coolant circuit on the second pump 12 side) on the suction side of the second pump 12 via the coolant tank 70.

In this embodiment, the first coolant circuit communicates with the second coolant circuits, which can equalize the internal pressure between the first and second coolant circuits.

Thus, a difference in pressure acting on a valve element inside each of the first and second switching valves 19 and 20 can be decreased to thereby prevent the leakage of the coolant in the switching valve.

For example, given that the first coolant circuit and the second coolant circuit communicate together on the discharge side of one pump as well as on the suction side of the other pump, the coolant circuit communicating on the suction side of the pump might have its internal pressure abnormally increased. In contrast, in this embodiment, the first coolant circuit and the second coolant circuit communicate with each other on the suction sides of both pumps, which can prevent the internal pressure of the coolant circuits from abnormally increasing, thereby facilitating the design of parts with good pressure resistance.

Fourth Reference Example

Figure 46:
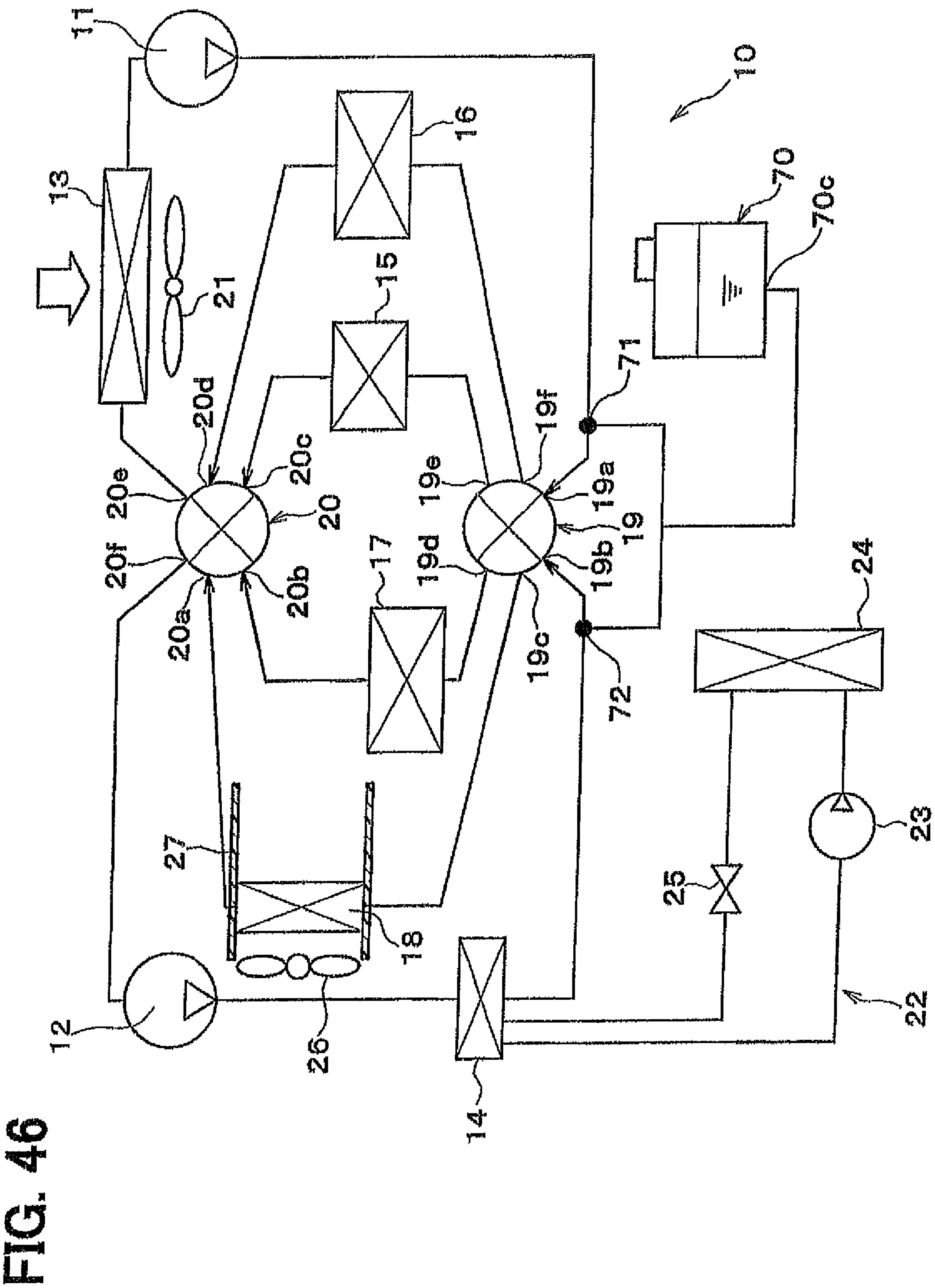
FIG. 46 is an entire configuration diagram of a vehicle cooling system according to a fourth reference example.

Although in the third reference example, the first coolant circuit and the second coolant circuit communicate with each other on the suction sides of both the pumps, in a fourth reference example of the invention, as shown in FIG. 46, the first coolant circuit and the second coolant circuit communicate with each other on the discharge sides of both the pumps.

Specifically, the first branch portion 71 of the first coolant circuit is provided between the discharge side of the first pump 11 and the inlet 19*a* of the first switching valve 19, and the second branch portion 72 of the second coolant circuit is provided between the discharge side of the second pump 12 and the inlet 19*b* of the first switching valve 19.

Although in the third reference example, the coolant tank 70 is provided with the first coolant outlet/inlet 70*a* for connection with the first coolant circuit, and the second coolant outlet/inlet 70*b* for connection with the second coolant circuit, in a fourth reference example, the coolant tank 70 is provided with one coolant outlet/inlet 70*c* connected to both the first and second coolant circuits.

Together with this, one coolant pipe connected to the coolant outlet/inlet 70*c* of the coolant tank 70 is branched from the coolant tank 70 side into two parts toward the first branch portion 71 and the second branch portion 72.

This embodiment can also obtain the same operation and effects as those of the third reference example described above.

Eighth Embodiment

An eighth embodiment of the invention specifically shows the structure of the coolant cooler 14 and condenser 50 in the first embodiment.

Figure 47:
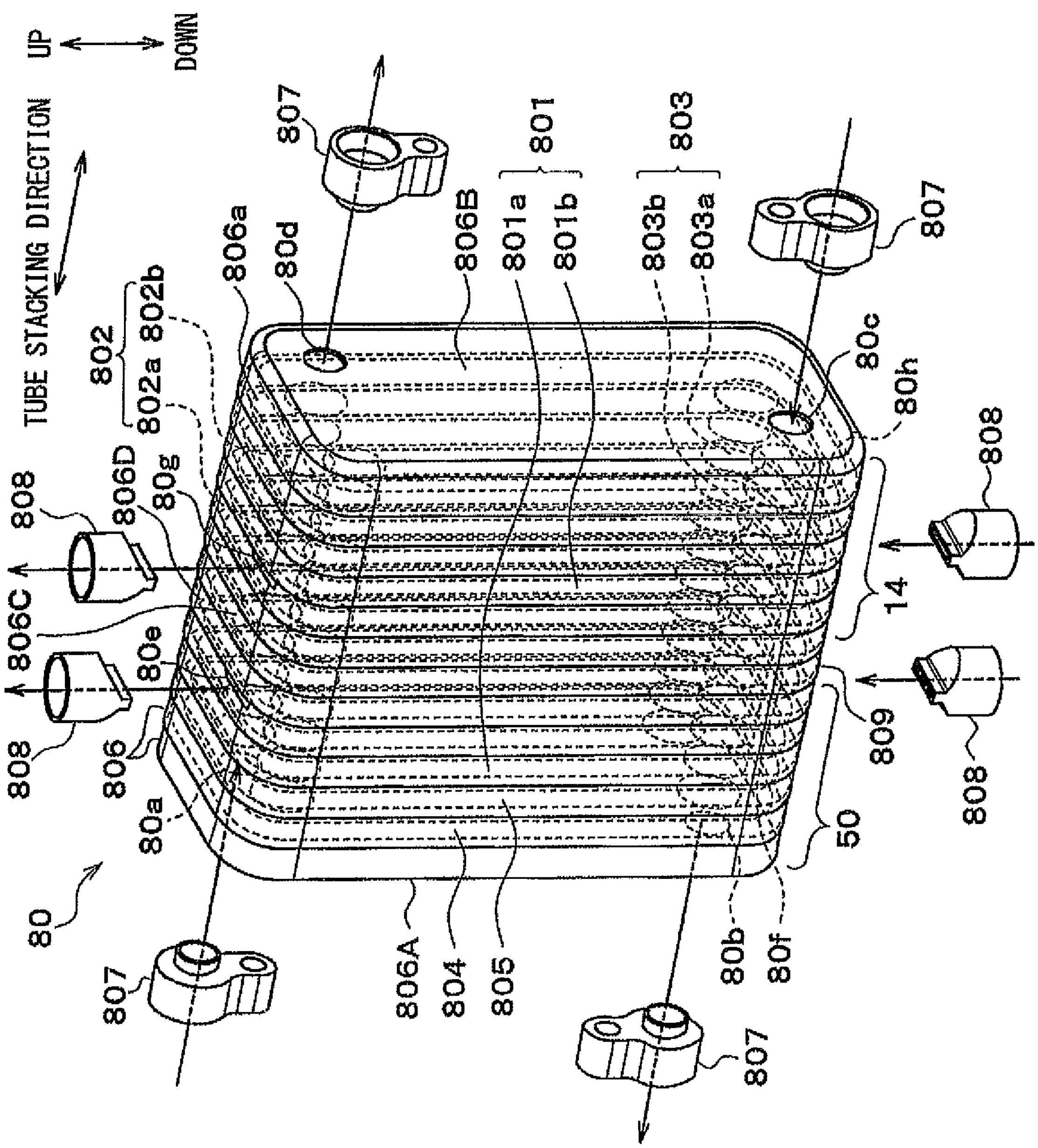
FIG. 47 is a perspective view showing a coolant cooler and a condenser in an eighth embodiment.
Figure 48:
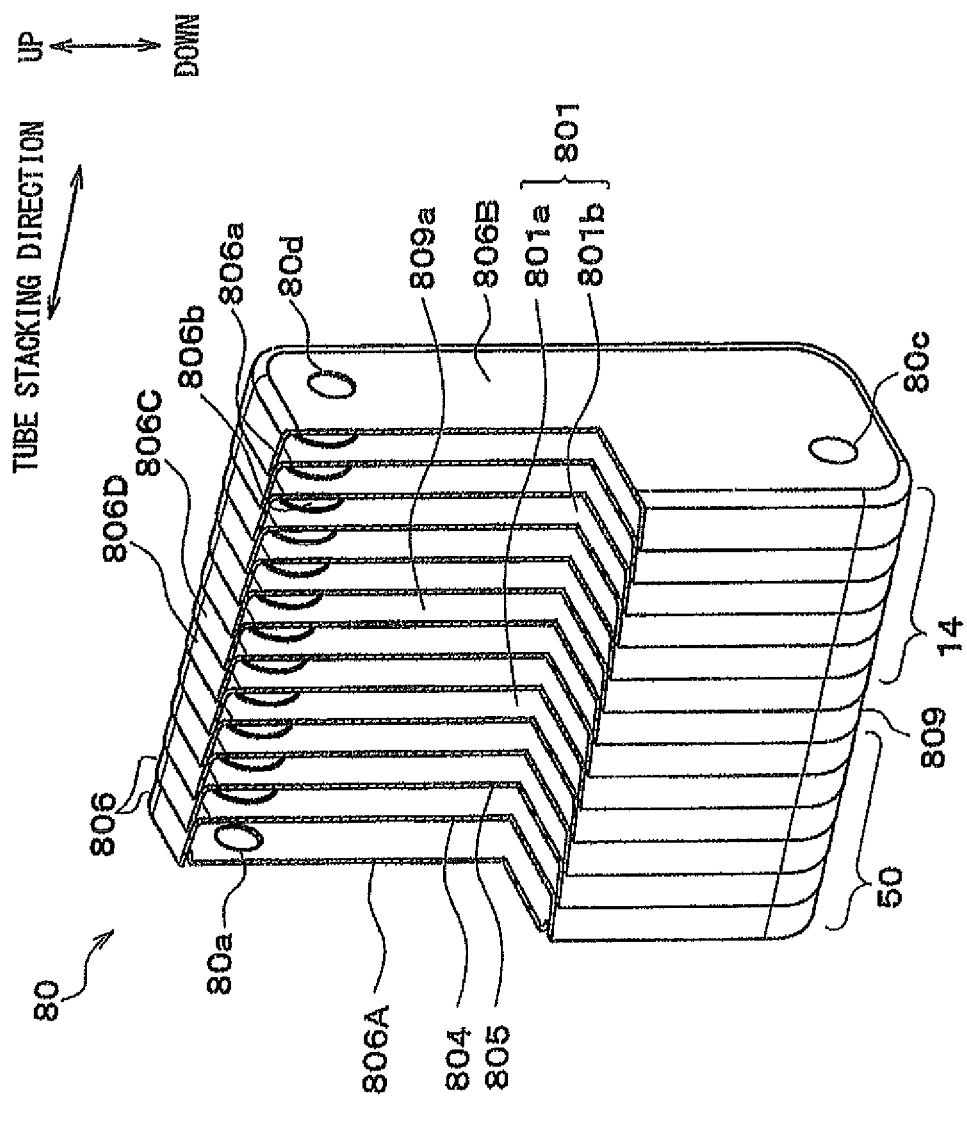
FIG. 48 is a perspective view of a cutout portion of parts of the coolant cooler and condenser shown in FIG. 47.

FIG. 47 shows a perspective view of a heat exchanger 80 including the coolant cooler 14 and the condenser 50. FIG. 48 shows a perspective view of a cutout portion of the structure shown in FIG. 47. The upward and downward arrows shown in FIGS. 47 and 48 indicate the vertical direction of the vehicle (or the direction of gravitational force).

The heat exchanger 80 includes a heat exchanging portion 801, an upper tank portion 802, and a lower tank portion 803. The heat exchanging portion 801 is formed by stacking (arranging in parallel) a plurality of tubes 804 for the coolant and a plurality of tubes 805 for the refrigerant. The stacking direction of the tubes 804 for the coolant and the tubes 805 for the refrigerant (namely, the left-right direction shown in FIGS. 47 and 48) is hereinafter referred to as a "stacking direction of the tubes". In this example, the tubes 804 for the coolant and the tubes 805 for the refrigerant are alternately stacked on each other.

The upper tank portion 802 includes a tank space 802*a* for an upper coolant (tank space for a heat medium), and a tank space 802*b* for an upper refrigerant. The tank space 802*a* for the upper coolant is adapted to collect the coolants for a plurality of tubes 804 for the coolant. The tank space 802*b* for the upper refrigerant is adapted to distribute and collect the coolant with respect to a plurality of tubes 805 for the refrigerant.

The lower tank portion 803 includes a tank space 803*a* for a lower coolant (tank space for a heat medium), and a tank space 803*b* for a lower refrigerant. The tank space 803*a* for the lower refrigerant is adapted to distribute the coolant to a plurality of tubes 804 for the coolant. The tank space 803*b* for the lower refrigerant is adapted to distribute the coolant and collect the coolants for a plurality of tubes 805 for the refrigerant.

The tank space 802*a* for the upper coolant and the tank space 803*a* for the lower coolant are diagonally positioned as viewed from the tube stacking direction. The tank space 802*b* for the upper refrigerant and the tank space 803*b* for the lower refrigerant are diagonally positioned as viewed from the tube stacking direction.

The heat exchanger 80 is mounted on the vehicle such that the longitudinal direction of each of the tubes 804 for the coolant and the tubes 805 for the refrigerant (hereinafter referred to as a tube longitudinal direction) conforms to the vertical direction of the vehicle (or the direction of gravitational force).

The heat exchanger 80 is formed by stacking and bonding a number of plate members 806 in the tube stacking direction. The plate member 806 is a plate having a substantially elongated rectangular shape, and formed, for example, using a both-sided clad material including an aluminum center layer with both sides thereof clad with brazing.

An overhanging portion 806*a* is formed at the outer peripheral edge of the substantially rectangular plate member 806. The overhanging portion 806*a* protrudes in the direction perpendicular to the plate surface of the plate member 806 (in the tube stacking direction). A number of plate members 806 are stacked on each other with the respective overhanging portions 806*a* bonded together by brazing.

The arrangement directions of the plate members 806 (the directions in which protruding tips of the overhanging portions 806*a* are oriented) are the same except for one plate member 806A positioned at one end in the tube stacking direction (on the left end shown in FIGS. 47 and 48).

The respective tank spaces 802*a*, 802*b*, 803*a*, and 803*b* are formed by cylindrical portions 806*b* of the plate members 806. Each cylindrical portion 806*b* cylindrically protrudes in the direction opposite to the protruding direction of the overhanging portion 806*a*. The cylindrical portion 806*b* has a communication hole formed therein.

The cylindrical portion 806*b* of the plate member 806 is formed such that the tank spaces 802*a* and 803*a* for the coolant do not communicate with the tube 805 for the refrigerant, and such that the tube 804 for the coolant does not communicate with the tank spaces 802*b* and 803*b* for the refrigerant.

One side part of the heat exchanger 80 in the tube stacking direction (left part shown in FIGS. 47 and 48) constitutes the condenser 50, whereas the other side part of the heat exchanger 80 in the tube stacking direction (right part shown in FIGS. 47 and 48) constitutes the coolant cooler 14.

The plate member 806A positioned on one end in the tube stacking direction (on the left end shown in FIGS. 47 and 48) is provided with a refrigerant inlet 80*a* of the condenser 50 and a refrigerant outlet 80*b* of the condenser 50. The refrigerant inlet 80*a* of the condenser 50 communicates with the tank space 802*b* for the upper refrigerant. The refrigerant outlet 80*b* of the condenser 50 communicates with the tank space 803*b* for the lower refrigerant.

Connectors 807 for the refrigerant are respectively attached to the refrigerant inlet 80*a* and refrigerant outlet 80*b* of the condenser 50. A connector 807 for the refrigerant is formed by cutting or the like, and bonded to the plate member 806 by brazing.

The plate member 806B positioned on the other end in the tube stacking direction (on the right end shown in FIGS. 47 and 48) is provided with a refrigerant inlet 80*c* of the coolant cooler 14 and a refrigerant outlet 80*d* of the coolant cooler 14. The refrigerant inlet 80*c* of the coolant cooler 14 communicates with the tank space 803*b* for the lower refrigerant. The refrigerant outlet 80*d* of the coolant cooler 14 communicates with the tank space 802*b* for the upper refrigerant. Other connectors 807 for the refrigerant are respectively attached to the refrigerant inlet 80*c* and refrigerant outlet 80*d* of the coolant cooler 14.

The overhanging portion 806*a* of the plate member 806 on the condenser 50 side has on its upper surface, a coolant outlet 80*e* of the condenser 50. The overhanging portion 806*a* of the plate member 806 on the condenser 50 side has on its lower surface, a coolant inlet 80*f* of the condenser 50. Thus, the coolant outlet 80*e* and coolant inlet 80*f* of the condenser 50 are opened in the longitudinal direction of the tubes.

The coolant outlet 80*e* of the condenser 50 communicates with the tank space 802*a* for the upper coolant. The coolant inlet 80*f* of the condenser 50 communicates with the tank space 803*a* for the lower coolant. Other connectors 808 for the coolant are respectively attached to the coolant outlet 80*e* and coolant inlet 80*f* of the condenser 50. Each of connectors 808 for the coolant is formed by cutting or the like, and bonded to the plate member 806 by brazing.

The overhanging portion 806*a* of the plate member 806 on the coolant cooler 14 side has on its upper surface, a coolant outlet 80*g* of the coolant cooler 14. The overhanging portion 806*a* of the plate member 806 on the coolant cooler 14 side has on its lower surface, a coolant inlet 80*h* of the coolant cooler 14. Thus, the coolant outlet 80*g* and coolant inlet 80*h* of the coolant cooler 14 are opened in the longitudinal direction of the tubes.

The coolant outlet 80*g* of the coolant cooler 14 communicates with the tank space 802*a* for the upper coolant. The coolant inlet 80*h* of the coolant cooler 14 communicates with the tank space 803*a* for the lower coolant. Other connectors 808 for the coolant are respectively attached to the coolant outlet 80*g* and coolant inlet 80*h* of the coolant cooler 14.

The coolant inlets 80*f* and 80*h* and coolant outlets 80*e* and 80*g* are formed by holes formed in the overhanging portions 806*a* of the plate members 806.

Although in this example, the coolant inlets 80*f* and 80*h* and the coolant outlets 80*e* and 80*g* are opened in the tube longitudinal direction, the coolant inlets 80*f* and 80*h* and the coolant outlets 80*e* and 80*g* may be opened in the direction perpendicular to both the tube longitudinal direction and the tube stacking direction. That is, the coolant inlets 80*f* and 80*h* and coolant outlets 80*e* and 80*g* may be formed in a side surface of the overhanging portion 806*a* in the plate member 806.

A cavity formation portion 809 is formed at the boundary between the condenser 50 and the coolant cooler 14. The cavity formation portion 809 is provided with a cavity 809*a* into which both the coolant and refrigerant do not flow.

Specifically, the cavity formation portion 809 is formed by closing the cylindrical portion 806*b* of a plate member 806C positioned at a boundary between the condenser 50 and the coolant cooler 14, and bonding the plate member 806C positioned at the boundary to an adjacent plate member 806D.

The cavity 809*a* serves to suppress the heat transfer between a condenser heat exchanging portion (first heat exchanging portion) 801*a* of the heat exchanging portion 801 forming the condenser 50, and a coolant cooler heat exchanging portion (second heat exchanging portion) 801*b* of the heat exchanging portion 801 forming the coolant cooler 14.

A recessed portion may be formed in a plate surface of the plate member 806C positioned at the boundary between the condenser 50 and the coolant cooler 14, and abutted against and bonded to the adjacent plate member 806D. The recessed portion can be formed in various shapes, including a shape extending in the tube longitudinal direction, a shape extending in the tube short direction, and the like.

Figure 49:
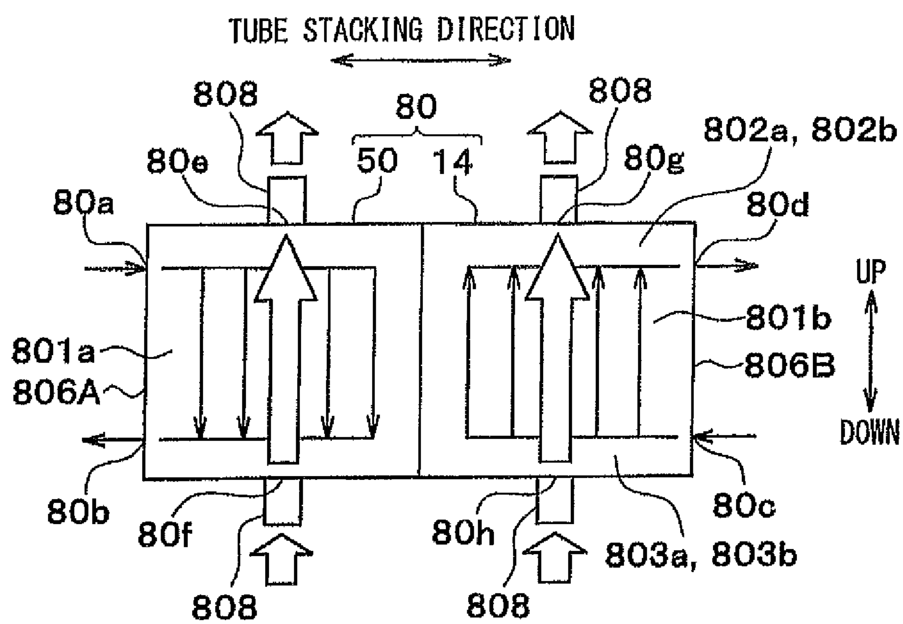
FIG. 49 is a front view of the coolant cooler and condenser shown in FIG. 47.

FIG. 49 shows an exemplary diagram of the flow of coolant and the flow of refrigerant in the heat exchanger 80. In the coolant cooler 14, the coolant flows from the coolant inlet 80*h* into the tank space 803*a* for the lower coolant. In the tank space 803*a* for the lower coolant, the coolant is then distributed to the tubes for the coolant of the coolant cooler heat exchanging portions 801*b* in the tank space 803*a* for the lower coolant. After flowing through the tubes for the coolant of the coolant cooler heat exchanging portion 801*b*, the coolants are collected into the tank space 802*a* for the upper coolant to flow out of the coolant outlet 80*g*.

In the coolant cooler 14, the refrigerant flows from the refrigerant inlet 80*d* into the tank space 803*b* for the lower refrigerant. In the tank space 803*b* for the lower refrigerant, the refrigerant is then distributed to the tubes for the refrigerant of the coolant cooler heat exchanging portion 801*b*. After flowing through the tubes for the refrigerant of the coolant cooler heat exchanging portion 801*b*, the coolants are collected into the tank space 802*b* for the upper refrigerant to flow out of the refrigerant outlet 80*c*.

In the condenser 50, the coolant flows from the coolant inlet 80*f* into the tank space 803*a* for the lower coolant. In the tank space 803*a* for the lower coolant, the coolant is then distributed to the tubes for the coolant of the condenser heat exchanging portion 801*a*. After flowing through the tubes for the coolant of the condenser heat exchanger 801*a*, the coolants are collected into the tank space 802*a* for the upper coolant to flow out of the coolant outlet 80*e*.

In the condenser 50, the refrigerant flows from the refrigerant inlet 80*a* into the tank space 802*b* for the upper refrigerant. In the tank space 802*b* for the upper refrigerant, the refrigerant is then distributed to the tubes for the refrigerant of the condenser heat exchanging portion 801*a*. After flowing through the tubes for the refrigerant of the condenser heat exchanging portion 801*a*, the refrigerants are collected into the tank space 803*b* for the lower refrigerant to flow out of the refrigerant outlet 80*b*.

Figure 50:
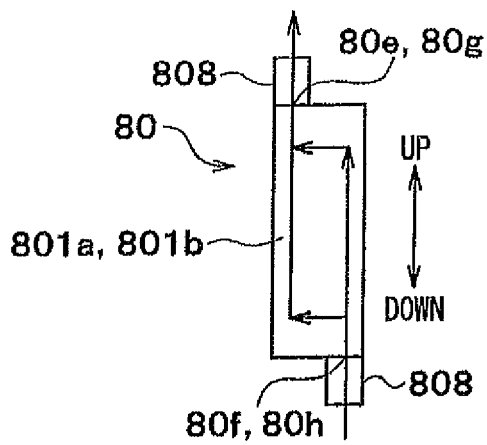
FIG. 50 is a side view of the coolant cooler and condenser shown in FIG. 47.
Figure 51:
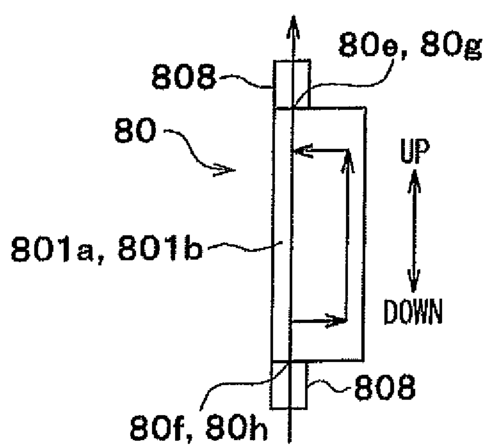
FIG. 51 is a side view of a coolant cooler and a condenser in a first modified example of the eighth embodiment.

As shown in FIG. 50, the coolant inlets 80*f* and 80*h* are diagonally disposed with respect to the coolant outlets 80*e* and 80*g* as viewed in the tube stacking direction, which results in improved distribution of the coolant to the tubes for the coolant. In a modified example shown in FIG. 51, the coolant inlets 80*f* and 80*h* and the coolant outlets 80*e* and 80*g* may be located in the same position in the thickness direction of the heat exchanger 80 as viewed in the tube stacking direction.

In an example shown in FIG. 49, the coolant inlets 80*f* and 80*h* and the coolant outlets 80*e* and 80*g* are located in the same position in the tube stacking direction as viewed from the front surface direction (specifically, the direction perpendicular to the paper surface of FIG. 49). In contrast, in a modified example shown in FIG. 52, the coolant inlets 80*f* and 80*h* are diagonally disposed with respect to the coolant outlets 80*e* and 80*g* as viewed from the front surface direction (in the direction perpendicular to both the tube stacking direction and the longitudinal direction of the tube), which results in improved distribution of the coolant to the tubes for the coolant.

Like the above first embodiment, in this embodiment, the coolant inlets 80*f* and 80*h* and the coolant outlets 80*e* and 80*g* are disposed between the plate members 806A and 806B positioned on both ends of the tank portions 802 and 803 in the stacking direction of tubes, which can increase the flexibility in connection of pipes and arrangement of the heat exchangers.

Preferably, the coolant inlets 80*f* and 80*h* are disposed in the lower tank portion 803, and the coolant outlets 80*e* and 80*g* are disposed in the upper tank portion 802. The coolant flows from the lower side to the upper side, making it easier to release air mixed in the coolant.

In the heat exchanging portion 801*a* of the condenser 50, the refrigerant flow is desirably a descending flow or horizontal flow. The flow direction of the refrigerant is identical to the dropping direction of a condensed liquid, so that the refrigerant can flow smoothly without interruption of the drop of the condensed liquid by the refrigerant flow.

In the coolant cooler 14, the refrigerant inlet 80*c* is preferably disposed in the lower tank portion 803 with improved distribution of the coolant.

Figure 52:
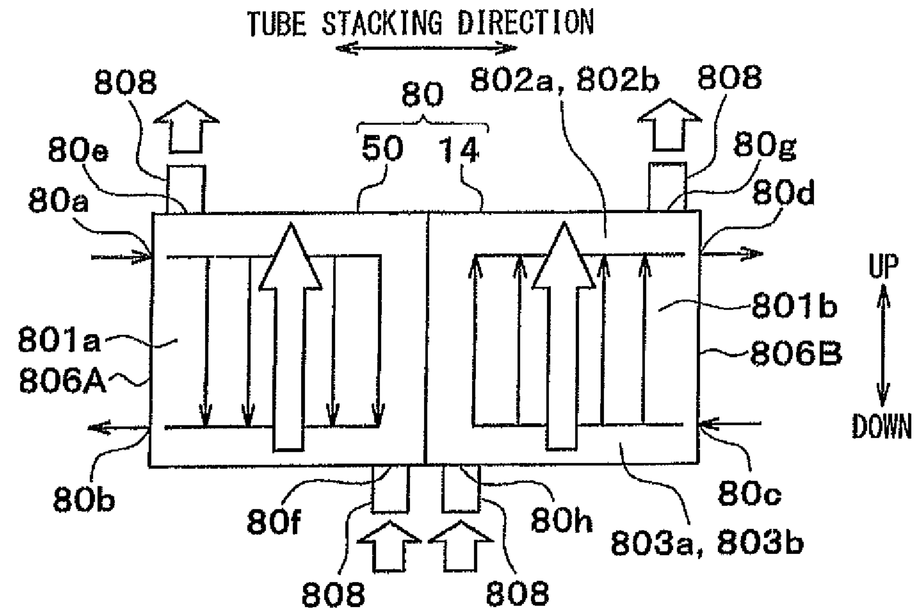
FIG. 52 is a front view of a coolant cooler and a condenser in a second modified example of the eighth embodiment.
Figure 53:
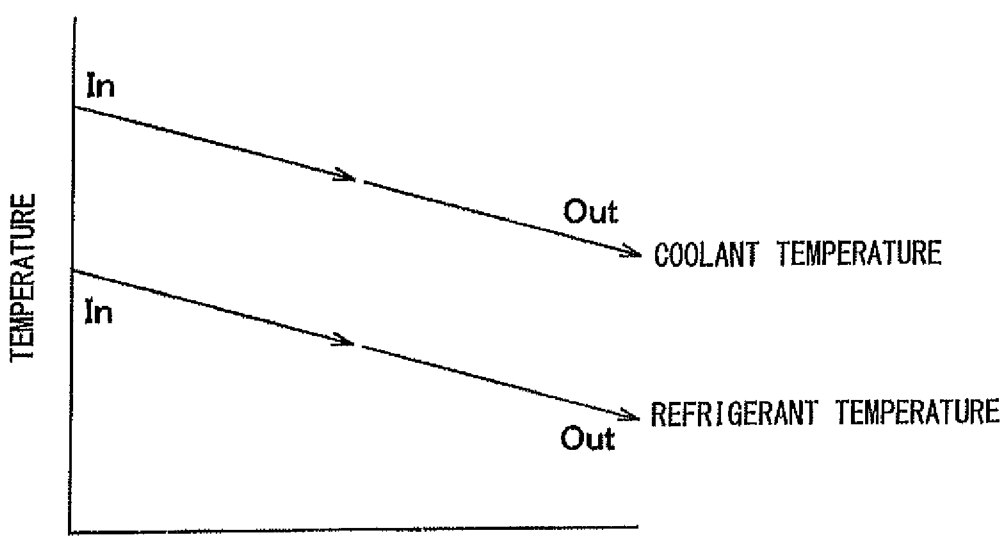
FIG. 53 is a graph showing the performances of the coolant cooler and condenser shown in FIG. 52.

In an accumulator cycle, as shown in FIGS. 49 and 52, the coolant and the refrigerant preferably flow through the coolant cooler 14 in the same direction. As illustrated in FIG. 53, good performance can be obtained.

The accumulator cycle is a refrigeration cycle in which an accumulator (gas-liquid separator) is disposed on the suction side of a compressor.

Figure 54:
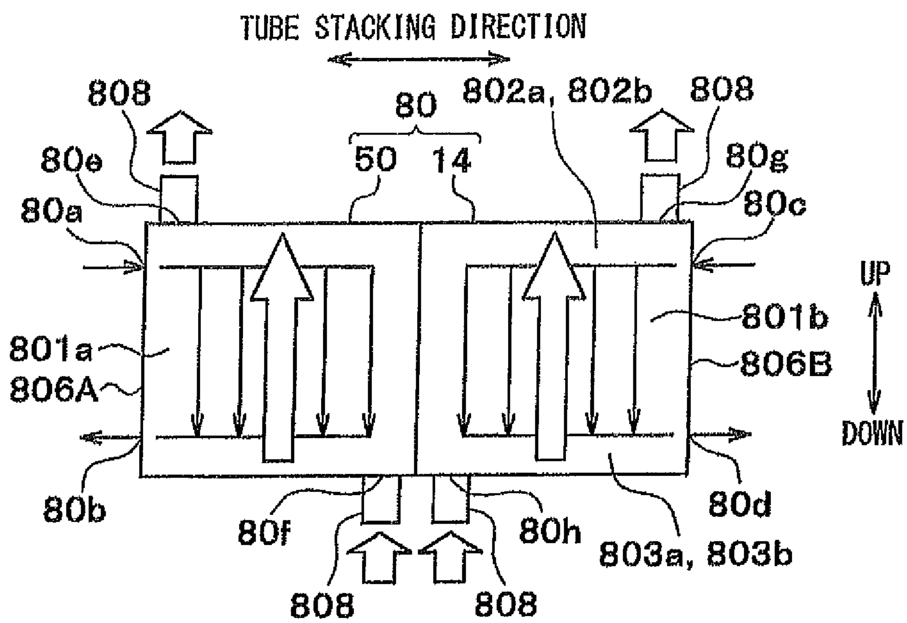
FIG. 54 is a front view of a coolant cooler and a condenser in a third modified example of the eighth embodiment.

In a modified example shown in FIG. 54, the refrigerant inlet 80*c* and the refrigerant outlet 80*d* are reversed in position with respect to the example shown in FIG. 52. That is, the refrigerant inlet 80*c* is disposed in the upper tank portion 802, while the refrigerant outlet 80*d* is disposed in the lower tank portion 803.

Figure 55:
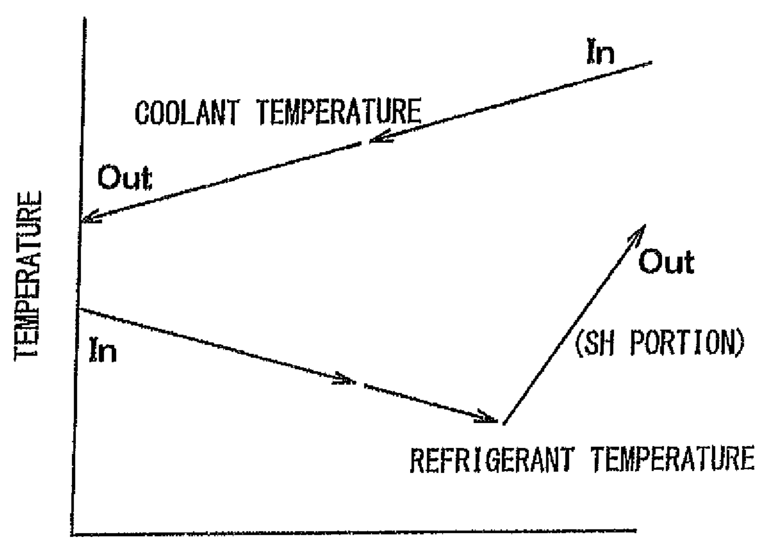
FIG. 55 is a graph showing the performances of the coolant cooler and condenser shown in FIG. 54.

In a receiver cycle, as shown in FIG. 54, the coolant and the refrigerant preferably flow through the coolant cooler 14 in opposite directions to each other. As illustrated in FIG. 55, good performance can be obtained. In this case, in order to suppress the deterioration of distribution of the refrigerant, the number of tubes for the refrigerant (or the number of paths) is preferably increased.

The receiver cycle is a refrigeration cycle in which a receiver (liquid receiver) is disposed between a radiator and an expansion valve.

The coolant inlets 80*f* and 80*h*, and the coolant outlets 80*e* and 80*g* may be reversed in position with respect to this embodiment. Alternatively, the coolant inlets 80*f* and 80*h* and the coolant outlets 80*e* and 80*g* may be reversed in position, and the refrigerant inlets 80*a* and 80*c* and the refrigerant outlets 80*b* and 80*d* may also be reversed in position.

At least one of the coolant inlets 80*f* and 80*h*, the coolant outlets 80*e* and 80*g*, the refrigerant inlets 80*a* and 80*c*, and the refrigerant outlets 80*b* and 80*d* is disposed between both ends of each of the tank portions 802 and 803 in the tube stacking direction, which can increase the flexibility in connection of the pipes and arrangement of the heat exchangers as compared to the case where all the inlets and outlets are disposed at either of the plate members 806A and 806B positioned on both ends of the tank portions 802 and 803.

In this embodiment, the cavity 809*a* is formed between the condenser 50 and the coolant cooler 14, thereby suppressing the heat transfer between the condenser 50 and the coolant cooler 14. In the heat exchanging portion 801*a* of the condenser 50, the tube located closest to the coolant cooler 14 may serve as a tube for the coolant so as to suppress the heat transfer between the condenser 50 and the coolant cooler 14. Likewise, in the heat exchanging portion 801*b* of the coolant cooler 14, the tube located closest to the condenser 50 may serve as a tube for the coolant so as to suppress the heat transfer between the condenser 50 and the coolant cooler 14.

That is, the tube for the refrigerant of the condenser 50 is not disposed adjacent to the tube for the refrigerant of the coolant cooler 14, which can suppress the heat transfer between the condenser 50 and the coolant cooler 14.

Ninth Embodiment

Figure 56:
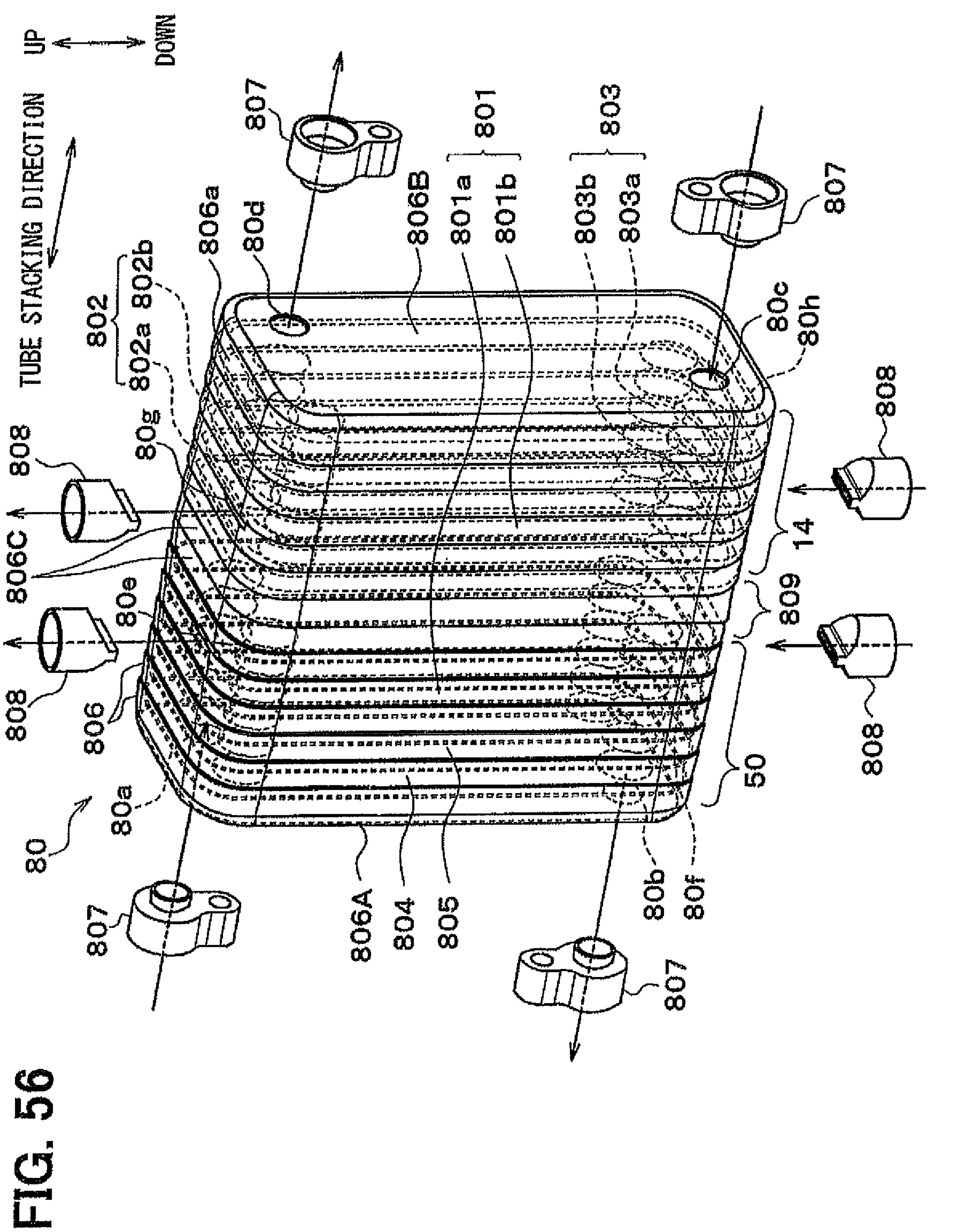
FIG. 56 is a perspective view showing a coolant cooler and a condenser in a ninth embodiment.
Figure 57:
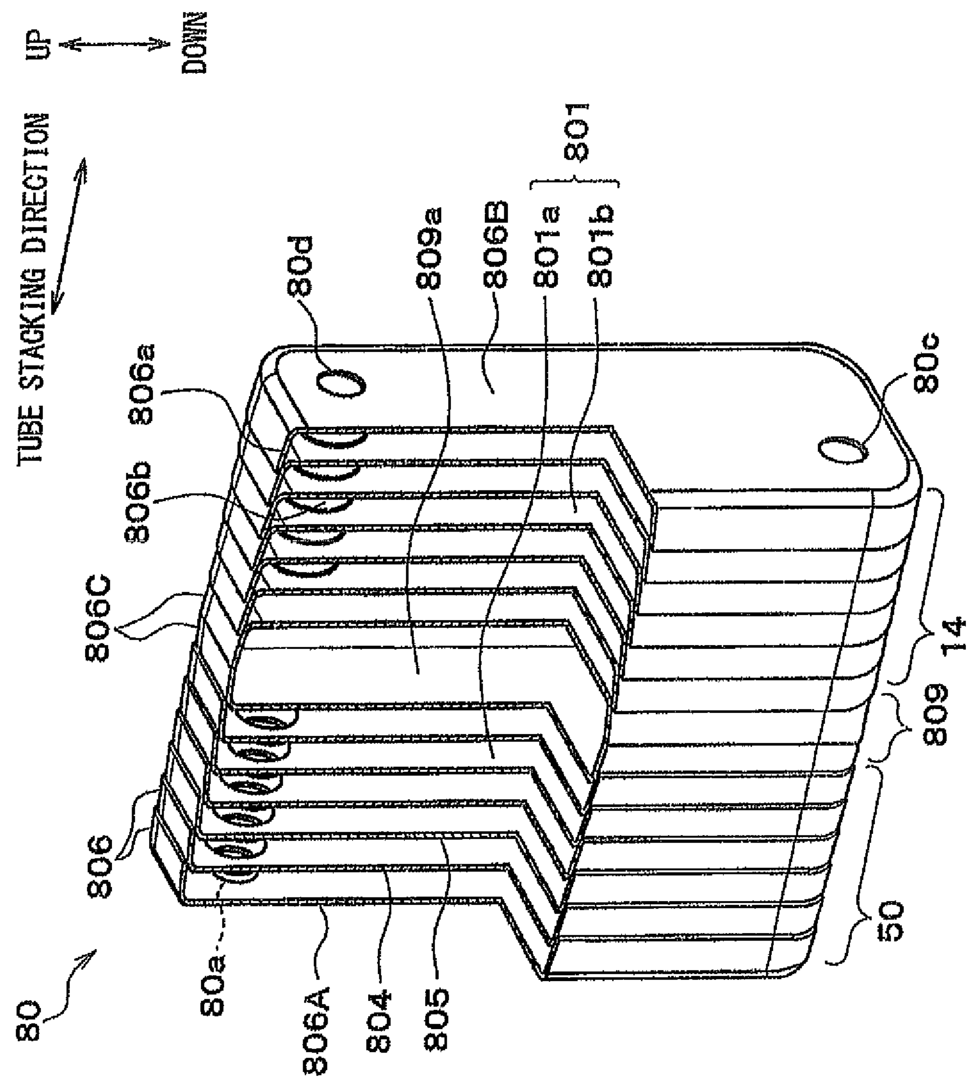
FIG. 57 is a perspective view of cutout parts of the coolant cooler and condenser shown in FIG. 56.

Although in the eighth embodiment, a number of plate members 806 are oriented in the same direction except for the plate member 806A located on one end in the tube stacking direction, in a ninth embodiment, as shown in FIGS. 56 and 57, the plate members 806 are oriented in opposite directions with the cavity formation portion 809 centered therebetween.

The cavity formation portion 809 is formed by stacking two plate members 806C together with the respective protruding tips of the overhanging portions 806*a* abutted against each other. Thus, the cavity 809*a* is formed between the two plate members 806C.

The plate members 806 on the condenser 50 side and the plate members 806 on the coolant cooler 14 side are stacked together with the respective protruding tips of the overhanging portions 806*a* directed toward the cavity formation portion 809. In other words, the plate members 806 on the condenser 50 side and the plate members 806 on the coolant cooler 14 side are disposed opposite (symmetrically) to each other in the tube stacking direction.

The two plate members 806C are bonded together to form the cavity formation portion 809. With this arrangement, even in case of breakage of the connection between the two plate members 806C due to thermal strain, the leak of the coolant and refrigerant can be prevented.

Margins for brazing of the two plate members 806C preferably have a longer length in a longitudinal direction of the plate member 806 (or in the tube longitudinal direction) than another length in a short-direction of the plate member 806 (or in the tube short direction). As the margin for brazing becomes longer, the amount of extension of the plate member becomes more, so that the plate member is more likely to be broken. By setting the margin for brazing in the longitudinal direction of the plate member 806 longer than that in the short direction thereof, the breakage due to the thermal strain can be suppressed.

Alternatively, recessed portions may be formed at the plate surfaces of the two plate members 806C to be abutted against each other, and then the two recessed portions of the two plate members 806C may be bonded together. The recessed portion may be formed in various shapes, including a shape extending in the tube longitudinal direction, a shape extending in the tube short direction, and the like.

Tenth Embodiment

Figure 58:
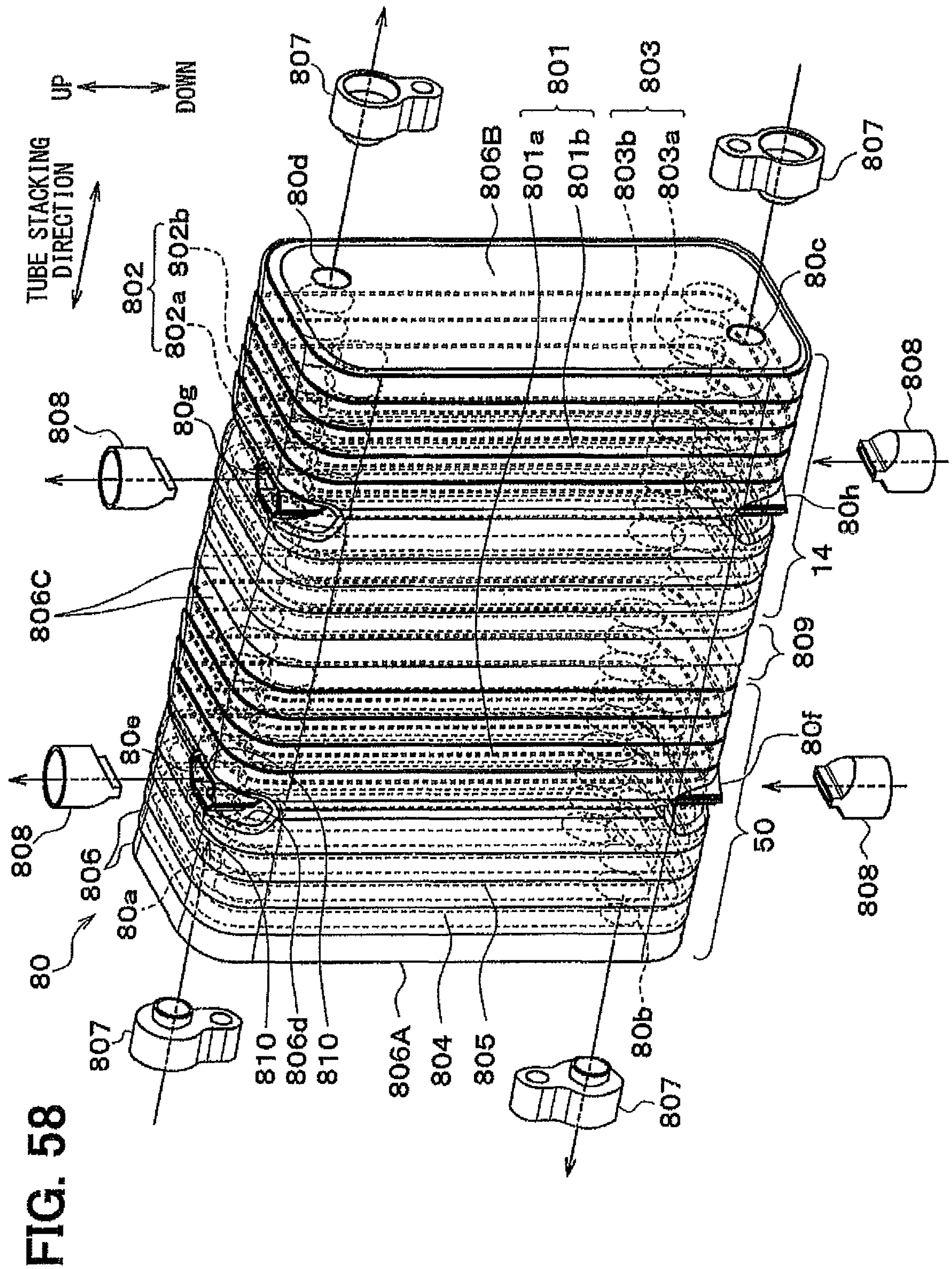
FIG. 58 is a perspective view showing a coolant cooler and a condenser in a tenth embodiment.
Figure 59:
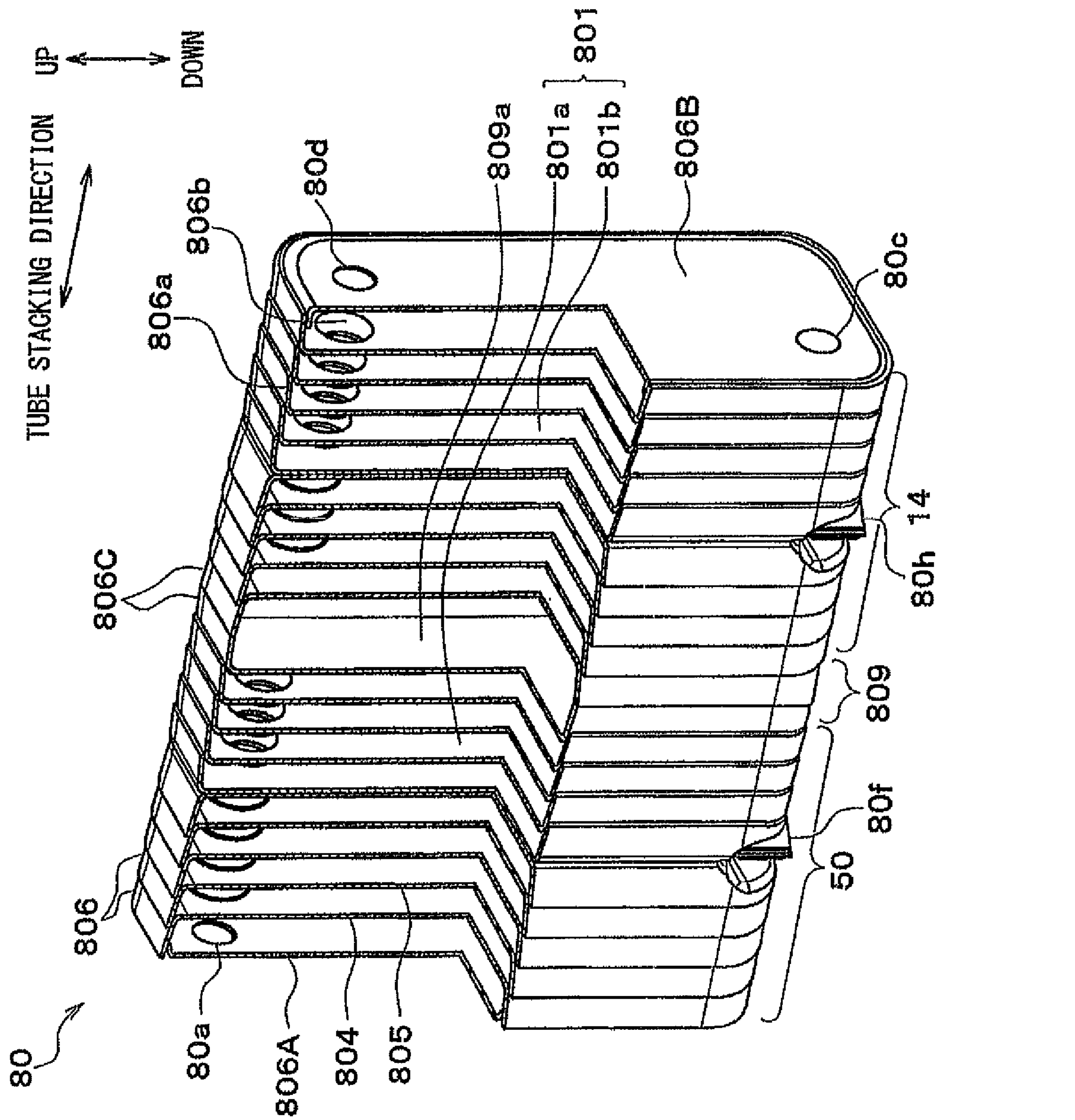
FIG. 59 is a perspective view of cutout parts of the coolant cooler and condenser shown in FIG. 58.

Although in the above eighth embodiment, the coolant inlets 80*f* and 80*h* and the coolant outlets 80*e* and 80*g* are composed of holes formed in the overhanging portions 806*a* of the plate members 806, in a tenth embodiment, as shown in FIGS. 58 and 59, the coolant inlets 80*f* and 80*h*, as well as the coolant outlets 80*e* and 80*g* are formed of a pair of openings independently formed from the plate members 806.

Each opening formation member 810 is formed of a semi-cylindrical plate material. Specifically, the opening formation member 810 is formed using a both-sided clad material including an aluminum center layer with both sides thereof clad with brazing. The pair of opening formation members 810 are bonded together to form a cylindrical member. The openings formed in the cylindrical member constitute the coolant inlets 80*f* and 80*h* and the coolant outlets 80*e* and 80*g*.

In this example, the pair of opening formation members 810 are stacked on each other in the tube stacking direction. The internal space of the cylindrical member formed by the pair of opening formation members 810 communicates with the tank spaces 802*a* and 803*a* for the coolant.

The pair of opening formation members 810 are bonded to the plate members 806 by brazing while being inserted into recessed portions 806*d* formed at the upper and lower edges of the plate member 806 (edges on both ends in the tube longitudinal direction).

The plate members 806 are disposed in opposite directions with the opening formation member 810 centered therebetween. Specifically, the plate member 806 is disposed such that the protruding tip of the overhanging portion 806*a* is directed opposite to the opening formation member 810.

Like the ninth embodiment, the plate members 806 are disposed in the opposite (symmetrical) directions to each other with the cavity formation portion 809 centered.

According to this embodiment, the opening area of each of the coolant inlets 80*f* and 80*h* and the coolant outlets 80*e* an 80*g* can be increased to achieve good inflow and outflow of the coolant as compared to the above eighth embodiment.

Eleventh Embodiment

Figure 60:
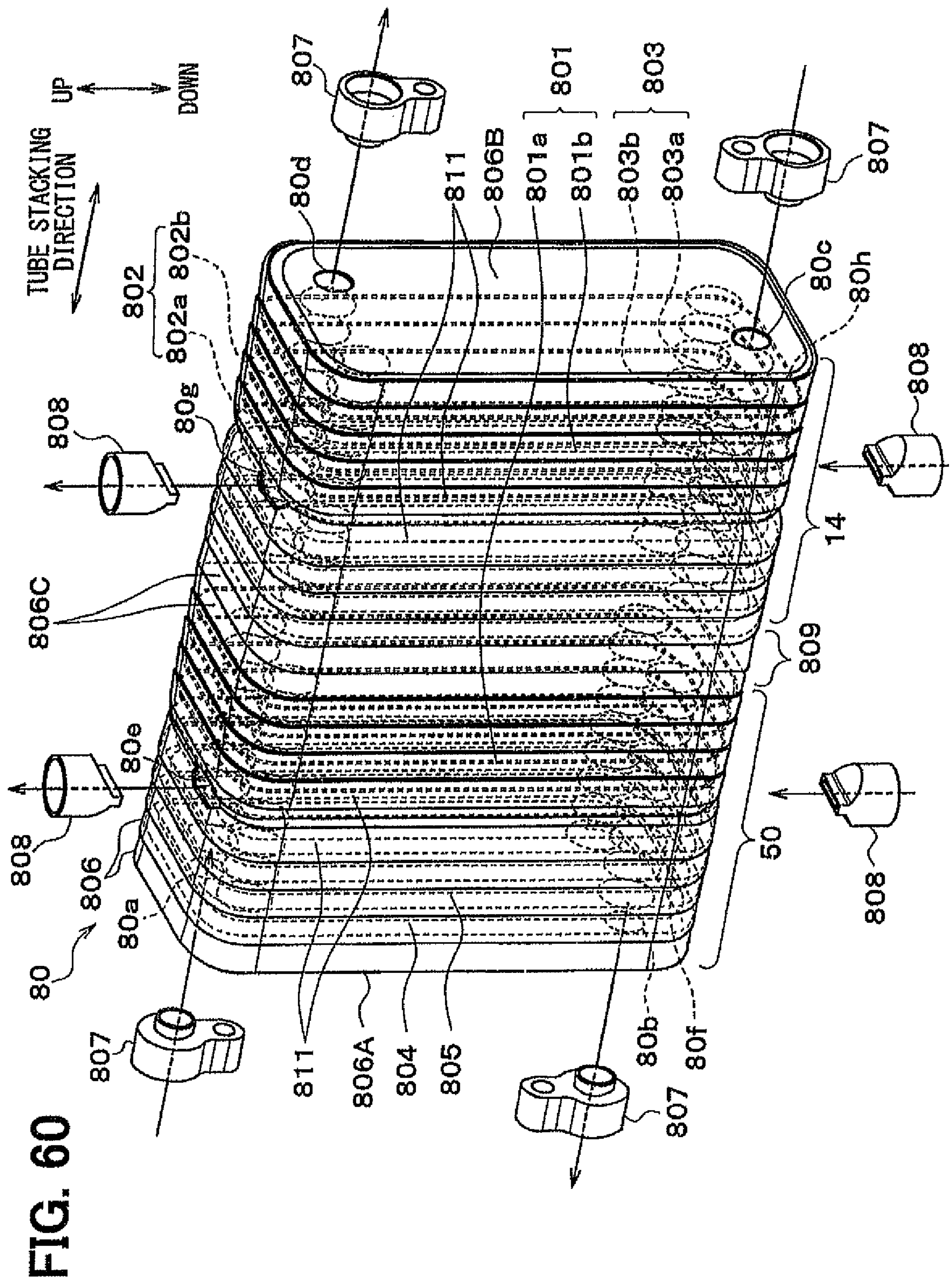
FIG. 60 is a perspective view showing a coolant cooler and a condenser in an eleventh embodiment.
Figure 61:
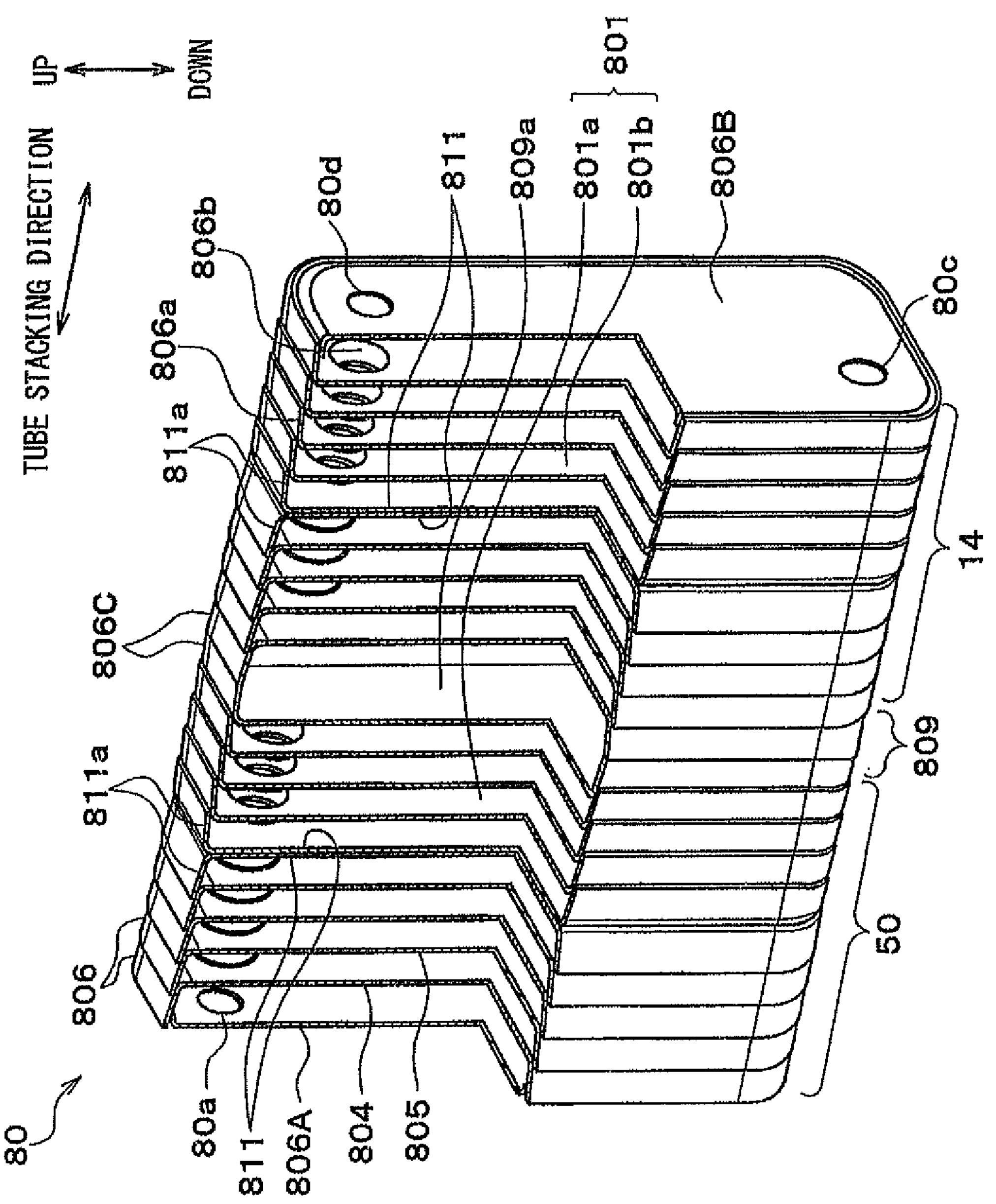
FIG. 61 is a perspective view of cutout parts of the coolant cooler and condenser shown in FIG. 60.

Although in the above tenth embodiment, the pair of opening formation members 810 are inserted into the upper edge and lower edge of the plate member 806, in an eleventh embodiment, as shown in FIGS. 60 and 61, a pair of opening formation members 811 (multiple members) extend from the upper end to lower end of the plate member 806 to be stacked while being sandwiched between the plate members 806.

Each opening formation member 811 is formed of a plate material with a substantially elongated rectangular shape which is the same as that of the plate member 806. Specifically, the opening formation member 811 is formed using a both-sided clad material including an aluminum center layer with both sides thereof clad with brazing.

An overhanging portion 811*a* is formed at the outer peripheral edge of the substantially rectangular opening formation member 811. The overhanging portion 806*a* protrudes in the direction perpendicular to the plate surface of the opening formation member 811 (in the tube stacking direction). Specifically, a pair of opening formation members 811 is disposed such that the respective protruding tips of the overhanging portions 811*a* are directed opposite to each other.

The plate members 806 are disposed in opposite directions with the pair of opening formation member 811 centered therebetween. The plate members 806 and opening formation member 811 are stacked on each other such that the protruding tips of the overhanging portions 806*a* and 811*a* are oriented in the same direction, whereby the overhanging portions 806*a* and 811*a* are bonded together by brazing.

The pair of opening formation members 811 is provided with recessed portions at its upper edge and lower edge (at both edges in the tube longitudinal direction). The recessed portions are superimposed on each other to form openings, which include any one of the coolant inlets 80*f* and 80*h* and the coolant outlets 80*e* and 80*g*.

Like the tenth embodiment, the plate members 806 are disposed in the opposite (symmetrical) directions to each other with the cavity formation portion 809 centered.

In this embodiment, the plate opening formation members 811 are stacked on each other like the plate member 806, whereby the coolant inlets 80*f* and 80*h* and the coolant outlets 80*e* and 80*g* can be formed. Thus, the heat exchanger of this embodiment can be more easily manufactured than that of the tenth embodiment.

Twelfth Embodiment

Figure 62:
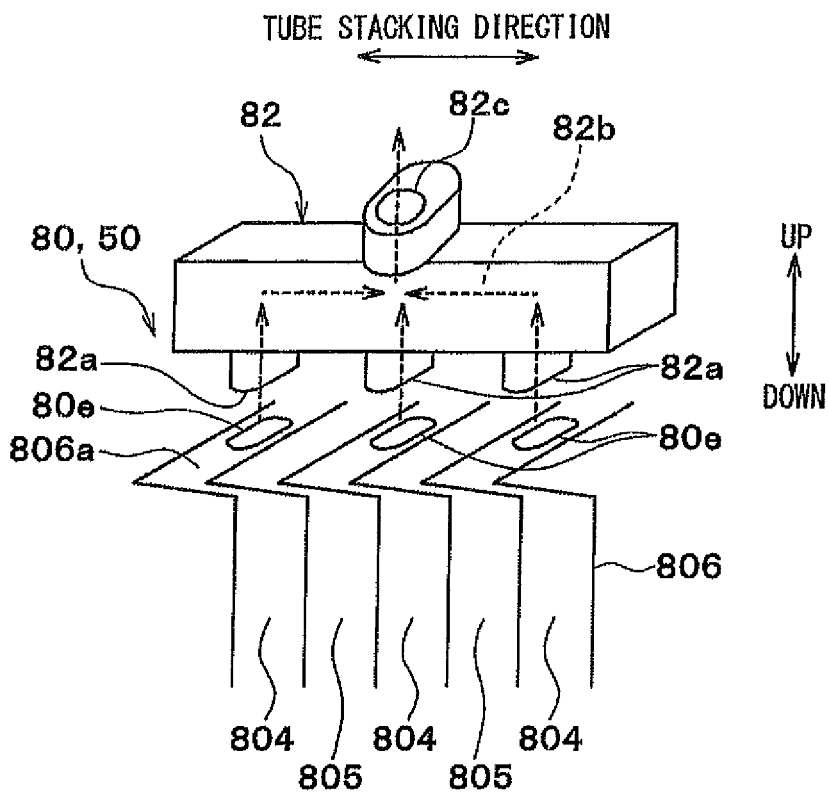
FIG. 62 is a perspective view showing a coolant cooler and a condenser in a twelfth embodiment.

Although in the above eighth embodiment, the only one coolant outlet 80*e* of the condenser 50 is formed, in a twelfth embodiment, as shown in FIG. 62, a plurality of coolant outlets 80*e* of the condenser 50 are formed.

In this example, the tubes 804 for the coolant and the tubes 805 for the refrigerant are alternately arranged. The coolant outlets 80*e* are formed by holes formed in the overhanging portions 806*a* of the plate members 806 that form the tubes 804 for the coolant.

A connector 82 for the coolant is attached to the coolant outlets 80*e*. The connector 82 for the coolant is formed by cutting or the like, and bonded to the plate member 806 by brazing. The connector 82 for the coolant includes a plurality of coolant inlets 82*a*, a coolant flow path 82*b*, and one coolant outlet 82*c*.

The coolant inlets 82*a* of the connector 82 for the coolant are provided corresponding to the coolant outlets 80*e* of the condenser 50. The coolant flow path 82*b* of the connector 82 for the coolant collects the coolants entering the coolant inlets 82*a*. The coolant collected by the coolant flow path 82*b* flows out of one coolant outlet 82*c* of the connector 82 for the coolant.

In this embodiment, a plurality of coolant outlets 80*e* are formed in the condenser 50, thereby allowing the good outflow of the coolant as compared to the case of formation of one coolant outlet 80*e* in the condenser 50 like the above eighth embodiment.

Like the coolant outlets 80*e* of the condenser 50, there may be provided a plurality of coolant inlets 80*f* of the condenser 50, the coolant outlets 80*g* of the coolant cooler 14, and the coolant inlets 80*h* of the coolant cooler 14.

Thirteenth Embodiment

Figure 63:
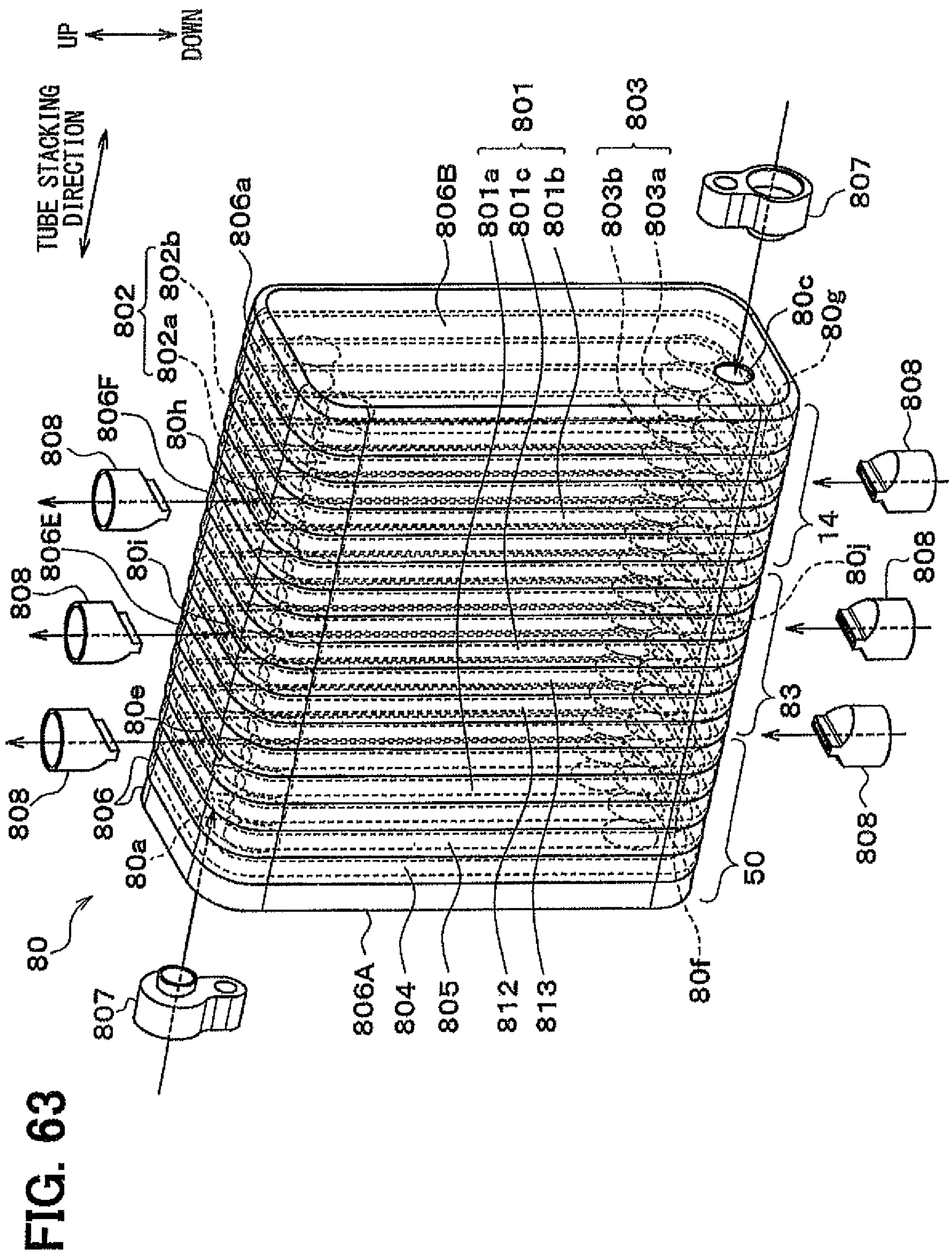
FIG. 63 is a perspective view showing a coolant cooler, a condenser, and an auxiliary heat exchanger in a thirteenth embodiment.
Figure 64:
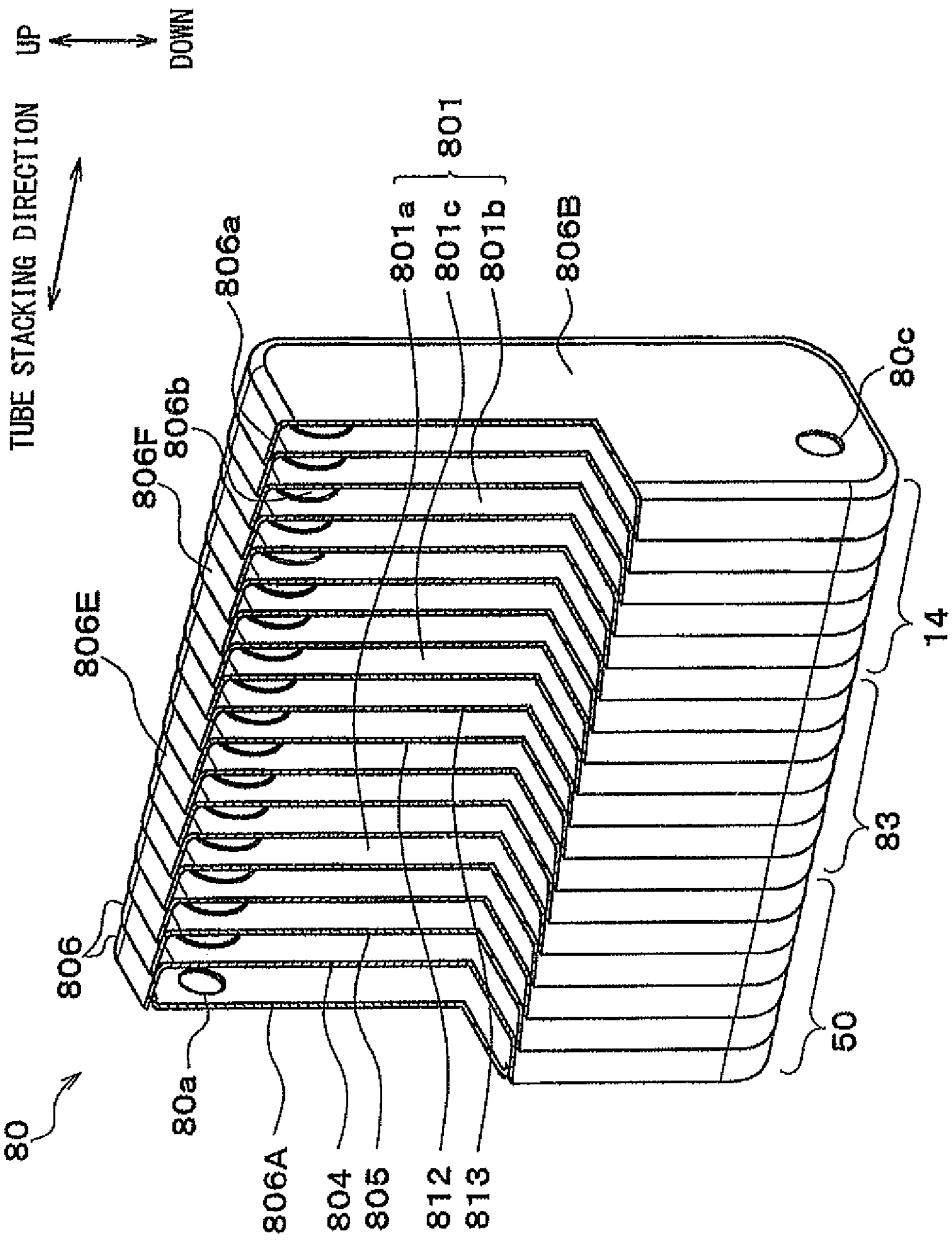
FIG. 64 is a perspective view of cutout parts of the coolant cooler, condenser, and auxiliary heat exchanger shown in FIG. 63.

Although in the above eighth embodiment, the heat exchanger 80 is composed of the coolant cooler 14 and condenser 50, in a thirteenth embodiment, as shown in FIGS. 63 and 64, the heat exchanger 80 is composed of the coolant cooler 14, the condenser 50, and an auxiliary heat exchanger 83.

In an example shown in FIGS. 63 and 64, the auxiliary heat exchanger 83 is an internal heat exchanger for exchanging heat between a liquid-phase refrigerant (first fluid) condensed by the condenser 50 and a gas-phase refrigerant (second fluid) evaporated by the coolant cooler 14.

The auxiliary heat exchanger 83 is disposed between the condenser 50 and the coolant cooler 14. Thus, an auxiliary heat exchanging portion 801*c* forming the auxiliary heat exchanger 83 of the heat changing portion 801 is disposed between a condenser heat exchanging portion 801*a* and a coolant cooler heat exchanging portion 801*b*.

The auxiliary heat exchanging portion 801*c* includes a laminate of tubes 812 for a first refrigerant (tubes for a first fluid) through which the liquid-phase refrigerant condensed by the condenser 50 flows, and tubes 813 for a second refrigerant (tubes for a second fluid) through which the gas-phase refrigerant evaporated by the coolant cooler 14 flows.

In order to enhance the heat exchanging properties of the auxiliary heat exchanging portion 801*c*, one of the tube 812 for the first refrigerant and the tube 813 for the second refrigerant is sandwiched between the tubes of the other type. More preferably, the tubes 812 for the first refrigerant and the tubes 813 for the second refrigerant are alternately arranged.

The refrigerant outlets 80*i* and 80*j* for allowing the refrigerant (internal fluid) to flow from the auxiliary heat exchanger 83 are formed of holes located at the upper surface and lower surface of the overhanging portion 806*a* of the plate member 806.

The refrigerant outlets 80*i* and 80*j* of the auxiliary heat exchanger 83 are disposed between a boundary (first boundary) located between the condenser 50 and the auxiliary heat exchanger 83, and another boundary (second boundary) located between the auxiliary heat exchanger 83 and the coolant cooler 14.

The refrigerant outlet 80*i* on the upper side of the auxiliary heat exchanger 83 communicates with the tank space 802*b* for the upper refrigerant. The refrigerant outlet 80*i* on the lower side of the auxiliary heat exchanger 83 communicates with the tank space 803*b* for the lower refrigerant.

The plate member 806A positioned on one end in the tube stacking direction (on the left end shown in FIGS. 63 and 64) is provided with the refrigerant inlet 80*a* of the condenser 50. The refrigerant inlet 80*a* of the condenser 50 communicates with the tank space 802*b* for the upper refrigerant. The connector 807 for the refrigerant is attached to the refrigerant inlet 80*a* of the condenser 50.

The plate member 806B positioned on the other end in the tube stacking direction (on the right end shown in FIGS. 63 and 64) is provided with the refrigerant inlet 80*c* of the coolant cooler 14. The refrigerant inlet 80*c* of the coolant cooler 14 communicates with the tank space 803*b* for the lower refrigerant. Another connector 807 for the refrigerant is attached to the refrigerant inlet 80*c* of the coolant cooler 14.

The overhanging portion 806*a* of the plate member 806 on the condenser 50 side has on its upper surface, the coolant outlet 80*e* of the condenser 50. The overhanging portion 806*a* of the plate member 806 on the condenser 50 side has on its lower surface, the coolant inlet 80*f* of the condenser 50.

The coolant outlet 80*e* of the condenser 50 communicates with the tank space 802*a* for the upper coolant. The coolant inlet 80*f* of the condenser 50 communicates with the tank space 803*a* for the lower coolant. Other connectors 808 for the coolant are respectively attached to the coolant outlet 80*e* and coolant inlet 80*f* of the condenser 50.

The overhanging portion 806*a* of the plate member 806 on the coolant cooler 14 side has on its upper surface, the coolant inlet 80*h* of the coolant cooler 14. The overhanging portion 806*a* of the plate member 806 on the coolant cooler 14 side has on its lower surface, the coolant outlet 80*g* of the coolant cooler 14.

The coolant inlet 80*h* of the coolant cooler 14 communicates with the tank space 802*a* for the upper coolant. The coolant outlet 80*g* of the coolant cooler 14 communicates with the tank space 803*a* for the lower coolant. The connectors 808 for the coolant are respectively attached to the coolant inlet 80*h* and coolant outlet 80*g* of the coolant cooler 14.

The coolant inlets 80*f* and 80*h* and coolant outlets 80*e* and 80*g* are formed by holes formed in the overhanging portions 806*a* of the plate members 806.

The plate member 806E positioned at the boundary between the condenser 50 and the auxiliary heat exchanger 83 is formed to connect the tank space 803*b* for the lower refrigerant with the condenser 50 side and the auxiliary heat exchanger 83 side, and not to connect other tank spaces 802*a*, 802*b*, and 803*a* with the condenser 50 side and the auxiliary heat exchanger 83 side.

Thus, the liquid-phase refrigerant condensed by the condenser heat exchanging portion 801*a* flows into the auxiliary heat exchanging portion 801*c* through the tank space 803*b* for the lower refrigerant (tank space for the first fluid).

A part of the tank space 803*b* for the lower refrigerant corresponding to the heat exchanging portion 801*a* of the condenser 50 is superimposed on a part of the space 803*b* corresponding to the heat exchanging portion 801*c* of the auxiliary heat exchanger 83 as viewed from the tube stacking direction.

The plate member 806F positioned at the boundary between the auxiliary heat exchanger 83 and the coolant cooler 14 is formed to connect the tank space 802*b* for the upper refrigerant with the auxiliary heat exchanger 83 side and the coolant cooler 14 side, and not to communicate other tank spaces 802*a*, 803*a*, and 803*b* with the auxiliary heat exchanger 83 side and the coolant cooler 14 side.

Thus, the gas-phase refrigerant evaporated by the coolant cooler heat exchanging portion 801*b* flows into the auxiliary heat exchanging portion 801*c* through the tank space 802*b* for the upper refrigerant (tank space for the second fluid).

A part of the tank space 802*b* for the upper refrigerant corresponding to the heat exchanging portion 801*c* of the auxiliary heat exchanger 83 is superimposed on another part of the tank space 802*b* corresponding to the heat exchanging portion 801*b* of the coolant cooler 14 as viewed from the tube stacking direction.

Figure 65:
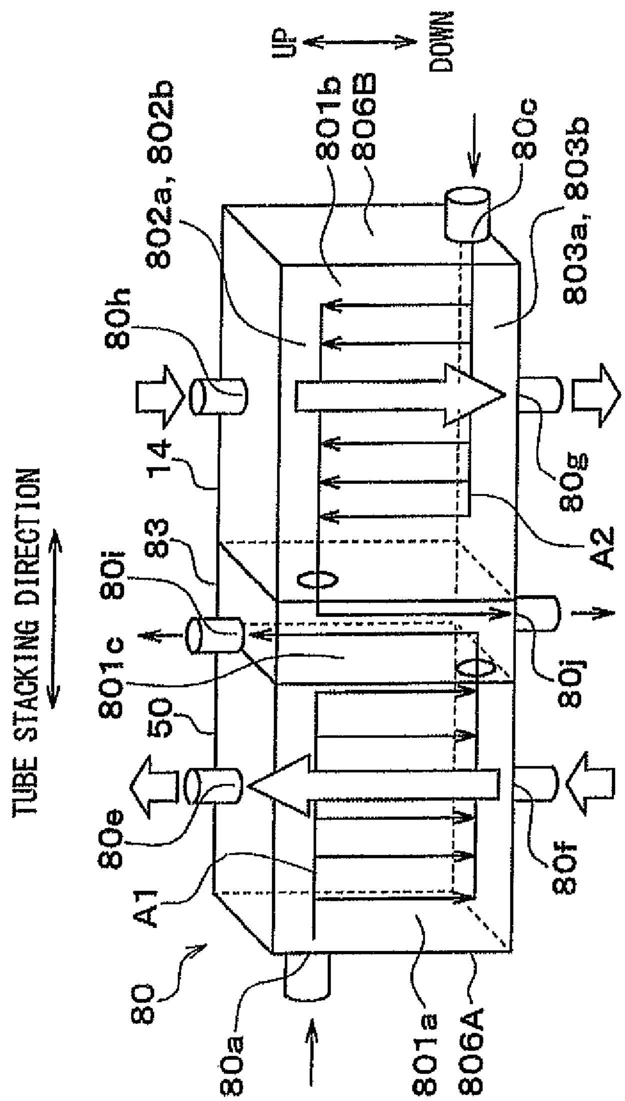
FIG. 65 is an exemplary perspective view of the coolant cooler and condenser shown in FIG. 63.

As indicated by the arrow A1 in FIG. 65, the refrigerant flowing from the refrigerant inlet 80*a* on the condenser 50 side into the condenser 50 flows through the tank space 802*b* for the upper refrigerant, the condenser heat exchanging portion 801*a*, and the tank space 803*b* for the lower refrigerant in that order to enter the auxiliary heat exchanger 83. Then, the refrigerant flows out of the upper side refrigerant outlet 80*i* through the auxiliary heat exchanging portion 801*c*.

As indicated by the arrow A2 in FIG. 65, the refrigerant flowing from the refrigerant inlet 80*c* on the coolant cooler 14 side into the coolant cooler 14 flows through the tank space 803*b* for the lower refrigerant, the coolant cooler heat exchanging portion 801*b*, and the tank space 802*b* for the upper refrigerant in that order to enter the auxiliary heat exchanger 83. Then, the refrigerant flows out of the lower side refrigerant outlet 80*j* through the auxiliary heat exchanging portion 801*c*.

At this time, the auxiliary heat exchanging portion 801*c* exchanges heat between the refrigerant flowing thereinto from the condenser 50 and the refrigerant flowing thereinto from the coolant cooler 14.

In this embodiment, the inlet and outlet for the coolant (fluid not passing through the auxiliary heat exchanger 83) are opened in the direction perpendicular to the tube stacking direction, whereas the inlet and outlet for the refrigerant (fluid passing through the auxiliary heat exchanger 83) are opened in the tube stacking direction.

In contrast, the inlet and outlet for the refrigerant (fluid passing through the auxiliary heat exchanger 83) are opened in the direction perpendicular to the tube stacking direction, whereas the inlet and outlet for the coolant (fluid passing through the auxiliary heat exchanger 83) are opened in the tube stacking direction, which can decrease the number of inlets and outlets opened in the direction perpendicular to the tube stacking direction.

In this embodiment, internal fluid inlet and outlet 80*i* and 80*j* of the auxiliary heat exchanger 83 are formed of holes made at the upper and lower surfaces of the overhanging portion 806*a* of the plate member 806. Alternatively, like the above eleventh embodiment, the internal fluid inlet and outlet 80*i* and 80*j* of the auxiliary heat exchanger 83 may be formed of a pair of opening formation members 811 each extending from the upper end to the lower end of the plate member 806.

The auxiliary heat exchanger 83 is not limited to the internal heat exchanger, and may be a supercooler or a coolant/coolant heat exchanger.

The supercooler is a heat exchanger for exchanging heat between the coolant and the liquid-phase refrigerant condensed by the condenser 50, further cooling the liquid-phase refrigerant to increase the degree of supercooling of the refrigerant.

The coolant/coolant heat exchanger is a heat exchanger for exchanging heat between the coolant having passing through the condenser 50 and the coolant having passed through the coolant cooler 14.

Fourteenth Embodiment

In a fourteenth embodiment, the arrangement of the inlet and outlet for fluid (for example, refrigerant in the case of the internal heat exchanger) flowing through the auxiliary heat exchanger 83 (hereinafter referred to as "fluid inlet" and "fluid outlet") is modified with respect to that of the above thirteenth embodiment.

Figure 66:
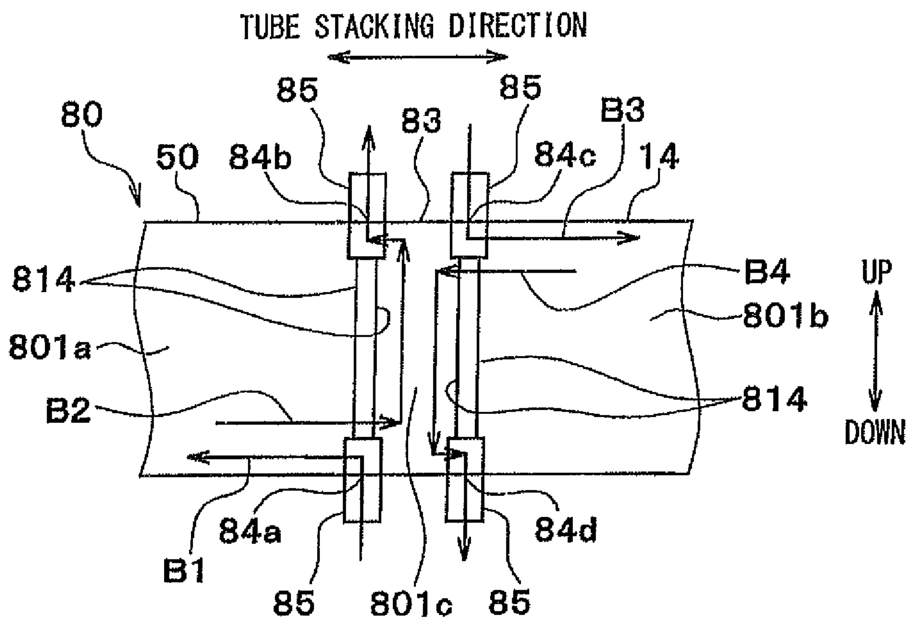
FIG. 66 is a front view showing a coolant cooler, a condenser, and an auxiliary heat exchanger in a fourteenth embodiment.

In this embodiment, as shown in FIG. 66, a first fluid inlet 84*a* and a first fluid outlet 84*b* are disposed between the condenser 50 and the auxiliary heat exchanger 83, whereas a second fluid inlet 84*c* and a second fluid outlet 84*d* are disposed between the auxiliary heat exchanger 83 and the coolant cooler 14.

The first fluid inlet 84*a* is disposed under between the condenser 50 and the auxiliary heat exchanger 83. The first fluid outlet 84*b* is disposed above between the condenser 50 and the auxiliary heat exchanger 83.

The second fluid inlet 84*c* is disposed above between the auxiliary heat exchanger 83 and the coolant cooler 14. The second fluid outlet 84*d* is disposed under between the auxiliary heat exchanger 83 and the coolant cooler 14.

Connectors 85 are attached to the first fluid inlet 84*a*, the first fluid outlet 84*b*, the second fluid inlet 84*c*, and the second fluid outlet 84*d*.

As indicated by the arrow B1 in FIG. 66, the fluid entering the first fluid inlet 84*a* flows into one of two tank spaces formed at the lower end of the condenser 50. As indicated by the arrow B2 in FIG. 66, the fluid in the other of the two tank spaces formed at the lower end of the condenser 50 flows from the first fluid outlet 84*b* through the auxiliary heat exchanger 83.

As indicated by the arrow B3 in FIG. 66, the fluid entering the second fluid inlet 84*c* flows into one of two tank spaces formed at the upper end of the coolant cooler 14. As indicated by the arrow B4 in FIG. 66, the fluid in the other of the two tank spaces formed at the upper end of the coolant cooler 14 flows from the second fluid outlet 84*d* through the auxiliary heat exchanger 83.

Figure 67:
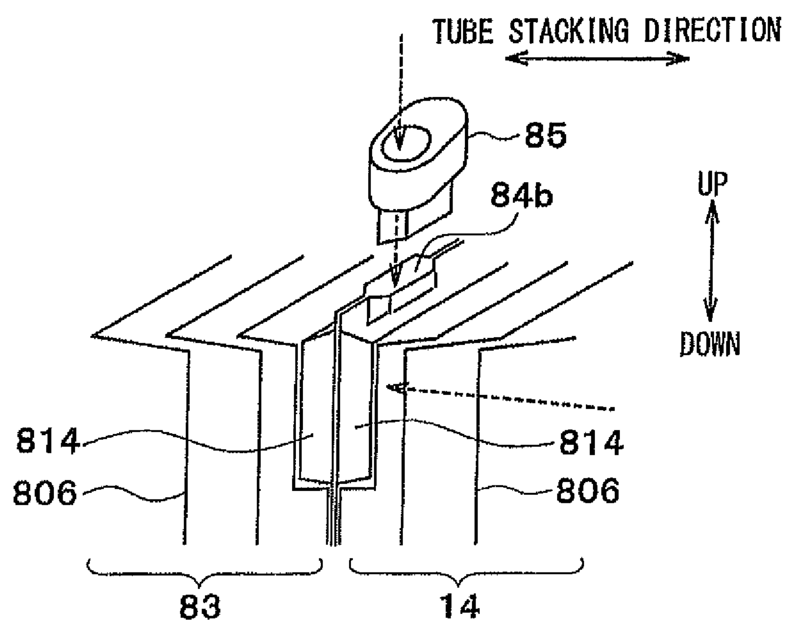
FIG. 67 is a perspective view showing a part near a first fluid outlet shown in FIG. 66.

FIG. 67 shows a part in the vicinity of the first fluid outlet 84*b*. A pair of plate opening formation members 814 (a plurality of members) are disposed between the condenser 50 and the auxiliary heat exchanger 83 to extend from the upper end to lower end of the plate member 806.

The first fluid outlet 84*b* is formed of an opening formed at the upper surface of the pair of opening formation members 814. The upper end of the pair of opening formation member 814 is shaped to expand in the tube stacking direction. The plate members 806 adjacent to the pair of opening formation members 814 have upper ends thereof recessed in the tube stacking direction, corresponding to the shape of the pair of opening formation members 814.

The plate members 806 are disposed opposed to each other in the tube stacking direction with the opening formation member 814 centered therebetween as the boundary between the condenser 50 and the auxiliary heat exchanger 83.

Figure 68:
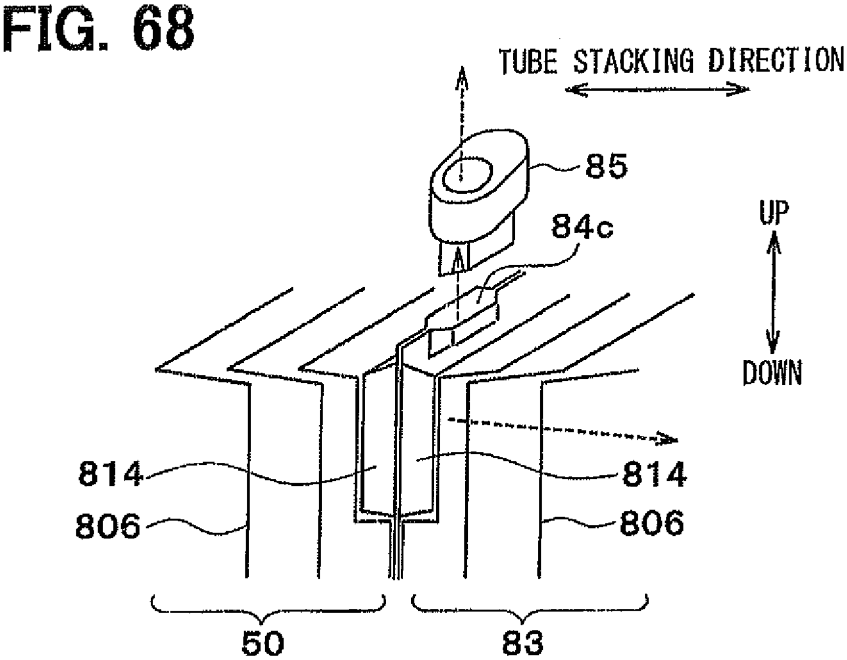
FIG. 68 is a perspective view showing a part near a second fluid outlet shown in FIG. 66.

FIG. 68 shows a part in the vicinity of the second fluid inlet 84*c*. The structure in the vicinity of the second fluid inlet 84*c* is the same as that in the vicinity of the first fluid outlet 84*b* shown in FIG. 67.

The plate members 806 are disposed opposed to each other in the tube stacking direction with the opening formation member 814 centered therebetween as the boundary between the auxiliary heat exchanger 83 and the coolant cooler 14.

Although not shown in the figure, the structure in the vicinity of the first fluid inlet 84*a* and the structure in the vicinity of the second fluid outlet 84*d* are also the same as that in the vicinity of the first fluid outlet 84*b* shown in FIG. 67 and that in the vicinity of the second fluid inlet 84*c* shown in FIG. 68.

This embodiment does not need to guide a fluid having passed through the auxiliary heat exchanger 83 to the end of the heat exchanger 80 in the tube stacking direction in flowing out the fluid, and thus can simplify the structure of the heat exchanger.

The pair of opening formation members 814 in this embodiment can be applied to the heat exchanger 80 of the above eighth embodiment. That is, in the heat exchanger 80 of the above eighth embodiment, the pair of opening formation members 814 may be disposed between the condenser 50 and the coolant cooler 14 to form the fluid inlet and outlet. In this case, a cavity may be formed between the pair of opening formation members 814 to suppress the heat transfer between the condenser 50 and the coolant cooler 14. That is, the cavity formation portion 809 of the above eighth embodiment can be formed by the pair of opening formation members 814.

In this embodiment, the inlets and outlets for the fluid flowing through the auxiliary heat exchanger 83 (for example, the refrigerant in the case of the internal heat exchanger) are disposed between the condenser 50 and the auxiliary heat exchanger 83, and between the auxiliary heat exchanger 83 and the coolant cooler 14. Additionally, or alternatively, the inlets and outlets for the fluid not flowing through the auxiliary heat exchanger 83 (for example, the coolant in the case of the internal heat exchanger) may be disposed between the condenser 50 and the auxiliary heat exchanger 83, and between the auxiliary heat exchanger 83 and the coolant cooler 14.

Fifteenth Embodiment

A fifteenth embodiment of the invention specifically shows the structure of the coolant cooler 14, the condenser 50, and the expansion valve 25 in the seventh embodiment.

The basic structure of the coolant cooler 14 and condenser 50 is the same as that of the heat exchanger 80 of the above eighth embodiment. That is, the coolant cooler 14 and condenser 50 are formed by stacking and bonding a number of plate members 806 in the tube stacking direction.

The coolant cooler 14 and the condenser 50 are not bonded together by brazing. However, the coolant cooler 14 and the condenser 50 are individually assembled by brazing, and then the expansion valve 25 is assembled to between the coolant cooler 14 and the condenser 50.

Figure 69:
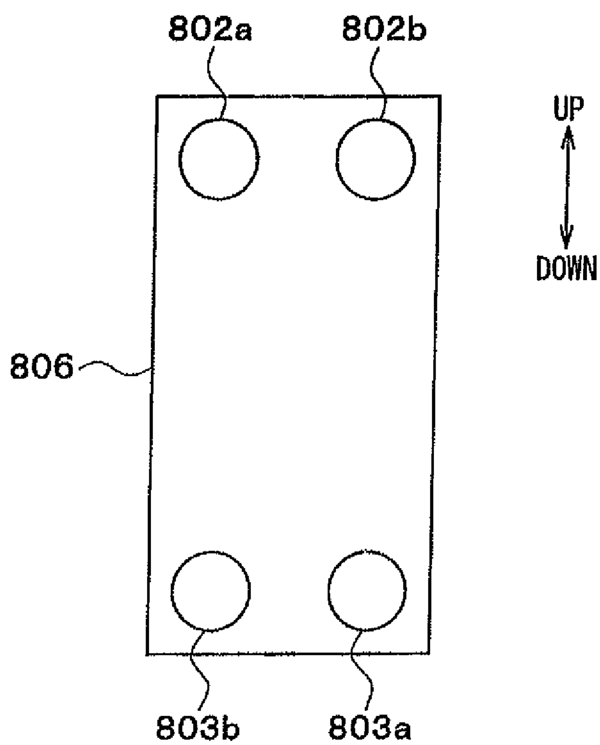
FIG. 69 is a front view of a plate member forming a condenser in a fifteenth embodiment.
Figure 70:
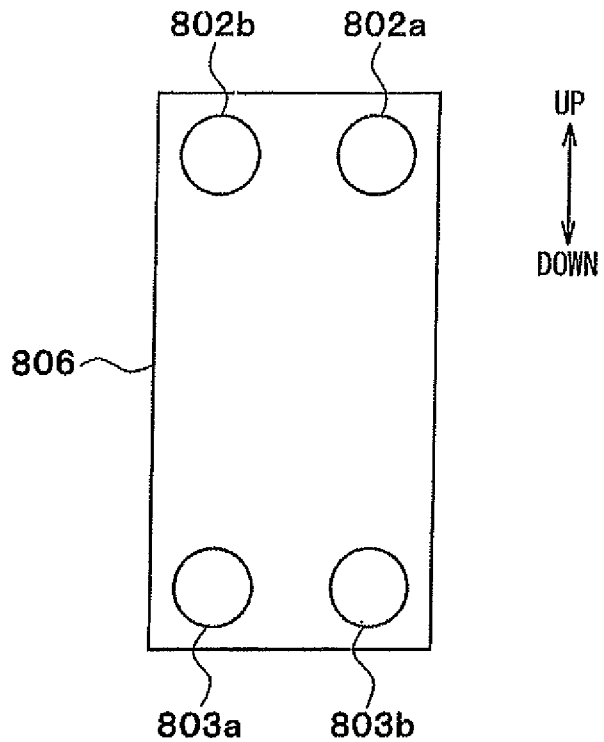
FIG. 70 is a front view of a plate member forming a coolant cooler in the fifteenth embodiment.

FIG. 69 is a diagram of the plate member 806 forming the condenser 50 as viewed from the expansion valve 25. FIG. 70 is a diagram of the plate member 806 forming the coolant cooler 14 as viewed from the expansion valve 25.

With the coolant cooler 14, condenser 50, and expansion valve 25 integrally assembled together, the tank space 803*b* for the lower refrigerant of the condenser 50 (or first tank space for the refrigerant) and the tank space 803*b* for the lower refrigerant of the coolant cooler 14 (or second tank space for the refrigerant) are positioned to be superimposed on each other as viewed from the tube stacking direction. Thus, a common plate member can be used as the plate member 806 forming the condenser 50 and the plate member 806 forming the coolant cooler 14.

Figure 71:
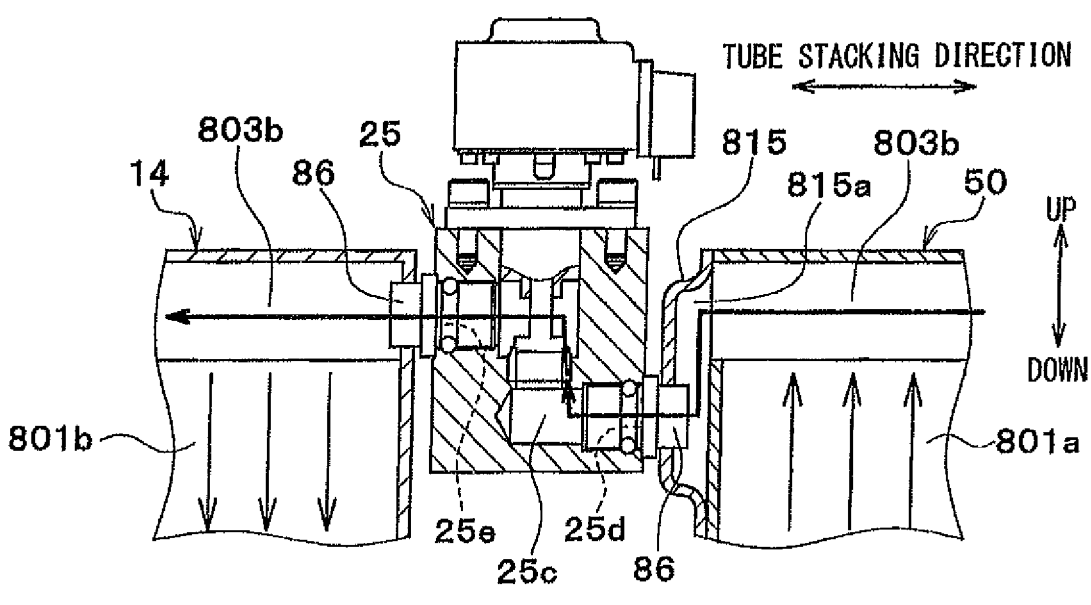
FIG. 71 is a cross-sectional view showing a part near an expansion valve in the fifteenth embodiment.

FIG. 71 shows a cross-sectional view of a part in the vicinity of the expansion valve 25.

The expansion valve 25 has the decompression flow path 25*c* for decompressing the refrigerant flowing from the condenser 50 to allow the decompressed refrigerant to flow into the coolant cooler 14. The inlet 25*d* and outlet 25*e* of the decompression flow path 25*c* are disposed in different positions as viewed from the tube stacking direction.

The outlet 25*e* of the decompression flow path 25*c* is disposed to be superimposed on the tank space 803*b* for the lower refrigerant of the coolant cooler 14 as viewed from the tube stacking direction. The outlet 25*e* of the decompression flow path 25*c* and the tank space 803*b* for the lower refrigerant of the coolant cooler 14 are connected and communicate with each other via the connector 86.

The inlet 25*d* of the decompression flow path 25*c* is disposed in a position different from that of the tank space 803*b* for the lower refrigerant of the condenser 50 as viewed from the tube stacking direction. A refrigerant flow path formation member 815 forming a refrigerant flow path 815*a* is disposed between the inlet 25*d* of the decompression flow path 25*c* and the tank space 803*b* for the lower refrigerant of the condenser 50.

The refrigerant flow path formation member 815 is a plate member formed using, for example, a both-sided clad material including an aluminum center layer with both sides thereof clad with brazing. The refrigerant flow path formation member 815 is stacked over and bonded to the plate members 806 forming the condenser 50 by brazing.

The refrigerant flow path 815*a* is a flow path for allowing the tank space 803*b* for the lower refrigerant of the condenser 50 to communicate with the inlet 25*d* of the decompression flow path 25*c*, and extends non-parallel to the tube stacking direction. The refrigerant flow path 815*a* is connected to the inlet 25*d* of the decompression flow path 25*c* via the connector 86.

In this embodiment, the refrigerant flow path 815*a* extending non-parallel to the tube stacking direction is formed between the inlet 25*d* of the decompression flow path 25*c* and the tank space 803*b* for the lower refrigerant of the condenser 50, so that the expansion valve 25 with the inlet 25*d* and outlet 25*e* of the decompression flow path 25*c* not arranged linearly can be assembled between the coolant cooler 14 and the condenser 50 without any trouble.

Contrary to this embodiment, the inlet 25*d* of the decompression flow path 25*c* is superimposed on the tank space 803*b* for the lower refrigerant of the condenser 50 as viewed from the tube stacking direction, and the outlet 25*e* of the decompression flow path 25*c* is disposed in a position different from that of the tank space 803*b* for the lower refrigerant of the coolant cooler 14 as viewed from the tube stacking direction. In this case, the refrigerant flow path 815*a* extending non-parallel to the tube stacking direction may be formed between the outlet 25*e* of the decompression flow path 25*c* and the tank space 803*b* for the lower refrigerant of the coolant cooler 14.

Other Embodiments

Various modifications and changes can be made to the above-mentioned embodiments and reference examples as follows.

(1) Various devices can be used as the devices to be cooled. For example, a heat exchanger incorporated in a seat for a passenger to sit on and adapted to cool and heat the seat by using coolant may be used as the device to be cooled. The number of devices to be cooled may be any number as long as the number is a plural number (two or more).

(2) The above first reference example shows one example of the arrangement pattern of holes formed in valve elements of the first and second switching valves 19 and 20. However, the arrangement pattern of holes formed in the valve elements of the first and second switching valves 19 and 20 can be changed in various manners.

The connection state between the inlet and outlet for the coolant can be changed in a variety of ways by modifying the arrangement pattern of the holes formed in the valve elements of the first and second switching valves 19 and 20, which can easily adapt to the change of specifications, including addition of an operating mode and the like.

(3) Although in the above first reference example, the switching is performed among the first to third modes based on the outside air temperature detected by the outside air sensor 42, the switching may be performed among the first to third modes based on the coolant temperature detected by the water temperature sensor 43.

(4) Although in the above second embodiment, the cold energy stored in the battery is used to supercool the high-pressure refrigerant of the refrigeration cycle 22 in the second mode, the cold energy stored in the battery may be used to cool the air of the vehicle interior, the inverter, and the like.

(5) In the reference examples described above, the coolant cooler 14 for cooling the coolant by the low-pressure refrigerant of the refrigeration cycle 22 is used as the cooler for cooling the coolant down to a lower temperature than the outside air temperature. However, a Peltier device may be used as the cooler.

(6) In each of the above-mentioned embodiments and reference examples, the coolant may intermittently circulate through the battery cooler 15 to thereby control the cooling capacity for the battery.

(7) In each of the above-mentioned embodiments and reference examples, the switching may be performed between a state of circulation of the intermediate-temperature coolant through the exhaust gas cooler 17 and another state of circulation of the low-temperature coolant therethrough according to a load on an engine. When a load on the engine is small, for example, while the vehicle is traveling in midtown, the switching can be performed to the low-temperature coolant circulation to cool the exhaust gas by the refrigeration cycle 22, resulting in an increase in density of exhaust gas returned to the engine intake side, thereby improving the fuel efficiency.

(8) In each of the above-mentioned embodiments and reference examples, the coolant is used as the heat medium for cooling the device to be cooled. Alternatively, various kinds of media, such as oil, may be used as the heat medium.

(9) The refrigeration cycle 22 of each of the above embodiments and reference examples employs a fluorocarbon refrigerant as the refrigerant. However, the kind of the refrigerant is not limited to such a kind of refrigerant. Specifically, a natural refrigerant, such as carbon dioxide, a hydrocarbon-based refrigerant, and the like may also be used as the refrigerant.

The refrigeration cycle 22 of each of the above embodiments and reference examples forms a subcritical refrigeration cycle whose high-pressure side refrigerant pressure does not exceed a critical pressure of the refrigerant. Alternatively, the refrigeration cycle may form a supercritical refrigeration cycle whose high-pressure side refrigerant pressure exceeds the critical pressure of the refrigerant.

(10) In each of the above-mentioned embodiments and reference examples, the vehicle cooling system of the present disclosure is applied to the hybrid car by way of example. Alternatively, the present disclosure may be applied to an electric vehicle which obtains a driving force for traveling from an electric motor for traveling without including an engine.

(11) Although in the above respective embodiments, the heat exchanger 80 is disposed such that the longitudinal direction of the tubes is identical to the vertical direction, namely, the direction of gravitational force, the invention is not limited thereto. The direction of arrangement of the heat exchanger 80 can be appropriately changed.

Figure 72:
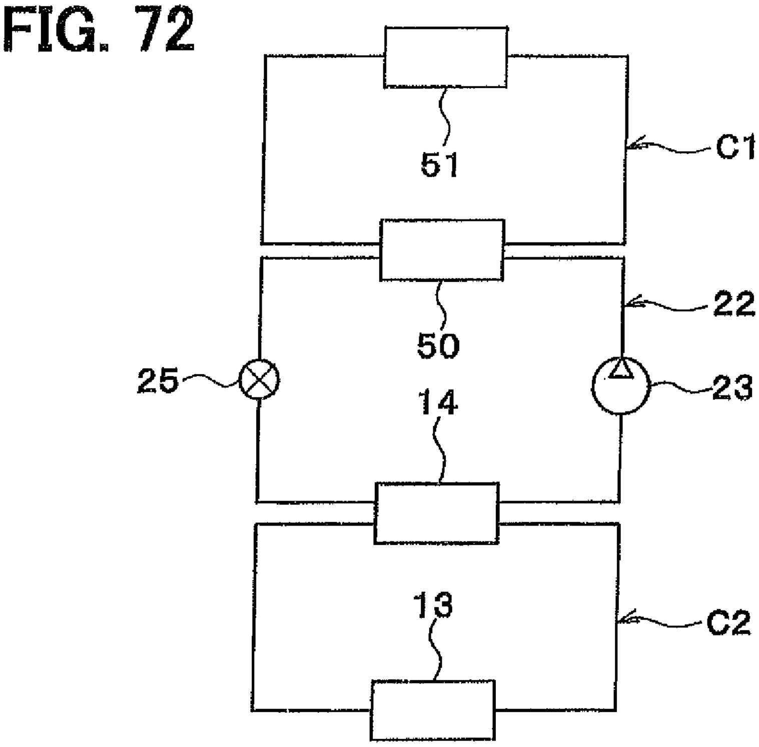
FIG. 72 is an entire configuration diagram of a thermal management system in another embodiment of the invention.
Figure 73:
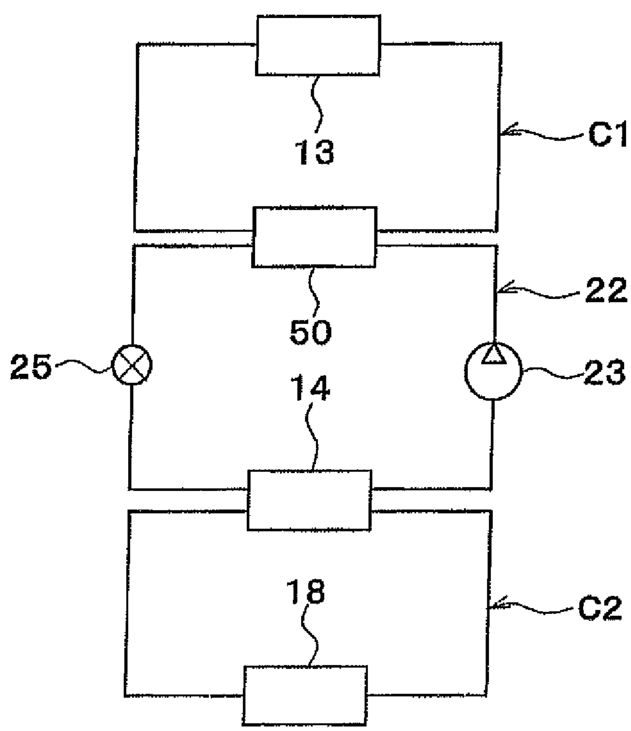
FIG. 73 is an entire configuration diagram of a thermal management system in another embodiment of the invention.

(12) The coolant cooler 14 and condenser 50 of the above-mentioned embodiments can be applied to a thermal management system shown in FIGS. 72 and 73.

In the thermal management system shown in FIGS. 72 and 73, the condenser 50 is adapted to cool the refrigerant, while heating the intermediate-temperature coolant by exchanging heat between the intermediate-temperature coolant circulating through the first coolant circuit C1 (intermediate-temperature coolant circuit) and the refrigerant circulating through the refrigeration cycle 22.

In the thermal management system shown in FIGS. 72 and 73, the coolant cooler 14 is adapted to cool the low-temperature coolant by exchanging heat between the low-temperature coolant circulating through the second coolant circuit C2 (low-temperature coolant circuit) and the refrigerant circulating through the refrigeration cycle 22.

In the thermal management system shown in FIG. 72, the heater core 51 and the coolant pump (not shown) are disposed in the first coolant circuit C1, whereas the radiator 13 and the coolant pump (not shown) are disposed in the second coolant circuit C2.

In the thermal management system shown in FIG. 73, the radiator 13 and the coolant pump (not shown) are disposed in the first coolant circuit C1, whereas the cooler core 18 and the coolant pump (not shown) are disposed in the second coolant circuit C2.

The coolant cooler 14 and condenser 50 in the thermal management system shown in FIGS. 72 and 73 can be integrated together, like the first embodiment.

The coolant cooler 14, condenser 50, and expansion valve 25 of the above-mentioned seventh embodiment can also be applied to a thermal management system shown in FIGS. 72 and 73. The coolant cooler 14, condenser 50, and expansion valve 25 in the thermal management system shown in FIGS. 72 and 73 can be integrated together, like the seventh embodiment.

(13) The above-mentioned embodiments may be appropriately combined together within the realm of possibility.

What is claimed is:

1. A heat exchanger comprising:

a plurality of plate members which are stacked and bonded to each other, wherein the plurality of plate members constitute a heat exchanging portion in which refrigerant tubes and heat medium tubes are stacked with each other, a refrigerant in a vapor-compression refrigeration cycle flowing through the refrigerant tubes, a heat medium flowing through the heat medium tubes to exchange heat with the refrigerant, and a tank portion in which at least one of a refrigerant tank space and a heat medium tank space is defined, the refrigerant tank space being adapted to collect or distribute the refrigerant with respect to the refrigerant tubes, the heat medium tank space being adapted to collect or distribute the heat medium with respect to the heat medium tubes, the heat exchanging portion includes a first heat exchanging portion in which heat is exchanged between the heat medium and the refrigerant on a high-pressure side of the vapor-compression refrigeration cycle, and a second heat exchanging portion in which heat is exchanged between the heat medium and the refrigerant on a low-pressure side of the vapor-compression refrigeration cycle, the tank portion is provided with a refrigerant inlet through which the refrigerant flows into the refrigerant tank space, a refrigerant outlet through which the refrigerant flows out of the refrigerant tank space, a heat medium inlet through which the heat medium flows into the heat medium tank space, and a heat medium outlet through which the heat medium flows out of the heat medium tank space, at least one of the refrigerant inlet, the refrigerant outlet, the heat medium inlet, and the heat medium outlet is disposed between both ends of the tank portion in a tube stacking direction of the refrigerant tubes and the heat medium tubes, an auxiliary heat exchanging portion that exchanges heat between a first fluid and a second fluid is provided between the first heat exchanging portion and the second heat exchanging portion, the first fluid is the refrigerant or the heat medium, the second fluid is the refrigerant or the heat medium, and at least one of the first fluid and the second fluid is the refrigerant or the heat medium flowing from at least one of the first heat exchanging portion and the second heat exchanging portion.

2. The heat exchanger according to claim 1, wherein the auxiliary heat exchanging portion includes first fluid tubes and second fluid tubes stacked with each other, the first fluid flowing through the first fluid tubes, the second fluid flowing through the second fluid tubes, the first fluid tubes are the coolant tubes or the heat medium tubes, the second fluid tubes are the refrigerant tubes or the heat medium tubes, and one of the first fluid tubes is sandwiched between adjacent two of the second fluid tubes.

3. The heat exchanger according to claim 1, wherein the first fluid is the refrigerant or the heat medium flowing from the first heat exchanging portion, and the second fluid is the refrigerant or the heat medium flowing from the second heat exchanging portion.

4. The heat exchanger according to claim 3, wherein the tank portion is provided with a first fluid tank space adapted to allow the first fluid flowing from the first heat exchanger to enter the auxiliary heat exchanging portion, and a second fluid tank space adapted to allow the second fluid flowing from the second heat exchanging portion to enter the auxiliary heat exchanging portion, the first fluid tank space is the refrigerant tank space or the heat medium tank space, the second fluid tank space is the refrigerant tank space or the heat medium tank space, a part of the first fluid tank space corresponding to the first heat exchanging portion is superimposed on a part of the first fluid tank space corresponding to the auxiliary heat exchanging portion when being viewed from the tube stacking direction, and a part of the second fluid tank space corresponding to the second heat exchanging portion is superimposed on a part of the second fluid tank space corresponding to the auxiliary heat exchanging portion when being viewed from the tube stacking direction.

5. The heat exchanger according to claim 3, wherein the first fluid is the refrigerant flowing out of the first heat exchanging portion, and the second fluid is the refrigerant flowing out of the second heat exchanging portion.

6. The heat exchanger according to claim 1, wherein at least one of the refrigerant outlet and the heat medium outlet is disposed between (i) a first boundary serving as a boundary between the first heat exchanging portion and the auxiliary heat exchanging portion, and (ii) a second boundary serving as a boundary between the auxiliary heat exchanging portion and the second heat exchanging portion.

7. The heat exchanger according to claim 1, wherein at least one of the refrigerant inlet and the refrigerant outlet is disposed between both ends of the tank portion in the tube stacking direction of the refrigerant tubes and the heat medium tubes.

8. The heat exchanger according to claim 1, wherein at least one of the refrigerant inlet, the refrigerant outlet, the heat medium inlet, and the heat medium outlet is formed by multiple members disposed between the plurality of plate members.

9. The heat exchanger according to claim 1, wherein at least one of the refrigerant outlet and the heat medium outlet is constituted by multiple members disposed between the plurality of plate members, and the multiple members are disposed at least one of (i) between the first heat exchanging portion and the auxiliary heat exchanging portion, and (ii) between the auxiliary heat exchanging portion and the second heat exchanging portion.

10. The heat exchanger according to claim 9, wherein the multiple members extend from one end to the other end of the plurality of plate members in a longitudinal direction of the refrigerant tubes and the heat medium tubes, and outlets formed by the multiple members among the refrigerant outlet and the heat medium outlet are disposed at both the one end and the other end of the refrigerant tubes and the heat medium tubes.

11. The heat exchanger according to claim 10, wherein the plurality of plate members are disposed opposite to each other in the tube stacking direction with the multiple members centered.

12. The heat exchanger according to claim 1, wherein at least one of the refrigerant inlet, the refrigerant outlet, the heat medium inlet, and the heat medium outlet is opened between both the ends in a direction perpendicular to the tube stacking direction.

13. The heat exchanger according to claim 1, wherein the plurality of plate members are disposed opposite to each other in the tube stacking direction, with a boundary between the first heat exchanging portion and the second heat exchanging portion, as a center.

* * * * *